US011080718B2

(12) United States Patent
Wiig et al.

(10) Patent No.: US 11,080,718 B2
(45) Date of Patent: *Aug. 3, 2021

(54) SYSTEM AND METHOD OF A REQUIREMENT, ACTIVE COMPLIANCE AND RESOURCE MANAGEMENT FOR CYBER SECURITY APPLICATION

(71) Applicants: Rex Wiig, Chino, CA (US); Angel Martinez, Anaheim, CA (US)

(72) Inventors: Rex Wiig, Chino, CA (US); Angel Martinez, Anaheim, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/350,560

(22) Filed: Dec. 3, 2018

(65) Prior Publication Data

US 2019/0172073 A1 Jun. 6, 2019

Related U.S. Application Data

(63) Continuation-in-part of application No. 15/732,485, filed on Nov. 20, 2017, now Pat. No. 10,268,974, which is a continuation-in-part of application No. 15/731,302, filed on May 22, 2017, now Pat. No. 9,953,281, which is a continuation-in-part of application No. 14/544,314, filed on Dec. 22, 2014, now Pat. No. 9,704,119, which is a (Continued)

(51) Int. Cl.

*H04L 29/06* (2006.01)
*G06Q 30/00* (2012.01)
*G06Q 10/06* (2012.01)
*G06N 20/00* (2019.01)
*G06N 3/08* (2006.01)
*G06N 3/04* (2006.01)
*H04L 9/06* (2006.01)
*H04L 9/08* (2006.01)

(52) U.S. Cl.

CPC ......... *G06Q 30/018* (2013.01); *G06N 3/0436* (2013.01); *G06N 3/08* (2013.01); *G06N 20/00* (2019.01); *G06Q 10/067* (2013.01); *G06Q 10/0635* (2013.01); *G06Q 10/06315* (2013.01); *H04L 9/0637* (2013.01); *H04L 9/0852* (2013.01); *H04L 2209/38* (2013.01)

(58) Field of Classification Search

None

See application file for complete search history.

(56) References Cited

U.S. PATENT DOCUMENTS 10,554,507 B1 * 2/2020 Siddiqui ............. H04L 63/1408
2005/0132225 A1 * 6/2005 Gearhart ............... G06F 21/577
726/4

(Continued)

*Primary Examiner* — Brandon S Hoffman

(57) ABSTRACT

A system and/or a method based on a scalable requirement, active compliance and resource management for enhancing real-time and/or near real-time Cyber security, utilizing a learning (self-learning) computer integrated with (a) one or more learning/quantum learning/fuzzy/neuro-fuzzy logic algorithms in real-time or near real-time and/or (b) one or more software agents in real-time or near real-time and/or (c) encrypted data or a set of encrypted data blocks identified with a blockchain, further coupled with a (quantum computing resistant) public key/private cryptosystem and/or semantic web and/or hardware authentication is disclosed.

37 Claims, 173 Drawing Sheets

Related U.S. Application Data continuation-in-part of application No. 13/815,843, filed on Mar. 15, 2013, now Pat. No. 9,646,279, which is a continuation-in-part of application No. 13/573,634, filed on Sep. 28, 2012, now Pat. No. 8,990,308.

(60) Provisional application No. 61/848,015, filed on Dec. 19, 2012.

(56) References Cited

U.S. PATENT DOCUMENTS

| | | | | |
|---|---|---|---|---|
| 2010/0115601 | A1* | 5/2010 | Brandstetter | G06F 21/577<br>726/11 |
| 2017/0063907 | A1* | 3/2017 | Muddu | H04L 63/1441 |
| 2017/0255778 | A1* | 9/2017 | Ionescu | G06F 21/53 |
| 2017/0286880 | A1* | 10/2017 | Wiig | G06Q 10/067 |
| 2018/0124094 | A1* | 5/2018 | Hamdi | H04L 63/1433 |

* cited by examiner

REQUIREMENT COUNT PER EVENT NUMBER

100D

| Number of Requirements | | | | | | | | | | | | | | | |
|---|---|---|---|---|---|---|---|---|---|---|---|---|---|---|---|
| Event Number Title | Analysis | | | Inspection | | | Demo | | | Test | | | Total | | |
| | Alloc | Verif | Status | Alloc | Verif | Status | Alloc | Verif | Status | Alloc | Verif | Status | Alloc | Verif | Status |
| 1000-00 System A Mission Countdown Test | 6 | 2 | 33.3% | 3 | 0 | 0.0% | 0 | 0 | 0.0% | 0 | 1 | 0.0% | 9 | 3 | 0.0% |
| 1001-00 System A Software | 4 | 2 | 50.0% | 1 | 0 | 0.0% | 0 | 0 | 0.0% | 0 | 0 | 0.0% | 5 | 2 | 0.0% |
| 1002-00 System A End-To-End Test | 4 | 0 | 0.0% | 0 | 0 | 0.0% | 0 | 0 | 0.0% | 0 | 0 | 0.0% | 4 | 0 | 0.0% |
| 1003-00 System A Mass Properties | 3 | 0 | 0.0% | 1 | 0 | 0.0% | 1 | 0 | 0.0% | 0 | 0 | 0.0% | 5 | 0 | 0.0% |
| 1004-00 System B Functional Test | 2 | 0 | 0.0% | 2 | 0 | 0.0% | 2 | 0 | 0.0% | 0 | 0 | 0.0% | 6 | 0 | 0.0% |
| 1005-00 System B Software Qualification | 0 | 0 | 0.0% | 0 | 0 | 0.0% | 0 | 0 | 0.0% | 3 | 0 | 0.0% | 3 | 0 | 0.0% |
| 1006-00 System B Reliability | 4 | 0 | 0.0% | 0 | 0 | 0.0% | 2 | 0 | 0.0% | 0 | 0 | 0.0% | 6 | 0 | 0.0% |
| 1007-00 System B Mass Properties | 2 | 0 | 0.0% | 2 | 0 | 0.0% | 0 | 0 | 0.0% | 0 | 0 | 0.0% | 4 | 0 | 0.0% |
| 1008-00 System B Thermal Test | 2 | 0 | 0.0% | 2 | 0 | 0.0% | 0 | 0 | 0.0% | 0 | 0 | 0.0% | 4 | 0 | 0.0% |

FIG. 5B1

REQUIREMENT COUNT PER EVENT NUMBER

100D

| Number of Requirements | | | | | | | | | | | | | | | |
|---|---|---|---|---|---|---|---|---|---|---|---|---|---|---|---|
| Event Number Title | Analysis | | | Inspection | | | Demo | | | Test | | | Total | | |
| | Alloc Verif Status | | | Alloc Verif Status | | | Alloc Verif Status | | | Alloc Verif Status | | | Alloc Verif Status | | |
| 1009-00 System B Design and Construction | 2 | 0 | 0.0% | 2 | 0 | 0.0% | 1 | 0 | 0.0% | 0 | 0 | 0.0% | 5 | 0 | 0.0% |
| 1010-00 System C Power Up Test | 3 | 0 | 0.0% | 1 | 0 | 0.0% | 0 | 0 | 0.0% | 0 | 0 | 0.0% | 4 | 0 | 0.0% |
| 1011-00 System C Data Transmission | 1 | 0 | 0.0% | 0 | 0 | 0.0% | 2 | 0 | 0.0% | 2 | 0 | 0.0% | 5 | 0 | 0.0% |
| 1012-00 System C Mass Properties | 0 | 0 | 0.0% | 0 | 0 | 0.0% | 2 | 0 | 0.0% | 2 | 0 | 0.0% | 4 | 0 | 0.0% |
| 1013-00 System C Reliability | 3 | 0 | 0.0% | 0 | 0 | 0.0% | 1 | 0 | 0.0% | 0 | 0 | 0.0% | 4 | 0 | 0.0% |
| 1014-00 System C Thermal | 2 | 0 | 0.0% | 2 | 0 | 0.0% | 0 | 0 | 0.0% | 0 | 0 | 0.0% | 4 | 0 | 0.0% |
| 1015-00 System C Design and Construction | 1 | 0 | 0.0% | 0 | 0 | 0.0% | 1 | 0 | 0.0% | 3 | 0 | 0.0% | 5 | 0 | 0.0% |
| Total | 39 | 4 | 10.3% | 16 | 0 | 0.0% | 12 | 0 | 0.0% | 10 | 1 | 0.0% | 77 | 5 | 0.0% |

FIG. 5B2

VERIFICATION STATUS BY SPECIFICATION

100D

| | Number of Requirements | | | | | | | | | | | | | | |
|---|---|---|---|---|---|---|---|---|---|---|---|---|---|---|---|
| Specification Number/ Name | Analysis | | | Inspection | | | Demo | | | Test | | | Total | | |
| | Alloc | Verif | Status | Alloc | Verif | Status | Alloc | Verif | Status | Alloc | Verif | Status | Alloc | Verif | Status |
| 1. A- Spec | 8 | 1 | 12.5% | 7 | 1 | 14.3% | 10 | 0 | 0.0% | 30 | 2 | 6.7% | 55 | 4 | 7.3% |
| 2. B-1 Spec | 10 | 3 | 30.0% | 5 | 0 | 0.0% | 0 | 0 | 0.0% | 0 | 0 | 0.0% | 17 | 3 | 17.6% |
| 3. B-2 Spec | 0 | 0 | 0.0% | 0 | 0 | 0.0% | 0 | 0 | 0.0% | 0 | 0 | 0.0% | 0 | 0 | 0.0% |
| 4. ICD 123 | 0 | 0 | 0.0% | 0 | 0 | 0.0% | 2 | 0 | 0.0% | 0 | 0 | 0.0% | 0 | 0 | 0.0% |
| Total | 18 | 4 | 22.2% | 12 | 1 | 8.3% | 12 | 0 | 0.0% | 30 | 2 | 6.7% | 72 | 7 | 9.7% |

FIG. 5C1

100D
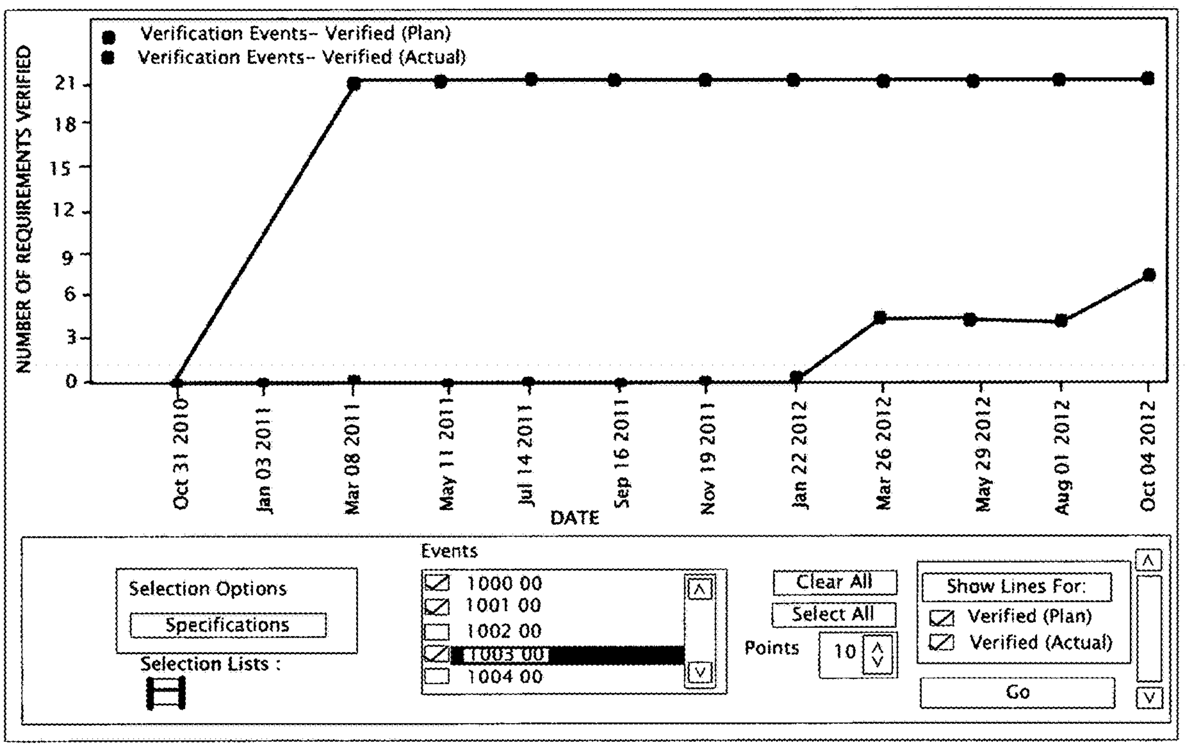
FIG. 5C2

100D

100A1
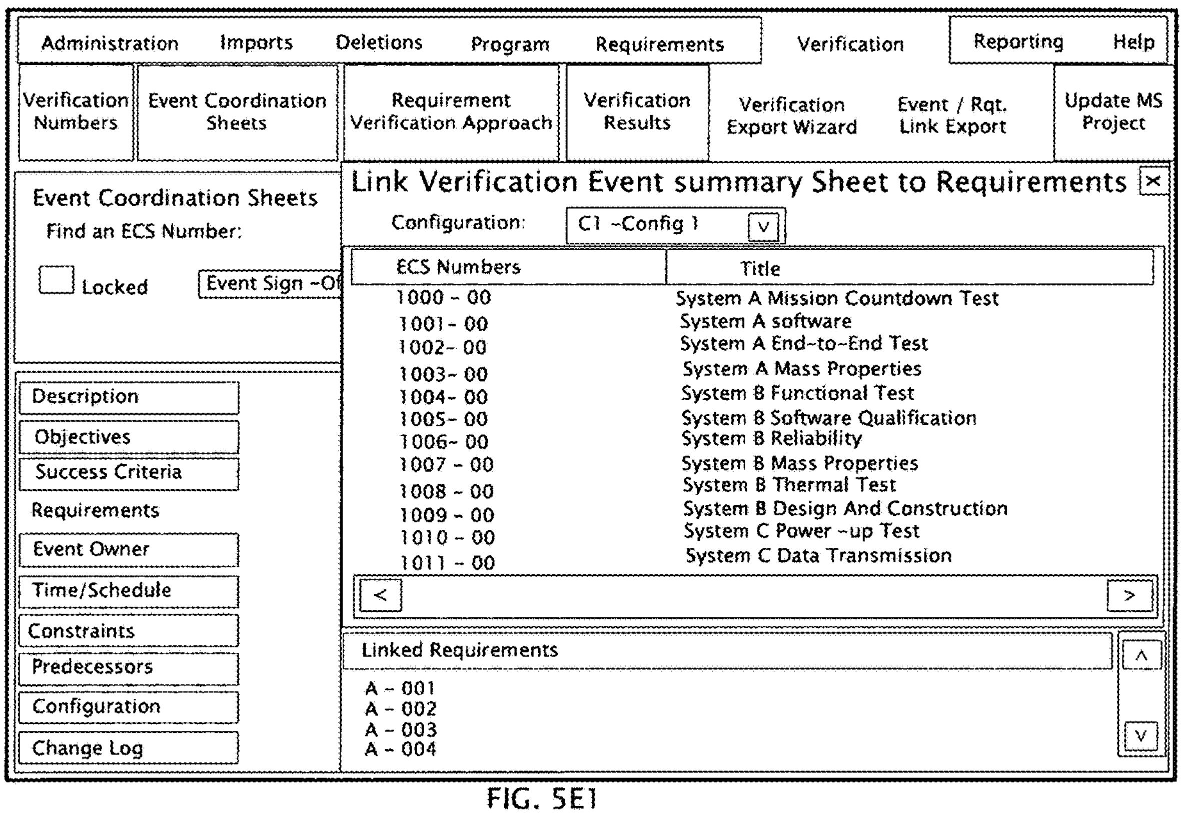
FIG. 5E1

100A1
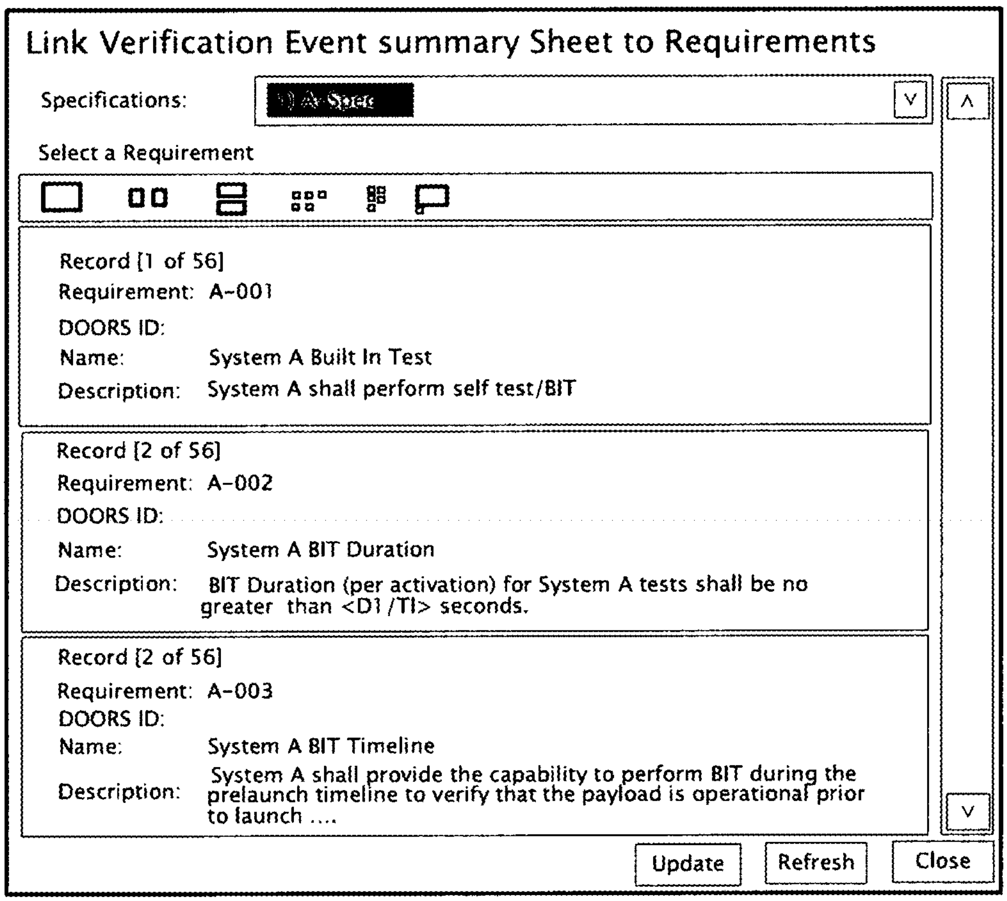
FIG. 5E2

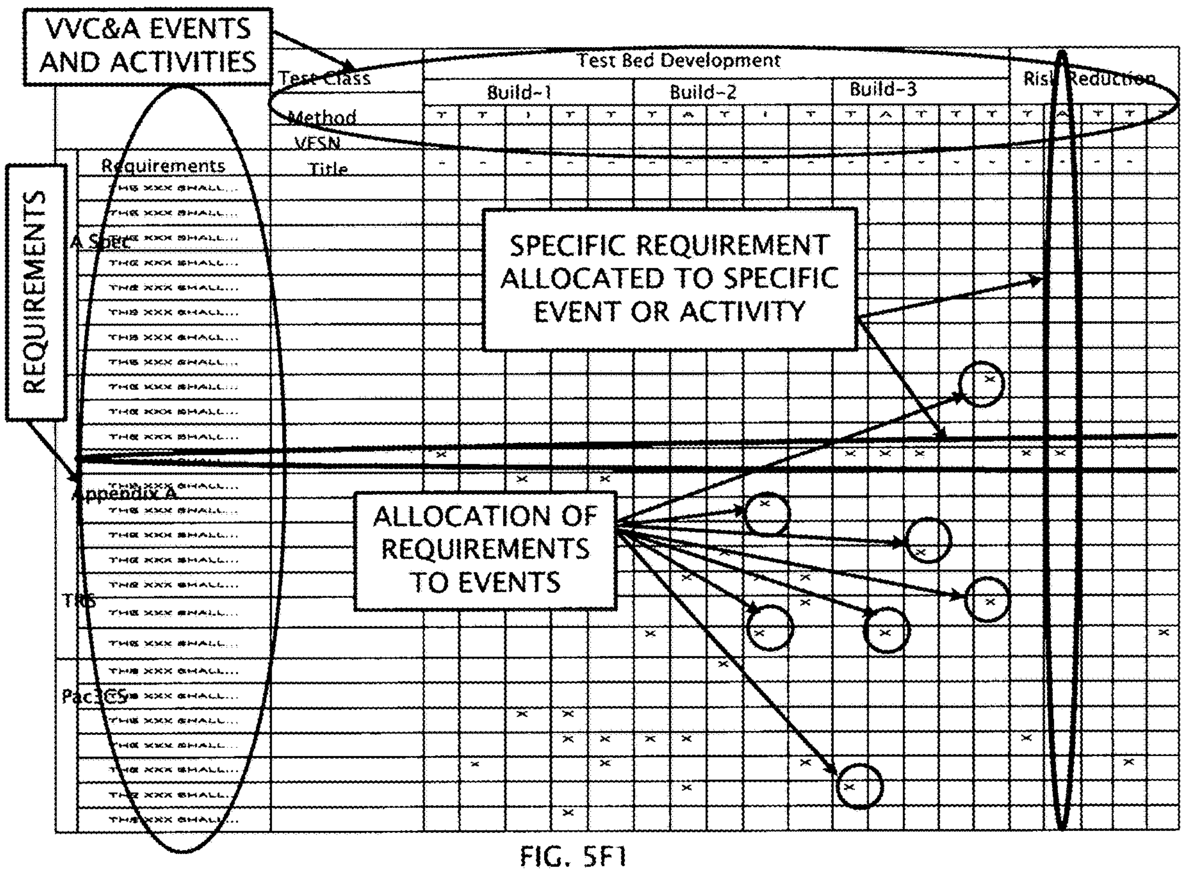
FIG. 5F1

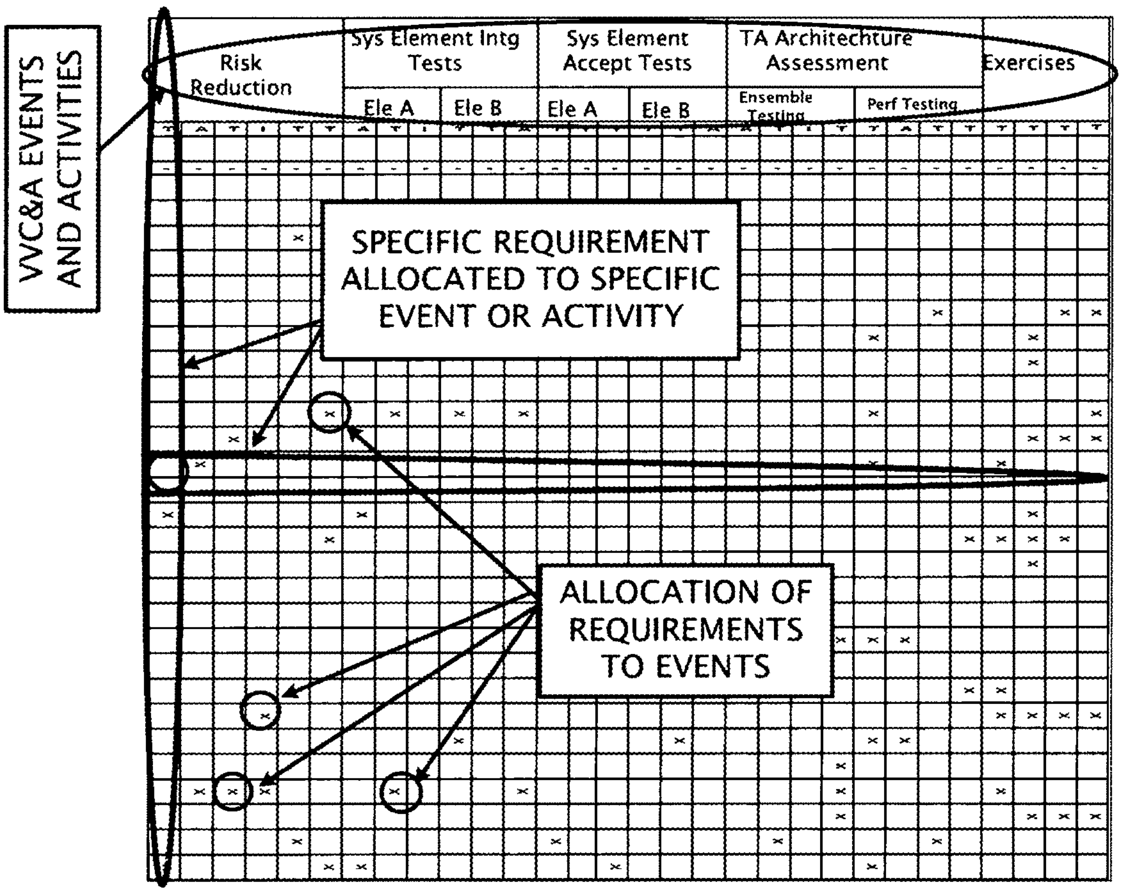
FIG. 5F2

REQUIREMENT, COMPLIANCE AND RESOURCE MANAGEMENT METHODOLOGY 100

| | FEATURES | BENEFITS |
|---|---|---|
| 100A | SPECIFICATION CREATION AND REQUIREMENTS MANAGEMENT. | PROVIDES SINGLE, CONFIGURATION CONTROLLED TRUE RELATIONAL DATABASE TO MANAGE SPECIFICATIONS AND REQUIREMENTS. |
| | PARENT/CHILD, SOURCE LIFE CYCLE TRACEABILITY. | ALLOWS FOR QUICK AND EASY IMPACT ASSESSMENT IN THE EVENT OF REQUIREMENT CHANGES. |
| | EMAIL NOTIFICATION FOR REQUIREMENT CHANGES. | FASTER RESPONSE TIME FOR PROGRAM CHANGE ASSESSMENT AND IMPLEMENTATION. |
| | CUSTOMIZABLE, FILTERABLE REQUIREMENT CATEGORIES. | ALLOWS FOR QUICK AND EASY REQUIREMENTS FILTERING/SORTING FOR ITEMS OF INTEREST. |
| | KEYWORD SEARCH CAPABILITY. | ALLOWS FOR QUICK ACCESS TO REQUIREMENTS AND ITEMS OF INTEREST.<br>SEARCHES ENTIRE DATABASE WITH SINGLE QUERY. |
| | EMBEDDED CONFIGURATION MANAGEMENT. | ENSURES REQUIREMENTS BASELINE IS UNDER STRICT CONFIGURATION CONTROL.<br>MAINTAINS DETAILED HISTORY OF ALL CHANGES AGAINST SPECIFIC REQUIREMENT ATTRIBUTES. |

FIG. 6A

REQUIREMENT, COMPLIANCE AND RESOURCE MANAGEMENT METHODOLOGY 100

| | FEATURES | BENEFITS |
|---|---|---|
| 100A | SPECIFICATION AUTHOR "BOOK BOSS" ASSIGNMENTS. | PROVIDES ABILITY TO ASSIGN PERSONNEL WITH READ/ WRITE ACCESS TO SPECIFICATIONS AND REQUIREMENTS. |
| 100B | IMPORT LEGAL/REGULARITY REQUIREMENTS (i.e., HIPPA). | SINGLE SOURCE FOR LEGAL/REGULATORY REQUIREMENT IN A TRUE RELATIONAL DATABASE. |
| 100C | IMPORT CUSTOMER REQUIREMENTS FROM MS WORD/MS EXCEL/PDF INTO DATABASE. | SEAMLESS IMPORT ALLOWS USERS TO CONSOLIDATE REQUIREMENTS INTO SINGLE, TRUE RELATIONAL DATABASE. |
| | INCORPORATES NON-TEXTUAL OBJECTS AND IMAGES INTO DATABASE. | ALLOWS NON-TEXTUAL OBJECTS TO BE ASSOCIATED WITH REQUIREMENTS OBJECTS. |
| 100D | TPM, RISK, CRITICAL ISSUE TRACKING AND CONTROL. | INSIGHTFUL REPORTING CAPABILITY PROVIDES VISIBILITY TO CRITICAL ISSUES AND UNRESOLVED ACTIONS, ENABLING EFFICIENT RESOURCE ALLOCATION. |
| | OVERALL PROJECT COMPLETION STATUS. | SIMPLE DASHBOARD METRICS WHICH PROVIDE COMPLETION STATUS AT ALL LEVELS OF INTEGRATION UP TO FINAL END-ITEM DELIVERY. |

FIG. 6B

REQUIREMENT, COMPLIANCE AND RESOURCE MANAGEMENT METHODOLOGY 100

| | FEATURES | BENEFITS |
|---|---|---|
| 100D | OPEN ACTION STATUS. | QUICK AND EASY ACCESS TO PROGRAM ACTION ITEMS AND COMPLETION STATUS. |
| | PROGRAM USAGE STATISTICS. | REAL-TIME METRICS WHICH DISPLAY IRIS USER STATISTICS SUCH AS USER FREQUENCY AND DURATION. |
| 100E | HARDWARE/SOFTWARE RESOURCE MANAGEMENT. | ALLOWS FOR QUICK AND EASY RESERVATION OF HARDWARE/SOFTWARE COMPONENTS NEEDED TO PERFORM VERIFICATION ACTIVITIES IN SPECIFIC FACILITIES/LOCATIONS.<br>FLAGS USER IF A HARDWARE/SOFTWARE SCHEDULING CONFLICT EXISTS.<br>PROVIDES RESOURCE TIME AND COST FOR EACH EVENT. |
| | PERSONNEL RESOURCE MANAGEMENT. | ALLOWS FOR QUICK AND EASY RESERVATION OF PERSONNEL AND SUBJECT MATTER EXPERTS NEEDED TO PERFORM VERIFICATION ACTIVITIES IN SPECIFIC FACILITIES/LOCATIONS.<br>FLAGS USER IF A PERSONNEL SCHEDULING CONFLICT EXISTS.<br>PROVIDES RESOURCE TIME AND COST FOR EACH EVENT. |

FIG. 6C

REQUIREMENT, COMPLIANCE AND RESOURCE MANAGEMENT METHODOLOGY 100

| | FEATURES | BENEFITS |
|---|---|---|
| 100F | ALLOCATION OF REQUIREMENTS TO VERIFICATION EVENTS. | PROVIDES REAL-TIME VISIBILITY TO VERIFICATION STRATEGIES, CONFIGURATION AND OBJECTIVES THEREBY PROVIDING PROGRAMS THE ABILITY TO LEVERAGE VERIFICATION ACTIVITIES IN SUPPORT OF AGILE ACQUISITION INITIATIVES.<br>INSTITUTES AN ENVIRONMENT OF COLLABORATION ENSURING EARLY IDENTIFICATION OF RISKS. |
| | CUSTOMIZABLE VERIFICATION EVENT COORDINATION MATRIX. | CUSTOMIZABLE EVENT COORDINATION MATRIX (ECM) GENERATOR WHICH ALLOWS USERS TO ORGANIZE AND GROUP EVENTS BY END-ITEM DELIVERABLES AND ENGINEERING DISCIPLINES.<br>PROVIDES ABILITY FOR USERS TO SEE IF THEY CAN MOVE REQUIREMENTS TO ANOTHER EVENT AND THE EVENT IN QUESTION MAY ALSO ELIMINATED THEREBY STREAMLINING VERIFICATION ACTIVITIES. |
| | EVENT RESOURCE MANAGEMENT. | TIGHTLY COUPLES REQUIRED VERIFICATION EVENT RESOURCES TO INTEGRATED SCHEDULES TO BETTER COORDINATE RESOURCES. |
| | EVENT CONFIGURATION CONTROL AND CHANGE HISTORY. | ENSURES VERIFICATION BASELINE IS UNDER STRICT CONFIGURATION CONTROL.<br>MAINTAINS DETAILED HISTORY OF ALL CHANGES AGAINST SPECIFIC VERIFICATION ACTIVITIES. |

FIG. 6D

REQUIREMENT, COMPLIANCE AND RESOURCE MANAGEMENT METHODOLOGY 100

| | FEATURES | BENEFITS |
|---|---|---|
| 100F | TRACEABILITY FROM REQUIREMENTS TO COMPLIANCE DATA ARTIFACTS. | PROVIDES CLOSED-LOOP AUTOMATED HYPERLINKS WHICH PROVIDE QUICK ACCESS TO REQUIREMENTS COMPLIANCE DATA AND RELATED ARTIFACTS. |
| | VERIFICATION ACTIVITY LINKAGE TO MS PROJECT SCHEDULES. | TIGHTLY COUPLES VERIFICATION ACTIVITIES WITH PROGRAM MILESTONES TO ENSURE TIMELY END-ITEM DELIVERY. |
| | ELECTRONIC SIGNATURE (EVENT PLANNING AND COMPLETION). | ELECTRONIC SIGNATURE CAPABILITY DRAMATICALLY REDUCES TEST ACTIVITY APPROVAL CYCLE. |
| | ENTERPRISE INTEGRATION WITH EXTERNAL DATA SOURCES. | ALLOWS FOR CORRELATION OF DATA ELEMENTS ACROSS THE ENTERPRISE DRAMATICALLY IMPROVING COLLABORATION, INCREASING WORK FORCE EFFICIENCY AND REDUCING COST. |
| 100A1 | SIMPLE AND INTUITIVE GUI USER INTERFACE. | SIMPLE, INTUITIVE INTERFACE PROVIDES POWERFUL CAPABILITIES FOR IMPORTING, LINKING, ANALYZING, REPORTING AND MANAGING REQUIREMENTS, INCLUDING TRACEABILITY TO ASSOCIATED PROJECT VERIFICATION EVENTS AND TEAM ASSIGNMENTS. REQUIRES MINIMAL USER TRAINING. |
| | READY FOR USE UPON INSTALLATION. | NO CUSTOM SCRIPTING REQUIRED RESULTS IN LOWER IMPLEMENTATION COST, FASTER USAGE. MAY BE TAILORED TO SUPPORT SPECIFIC PROJECT PROCESSES. |

FIG. 6E

FUZZY LOGIC MEMBERSHIP FUNCTION

REQUIREMENT, COMPLIANCE AND RESOURCE MANAGEMENT METHODOLOGY 120

| | FEATURES | BENEFITS |
|---|---|---|
| 100A | SPECIFICATION CREATION AND REQUIREMENTS MANAGEMENT. | PROVIDES SINGLE, CONFIGURATION CONTROLLED TRUE RELATIONAL DATABASE TO MANAGE SPECIFICATIONS AND REQUIREMENTS. |
| | PARENT/CHILD, SOURCE LIFE CYCLE TRACEABILITY. | ALLOWS FOR QUICK AND EASY IMPACT ASSESSMENT IN THE EVENT OF REQUIREMENT CHANGES. |
| | EMAIL NOTIFICATION FOR REQUIREMENT CHANGES. | FASTER RESPONSE TIME FOR PROGRAM CHANGE ASSESSMENT AND IMPLEMENTATION. |
| | CUSTOMIZABLE, FILTERABLE REQUIREMENT CATEGORIES. | ALLOWS FOR QUICK AND EASY REQUIREMENTS FILTERING/SORTING FOR ITEMS OF INTEREST. |
| | KEYWORD SEARCH CAPABILITY. | ALLOWS FOR QUICK ACCESS TO REQUIREMENTS AND ITEMS OF INTEREST.<br>SEARCHES ENTIRE DATABASE WITH SINGLE QUERY. |
| | EMBEDDED CONFIGURATION MANAGEMENT. | ENSURES REQUIREMENTS BASELINE IS UNDER STRICT CONFIGURATION CONTROL.<br>MAINTAINS DETAILED HISTORY OF ALL CHANGES AGAINST SPECIFIC REQUIREMENT ATTRIBUTES. |
| | SPECIFICATION AUTHOR "BOOK BOSS" ASSIGNMENTS. | PROVIDES ABILITY TO ASSIGN PERSONNEL WITH READ/WRITE ACCESS TO SPECIFICATIONS AND REQUIREMENTS. |

FIG. 8A

REQUIREMENT, COMPLIANCE AND RESOURCE MANAGEMENT METHODOLOGY 120

| | FEATURES | BENEFITS |
|---|---|---|
| 100B | IMPORT LEGAL/REGULARITY REQUIREMENTS (i.e., HIPPA). | SINGLE SOURCE FOR LEGAL/REGULATORY REQUIREMENT IN A TRUE RELATIONAL DATABASE. |
| 100C | IMPORT CUSTOMER REQUIREMENTS FROM MS WORD/MS EXCEL/PDF INTO DATABASE. | SEAMLESS IMPORT ALLOWS USERS TO CONSOLIDATE REQUIREMENTS INTO SINGLE, TRUE RELATIONAL DATABASE. |
| | INCORPORATES NON-TEXTUAL OBJECTS AND IMAGES INTO DATABASE. | ALLOWS NON-TEXTUAL OBJECTS TO BE ASSOCIATED WITH REQUIREMENTS OBJECTS. |
| 100D | TPM, RISK, CRITICAL ISSUE TRACKING AND CONTROL. | INSIGHTFUL REPORTING CAPABILITY PROVIDES VISIBILITY TO CRITICAL ISSUES AND UNRESOLVED ACTIONS, ENABLING EFFICIENT RESOURCE ALLOCATION. |
| | OVERALL PROJECT COMPLETION STATUS. | SIMPLE DASHBOARD METRICS WHICH PROVIDE COMPLETION STATUS AT ALL LEVELS OF INTEGRATION UP TO FINAL END-ITEM DELIVERY. |
| | OPEN ACTION STATUS. | QUICK AND EASY ACCESS TO PROGRAM ACTION ITEMS AND COMPLETION STATUS. |

FIG. 8B

REQUIREMENT, COMPLIANCE AND RESOURCE MANAGEMENT METHODOLOGY 120

| | FEATURES | BENEFITS |
|---|---|---|
| 100D | PROGRAM USAGE STATISTICS. | REAL-TIME METRICS WHICH DISPLAY IRIS USER STATISTICS SUCH AS USER FREQUENCY AND DURATION. |
| 100E | HARDWARE/SOFTWARE RESOURCE MANAGEMENT. | ALLOWS FOR QUICK AND EASY RESERVATION OF HARDWARE/SOFTWARE COMPONENTS NEEDED TO PERFORM VERIFICATION ACTIVITIES IN SPECIFIC FACILITIES/LOCATIONS.<br>FLAGS USER IF A HARDWARE/SOFTWARE SCHEDULING CONFLICT EXISTS.<br>PROVIDES RESOURCE TIME AND COST FOR EACH EVENT. |
| | PERSONNEL RESOURCE MANAGEMENT. | ALLOWS FOR QUICK AND EASY RESERVATION OF PERSONNEL AND SUBJECT MATTER EXPERTS NEEDED TO PERFORM VERIFICATION ACTIVITIES IN SPECIFIC FACILITIES/LOCATIONS.<br>FLAGS USER IF A PERSONNEL SCHEDULING CONFLICT EXISTS.<br>PROVIDE RESOURCE TIME AND COST FOR EACH EVENT. |
| 100F | ALLOCATION OF REQUIREMENTS TO VERIFICATION EVENTS. | PROVIDES REAL-TIME VISIBILITY TO VERIFICATION STRATEGIES, CONFIGURATION AND OBJECTIVES THEREBY PROVIDING PROGRAMS THE ABILITY TO LEVERAGE VERIFICATION ACTIVITIES IN SUPPORT OF AGILE ACQUISITION INITIATIVES.<br>INSTITUTES AN ENVIRONMENT OF COLLABORATION ENSURING EARLY IDENTIFICATION OF RISKS. |

FIG. 8C

REQUIREMENT, COMPLIANCE AND RESOURCE MANAGEMENT METHODOLOGY 120

| | FEATURES | BENEFITS |
|---|---|---|
| 100F | CUSTOMIZABLE VERIFICATION EVENT COORDINATION MATRIX. | CUSTOMIZABLE EVENT COORDINATION MATRIX (ECM) GENERATOR WHICH ALLOWS USERS TO ORGANIZE AND GROUP EVENTS BY END-ITEM DELIVERABLES AND ENGINEERING DISCIPLINES.<br>PROVIDES ABILITY FOR USERS TO SEE IF THEY CAN BE MOVE REQUIREMENTS TO ANOTHER EVENT AND THE EVENT IN QUESTION MAY ALSO ELIMINATED THEREBY STREAMLINING VERIFICATION ACTIVITIES. |
| | EVENT RESOURCE MANAGEMENT. | TIGHTLY COUPLES REQUIRED VERIFICATION EVENT RESOURCES TO INTEGRATED SCHEDULES TO BETTER COORDINATE RESOURCES. |
| | EVENT CONFIGURATION CONTROL AND CHANGE HISTORY. | ENSURES VERIFICATION BASELINE IS UNDER STRICT CONFIGURATION CONTROL.<br>MAINTAINS DETAILED HISTORY OF ALL CHANGES AGAINST SPECIFIC VERIFICATION ACTIVITIES. |
| | TRACEABILITY FROM REQUIREMENTS TO COMPLIANCE DATA ARTIFACTS. | PROVIDES CLOSED-LOOP AUTOMATED HYPERLINKS WHICH PROVIDE QUICK ACCESS TO REQUIREMENTS COMPLIANCE DATA AND RELATED ARTIFACTS. |
| | VERIFICATION ACTIVITY LINKAGE TO MS PROJECT SCHEDULES. | TIGHTLY COUPLES VERIFICATION ACTIVITIES WITH PROGRAM MILESTONES TO ENSURE TIMELY END-ITEM DELIVERY. |

FIG. 8D

REQUIREMENT, COMPLIANCE AND RESOURCE MANAGEMENT METHODOLOGY 120

| | FEATURES | BENEFITS |
|---|---|---|
| 100F | ELECTRONIC SIGNATURE (EVENT PLANNING AND COMPLETION). | ELECTRONIC SIGNATURE CAPABILITY DRAMATICALLY REDUCES TEST ACTIVITY APPROVAL CYCLE. |
| | ENTERPRISE INTEGRATION WITH EXTERNAL DATA SOURCES. | ALLOWS FOR CORRELATION OF DATA ELEMENTS ACROSS THE ENTERPRISE DRAMATICALLY IMPROVING COLLABORATION, INCREASING WORK FORCE EFFICIENCY AND REDUCING COST. |
| 100A1 | SIMPLE AND INTUITIVE GUI USER INTERFACE. | SIMPLE, INTUITIVE INTERFACE PROVIDES POWERFUL CAPABILITIES FOR IMPORTING, LINKING, ANALYZING, REPORTING AND MANAGING REQUIREMENTS, INCLUDING TRACEABILITY TO ASSOCIATED PROJECT VERIFICATION EVENTS AND TEAM ASSIGNMENTS. |
| | READY FOR USE UPON INSTALLATION. | NO CUSTOM SCRIPTING REQUIRED RESULTS IN LOWER IMPLEMENTATION COST, FASTER USAGE.<br>MAY BE TAILORED TO SUPPORT SPECIFIC PROJECT PROCESSES. |
| 100C1 | PROJECT SETUP QUESTION AND ANSWER. | STEP-BY-STEP QUESTION AND ANSWER THAT ALLOWS USER TO QUICKLY AND EASILY SET UP A NEW PROJECT. |
| 100F1 | DECISION BASED ON FUZZY APPROXIMATION. | ENABLES PROGRAM DECISION MAKERS TO ASSESS WHEN VERIFICATION IS GOOD ENOUGH. |
| | "REQUIREMENT GOODNESS" CHECK. | EVALUATES REQUIREMENT GOODNESS THEREBY REDUCING REQUIREMENT REWORK AND VERIFICATION RESOURCE WASTE. |

FIG. 8E

OPTIMUM VALUE OF PROJECT ($M)
OUTPUT OF A MONTE CALRO SIMULATION

5-YEAR GROWTH INPUT DISTRIBUTION
INPUT TO A MONTE CARLO SIMULATION

REQUIREMENT, COMPLIANCE AND RESOURCE MANAGEMENT METHODOLOGY 140

| | FEATURES | BENEFITS |
|---|---|---|
| 100A | SPECIFICATION CREATION AND REQUIREMENTS MANAGEMENT. | PROVIDES SINGLE, CONFIGURATION CONTROLLED TRUE RELATIONAL DATABASE TO MANAGE SPECIFICATIONS AND REQUIREMENTS. |
| | PARENT/CHILD, SOURCE LIFE CYCLE TRACEABILITY. | ALLOWS FOR QUICK AND EASY IMPACT ASSESSMENT IN THE EVENT OF REQUIREMENT CHANGES. |
| | EMAIL NOTIFICATION FOR REQUIREMENT CHANGES. | FASTER RESPONSE TIME FOR PROGRAM CHANGE ASSESSMENT AND IMPLEMENTATION. |
| | CUSTOMIZABLE, FILTERABLE REQUIREMENT CATEGORIES. | ALLOWS FOR QUICK AND EASY REQUIREMENTS FILTERING/SORTING FOR ITEMS OF INTEREST. |
| | KEYWORD SEARCH CAPABILITY. | ALLOWS FOR QUICK ACCESS TO REQUIREMENTS AND ITEMS OF INTEREST.<br>SEARCHES ENTIRE DATABASE WITH SINGLE QUERY. |
| | EMBEDDED CONFIGURATION MANAGEMENT. | ENSURES REQUIREMENTS BASELINE IS UNDER STRICT CONFIGURATION CONTROL.<br>MAINTAINS DETAILED HISTORY OF ALL CHANGES AGAINST SPECIFIC REQUIREMENT ATTRIBUTES. |

FIG. 10A

REQUIREMENT, COMPLIANCE AND RESOURCE MANAGEMENT METHODOLOGY 140

| | FEATURES | BENEFITS |
|---|---|---|
| 100A | SPECIFICATION AUTHOR "BOOK BOSS" ASSIGNMENTS. | PROVIDES ABILITY TO ASSIGN PERSONNEL WITH READ/ WRITE ACCESS TO SPECIFICATIONS AND REQUIREMENTS. |
| 100B | IMPORT LEGAL/REGULARITY REQUIREMENTS (i.e., HIPPA). | SINGLE SOURCE FOR LEGAL/REGULATORY REQUIREMENT IN A TRUE RELATIONAL DATABASE. |
| 100C | IMPORT CUSTOMER REQUIREMENTS FROM MS WORD/MS EXCEL /PDF INTO DATABASE. | SEAMLESS IMPORT ALLOWS USERS TO CONSOLIDATE REQUIREMENTS INTO SINGLE, TRUE RELATIONAL DATABASE. |
| | INCORPORATES NON-TEXTUAL OBJECTS AND IMAGES INTO DATABASE. | ALLOWS NON-TEXTUAL OBJECTS TO BE ASSOCIATED WITH REQUIREMENTS OBJECTS. |
| 100D | TPM, RISK, CRITICAL ISSUE TRACKING AND CONTROL. | INSIGHTFUL REPORTING CAPABILITY PROVIDES VISIBILITY TO CRITICAL ISSUES AND UNRESOLVED ACTIONS, ENABLING EFFICIENT RESOURCE ALLOCATION. |
| | OVERALL PROJECT COMPLETION STATUS. | SIMPLE DASHBOARD METRICS WHICH PROVIDE COMPLETION STATUS AT ALL LEVELS OF INTEGRATION UP TO FINAL END-ITEM DELIVERY. |
| | OPEN ACTION STATUS. | QUICK AND EASY ACCESS TO PROGRAM ACTION ITEMS AND COMPLETION STATUS. |

FIG. 10B

REQUIREMENT, COMPLIANCE AND RESOURCE MANAGEMENT METHODOLOGY 140

| | FEATURES | BENEFITS |
|---|---|---|
| 100D | PROGRAM USAGE STATISTICS. | REAL-TIME METRICS WHICH DISPLAY IRIS USER STATISTICS SUCH AS USER FREQUENCY AND DURATION. |
| 100E | HARDWARE/SOFTWARE RESOURCE MANAGEMENT. | ALLOWS FOR QUICK AND EASY RESERVATION OF HARDWARE/SOFTWARE COMPONENTS NEEDED TO PERFORM VERIFICATION ACTIVITIES IN SPECIFIC FACILITIES/LOCATIONS.<br>FLAGS USER IF A HARDWARE/SOFTWARE SCHEDULING CONFLICT EXISTS.<br>PROVIDES RESOURCE TIME AND COST FOR EACH EVENT. |
| | PERSONNEL RESOURCE MANAGEMENT. | ALLOWS FOR QUICK AND EASY RESERVATION OF PERSONNEL AND SUBJECT MATTER EXPERTS NEEDED TO PERFORM VERIFICATION ACTIVITIES IN SPECIFIC FACILITIES/LOCATIONS.<br>FLAGS USER IF A PERSONNEL SCHEDULING CONFLICT EXISTS.<br>PROVIDE RESOURCE TIME AND COST FOR EACH EVENT. |
| 100F | ALLOCATION OF REQUIREMENTS TO VERIFICATION EVENTS. | PROVIDES REAL-TIME VISIBILITY TO VERIFICATION STRATEGIES, CONFIGURATION AND OBJECTIVES THEREBY PROVIDING PROGRAMS THE ABILITY TO LEVERAGE VERIFICATION ACTIVITIES IN SUPPORT OF AGILE ACQUISITION INITIATIVES.<br>INSTITUTES AN ENVIRONMENT OF COLLABORATION ENSURING EARLY IDENTIFICATION OF RISKS. |

FIG. 10C

REQUIREMENT, COMPLIANCE AND RESOURCE MANAGEMENT METHODOLOGY 140

| | FEATURES | BENEFITS |
|---|---|---|
| 100F | CUSTOMIZABLE VERIFICATION EVENT COORDINATION MATRIX. | CUSTOMIZABLE EVENT COORDINATION MATRIX (ECM) GENERATOR WHICH ALLOWS USERS TO ORGANIZE AND GROUP EVENTS BY END-ITEM DELIVERABLES AND ENGINEERING DISCIPLINES.<br>PROVIDES ABILITY FOR USERS TO SEE IF THEY CAN BE MOVE REQUIREMENTS TO ANOTHER EVENT AND THE EVENT IN QUESTION MAY ALSO ELIMINATED THEREBY STREAMLINING VERIFICATION ACTIVITIES. |
| | EVENT RESOURCE MANAGEMENT. | TIGHTLY COUPLES REQUIRED VERIFICATION EVENT RESOURCES TO INTEGRATED SCHEDULES TO BETTER COORDINATE RESOURCES. |
| | EVENT CONFIGURATION CONTROL AND CHANGE HISTORY. | ENSURES VERIFICATION BASELINE IS UNDER STRICT CONFIGURATION CONTROL.<br>MAINTAINS DETAILED HISTORY OF ALL CHANGES AGAINST SPECIFIC VERIFICATION ACTIVITIES. |
| | TRACEABILITY FROM REQUIREMENTS TO COMPLIANCE DATA ARTIFACTS. | PROVIDES CLOSED-LOOP AUTOMATED HYPERLINKS WHICH PROVIDE QUICK ACCESS TO REQUIREMENTS COMPLIANCE DATA AND RELATED ARTIFACTS. |
| | VERIFICATION ACTIVITY LINKAGE TO MS PROJECT SCHEDULES | TIGHTLY COUPLES VERIFICATION ACTIVITIES WITH PROGRAM MILESTONES TO ENSURE TIMELY END-ITEM DELIVERY. |

FIG. 10D

REQUIREMENT, COMPLIANCE AND RESOURCE MANAGEMENT METHODOLOGY 140

| | FEATURES | BENEFITS |
|---|---|---|
| 100F | ELECTRONIC SIGNATURE (EVENT PLANNING AND COMPLETION). | ELECTRONIC SIGNATURE CAPABILITY DRAMATICALLY REDUCES TEST ACTIVITY APPROVAL CYCLE. |
| | ENTERPRISE INTEGRATION WITH EXTERNAL DATA SOURCES. | ALLOWS FOR CORRELATION OF DATA ELEMENTS ACROSS THE ENTERPRISE DRAMATICALLY IMPROVING COLLABORATION, INCREASING WORK FORCE EFFICIENCY AND REDUCING COST. |
| 100A1 | SIMPLE AND INTUITIVE GUI USER INTERFACE. | SIMPLE, INTUITIVE INTERFACE PROVIDES POWERFUL CAPABILITIES FOR IMPORTING, LINKING, ANALYZING, REPORTING AND MANAGING REQUIREMENTS, INCLUDING TRACEABILITY TO ASSOCIATED PROJECT VERIFICATION EVENTS AND TEAM ASSIGNMENTS. |
| | READY FOR USE UPON INSTALLATION | NO CUSTOM SCRIPTING REQUIRED RESULTS IN LOWER IMPLEMENTATION COST, FASTER USAGE.<br>MAY BE TAILORED TO SUPPORT SPECIFIC PROJECT PROCESSES. |
| 100C1 | PROJECT SETUP QUESTION AND ANSWER. | STEP-BY-STEP QUESTION AND ANSWER THAT ALLOWS USER TO QUICKLY AND EASILY SET UP A NEW PROJECT. |

FIG. 10E

REQUIREMENT, COMPLIANCE AND RESOURCE MANAGEMENT METHODOLOGY 140

| | FEATURES | BENEFITS |
|---|---|---|
| 100F1 | DECISION BASED ON FUZZY APPROXIMATION. | ENABLES PROGRAM DECISION MAKERS TO ASSESS WHEN VERIFICATION IS " GOOD ENOUGH". |
| | "REQUIREMENT GOODNESS" CHECK. | EVALUATES REQUIREMENT GOODNESS THEREBY REDUCING REQUIREMENT REWORK AND VERIFICATION RESOURCE WASTE. |
| 100F2 | VARIABILITY MEASUREMENT. | PROVIDES STATISTICAL ESTIMATING CAPABILITY FOR EMPIRICAL RESULTS THAT REQUIRE STATISTICAL MODELING TO ASSESS PERFORMANCE VARIABILITY. |
| 100F3 | TPM CALCULATOR (WEIGHTING LOGIC). | ALLOWS PROGRAM TO CALCULATE VALUE OF TPM THROUGHOUT INTEGRATION PROCESS. |

FIG. 10F

| | A | I | D | T | ECS No. |
|---|---|---|---|---|---|
| 3.2 | | | | | 11320010 |
| 3.2.1 | X | | | | 11320020 |
| 3.2.2 | | X | X | | 11320010 |
| 3.7 | | | | | 11320050 |
| 3.7.1 | X | | | | 11320060 |
| 3.7.2 | | X | | | 11320010 |

FIG. 11A

PROCESS IMPLEMENTATION

SPECIFICATION DEVELOPMENT

| | DESIGN OR ACCEPTANCE | MISSION CRITICAL? | SHOCK/VIB | THERMAL | FUNCTIONAL |
|---|---|---|---|---|---|
| | | | 11320010 | 11320020 | 11320020 |
| REQUIREMENTS | | | | | |
| 3.2 | | | | | |
| 3.2.1 | D | Y | X | | |
| 3.2.2 | A | | | X | |
| 3.2.3 | A | Y | | X | |
| 3.2.4 | D | | | X | |
| 3.7 | | | | | |
| 3.7.1 | A | Y | X | | |
| 3.7.2 | A | | | X | |

FIG. 11B

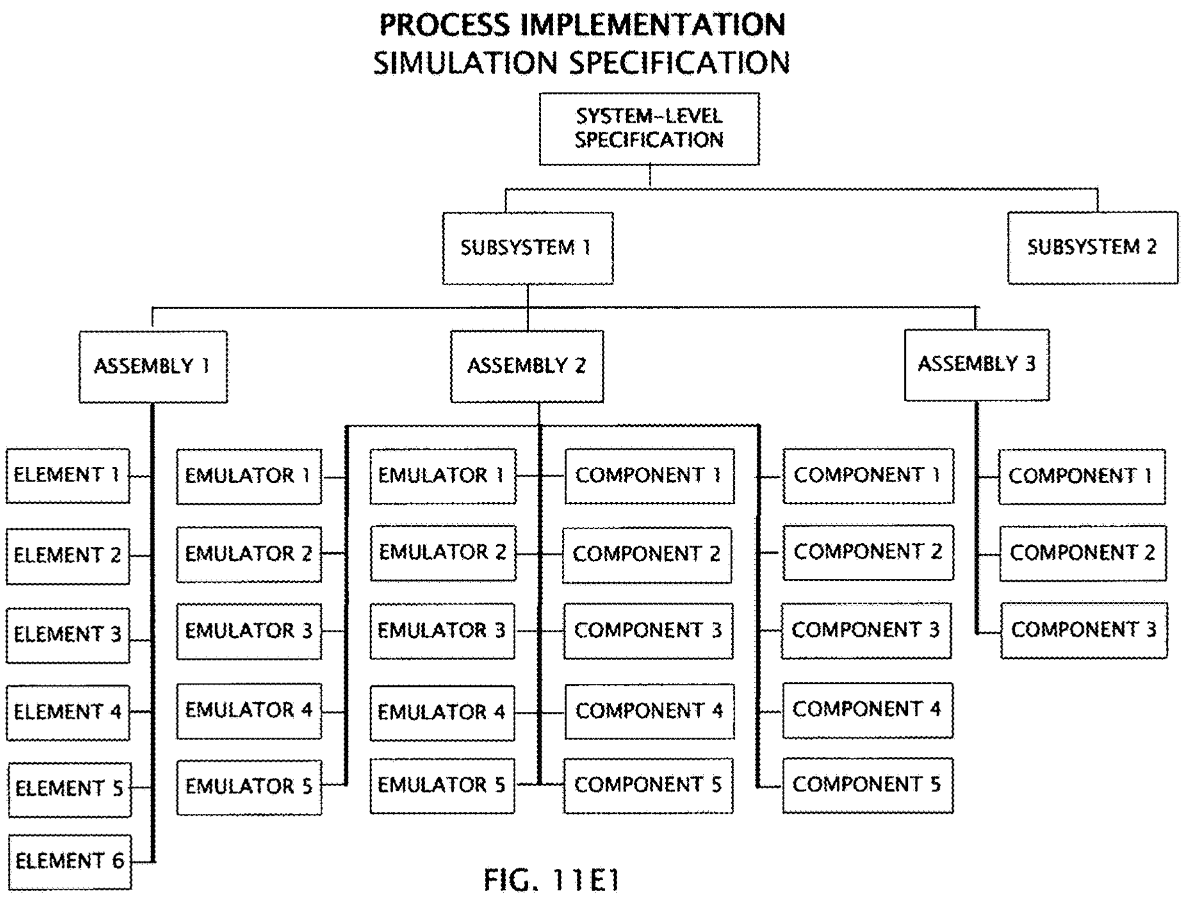
FIG. 11E1

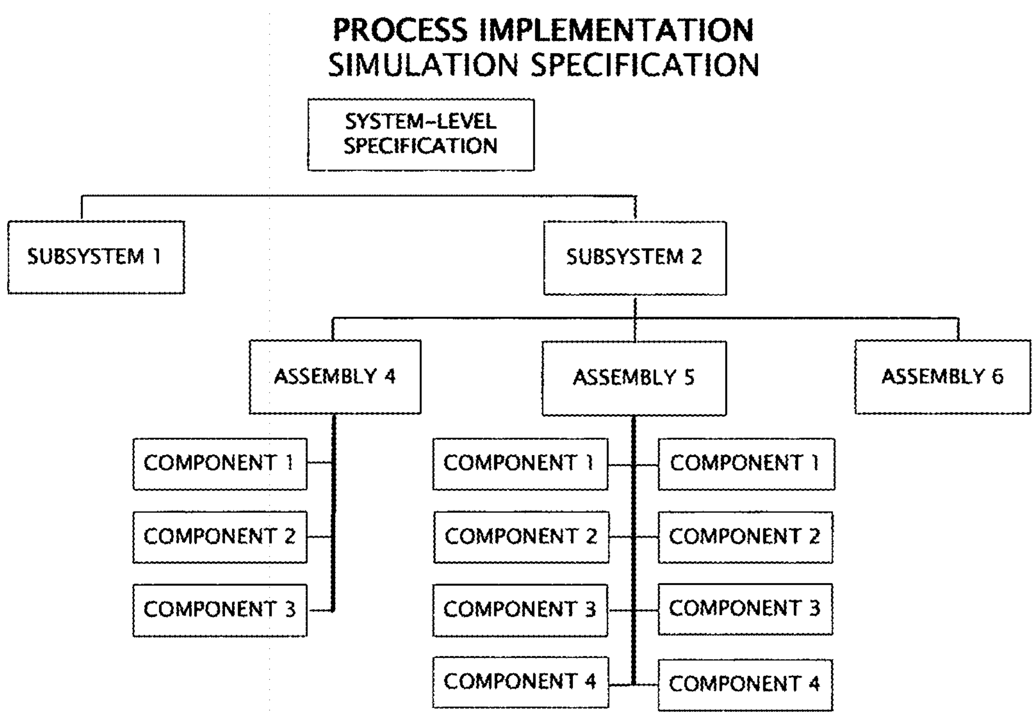
FIG. 11E2

3160

| | VERIFICATION EVENTS | | |
|---|---|---|---|
| | SUBSYSTEM 1 | • • • | SUBSYSTEM n |
| VERIFICATION NUMBER | A | B | C |
| VERIFICATION TITLE | | | |
| EIS DEVELOPER | D | E | F |
| EIS CONDUCTOR | | | |
| REQUIREMENT COUNT | | | |
| G | H | I | J |

| SUBSYSTEM 1 | | | | | | | | | |
|---|---|---|---|---|---|---|---|---|---|
| VERIFICATION NUMBER | EVENT ID #1 | EVENT ID #2 | EVENT ID #3 | EVENT ID #4 | EVENT ID #5 | ● | ● | ● | EVENT ID # n |
| VERIFICATION TITLE | EVENT TITLE 1 | EVENT TITLE 2 | EVENT TITLE 3 | EVENT TITLE 4 | EVENT TITLE 5 | ● | ● | ● | EVENT TITLE n |

| SUBSYSTEM # 2 | | | | | | | | | |
|---|---|---|---|---|---|---|---|---|---|
| VERIFICATION NUMBER | EVENT ID #1 | EVENT ID #2 | EVENT ID #3 | EVENT ID #4 | EVENT ID #5 | ● | ● | ● | EVENT ID # n |
| VERIFICATION TITLE | EVENT TITLE 1 | EVENT TITLE 2 | EVENT TITLE 3 | EVENT TITLE 4 | EVENT TITLE 5 | ● | ● | ● | EVENT TITLE n |

| SUBSYSTEM # 3 | | | | | | | | | |
|---|---|---|---|---|---|---|---|---|---|
| VERIFICATION NUMBER | EVENT ID #1 | EVENT ID #2 | EVENT ID #3 | EVENT ID #4 | EVENT ID #5 | ● | ● | ● | EVENT ID # n |
| VERIFICATION TITLE | EVENT TITLE 1 | EVENT TITLE 2 | EVENT TITLE 3 | EVENT TITLE 4 | EVENT TITLE 5 | ● | ● | ● | EVENT TITLE n |

| SUBSYSTEM # 1 | | | | | | | | | |
|---|---|---|---|---|---|---|---|---|---|
| EIS DEVELOPER | JANE DOE 1 | JANE DOE 2 | JOHN DOE 1 | JIM SMITH 1 | JANE DOE 3 | ● | ● | ● | JANE DOE n |
| EIS CONDUCTOR | JOHN DOE 1 | JOHN DOE 2 | JOHN DOE 3 | JANE DOE 1 | JANE SMITH 1 | ● | ● | ● | Jane Smith n |
| REQUIREMENT COUNT | 40 | 39 | 57 | 52 | 198 | 87 | 314 | 27 | 234 |

| SUBSYSTEM # 2 | | | | | | | | | |
|---|---|---|---|---|---|---|---|---|---|
| EIS DEVELOPER | JANE DOE 1 | JANE DOE 2 | JOHN DOE 1 | JIM SMITH 1 | JANE DOE 3 | ● | ● | ● | JANE DOE n |
| EIS CONDUCTOR | JOHN DOE 1 | JOHN DOE 2 | JOHN DOE 3 | JANE DOE 1 | JANE SMITH 1 | ● | ● | ● | Jane Smith n |
| REQUIREMENT COUNT | 40 | 39 | 57 | 52 | 198 | 87 | 314 | 27 | 234 |

| SUBSYSTEM # 3 | | | | | | | | | |
|---|---|---|---|---|---|---|---|---|---|
| EIS DEVELOPER | JANE DOE 1 | JANE DOE 2 | JOHN DOE 1 | JIM SMITH 1 | JANE DOE 3 | ● | ● | ● | JANE DOE N |
| EIS CONDUCTOR | JOHN DOE 1 | JOHN DOE 2 | JOHN DOE 3 | JANE DOE 1 | JANE SMITH 1 | ● | ● | ● | JANE SIMITH N |
| REQUIREMENT COUNT | 40 | 39 | 57 | 52 | 198 | 87 | 314 | 27 | 234 |

| | | | | | |
|---|---|---|---|---|---|
| SPEC A | RQT-1 | REQUIREMENT 1 TITLE | CAT 1 | N | S |
| SPEC A | RQT-2 | REQUIREMENT 2 TITLE | CAT 1 | N | S |
| SPEC A | RQT-3 | REQUIREMENT 3 TITLE | CAT 1 | N | S |
| SPEC A | RQT-4 | REQUIREMENT 4 TITLE | CAT 1 | N | S |
| SPEC A | RQT-5 | REQUIREMENT 5 TITLE | CAT 1 | N | S |
| SPEC A | ● | ● | CAT 1 | N | S |
| SPEC A | ● | ● | CAT 1 | N | S |
| SPEC A | ● | ● | CAT 1 | N | S |
| SPEC A | RQT-n | REQUIREMENT n TITLE | CAT 1 | N | S |

| SUBSYSTEM 1 | | | | | | | |
|---|---|---|---|---|---|---|---|
| | | | | | | | RQT-1 |
| | RQT-2 | | | | | | |
| | | | | | | RQT-3 | |
| | | | | RQT-4 | | | |
| | | | | RQT-5 | | | |
| | | RQT-6 | | | | | |
| | | | | RQT-7 | | | |
| | | | | | | | RQT-8 |

| | | | | | | | |
|---|---|---|---|---|---|---|---|
| | | | | | | RQT-1 | |
| | | | | | | | |
| | | | | | | | |
| | | | | | | | |
| | | | | | | RQT-2 | |
| | | | | | | | |
| | | | | | | | |
| | | | | | | RQT-3 | |

| | | | | | | | |
|---|---|---|---|---|---|---|---|
| | | | | | | RQT-1 | |
| | | | | | | RQT-2 | |
| | | | | | | RQT-3 | |
| | | | | | | RQT-4 | |
| | | | | | | RQT-5 | |
| | | | | | | RQT-6 | |
| | | | | | | RQT-7 | |
| | | | | | | RQT-8 | |

FIG. 25K

| | | System Baseline Report | | |
|---|---|---|---|---|
| ID No. | Rev: | Event title | Status | Date: |
| IS-001 | | Information System 1 | Operational | |

| | | | |
|---|---|---|---|
| Accreditation | | | |
| Accreditation Date: | 2/28/2015 | Accrediting Agency: | |
| Accreditation Expiration: | 3/22/2015 | Accreditation POC: | |
| System Description | | | |
| Summary Description: | | | |
| | | | |
| Mission Supported: | | | |
| The system provides real-time control and information supporting the main power plant. The power plant provides critical distribution of electric power to the military installation. | | | |

| | | | | |
|---|---|---|---|---|
| Personnel | System Owner: | | Incident Response: | |
| Responsible Organization: | Name: | | Name: | |
| | Phone: | | Phone: | |
| | E mall: | | E mall: | |
| | E Mall2: | | E Mall2: | |
| System Location: | | | | |
| Information Types: | | | | |

| ID No. | Name | Type | Description |
|---|---|---|---|
| 001 | Energy Supply | D.7.1 | Sensor data monitoring the availability of energy for the military installation and its soldiers and command authority. This function includes control of distribution and transfer of power. the remote control capabilities can take action such as initiating necessary switching actions to alleviate an overloading power condition. The impacts to this information and the system may affect the installation's critical infrastructures. |
| 002 | General Information | C.2.8.12 | The Information System Processes Routine Administrative Information. |

| System Impact Assessments: | | Provisional / Adjustments | | | | | |
|---|---|---|---|---|---|---|---|
| | | Confidentiality | | Integrity | | Availability | |
| ID No. | Name | Impact Adjustment Justification | | | | | |
| 001 | Energy Supply | Low | Moderate | Low | High | Low | High |
| | | Disclosure of sensor information may seriously impact the missions if indications & warnings of overall capability are provided to an adversary. | | Severe impacts or consequences may occur if adversarial modification of information results in incorrect power system regulation or control actions. | | Due to loss of availability, severe impact to the mission capability may result and may in-turn have overall catastrophic consequences for the facility's critical infrastructures and possible loss of human life. | |
| ID No. | Name | Low | | Low | | Low | |
| 002 | General Information | No Adjustments | | No Adjustments | | No Adjustments | |
| System Categorization: | | Moderate | | High | | High | |
| Overall System Categorization: | | | | High | | | |

FIG. 64B.1

Requirements / Controls:

| ID No. | Title | Description | Inheritance (Parent) | Implement. Status | Attributes B | T | O | AO |
|---|---|---|---|---|---|---|---|---|
| NIST 800-53 | | | | | | | | |
| AC-1 | Access Control Policy And Procedures Control: | The organization: a. Develops, documents, and disseminates to [Assignment: organization-defined personnel or roles]: 1. An access control policy that addresses purpose, scope, roles, responsibilities, management commitment, coordination among organizational entities, and compliance; and 2. Procedures to facilitate the implementation of the access control policy and associated access controls; and b. Reviews and updates the current: 1. Access control policy [Assignment: organization-defined frequency]; and 2. Access control procedures [Assignment: organization-defined frequency]. | IS-002, AC1 | implemented | X | X | X | |
| AC-2 | Account Management | The organization: a. Identifies and selects the following types of information system accounts to support organizational missions/business functions: [Assignment: organization-defined information system account types]; b. Assigns account managers for information system accounts; c. Establishes conditions for group and role membership; d. Specifies authorized users of the information system, group and role membership, and access authorizations (i.e., privileges) and other attributes (as required) for each account; e. Requires approvals by [Assignment: organization-defined personnel or roles] for requests to create information system accounts; f. Creates, enables, modifies, disables, and removes information system accounts in accordance with [Assignment: organization defined procedures or conditions]; g. Monitors the use of information system accounts; | IS-002, AC2 | Implemented | | | | |

System Components:

Hardware:

| Hardware Name: | Part: | Serial: | |
|---|---|---|---|
| | | | |

Software:

| Software Name: | Version: | Serial: | |
|---|---|---|---|
| | | | |

Links to Applicable Documents and Information

Description:

| Comments/Supporting Information: | Hyperlink: |
|---|---|
| | |

Baseline Approval Signatures:

| Responsibility: | Staff Name (Print) | Date |
|---|---|---|
| System Owner | | |
| Authorizing Official | | |
| Customer | | |

FIG. 64B.2

| System Baseline Report | | | | |
|---|---|---|---|---|
| ID No. | Rev: | Event title | Status | Date |
| IS-001 | | Information System 1 | Operational | |

| Accreditation | | | |
|---|---|---|---|
| Accreditation Date: | 2/28/2015 | Accrediting Agency: | |
| Accreditation Expiration: | 3/22/2015 | Accreditation POC: | |

| System Description |
|---|
| Summary Description: |
| |
| Mission Supported: |
| The system provides real-time control and information supporting the main power plant. The power plant provides critical distribution of electric power to the military installation. |

| Personnel | System Owner: | | Incident Response: | |
|---|---|---|---|---|
| Responsible Organization: | Name: | | Name: | |
| | Phone: | | Phone: | |
| | E mall: | | E mall: | |
| | E Mall2: | | E Mall2: | |

System Location:

| Information Types: | | | |
|---|---|---|---|
| ID No. | Name | Type | Description |
| 001 | Energy Supply | D.7.1 | Sensor data monitoring the availability of energy for the Military installation and its soldiers and command authority. This function includes control of distribution and transfer of power. The remote control capabilities can take action such as initiating necessary switching actions to alleviate an overloading power condition. The impacts to this information and the system may affect the installation's critical infrastructures. |
| 002 | General Information | C.2.8.12 | The Information System Processes Routine Administrative Information. |

| System Impact Assessments: | | Provisional / Adjustments | | | | | |
|---|---|---|---|---|---|---|---|
| | | Confidentiality | | Integrity | | Availability | |
| ID No. | Name | Impact Adjustment Justification | | | | | |
| 001 | Energy Supply | Low | Moderate | Low | High | Low | High |
| | | Disclosure of sensor information may seriously impact the missions if indications & warnings of overall capability are provided to an adversary. | | Severe impacts or consequences may occur if adversarial modification of information results in incorrect power system regulation or control actions. | | Due to loss of availability, severe impact to the mission capability may result and may in-turn have overall catastrophic consequences for the facility's critical infrastructures and possible loss of human life. | |
| ID No. | Name | Low | | Low | | Low | |
| 002 | General Information | No Adjustments | | No Adjustments | | No Adjustments | |
| System Categorization: | | Moderate | | High | | High | |
| Overall System Categorization: | | High | | | | | |

FIG. 65A

Requirements / Controls:

| ID No. | Title | Description | Inheritance (Parent) | Implement. Status | Attributes B | T | O |
|---|---|---|---|---|---|---|---|
| NIST 800-53 | | | | | | | |
| AC-1 | Access Control Policy And Procedures Control: | The organization: a. Develops, documents, and disseminates to [Assignment: organization-defined personnel or roles]: 1. An access control policy that addresses purpose, scope, roles, responsibilities, management commitment, coordination among organizational entities, and compliance; and 2. Procedures to facilitate the implementation of the access control policy and associated access controls; and b. Reviews and updates the current: 1. Access control policy [Assignment: organization-defined frequency]; and 2. Access control procedures [Assignment: organization-defined frequency] | IS-002, AC1 | implemented | X | X | X |
| AC-2 | Account Management | The organization: a. Identifies and selects the following types of information system accounts to support organizational missions/business functions: [Assignment: organization-defined information system account types]; b. Assigns account managers for information system accounts; c. Establishes conditions for group and role membership; d. Specifies authorized users of the information system, group and role membership, and access authorizations (i.e., privileges) and other attributes (as required) for each account; e. Requires approvals by [Assignment: organization-defined personnel or roles] for requests to create information system accounts; f. Creates, enables, modifies, disables, and removes information system accounts in accordance with [Assignment: organization defined procedures or conditions]; | IS-002, AC2 | Implemented | | | |

Baseline / Tailored / Overlay

| System Components: | | | |
|---|---|---|---|
| Hardware: | | | |
| Hardware Name: | Part: | Serial: | |
| | | | |
| Software: | | | |
| Software Name: | Version: | Serial: | |
| | | | |
| Links to Applicable Documents and Information | | | |
| Description: | | | |
| Comments/Supporting Information: | Hyperlink: | | |
| | | | |

| Baseline Approval Signatures: | | |
|---|---|---|
| Responsibility: | Staff Name (Print) | Date |
| System Owner | | |
| Authorizing Official | | |
| Customer | | |

FIG. 65B www.dss.mil/documents/rmf/DSS%20SAR_Template_april%202016.docx¶

Security Assessment Report (SAR)

| | | |
|---|---|---|
| System Name¤ | ▯ | ▯ |
| Facility Name¤ | ▯ | ▯ |
| Report Prepared By¤ | ▯ | ▯ |

| | | |
|---|---|---|
| Date of Original SAR¤ | ▯ | ▯ |
| Date of Last SAR¤ | ▯ | ▯ |
| Date of This SAR¤ | ▯ | ▯ |
| Date of Assessment¤ | ▯ | ▯ |

—— Page Break ——

Insert Record of Changes www.dss.mil/documents/rmf/DSS%20SAR_Template_april%202016.docx

• 1.→Assessment Details

On [Date] the [System Name] located at[Site] was assessed by [·],·

System Information

| | | |
|---|---|---|
| System CLassification¤ | S-or-TS¤ | ▯ |
| UID¤ | ¤ | ▯ |
| Security Categorization¤ | MLL, HMM, HML...¤ | ▯ |
| Overlay(S)¤ | ¤ | ▯ |
| Source of Controls¤ | NIST-800.53 and DAAPM¤ | ▯ |

• 2.→Findings

Organization/Site/System personnel were contacted and interviewed as part of the security assessment. Responses from interviewed personnel are incorporated in the results reported in this SAR. Organizational components and site personnel that directly support the system undergoing assessment are listed below.[List PM/ISO, ISSM/ISSO . system administrator, etc.]

During the assessment the team found [x number] of findings/ deficiencies. General impressions/ observations are ...

• 3.→Recommendation

Recommendation for the system [pick one, delete the rest]

Authorization to Operate (ATO)
ATO with Plan of Action and Milestones (POA&M)
Deny Authorization to Operate (DATO)

The ISO shall create/update the POA&M associated with the subject system address the identified findings/deficiencies within the established timeframes and update the POA&M at least quarterly.

• 4.→Summary Of Findings

The results of the assessment identify the extent to which the controls specified in the system security plan are implemented correctly, operating as intended and producing the desired outcome with respect to meeting the specified security requirements, table 1 below provides a summary of the deficiencies identified during the assessment, Table-1. Summary of Deficiencies in Security Controls

| Control ID¤ | Control Name¤ | Provider¤ | Description Of Deficiency¤ | Recommended-Corrective Action¤ | ▯ |
|---|---|---|---|---|---|
| AC-6(1)¤ | Least Privilege¤ | ISO/ISSM¤ | Need-to description 'how' the system I/O ports are protected¤ | Provide Requested-Description¤ | ▯ |

FIG. 77A www.dss.mil/documents/rmf/DSS%20SAR_Template_april%202016.docx¶

| | | | | |
|---|---|---|---|---|
| ¤ | ¤ | ¤ | Modify audit logs See also AC-5.¤ | Implementation description¤ |

•

• 5.→Summary Of Observations

An observation indicates an area where controls are in place, but there may be a more efficient or cost effective process/procedure that could be implemented. table 2 below provides a summary of observations.

Table-2. Summary of Observations

| Control ID¤ | Control Name¤ | Observation¤ | Recommended Action For improvement¤ |
|---|---|---|---|
| CM5(5); CM-5(6)¤ | Configuration Management¤ | These control are typically applicable to systems used for software/ system development. These control could potentially be tailored out¤ | Consider Tailoring Out¤ |
| ¤ | ¤ | ¤ | ¤ |
| ¤ | ¤ | ¤ | ¤ |

FIG. 77B

SYSTEM AND METHOD OF A REQUIREMENT, ACTIVE COMPLIANCE AND RESOURCE MANAGEMENT FOR CYBER SECURITY APPLICATION

CROSS REFERENCE OF RELATED APPLICATIONS

The present application is

- a continuation-in-part (CIP) of (a) U.S. Non-Provisional patent application Ser. No. 15/732,485 entitled, "SYSTEM AND METHOD OF A REQUIREMENT, COMPLIANCE AND RESOURCE MANAGEMENT", filed on Nov. 20, 2017, (which resulted in a U.S. Pat. No. 10,268,974, issued on Apr. 23, 2019),
- wherein (a) is a continuation-in-part (CIP) of (b) U.S. Non-Provisional patent application Ser. No. 15/731,302 entitled, "SYSTEM AND METHOD OF A REQUIREMENT, COMPLIANCE AND RESOURCE MANAGEMENT", filed on May 22, 2017, (which resulted in a U.S. Pat. No. 9,953,281, issued on Apr. 24, 2018),
- wherein (b) is a continuation-in-part (CIP) of (c) U.S. Non-Provisional patent application Ser. No. 14/544,314 entitled, "SYSTEM AND METHOD OF A REQUIREMENT, COMPLIANCE AND RESOURCE MANAGEMENT", filed on Dec. 22, 2014, (which resulted in a U.S. Pat. No. 9,704,119, issued on Jul. 11, 2017),
- wherein (c) is a continuation-in-part (CIP) of (d) U.S. Non-Provisional patent application Ser. No. 13/815,843 entitled, "SYSTEM AND METHOD OF A REQUIREMENT, COMPLIANCE AND RESOURCE MANAGEMENT", filed on Mar. 15, 2013, (which resulted in a U.S. Pat. No. 9,646,279, issued on May 9, 2017),
- wherein (d) claims the benefit of priority to (e) U.S. Provisional Patent Application No. 61/848,015 entitled, "SYSTEM AND METHOD OF A REQUIREMENT, COMPLIANCE AND RESOURCE MANAGEMENT METHODOLOGY", filed on Dec. 19, 2012),
- Furthermore, wherein (d) is a continuation-in-part (CIP) of (f) U.S. Non-Provisional patent application Ser. No. 13/573,634 entitled, "SYSTEM AND METHOD OF A REQUIREMENT, COMPLIANCE AND RESOURCE MANAGEMENT", filed on Sep. 28, 2012, (which resulted in a U.S. Pat. No. 8,990,308, issued on Mar. 24, 2015).

The entire contents of all (i) U.S. Non-Provisional Patent Applications, (ii) U.S. Provisional Patent Applications, as listed in the previous paragraph and (iii) the filed (Patent) Application Data Sheet (ADS) are hereby incorporated by reference, as if they are reproduced herein in their entirety.

FIELD OF THE INVENTION

The present invention is related to a system and/or a method based on a scalable requirement, compliance and resource management methodology.

The requirement, compliance and resource management methodology of the present invention is intended for (a) designing a product/service, (b) scoping end-to-end process steps, which are required for designing the product/service, (c) identifying critical constrains for designing the product/service, (d) optimizing relevant processes for designing the product/service, (e) evaluating requirement specifications of each process step for designing the product/service, (f) allocating resources (human capital and/or investment capital) for each process step for designing the product/service and (g) enhancing near real time and/or real time collaboration between users.

DESCRIPTION OF PRIOR ART

One currently available product IBM Rational DOORS® software program enables to capture, trace, analyze and manage changes to requirements.

IBM Rational DOORS® can demonstrate compliance to regulations and standards.

IBM Rational DOORS® software allows all stakeholders to actively participate in the requirements process. It has ability to manage changing requirements with scalability. Its life cycle traceability can help teams align the methods and processes and also measure the impact of such methods and processes.

BACKGROUND OF THE INVENTION

In sharp contrast to IBM Rational DOORS®, the requirement, compliance and resource management methodology of the present invention is uniquely enhanced with mathematical algorithms (e.g., fuzzy logic, statistics and weighting logic) to account for any inherent approximation, variability and uncertainty in a process step and/or all cumulative process steps.

Above is a significant innovation compared to IBM Rational DOORS®.

Furthermore, the requirement, compliance and resource management methodology of the present invention synthesizes optimization of relevant process steps, requirements, resources and critical constraints for near real time and/or real time collaboration.

BRIEF DESCRIPTION OF THE FIGURES

FIGS. 5B (schematic chart), 5C (schematic chart), 5D (schematic chart) and 5E (schematic chart) describe various embodiments of 100D of the requirement, compliance and resource management methodology 100 in FIG. 5A. FIGS. 5E (schematic chart) and 5F (schematic chart) describe various embodiments of 100A1 of the requirement, compliance and resource management methodology 100 in FIG. 5A.

FIGS. 6A, 6B, 6C, 6D and 6E describe the features and benefits of the requirement, compliance and resource management methodology 100, as described in FIG. 5A. Features and benefits FIG. 6A describes specific features and benefits of 100A of the requirement, compliance and resource management methodology 100 in FIG. 5A. Features and benefits FIG. 6B describes specific features and benefits of 100A, 100B, 100C and 100D of the requirement, compliance and resource management methodology 100 in FIG. 5A Features and benefits FIG. 6C describes specific features and benefits of 100D and 100E of the requirement, compliance and resource management methodology 100 in FIG. 5A. Features and benefits FIG. 6D describes specific features and benefits of 100F of the requirement, compliance and resource management methodology 100 in FIG. 5A. Features and benefits FIG. 6E describes specific features and benefits of 100F and 100A1 of the requirement, compliance and resource management methodology 100 in FIG. 5A.

FIGS. 8A, 8B, 8C, 8D and 8E describe the features and benefits of the requirement, compliance and resource management methodology 120, as described in FIG. 7A. Features and benefits FIG. 8A describes specific features and benefits of 100A of the requirement, compliance and resource management methodology 120 in FIG. 7A. Features and benefits FIG. 8B describes specific features and benefits of 100B, 100C and 100D of the requirement, compliance and resource management methodology 120 in FIG. 7A. Features and benefits FIG. 8C describes specific features and benefits of 100D, 100E and 100F of the requirement, compliance and resource management methodology 120 in FIG. 7A. Features and benefits FIG. 8D describes specific features and benefits of 100F of the requirement, compliance and resource management methodology 120 in FIG. 7A. Features and benefits FIG. 8E describes specific features and benefits of 100F, 100A1, 100C1 and 100F1 of the requirement, compliance and resource management methodology 120 in FIG. 7A.

FIG. 9H describes a scaled fraction for an event (considering system, segment, element and assembly operations). FIG. 9I describes a scaled % factor for an event (considering system, segment, element and assembly operations).

FIGS. 10A, 10B, 10C, 10D, 10E and 10F describe the features and benefits of the requirement, compliance and resource management methodology 140, as described in FIG. 9A. Features and benefits FIG. 10A describes specific features and benefits of 100A of the requirement, compliance and resource management methodology 140 in FIG. 9A. Features and benefits FIG. 10B describes specific features and benefits of 100A, 100B, 100C and 100D of the requirement, compliance and resource management methodology 140 in FIG. 9A. Features and benefits FIG. 10C describes specific features and benefits of 100D, 100E and 100F of the requirement, compliance and resource management methodology 140 in FIG. 9A. Features and benefits FIG. 10D describes specific features and benefits of 100F of the requirement, compliance and resource management methodology 140 in FIG. 9A. Features and benefits FIG. 10E describes specific features and benefits of 100F, 100A1 and 100C1 of the requirement, compliance and resource management methodology 140 in FIG. 9A. Features and benefits FIG. 10F describes specific features and benefits of 100F1, 100F2 and 100F3 of the requirement, compliance and resource management methodology 140 in FIG. 9A.

FIG. 11A describes an overview of a typical process implementation. FIG. 11B describes a granular view of a typical process implementation, connecting with FIG. 11A. FIG. 11E1 describes simulator specification of an example subsystem 1. FIG. 11E2 describes simulator specification of an example subsystem 2.

FIG. 12B is continuation of FIG. 12A.

FIG. 18B is the continuation of FIG. 18A.

FIG. 20B is the continuation of FIG. 20A.

FIG. 25A describes module 3160 (3160 as in FIG. 17A). Furthermore, module 3160 has cells, which can be identified as A, B, C, D, E, F, G, H, I and J.

FIG. 25B describes cell A of module 3160. FIG. 25C describes cell B of module 3160. FIG. 25D describes cell C of module 3160. FIG. 25E describes cell D of module 3160. FIG. 25F describes cell E of module 3160. FIG. 25G describes cell F of module 3160. FIG. 25H describes cell G of module 3160. FIG. 25I describes cell H of module 3160. FIG. 25J describes cell I of module 3160. FIG. 25K describes cell J of module 3160.

FIG. 30B is continuation of FIG. 30A. FIG. 30C is continuation of FIG. 30B. FIG. 30D is continuation of FIG. 30C.

FIG. 32B is continuation of FIG. 32A.

FIG. 64 illustrates System Baseline Report: Automated report that summarizes the system baseline by formatting and displaying all data content input using GUI forms 1-29.

FIG. 65 (is divided into FIG. 65A and FIG. 65B) illustrates System Baseline Report: Automated report that summarizes the system baseline by formatting and displaying all data content input using GUI forms 1-29.

FIG. 77 is divided into FIG. 77A and FIG. 77B. The entire FIG. 77 illustrates Security Assessment Report (SAR): Report formats and displays SAR data entered in GUIs 39-42.

DETAIL DESCRIPTION OF THE PREFERRED EMBODIMENT OF THE INVENTION

Figure 1:
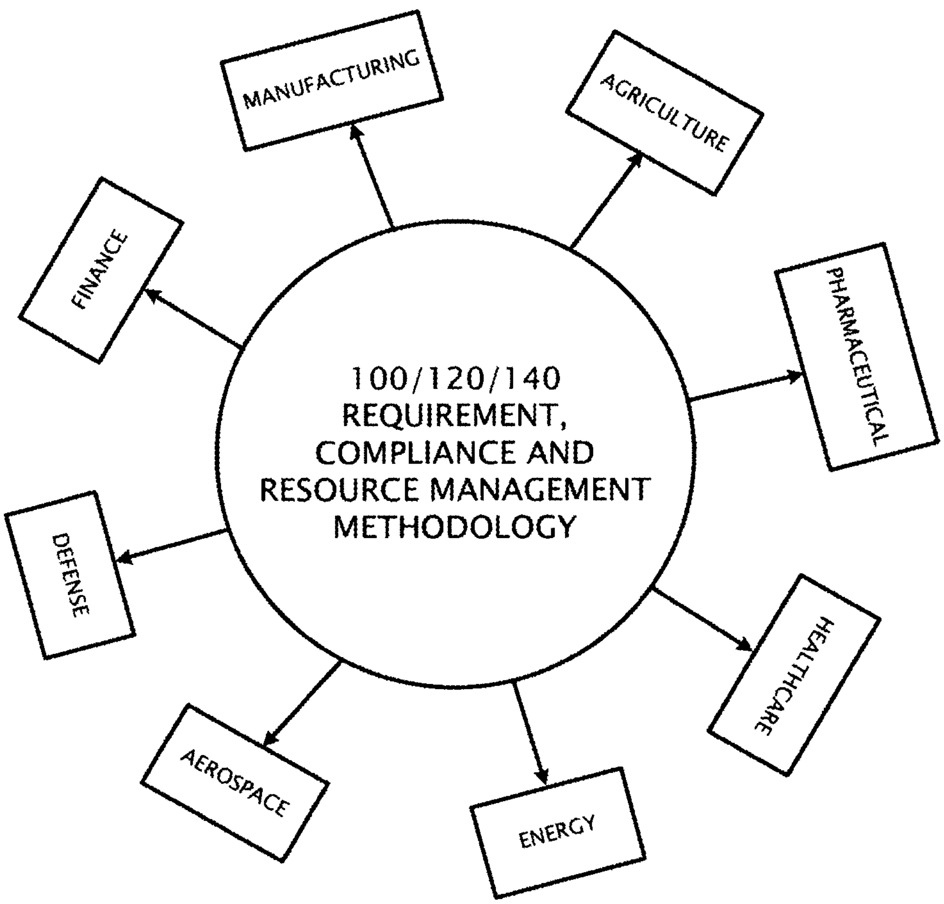
FIG. 1 (schematic diagram) describes various applications of the requirement, compliance and resource management methodology.

FIG. 1 (schematic diagram) describes the various applications of the requirement, compliance and resource management methodology 100 (as described in FIG. 5A) or 120 (as described in FIG. 7A) or 140 (as described in FIG. 9A) in many industries (e.g., manufacturing, agriculture, pharmaceuticals, healthcare, energy, aerospace, defense and finance (including banking)).

Furthermore, the requirement, compliance and resource management methodology 100 or 120 or 140 can be customized to fit any product/service in any industry.

Figure 7A:
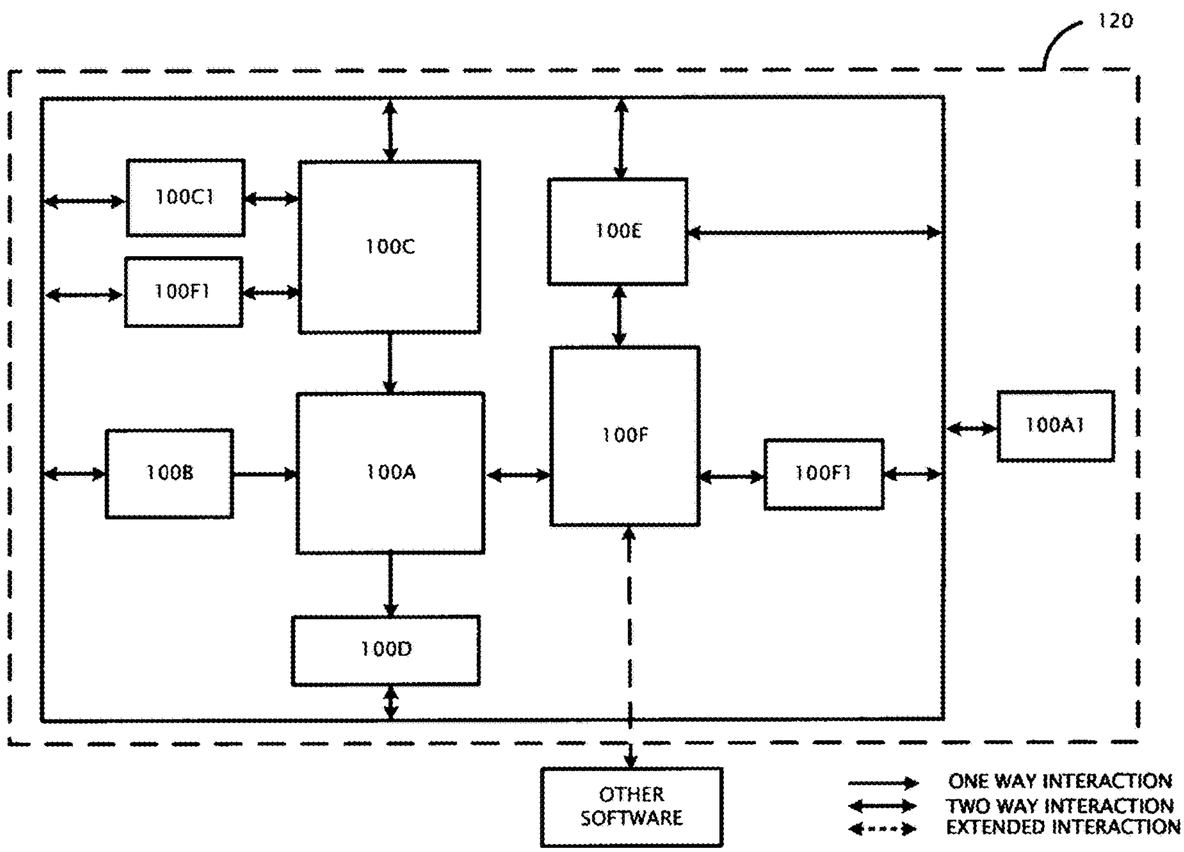
FIG. 7A (block diagram) describes another embodiment of the requirement, compliance and resource management methodology 120, further enhanced by a question/answer format of a requirement input module and a fuzzy logic algorithm module.

The requirement, compliance and resource management methodology 100 (as described in FIG. 5A) configured/enhanced with the question/answer format of a requirement input module and the fuzzy logic algorithm module can be designated as the requirement, compliance and resource management methodology 120 (as described in FIG. 7A).

Fuzzy means not clear (blurred). Fuzzy logic is a form of approximate reasoning, that can represent variation or imprecision in logic by making use of natural language (NL) in logic.

Approximation is inherent and inevitable in any process step and approximation can be modeled and managed explicitly. A fuzzy logic algorithm module can represent approximations for inputs and outputs in the requirement, compliance and resource management methodology 120.

Figure 9A:
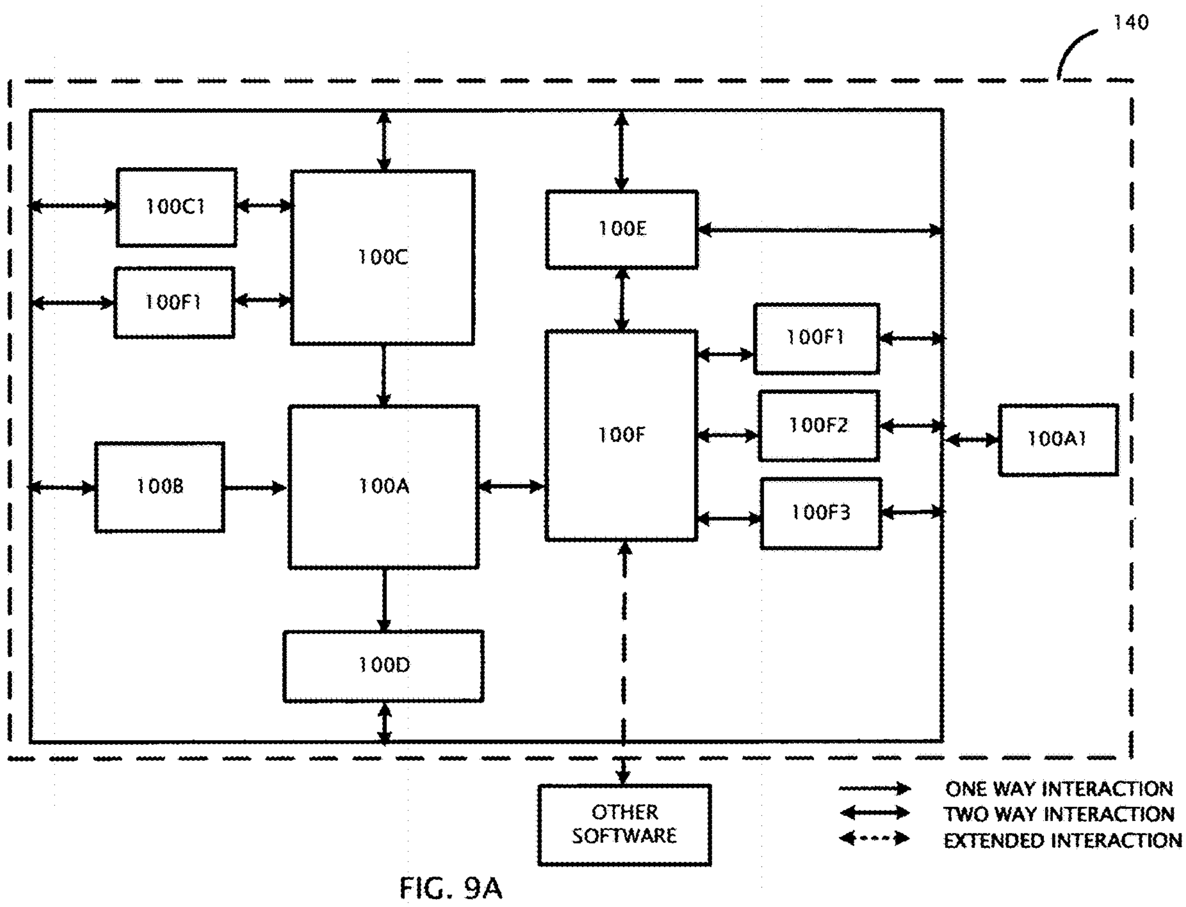
FIG. 9A (block diagram) describes another embodiment of the requirement, compliance and resource management methodology 140, further enhanced by a question/answer format of requirement input, a fuzzy logic algorithm module, a statistical algorithm module and a weighting logic algorithm module.

The requirement, compliance and resource management methodology 120 (as described in FIG. 7A) further configured/enhanced with a statistical algorithm module and a weighting logic algorithm module can be designated as the requirement, compliance and resource management methodology 140 (as described in FIG. 9A).

Uncertainty/variation is inherent and inevitable in any process step and uncertainty/variation can be modeled and managed explicitly. A statistical algorithm module can represent uncertainty/variation for inputs and outputs in the requirement, compliance and resource management methodology 140.

The requirement, compliance and resource management methodology 100 or 120 or 140 can be integrated with an enterprise storage system (e.g., an enterprise server) and/or an enterprise device (e.g., a laptop and a mobile internet appliance).

Alternatively, the requirement, compliance and resource management methodology 100 or 120 or 140 can be located at a cloud storage system for software-as-a service (SaaS).

Furthermore, the requirement, compliance and resource management methodology 100 or 120 or 140 is scalable.

Many components of the requirement, compliance and resource management methodology 100 or 120 or 140 are modular to permit automating some functions, but not automating other functions.

Furthermore, the components of the requirement, compliance and resource management methodology 100 or 120 or 140 can include (a) transactional database, (b) management portal/dashboard, (c) business intelligence system, (d) customizable reporting, (e) external access via internet, (f) search, (g) document management, (h) messaging/chat and (i) workflow management.

Best practices can be incorporated in the requirement, compliance and resource management methodology 100 or 120 or 140. This means that the requirement, compliance and resource management methodology 100 or 120 or 140 can reflect a defined interpretation as the most effective way to perform a process step and a customer can also modify the best practices.

Furthermore, the requirement, compliance and resource management methodology 100 or 120 or 140 can be configured with an application programming interface (API) to integrate (e.g., direct integration and/or database integration) with other software programs (e.g., MS Word, MS Excel, MS Project and Enterprise Resource Planning (ERP)).

Enterprise Resource Planning (ERP) is an integrated software program/system that operates in near real time and/or real time, without relying on periodic updates with a common database, which supports (a) finance/accounting (general ledger, payables, cash management, fixed assets, receivables, budgeting and consolidation), (b) human resources (payroll, training, benefits, 401K, recruiting and diversity management), (c) manufacturing (bill of materials, engineering, work orders, scheduling, capacity, workflow management, quality control, cost management, manufacturing process, manufacturing projects, manufacturing flow, activity based costing and product life cycle management), (d) supply chain management (order to cash, inventory, order entry, purchasing, product configuration, supply chain planning, supplier scheduling, inspection of goods, claim processing and commissions), (e) project management (costing, billing, time and expense, performance units and activity management) and (f) customer relationship management (sales and marketing, commissions, service, customer contact and call center support).

Figure 2:
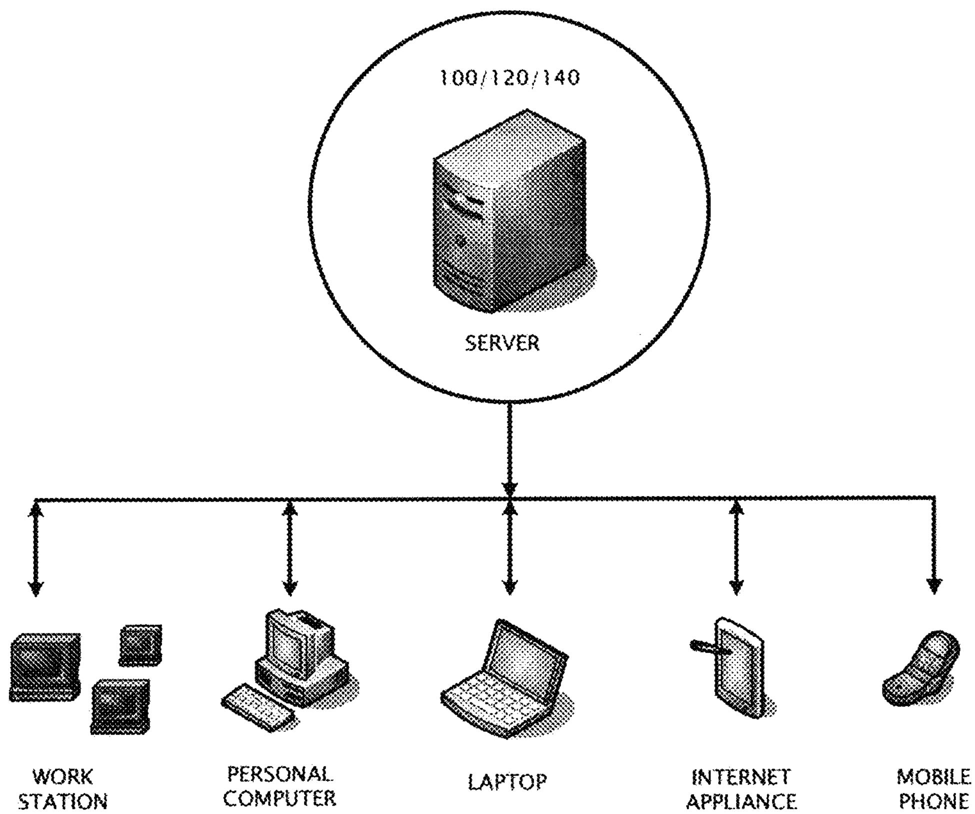
FIG. 2 (schematic diagram) describes the connectivity (both one-way and two-way connectivity) of the requirement, compliance and resource management methodology (located at an enterprise server) with other external systems and/or devices.

FIG. 2 (schematic diagram) describes two-way connection of the requirement, compliance and resource management methodology 100 or 120 or 140 (located at an enterprise storage system) to many systems (e.g., work station) and/or devices (e.g., personal computer, laptop and internet appliance). The Internet appliance can be a mobile internet appliance (e.g., iPad).

FIG. 2 (schematic diagram) also describes one-way connection of the requirement, compliance and resource management methodology 100 or 120 or 140 (located at an enterprise storage system) to a mobile phone. The one-way connection can illustrate only summary result (summary dash board) with a mobile phone, due to a limitation of the available display screen size.

Figure 3:
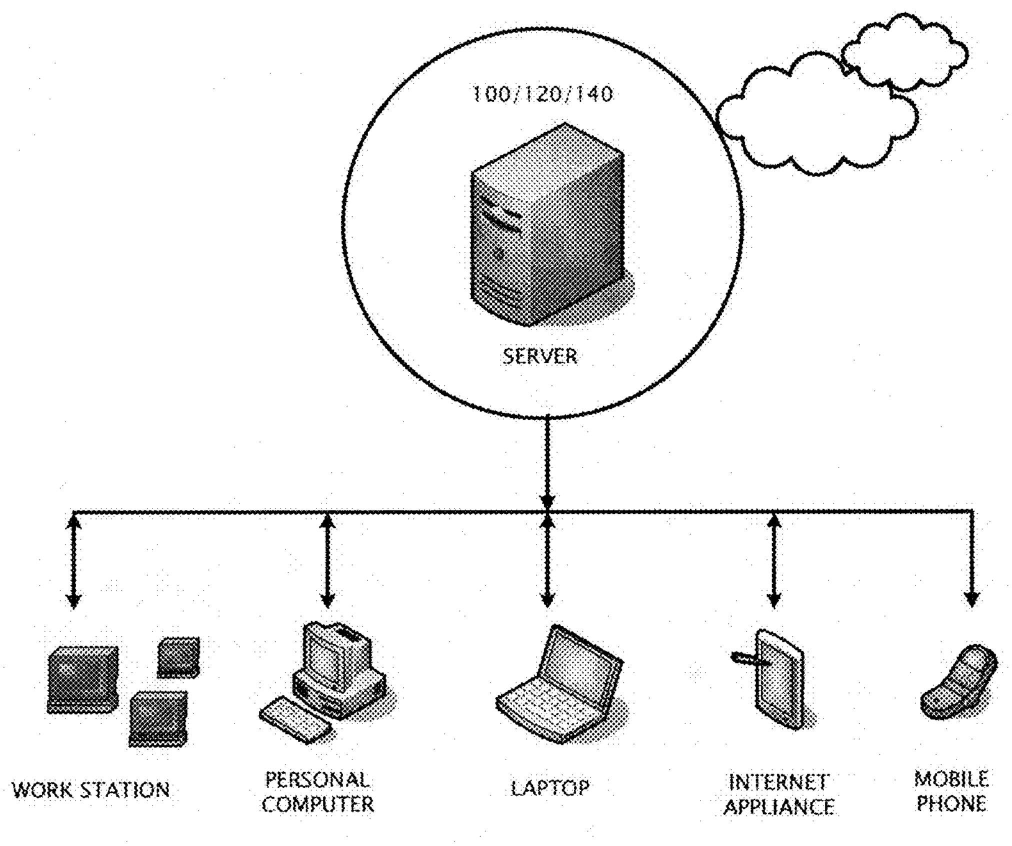
FIG. 3 (schematic diagram) describes the connectivity (both one-way and two-way connectivity) of the requirement, compliance and resource management methodology (located at a cloud server) with other external systems and/or devices.

FIG. 3 (schematic diagram) describes two-way connection of the requirement, compliance and resource management methodology 100 or 120 or 140 (located at a cloud storage system) to many systems (e.g., work station) and/or devices (e.g., personal computer, laptop and internet appliance). The internet appliance can be a mobile internet appliance (e.g., iPad).

FIG. 3 (schematic diagram) also describes one-way connection of the requirement, compliance and resource management methodology 100 or 120 or 140 (located at a cloud storage system) to a mobile phone. The one-way connection can illustrate only summary result (summary dash board) with a mobile phone, due to a limitation of the available display screen size.

Figure 4:
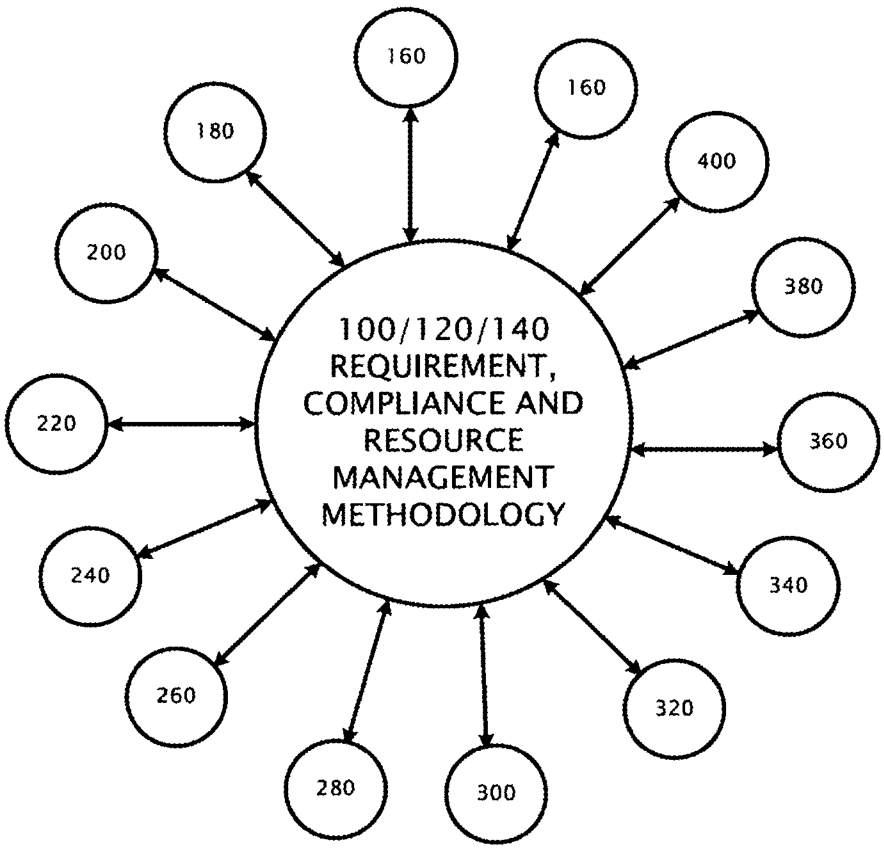
FIG. 4 (schematic diagram) describes the connectivity (two-way connectivity) of the requirement, compliance and resource management methodology with users for (a) near real time and/or real time collaboration between users, (b) product development, (c) procurement, system/test/QA engineering, (d) legal/compliance requirement/management, (e) product management, (f) product marketing, (g) technical support, (h) financial management and (i) executive management.

FIG. 4 (schematic diagram) describes two-way connection of the requirement, compliance and resource management methodology 100 or 120 or 140 to various functional modules. User is denoted by 160, Algorithm Engineering is denoted by 180, Hardware Engineering is denoted by 200, System Engineering is denoted by 220, Subcontracting is denoted by 240, Procurement is denoted by 260, Product Management is denoted by 280, Product Marketing is denoted by 300, Technical Support is denoted by 320, Internal Legal is denoted by 340, External Legal (Compliance) is denoted by 360, Financial Management is denoted by 380 and Executive (General) Management is denoted by 400.

Figure 5A:
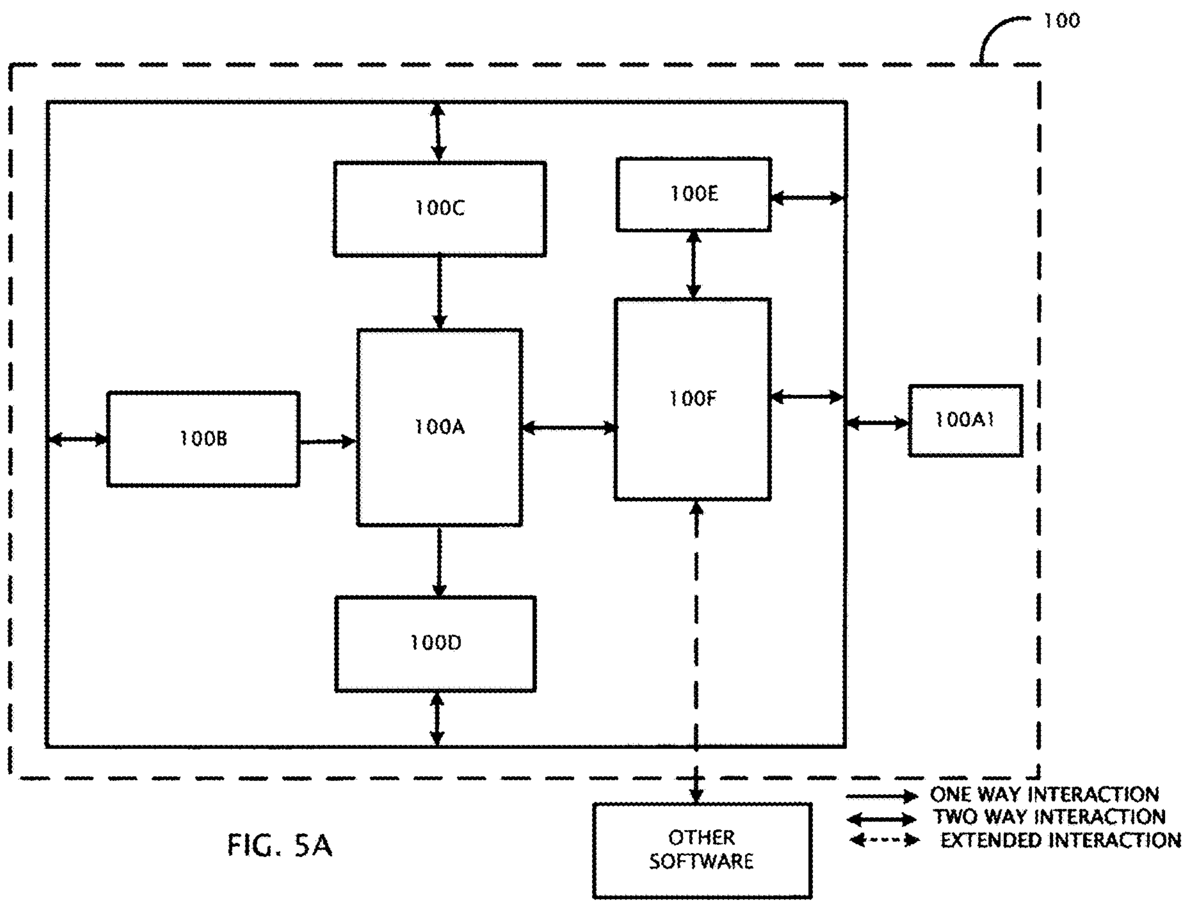
FIG. 5A (block diagram) describes one embodiment of the requirement, compliance and resource management methodology 100.
Figure 5D:
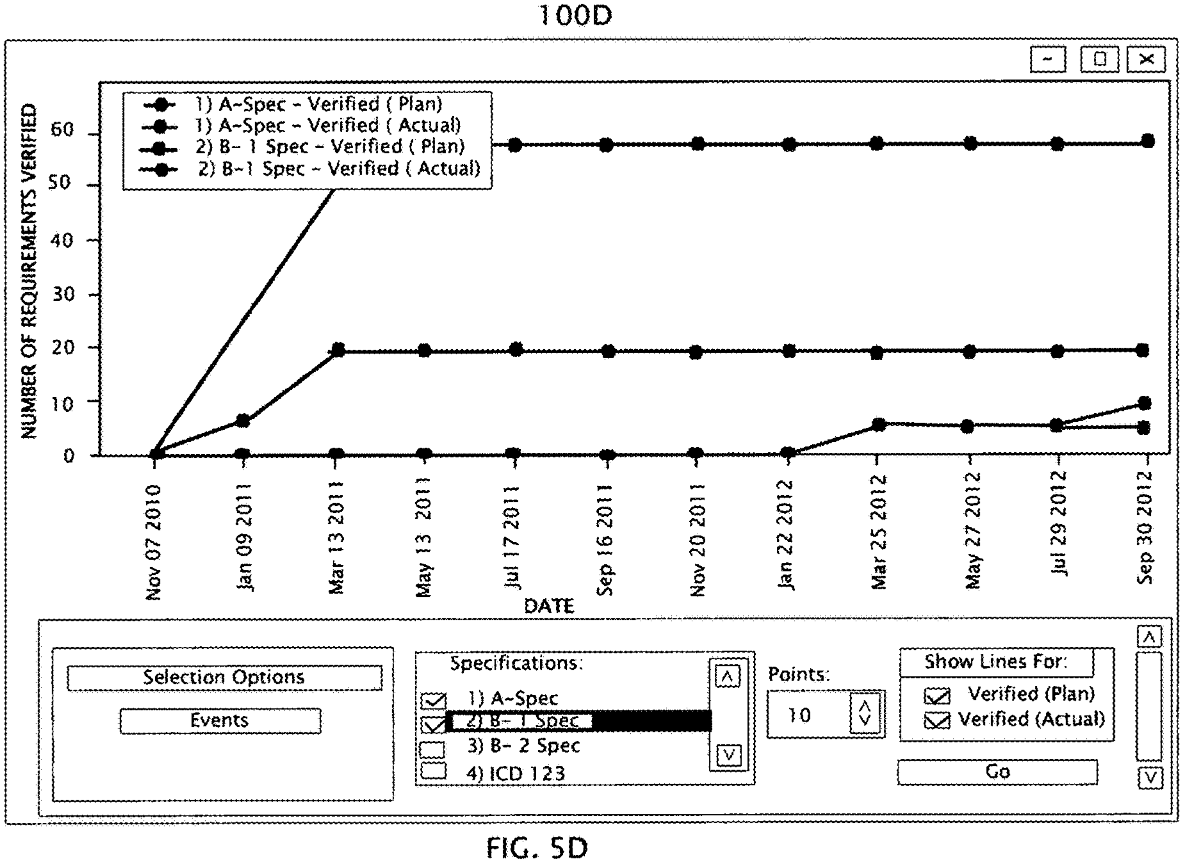
FIG. 5B consists of FIG. 5B1 and FIG. 5B2.
FIG. 5C consists of FIG. 5C1 and FIG. 5C2.
FIG. 5E consists of FIG. 5E1 and FIG. 5E2.
FIG. 5F consists of FIG. 5F1 and FIG. 5F2.

FIG. 5A (block diagram) describes the requirement, compliance and resource management methodology 100 and all relevant modules are described below: Requirement Processing Module is denoted by 100A, Compliance & Legal Module is denoted by 100B, Requirement Input Module is denoted by 100C, Specifications and Matrices Module is denoted by 100D, Resource Allocation Module is denoted by 100E, Even Verification Module is denoted by 100F and Graphical User Interface Module is denoted by 100A1.

Event verification module 100F can be configured with an application programming interface (API) to integrate (e.g., direct integration and/or database integration) the requirement, compliance and resource management methodology 100 with other software programs (e.g., MS Word, MS Excel, MS Project and Enterprise Resource Planning (ERP)).

Graphical user interface module 100A1 can be configured a search interface for input data, interpretation of input data, analysis, output data and interpretation of output data.

The requirement processing module 100A can include an embedded constraint analysis tool. It adopts the common idiom that a chain is no stronger than its weakest link.

Assuming the goal of a project utilizing the requirement, compliance and resource management methodology and its success/failure measurements are clearly defined, then the process steps of the embedded constraint analysis tool are:

1. identifying all constraints
2. deciding to exploit the constraints (how to get the most out of the constraints)
3. making changes needed to break the first critical constraint
4. If the first critical constraint has been broken, then to go to step 3 in order to break the second critical constrain, the third critical constrain and so on.

Buffer can be used to protect the constraint from varying in the entire the requirement, compliance and resource management methodology. Buffer can also allow for normal variation and the occasional upset before and behind the constraint.

FIG. 5B1 and FIG. 5B2 are divided part of FIG. 5B. FIG. 5C1 and FIG. 5C2 are divided part of FIG. 5C. FIG. 5E1 and FIG. 5E2 are divided part of FIG. 5E. FIG. 5F1 and FIG. 5F2 are divided part of FIG. 5F. FIGS. 5B (schematic chart), 5C (schematic chart), 5D (schematic chart), 5E (schematic chart) and 5F (schematic chart) describe some typical outputs of some components of the embodiment of the requirement, compliance and resource management methodology 100 (as described in FIG. 5A).

An event coordination matrix (ECM) is a tool that can enable cross-functional and cross-enterprise coordination for facilitating verification, validation, certification and accreditation (VVC&A) planning and execution.

The development of the ECM can be driving factor in verification planning activities. Typically, ECM can be developed early in the verification planning process to drive an early adoption amongst key stakeholders and also to allow for an identification of potential discrepancies as early as possible.

The responsibility of the development of the ECM primarily relies on inputs from a test and verification (T&V) team, a system engineering (SE) team and an enterprise integration (EI) team, with additional inputs provided by specialty engineering, quality assurance/mission assurance, information assurance and logistics planning.

The development of the ECM is a cross-enterprise activity and is comprised of a four-part process:

1. identification of requirements,
2. identification of analysis, inspection, demonstration and test (AIDT) events,
3. allocation of requirements to specific events, and
4. allocation of events to timelines or key events within schedules.

The development, population and refinement of the ECM is coordinated both within the system engineering & integration (SE&I) organization and prime contractor organization by the EI team to ensure a thorough and balanced approach across the enterprise.

Once all requirements (both imposed and derived) have been addressed through VVC&A and identified by the SE team, then all activities or events where the VVC&A will occur have been identified by the T&V team, the requirements are then allocated to the set of specific events.

As depicted in FIG. 5F, the left side of the ECM includes the requirements information and the top of the ECM addresses the individual events that are planned to accomplish the VVC&A.

Within the ECM, all activities and events (where VVC&A to be performed) are documented and tracked. The objective of the ECM is to correlate all requirements to specific activities and events. By focusing on all VVC&A activities (as opposed to test only), it becomes possible to optimize the T&V approach across the entire breadth of the program, allowing the T&V team to factor in analysis, inspection and demonstration events into their verification planning. By analyzing the VVC&A activities across the program, the T&V team can act in a truly integrated fashion, optimizing the development and re-use of test data, scenarios, run conditions, truth models, environmental conditions and even the execution of entire events to allow for efficient planning.

By looking at the complete picture of all integrated verification activities, the SE&I organization truly has insight and oversight into the planned activities of the prime contractors and can identify areas of the program, where there is either not enough verification being planned (for example, mission critical requirements (MCRs), interoperability requirements and critical technical parameter (CTP) requirements) or too much verification being planned (redundant or extraneous events).

An added benefit of this integrated approach to verification planning is that it now becomes possible for the T&V organization to report confidence to the customer about when technical functionality will come on-board and also to understand the impact of changes to schedule, performance and budget, thereby facilitating more accurate trade analysis and higher confidence recommendations on how to solve both programmatic and technical problems as they arise.

A key consideration to note is the time-phase approach to the identification of Analysis, Inspection, Demonstration & Test (AIDT) events. Identifying events that only represent final acceptance tests (FAT) as the primary focus of an integrated T&V approach is short-sighted and will not allow the SE&I to truly act as a system integrator, thereby making it much more difficult to report incremental progress (and thus confidence) to the customer. As the program progresses, the SE&I organization has identified analysis events that will occur prior to FAT. These analysis events allow the SE&I organization to analyze the technical details of the prime contractor's exercises, rehearsals and even internal verification activities.

By scheduling analysis events that are centered on both technical capability delivery and reasonable time-phasing, the SE&I organization can more accurately predict when technical capabilities will be delivered and provide more accurate, actionable data upon which the customer can make decisions.

Another key consideration is the design versus acceptance verification. The design verification encompasses those things typically performed once for a system (induced environments, etc.) and, in many cases, by inspection. The acceptance verification can occur on a component-by-component or build-by-build basis. As the requirements are allocated to the events, the verification type (AIDT) is captured in the ECM to ensure that the validation and verification is addressed adequately.

Given the considerations defined above, in order to optimize the benefit of a truly integrated SE&I methodology, all aspects of VVC&A have to be addressed in one matrix ensuring the AIDT and VVC&A activities can be performed once and at the lowest cost, risk and most optimum time/venue.

FIGS. 6A, 6B, 6C, 6D and 6E describe the features and benefits of the requirement, compliance and resource management methodology 100, as described in FIG. 5A.

The key features and benefits of the requirement, compliance and resource management methodology 100 are listed below:

Requirement Processing Module (100A) Feature: Specification author "book boss" assignments. Requirement Processing Module (100A) Benefit: Provides ability to assign personnel with read/write access to specifications and requirements.

Compliance & Legal Module (100B) Feature: Import legal/regularity requirements (i.e., HIPAA). Compliance & Legal Module (100B) Benefit: Single source for legal/regulatory requirement in a true relational database.

Requirement Input Module (100C) Feature (1): Import customer requirements from MS Word/MS Excel/pdf into database. Requirement Input Module (100C) Benefit (1): Seamless import allows users to consolidate requirements into single, true relational database. Requirement Input Module (100C) Feature (2): Incorporates non-textual objects and images into database. Requirement Input Module (100C) Benefit (2): Allows non-textual objects to be associated with requirements objects.

Specifications and Matrices Module (100D) Feature (1): TPM, risk, critical issue tracking and control. Specifications and Matrices Module (100D) Benefit (1): Insightful reporting capability provides visibility to critical issues and unresolved actions, enabling efficient resource allocation. Specifications and Matrices Module (100D) Feature (2): Overall project completion status. Specifications and Matrices Module (100D) Benefit (2): Simple dashboard metrics which provide completion status at all levels of integration up to final end-item delivery. Specifications and Matrices Module (100D) Feature (3): Open action status. Specifications and Matrices Module (100D) Benefit (3): Quick and easy access to program action items and completion status. Specifications and Matrices Module (100D) Feature (4): Program usage statistics. Specifications and Matrices Module (100D) Benefit (4): Real-time metrics which display iris user statistics such as user frequency and duration.

Resource Allocation Module (100E) Feature (1): Hardware/software resource management. Resource Allocation Module (100E) Benefit (1): Allows for quick and easy reservation of hardware/software components needed to perform verification activities in specific facilities/locations. Flags, if there is a scheduling conflict in hardware/software resource allocation. Provides resource time and cost for each event. Resource Allocation Module (100E) Feature (2): Personnel resource management. Resource Allocation Module (100E) Benefit (2): Allows for quick and easy reservation of personnel and subject matter experts needed to perform verification activities in specific facilities/locations. Flags, if there is a scheduling conflict in hardware/software resource allocation. Provides resource time and cost for each event.

Event Verification Module (100F) Feature (1): Allocation of requirements to verification events. Event Verification Module (100F) Benefit (1): Provides real-time visibility to verification strategies, configuration and objectives thereby providing programs the ability to leverage verification activities in support of agile acquisition initiatives. Enables collaboration ensuring early identification of risks. Event Verification Module (100F) Feature (2): Customizable verification event coordination matrix. Event Verification Module (100F) Benefit (2): Customizable event coordination matrix (ECM) generator which allows users to organize and group events by end-item deliverables and engineering disciplines. Provides ability for users to see if they can move requirements to another event and the event in question may also eliminated thereby streamlining verification activities. Event Verification Module (100F) Feature (3): Event resource management. Event Verification Module (100F) Benefit (3): Tightly couples required verification event resources to integrated schedules to better coordinate resources. Event Verification Module (100F) Feature (4): Event configuration control and change history. Event Verification Module (100F) Benefit (4): Ensures verification baseline is under strict configuration control. Maintains a detailed history of all changes against specific verification activities. Event Verification Module (100F) Feature (5): Traceability from requirements to compliance data artifacts. Event Verification Module (100F) Benefit (5): Provides closed-loop automated hyperlinks which provide quick access to requirements compliance data and related artifacts. Event Verification Module (100F) Feature (6): Verification activity linkage to MS project schedules. Event Verification Module (100F) Benefit (6): Tightly couples with verification activities with program milestones to ensure timely end-item delivery. Event Verification Module (100F) Feature (7): Electronic signature (event planning and completion). Event Verification Module (100F) Benefit (7): Electronic signature capability dramatically reduces test activity approval cycle. Event Verification Module (100F) Feature (8): Enterprise integration with external data sources. Event Verification Module (100F) Benefit (8): Allows for correlation of data elements across the enterprise dramatically improving collaboration, increasing work force efficiency and reducing cost.

Graphical User Interface Module (100A1) Feature (1): Simple and intuitive GUI user interface. Graphical User Interface Module (100A1) Benefit (1): Simple, intuitive interface provides powerful capabilities for importing, linking, analyzing, reporting and managing requirements, including traceability to associated project verification events and team assignments. Requires minimal user training. Graphical User Interface Module (100A1) Feature (2): Ready for use upon installation. Graphical User Interface Module (100A1) Benefit (2): No custom scripting required results in lower implementation cost, faster usage. May be tailored to support specific project processes.

A major challenge in the requirement, compliance and resource management methodology 100 (as described in FIG. 5A) is in qualitative and imprecise terms.

The use of soft functional requirements in a task-based specification methodology can capture the imprecise requirements and formulate soft functional requirements using a fuzzy logic algorithm module. More specifically, the soft functional requirements can be represented by canonical form in test-score semantics.

FIG. 7A (block diagram) describes another embodiment of the requirement, compliance and resource management methodology, further enhanced by a question and answer format of a requirement input module 100 C1 and a fuzzy logic algorithm module 100F1 and all relevant modules are described below: Requirement Processing Module is denoted by 100A, Compliance & Legal Module is denoted by 100B, Requirement Input Module is denoted by 100C, Specifications and Matrices Module is denoted by 100D, Resource Allocation Module is denoted by 100E, Event Verification Module is denoted by 100F, Graphical User Interface Module is denoted by 100A1, Question & Answer Format For Requirement Input Module is denoted by 100C1 and Fuzzy Logic Algorithm Module is denoted by 100F1.

Figure 7B:
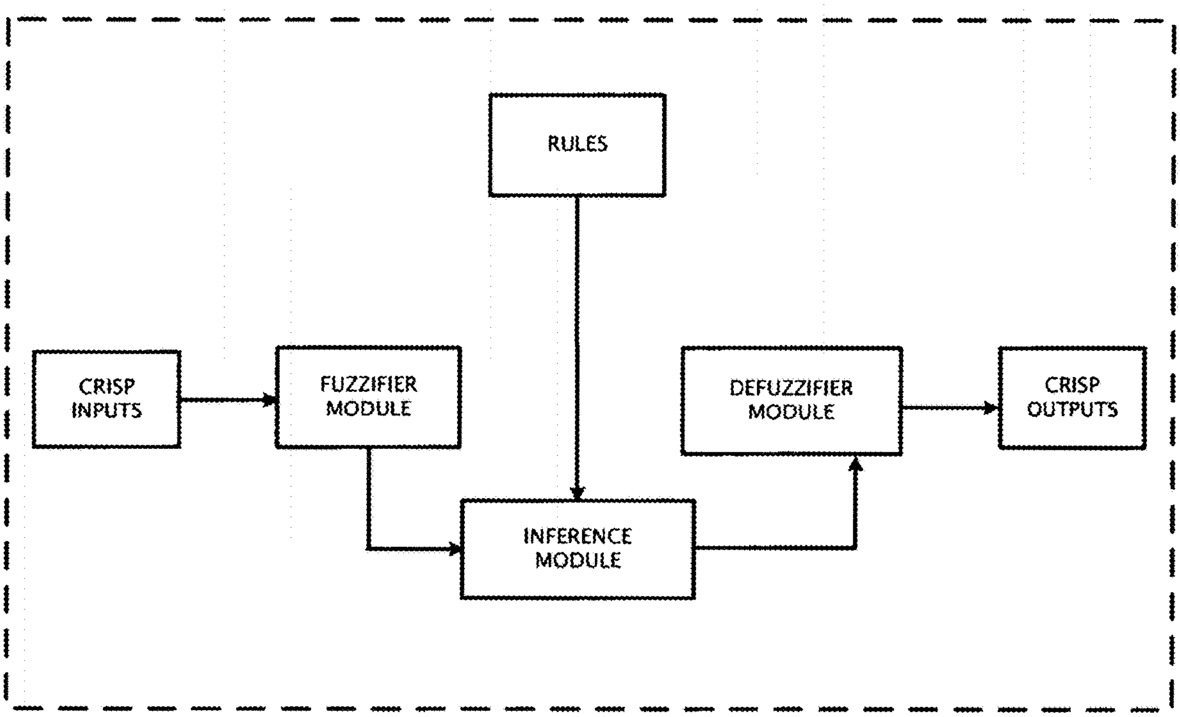
FIGS. 7B (schematic diagram) and 7C (schematic diagram) describe an application of the fuzzy logic module of the requirement, compliance and resource management methodology 120, as described in FIG. 7A.

FIGS. 7B (schematic diagram) and 7C (schematic diagram) describes the implementation of a fuzzy logic algorithm module 100F1.

A fuzzy logic algorithm module can be implemented as follows: (a) define linguistic variables and terms, (b) construct membership functions, (c) construct rule base, (d) convert crisp inputs into fuzzy values, utilizing membership functions (fuzzification), (e) evaluate rules in the rule base (inference), (f) combine the results of each rules (inference) and (g) convert outputs into non-fuzzy values (de-fuzzification).

Fuzzy logic is a relatively new technique for solving problems related to requirement, compliance and resource management methodology. The key idea of fuzzy logic is that it uses a simple/easy way to secure the output(s) from the input(s), wherein the outputs can be related to the inputs by using if-statements.

Effective management of requirement, compliance and resource management methodology is crucial in producing a new product and/or new system.

In a competitive world, organizations are forced to look for scientific tools in evaluation of effective management of requirement, compliance and resource management methodology. The management team is responsible for producing an output and hence the management team must be constantly aware of the goal, purpose and management efficiency. Furthermore, effectiveness in requirement, compliance and resource management methodology, which is a synonym of a project success, is measured or assessed in terms of the degree of achievement of project objectives.

For example, if project time delay (PTD) is low (L) and project time delay gradient (PTDG) is high (H), then according to a fuzzy decision, the project management efficiency (PME) is very high (VH).

However, the boundaries of very high, high, medium and low of any decision variable are determined by expert knowledge.

A fuzzy decision making system is a scientific tool that can be used to solve the problem. This means that information of expert knowledge and experience in a fuzzy decision making system is used for determining the project management efficiency.

The development of such a fuzzy decision making system can be implemented by utilizing the Mathworks software. Fuzzy Logic Toolbox from Mathworks Software is a menu driven software that can allow the implementation of fuzzy constructs like membership functions and a database of decision rules.

Fuzzy Logic Toolbox from Mathworks Software also provides Mathworks Software's MATLAB functions, graphical tools and Mathworks Software's Simulink blocks for analyzing, designing and simulating systems based on fuzzy logic.

Furthermore, Fuzzy Logic Toolbox from Mathworks Software enables (a) design fuzzy inference systems, including fuzzy clustering and neuro-fuzzy system.

A neural network can approximate a function, but it is impossible to interpret the result in terms of natural language. The fusion of neural networks and fuzzy logic in neuro-fuzzy system can provide both learning as well as readability. Neuro-fuzzy system is based on combinations of artificial neural networks and fuzzy logic.

Neuro-fuzzy system can use fuzzy inference engine with fuzzy rules for modeling the project uncertainties which is enhanced through learning the various situations with a radial basis function (RBF) neural network.

Additionally, a neural network can approximate a function, but it is impossible to interpret the result in terms of a natural language. But an integration of the neural network and fuzzy logic in a neuro-fuzzy algorithm can provide both learning and readability. The neuro-fuzzy algorithm can use fuzzy inference engine (with fuzzy rules) for modeling uncertainties, which is further enhanced through learning the various situations with a radial basis function. The radial basis function consists of an input layer, a hidden layer and an output layer with an activation function of hidden units. A normalized radial basis function with unequal widths and equal heights can be written as:

$$\psi_i(x)(softmax) = \frac{\exp(h_i)}{\sum_{i=1}^{n} \exp(h_i)}$$

-continued $$h_i = \left( -\sum_{l=1}^{2} \frac{(X_l - u_{il})^2}{2\sigma_i^2} \right)$$

X is the input vector, uil is the center of the ith hidden node (i=1, . . . , 12) that is associated with the lth (1=1,2) input vector, σi is a common width of the ith hidden node in the layer and soft max (hi) is the output vector of the ith hidden node. The radial basis activation function is the soft max activation function. First, the input data is used to determine the centers and the widths of the basis functions for each hidden node. Second, is a procedure to find the output layer weights that minimize a quadratic error between predicted values and target values. Mean square error can be defined as:

$$MSE = \frac{1}{N} \sum_{k=1}^{N} ((TE)_k^{exp} - (TE)_k^{cal})^2$$

For inherent uncertainties in the requirement, compliance and resource management methodology 120/140 due to external factors, shifting business objectives and poorly defined methods, a neuro-fuzzy system can be utilized for scenario planning.

FIG. 7B describes crisp inputs are fed into fuzzifier module to inference module. Inference module is based on rules. The inference module is fed into defuzzifier module then to crisp outputs.

Figure 7C:
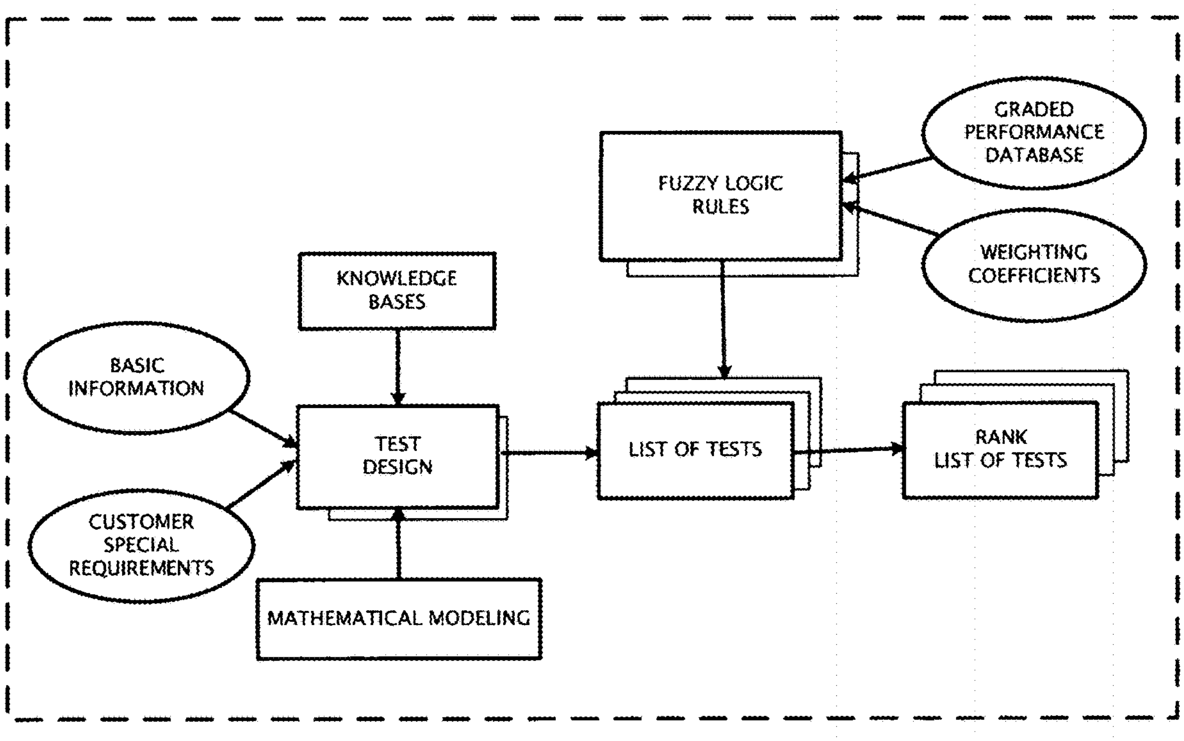
FIG. 7D describes a fuzzy logic membership function.
FIG. 7E describes a decision flow chart of the fuzzy logic algorithm module of the requirement, compliance and resource management methodology 120, as described in FIG. 7A.

FIG. 7C describes an application of fuzzy logic in a test design. The test design takes into account of (a) basic information, (b) customer special requirements, (c) knowledge rules and (d) mathematical modeling. Test design then creates a list of tests based fuzzy logic rules (fuzzy logic rules are based on graded performance database and weighting coefficients) with ranking.

Fuzzy set theory is a generalization of the ordinary set theory. A fuzzy set is a set whose elements belong to the set with some degree of membership μ. Let X be a collection of objects. It is called universe of discourse. A fuzzy set A€X is characterized by membership function μA(x) represents the degree of membership, Degree of membership maps each element between 0 and 1. It is defined as: A={(x, $\mu_A$(x)); x€X}.

Figure 7D:
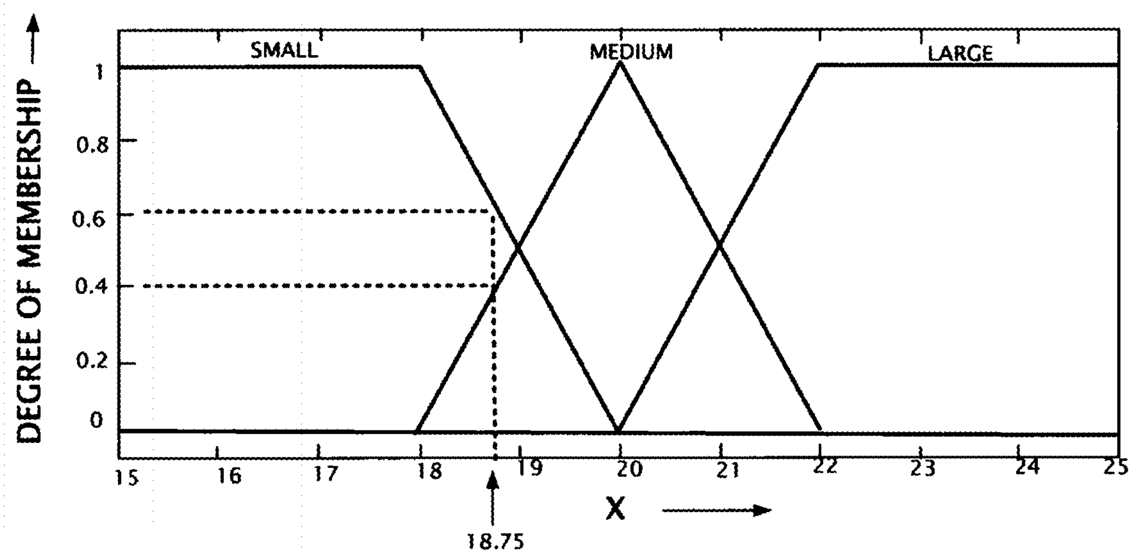

FIG. 7D illustrates the membership functions of three fuzzy sets viz. "small", medium" and "large" for a fuzzy variable X. The universe of discourse is all possible values of Xs.

It is X=[15;25]. At X of 18.75, the fuzzy set is a "small" with membership value of 0.6. Hence, $\mu_{small}$(18.75) is 0.6; $\mu_{medium}$(18.75) is 0.4 and $\mu_{large}$(18.75) is 0.4.

Fuzzy inference system is a rule-based system. It is based on fuzzy set theory and fuzzy logic. Fuzzy inference system is mappings from an input space to an output space. Fuzzy inference system allows constructing structures which are used to generate responses (outputs) for certain stimulations (inputs). Response of fuzzy inference system is based on stored knowledge (relationships between responses and stimulations). Knowledge is stored in the form of a rule base. Rule base is a set of rules. Rule base expresses relations between inputs of system and its expected outputs. Knowledge is obtained by eliciting information from specialists. These systems are usually known as fuzzy expert systems. Another common denomination for fuzzy inference system is fuzzy knowledge-based systems. It is also called as data-driven fuzzy systems. A fuzzy decision making system is comprised of four main components: a fuzzification interface, a knowledge base, decision making logic, and a defuzzification interface. In essence, a fuzzy decision making system is a fuzzy expert system. A fuzzy expert system is oriented towards numerical processing where conventional expert systems are mainly symbolic reasoning engines.

Figure 7E:
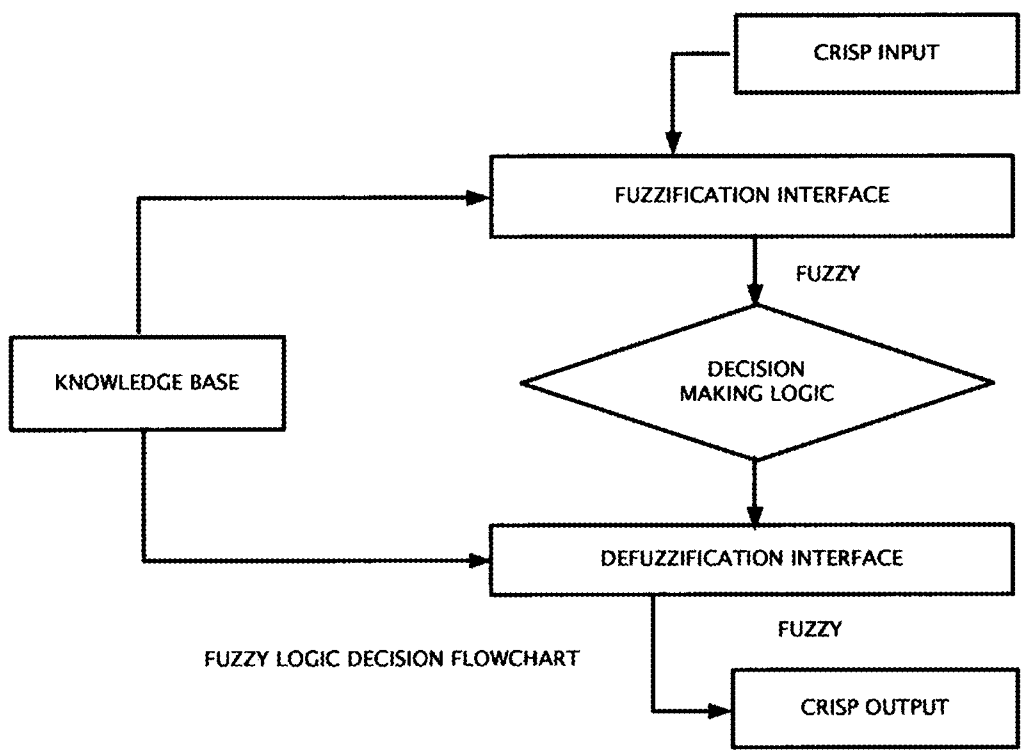

FIG. 7E describes a decision flow chart of the fuzzy logic module of the requirement, compliance and resource management methodology 120, as described in FIG. 7A.

There are key four components in a decision flow chart of the fuzzy logic module: (a) The fuzzification interface: It measures the values of the input variables on their membership functions to determine the degree of truth for each rule premise, (b) The knowledge base: It comprises experts' knowledge of the application domain and the decision rules that govern the relationships between inputs and outputs. The membership functions of inputs and outputs are designed by experts based on their knowledge of the system and experience, (c) The decision-making logic: It is similar to simulating human decision making in inferring fuzzy control actions based on the rules of inference in fuzzy logic. The evaluation of a rule is based on computing the truth value of its premise part and applying it to its conclusion part. This results in assigning one fuzzy subset to each output variable of the rule. In Min Inference, the entire strength of the rule is considered as the minimum membership value of the input variables' membership values. A rule is said to be fire, if the degree of truth of the premise part of the rule is not zero, (d) The defuzzification interface: It converts a fuzzy control action (a fuzzy output) into a nonfuzzy control action (a crisp output). The most common used method in defuzzification is the center of area method (COA). The center of area method computes the crisp value as the weighted average of a fuzzy set.

FIGS. 8A, 8B, 8C, 8D and 8E describe the features and benefits of the requirement, compliance and resource management methodology 120, as described in FIG. 7A.

The key features and benefits of the requirement, compliance and resource management methodology 120 are listed below:

Requirement Processing Module (100A) Feature: Specification author "book boss" assignments. Requirement Processing Module (100A) Benefit: Provides ability to assign personnel with read/write access to specifications and requirements.

Compliance & Legal Module (100B) Feature: Import legal/regularity requirements (i.e., HIPPA). Compliance & Legal Module (100B) Benefit: Single source for legal/regulatory requirement in a true relational database.

Requirement Input Module (100C) Feature (1): Import customer requirements from MS Word/MS Excel/pdf into database. Requirement Input Module (100C) Benefit (1): Seamless import allows users to consolidate requirements into single, true relational database. Requirement Input Module (100C) Feature (2): Incorporates non-textual objects and images into database. Requirement Input Module (100C) Benefit (2): Allows non-textual objects to be associated with requirements objects.

Specifications and Matrices Module (100D) Feature (1): TPM, risk, critical issue tracking and control. Specifications and Matrices Module (100D) Benefit (1): Insightful reporting capability provides visibility to critical issues and unresolved actions, enabling efficient resource allocation. Specifications and Matrices Module (100D) Feature (2): Overall project completion status. Specifications and Matrices Module (100D) Benefit (2): Simple dashboard metrics which provide completion status at all levels of integration up to final end-item delivery. Specifications and Matrices Module (100D) Feature (3): Open action status. Specifications and Matrices Module (100D) Benefit (3): Quick and easy access to program action items and completion status. Specifications and Matrices Module (100D) Feature (4): Program usage statistics. Specifications and Matrices Module (100D) Benefit (4): Real-time metrics which display iris user statistics such as user frequency and duration.

Resource Allocation Module (100E) Feature (1): Hardware/software resource management. Resource Allocation Module (100E) Benefit (1): Allows for quick and easy reservation of hardware/software components needed to perform verification activities in specific facilities/locations. Flags, if there is a scheduling conflict in hardware/software resource allocation. Provides resource time and cost for each event. Resource Allocation Module (100E) Feature (2): Personnel resource management. Resource Allocation Module (100E) Benefit (2): Allows for quick and easy reservation of personnel and subject matter experts needed to perform verification activities in specific facilities/locations. Flags, if there is a scheduling conflict in hardware/software resource allocation. Provides resource time and cost for each event.

Event Verification Module (100F) Feature (1): Allocation of requirements to verification events. Event Verification Module (100F) Benefit (1): Provides real-time visibility to verification strategies, configuration and objectives thereby providing programs the ability to leverage verification activities in support of agile acquisition initiatives. Enables collaboration ensuring early identification of risks. Event Verification Module (100F) Feature (2): Customizable verification event coordination matrix. Event Verification Module (100F) Benefit (2): Customizable event coordination matrix (ECM) generator which allows users to organize and group events by end-item deliverables and engineering disciplines. Provides ability for users to see if they can move requirements to another event and the event in question may also eliminated thereby streamlining verification activities. Event Verification Module (100F) Feature (3): Event resource management. Event Verification Module (100F) Benefit (3): Tightly couples required verification event resources to integrated schedules to better coordinate resources. Event Verification Module (100F) Feature (4): Event configuration control and change history. Event Verification Module (100F) Benefit (4): Ensures verification baseline is under strict configuration control. Maintains a detailed history of all changes against specific verification activities. Event Verification Module (100F) Feature (5): Traceability from requirements to compliance data artifacts. Event Verification Module (100F) Benefit (5): Provides closed-loop automated hyperlinks which provide quick access to requirements compliance data and related artifacts. Event Verification Module (100F) Feature (6): Verification activity linkage to MS project schedules. Event Verification Module (100F) Benefit (6): Tightly couples with verification activities with program milestones to ensure timely end-item delivery. Event Verification Module (100F) Feature (7): Electronic signature (event planning and completion). Event Verification Module (100F) Benefit (7): Electronic signature capability dramatically reduces test activity approval cycle. Event Verification Module (100F) Feature (8): Enterprise integration with external data sources. Event Verification Module (100F) Benefit (8): Allows for correlation of data elements across the enterprise dramatically improving collaboration, increasing work force efficiency and reducing cost.

Graphical User Interface Module (100A1) Feature (1): Simple and intuitive GUI user interface. Graphical User Interface Module (100A1) Benefit (1): Simple, intuitive interface provides powerful capabilities for importing, linking, analyzing, reporting and managing requirements, including traceability to associated project verification events and team assignments. Requires minimal user training. Graphical User Interface Module (100A1) Feature (2): Ready for use upon installation. Graphical User Interface Module (100A1) Benefit (2): No custom scripting required results in lower implementation cost, faster usage. May be tailored to support specific project processes.

Question & Answer Format For Requirement Input Module (100C1) Feature (1) Project setup question and answer. Question & Answer Format For Requirement Input Module (100C1) Benefit (1): Step-by-step question and answer that allows user to quickly and easily set up a new project.

Fuzzy Logic Algorithm Module 100F1 Feature (1): Verification completion decision (fuzzy logic). Fuzzy Logic Algorithm Module 100F1 Benefit (1): Enables program decision makers to assess when verification is good enough. Fuzzy Logic Algorithm Module 100F1 Feature (2): "Requirement goodness" estimation (fuzzy logic). Fuzzy Logic Algorithm Module 100F1 Benefit (2): Evaluates requirement goodness thereby reducing requirement rework and verification resource waste.

FIG. 9A (block diagram) describes another embodiment of the requirement, compliance and resource management methodology 140, further enhanced by a question and answer format of requirement input module 100C1, a fuzzy logic algorithm module 100F1, a statistical algorithm module 100F2 and a weighting logic algorithm module 100F3 and all relevant modules are described below: Requirement Processing Module is denoted by 100A, Compliance & Legal Module is denoted by 100B, Requirement Input Module is denoted by 100C, Specifications and Matrices Module is denoted by 100D, Resource Allocation Module is denoted by 100E, Event Verification Module is denoted by 100F, Graphical User Interface Module is denoted by 100A1, Question & Answer Format For Requirement Input Module is denoted by 100C1, Fuzzy Logic Algorithm Module is denoted by 100F1, Statistical Algorithm Module is denoted by 100F2 and Weighting Logic Algorithm Module is denoted by 100F3.

Figure 9B:
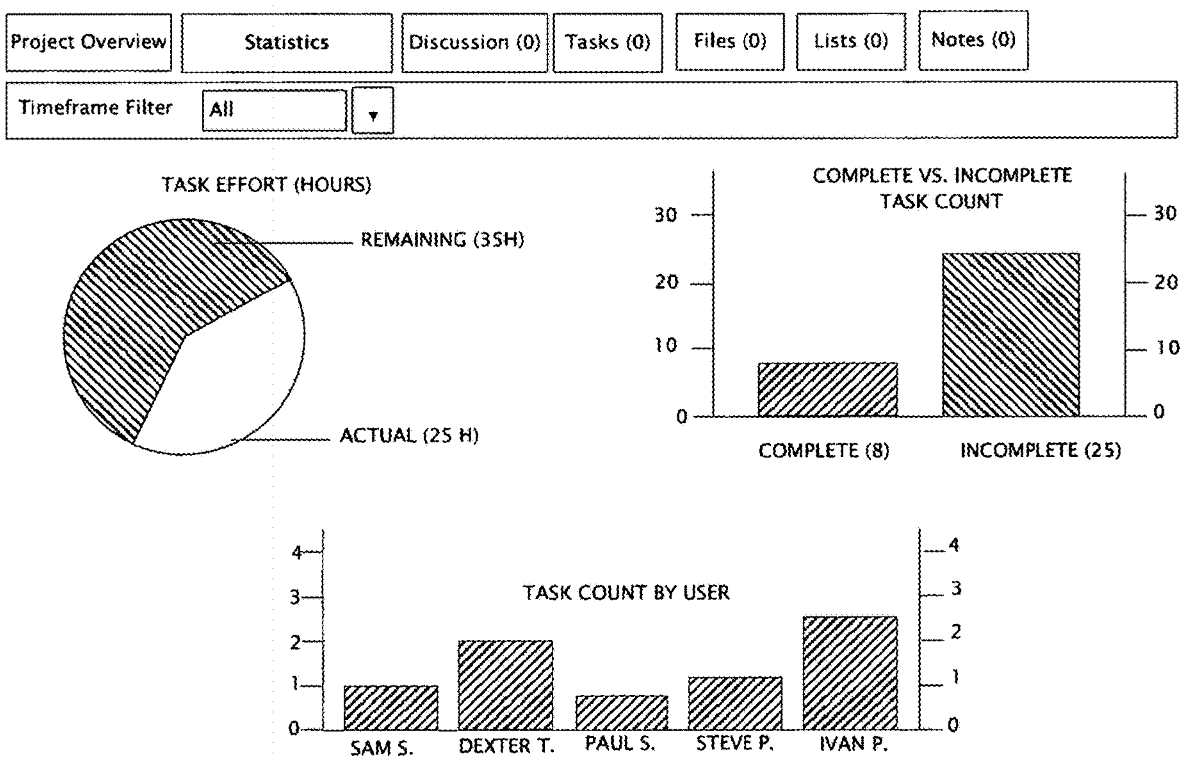
FIG. 9B describes an application of the statistical module of the requirement, compliance and resource management methodology 140, as described in FIG. 9A.

FIG. 9B (schematic chart) describes the implementation result of a statistical algorithm module 100F2.

Statistical Algorithm Module (100F2) Feature (1): Statistics variability. Statistical Algorithm Module (100F2) Benefit (1): Provides statistical estimating capability for empirical results that require statistical modeling to assess performance variability.

Furthermore, the statistical algorithm module (100F2) can be also configured with a Monte Carlo simulation.

A Monte Carlo simulation can help solve problems that are too complicated to solve using equations or problems for which no equations exist. It is useful for problems which have lots of uncertainty in inputs.

In cost management, one can use Monte Carlo simulation to better understand project budget and estimate final budget at completion. Instead of assigning a probability distribution to the project task durations, project manager assigns the distribution to the project costs. These estimates are normally produced by a project cost expert, and the final product is a probability distribution of the final total project cost. Project managers often use this distribution to set aside a project budget reserve, to be used when contingency plans are necessary to respond to risk events. Monte Carlo simulation can also be used when making capital budgeting and investment decisions. Risk analysis is part of every decision made in the requirement, compliance and resource management.

The requirement, compliance and resource management is constantly faced with uncertainty, ambiguity and variability. And even though there may be an unprecedented access to information, one can't accurately model the future.

A Monte Carlo simulation allows seeing all the possible outcomes of decisions and assessing the impact of risk, allowing for better decision making under uncertainty for requirement, compliance and resource management.

A Monte Carlo simulation can be added utilizing add-ins such as @ Risk or Risk+algorithm.

A Monte Carlo simulation encompasses a technique of statistical sampling to approximate a solution to a quantitative problem.

The requirement, compliance and resource management methodology contains many variables. However, each variable has many possible values represented by a probability distribution function p(x).

Probability distribution function p(x) of each variable is a realistic way of describing uncertainty in each variable in a risk analysis.

By contrast, a Monte Carlo simulation can sample probability distribution function for each variable to produce hundreds or thousands of possible outcomes. The results are analyzed to get probabilities of different outcomes occurring.

In contrast to a Monte Carlo simulation, a spreadsheet project cost model utilizes traditional "what if" scenarios, wherein "what if" analysis gives equal weight to all scenarios.

Common probability distribution functions p(x) are: Normal/"Bell Curve"—The user simply defines the mean or expected value and a standard deviation to describe the variation about the mean. Values in the middle near the mean are most likely to occur. Lognormal—Values are positively skewed, not symmetric like a normal distribution. It is used to represent values that don't go below zero but have unlimited positive potential. Uniform—All values have an equal chance of occurring, and the user simply defines the minimum and maximum. Triangular—The user defines the minimum, most likely, and maximum values. Values around the most likely are more likely to occur. Variables that could be described by a triangular distribution include past sales history per unit of time and inventory levels. PERT—The user defines the minimum, most likely, and maximum values, just like the triangular distribution. Values around the most likely are more likely to occur. However, values between the most likely and extremes are more likely to occur than the triangular; that is, the extremes are not as emphasized. Discrete—The user defines specific values that may occur and the likelihood of each.

A Monte Carlo simulation performs a risk analysis by building models of possible results by substituting a range of values-a probability distribution p(x) for any variable/factor that has an inherent uncertainty. It then calculates results over and over, each time using a different set of random values from the probability function p(x). Depending on the number of uncertainties and the ranges specified for them, a Monte Carlo simulation could involve thousands or tens of thousands of recalculations before it is completed. A Monte Carlo simulation produces distributions of possible outcome values.

A Monte Carlo simulation simulates the requirement, compliance and resource management methodology many times (thousands or tens of thousands of recalculations) and each time selecting a value of each variable from its probability distribution function p(x).

The outcome is a probability distribution of overall compliance and resource management methodology 140 through iterations of the model.

A Monte Carlo simulation is a powerful tool to quantify the potential effects of uncertainties of many variables in the requirement, compliance and resource management methodology 140.

But it should be noted a Monte carol simulation is only as good as model it is simulating and data/information/probability distribution function p(x) of a variable is fed into.

Furthermore, open-ended distributions (e.g., lognormal distribution) can be preferable than closed-ended (e.g., triangular distribution) distributions in a Monte carol simulation.

A Monte Carlo simulation can generally answer to the questions e.g., what is the probability of meeting the project budget? or what is the probability of meeting the project time deadline? or what is an optimum value of a project cost?

A Monte Carlo simulation provides a number of advantages over deterministic or "single-point estimate" analysis.

For example: Probabilistic Results. Results show not only what could happen, but how likely each outcome is.

For example: Graphical Results. Because of the data, a Monte Carlo simulation generates, it is easy to create graphs of different outcomes and their chances of occurrence. This is important for communicating findings to all stakeholders.

For example: Sensitivity Analysis. With just a few cases, deterministic analysis makes it difficult to see which variables impact the outcome the most. In a Monte Carlo simulation, it is easy to see which inputs had the biggest effect on bottom-line results.

For example: Scenario Analysis: In deterministic models, it is very difficult to model different combinations of values for different inputs to see the effects of truly different scenarios. Using a Monte Carlo simulation, analysts can see exactly which inputs had which values together when certain outcomes occurred. This is invaluable for pursuing further analysis.

For example: Correlation of Inputs. In a Monte Carlo simulation, it's possible to model interdependent relationships between input variables. It's important for accuracy to represent how, in reality, when some factors go up, others go up or down accordingly.

Figure 9C:
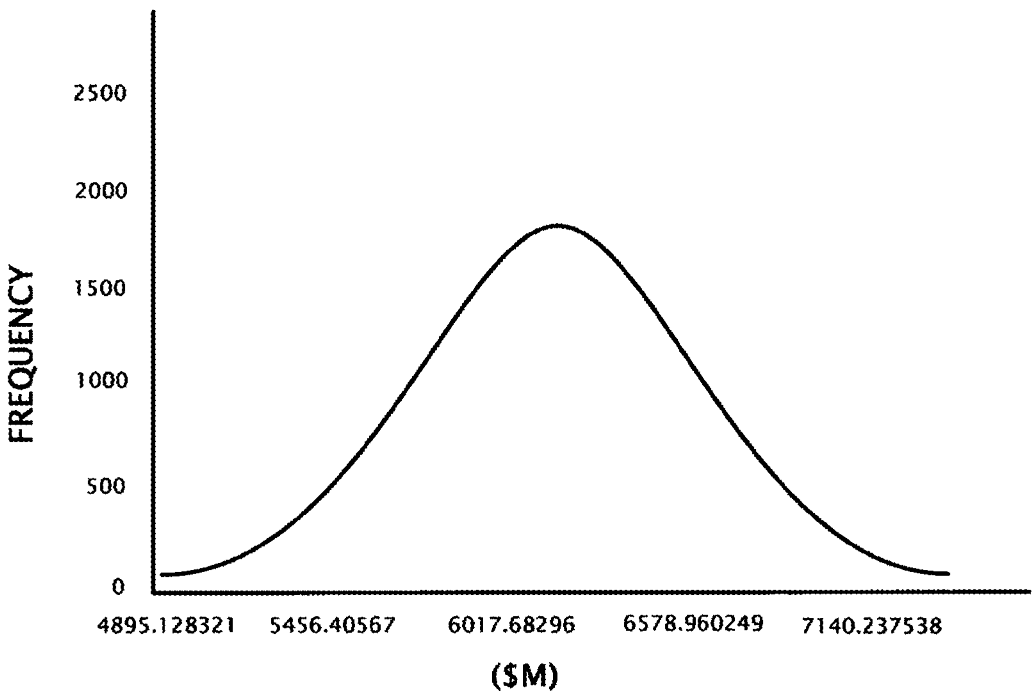
FIGS. 9C (statistical distribution plot), 9D (statistical distribution plot), 9E (statistical distribution plot) and 9F (statistical distribution plot) describe an application of a Monte Carlo simulation of the requirement, compliance and resource management methodology 140, as described in FIG. 9A. For example, FIG. 9C describes an optimum value distribution of a project, as an output of a Monte Carlo simulation.

FIG. 9C (statistical distribution plot) describes an outcome/output distribution of a project cost based on a Monte Carlo simulation.

Figure 9D:
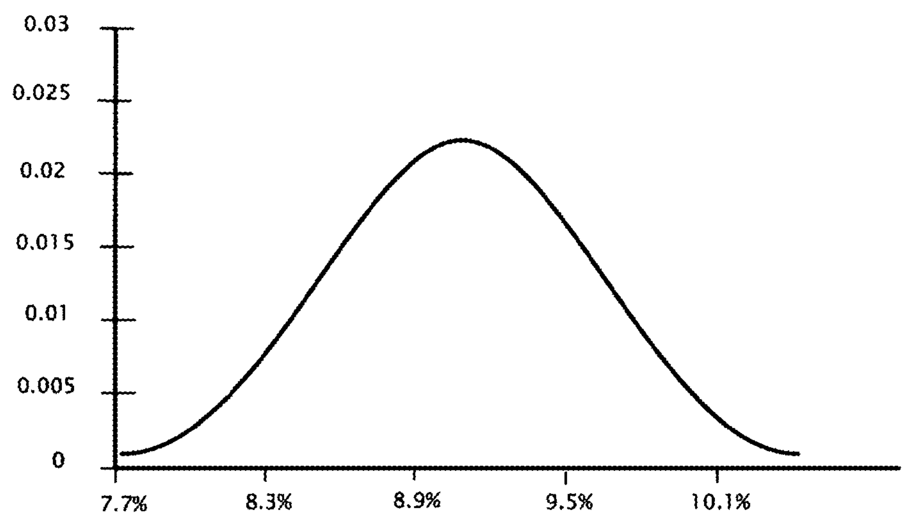
FIG. 9D describes a 5-year growth distribution, as an input to a Monte Carlo simulation.
Figure 9E:
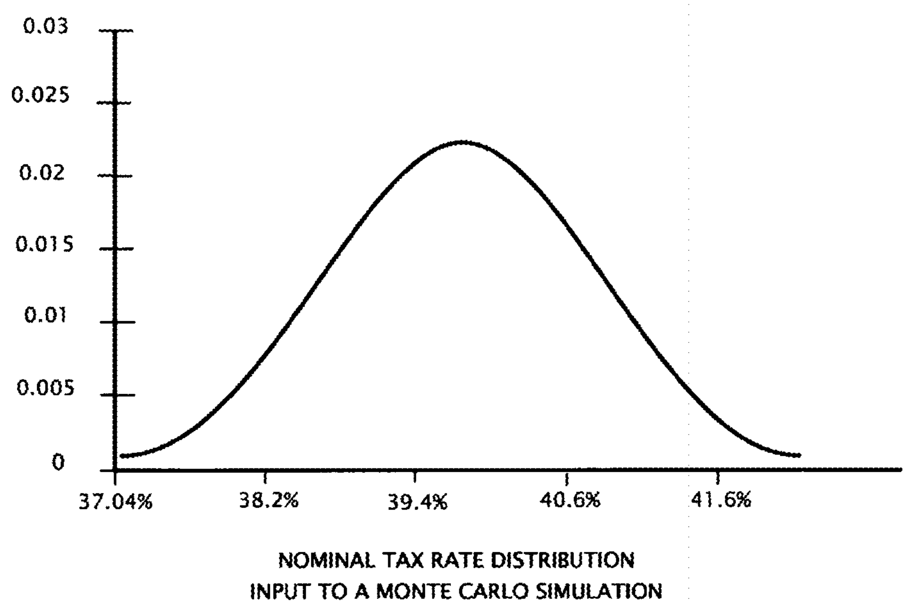
FIG. 9E describes a nominal tax distribution, as an input to a Monte Carlo simulation.
Figure 9F:
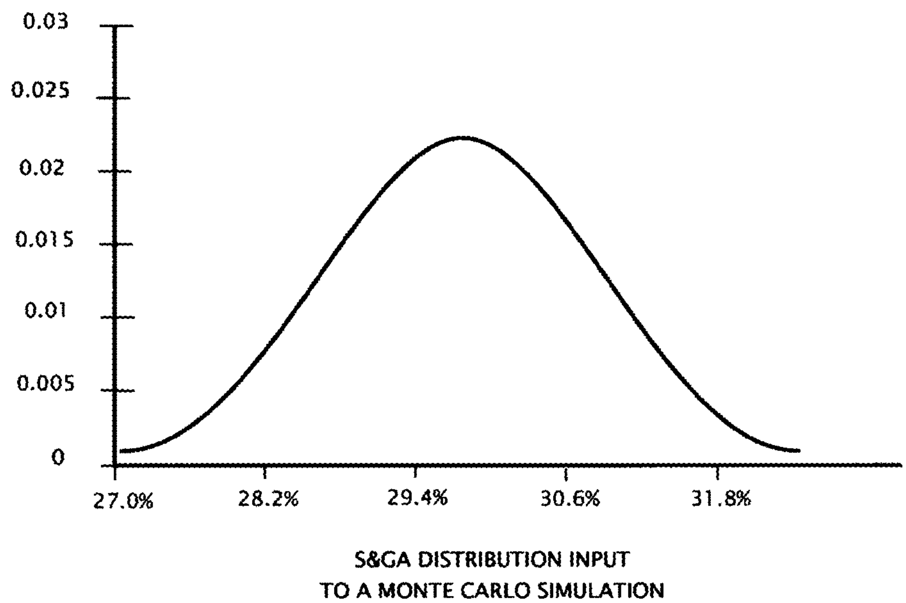
FIG. 9F describes a sales and general/administrative expense (S&GA) distribution, as an input to a Monte Carlo simulation.

FIGS. 9D (statistical distribution plot), 9E (statistical distribution plot) and 9F (statistical distribution plot) are typical inputs of a Monte Carlo simulation.

Figure 9G:
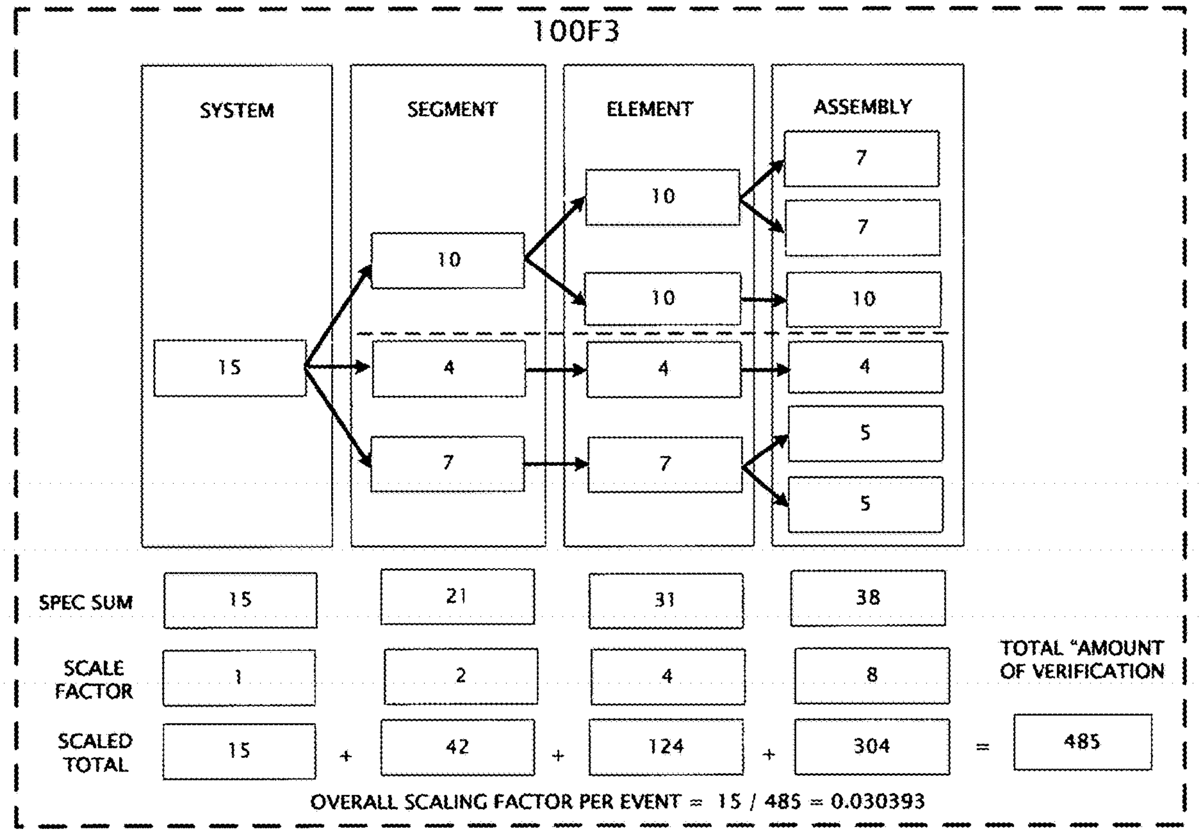
FIGS. 9G, 9H and 9I describe an embodiment of the weighting logic module of the requirement, compliance and resource management methodology 140, as described in FIG. 9A. For example, FIG. 9G describes a scaled total importance for an event (considering system, segment, element and assembly operations).

FIGS. 9G (schematic chart), 9H (schematic chart) and 9I (schematic chart) describes an implementation of the weighting logic algorithm.

Top-level requirements are decomposed into lower level requirements in a tree format as shown in FIG. 9G.

In FIG. 9G the weighting logic algorithm module 100F3 provides a method of increasing confidence in the prediction of TPMs. Parametric values are vertically summed for each level of integration for a given system (i.e., System, Segment, Element and Assembly) and shown in the "Spec Sum" row. An arbitrary numeric scaling factor or weight is applied to each level of assembly, thereby increasing the influence that the summed value has on the overall system for that particular level of integration. Summed values are multiplied by respective scale factors to produce a scaled total which is then added to yield an overall verification amount, 485 in this example. The system level parametric value of 15 is then divided by 485 to yield 0.0309, an effective system-level scaling factor which can be applied to each measured value of the overall system.

Figure 9H:
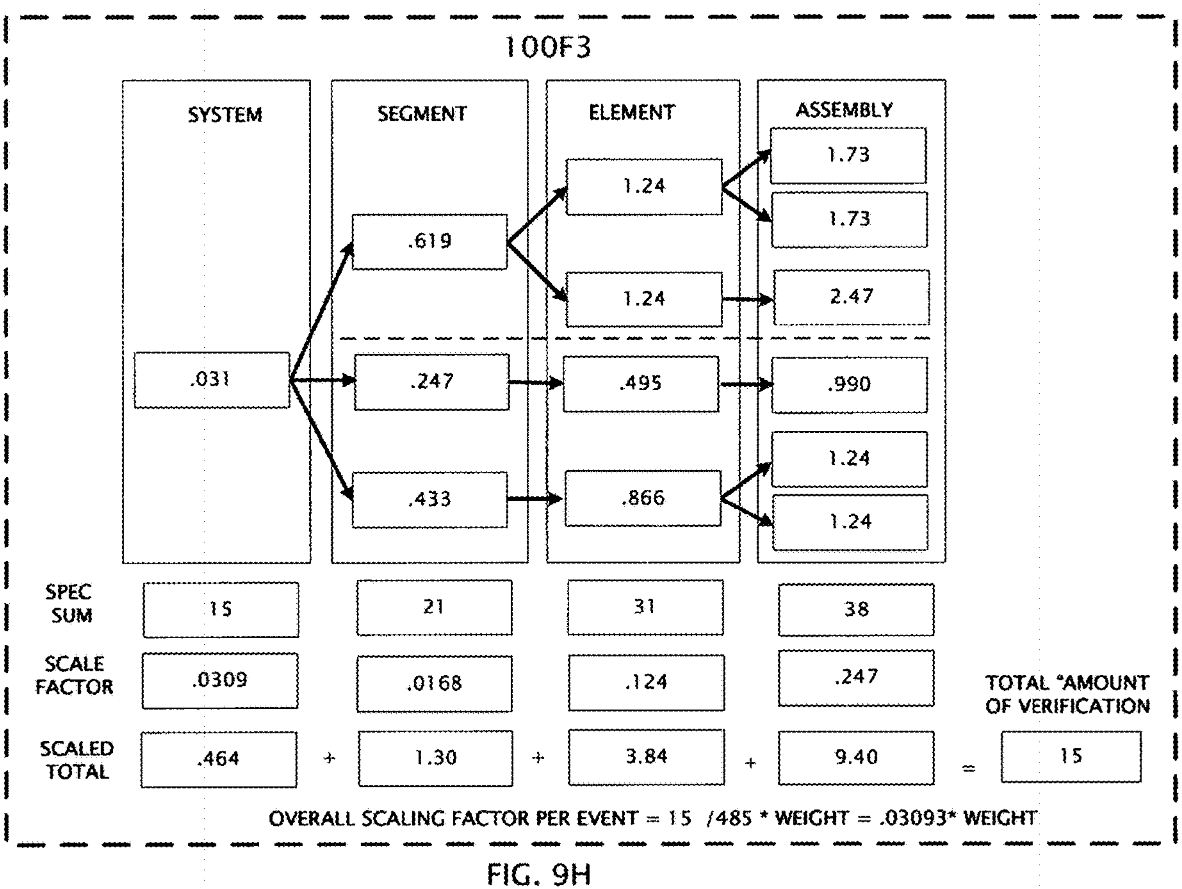

In FIG. 9H the system level scaling factor (0.0309) is multiplied by each measured value in the "tree", then multiplied by the Spec Scale factor from FIG. 9C. To obtain the "Scaled Total" values, the system level scaling factor (0.0309) is multiplies by the "Spec Sum" which is then multiplied by the scale factor for each level of integration. For example, the "Scaled Total" value for the "Segment" level of integration would be: system level scaling factor (0.0309)*Spec Scale Factor (2)*"Spec Sum" (21)=1.30.

Figure 9I:
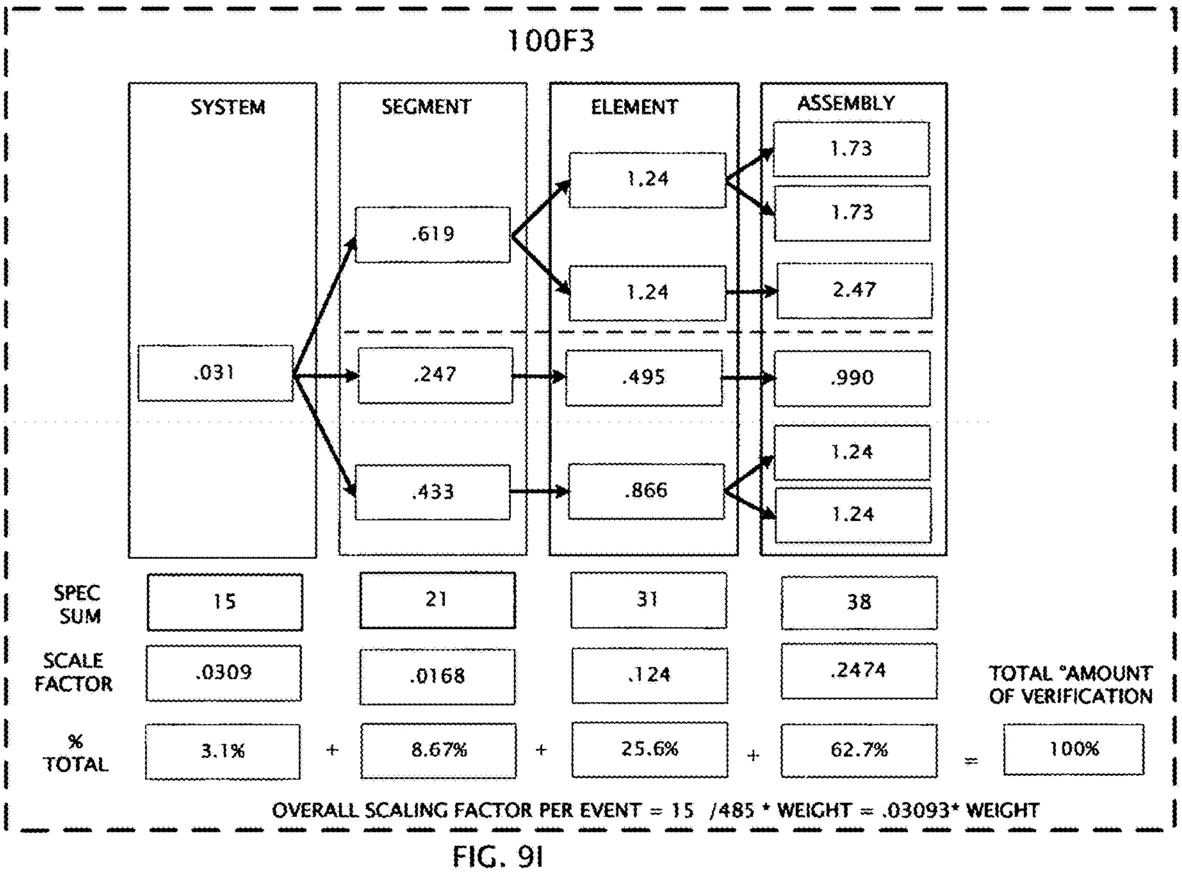

In FIG. 9I to obtain the percent total that each level of integration's verification data contributes to the overall system-level TPM, the "Scaled Total" values from FIG. 9D is divided by the System-level requirement value (15). For example, the assembly level contribution would be 9.40/15 or 62.7%.

The requirement, compliance and resource management methodology can provide a method of predicting system performance parameters throughout the program development life cycle. As top-level system requirements or technical performance measurements (TPMs) are assessed, a statistical weighting algorithm gives users the ability to weight or influence the empirical data of some elements more than others in the same set.

As measurements are collected to verify lower level requirements, the requirement, compliance and resource management methodology can provide users with the ability to assign an arbitrary weighting coefficient to these measurements to increase their influence on the top-level performance prediction at a given point in time.

Lower level measurement weighting coefficients are typically greater than higher level coefficients, since there are a fewer system elements (variables) associated with the lower level measurement, thereby increasing measurement confidence.

FIGS. 10A, 10B, 10C, 10D, 10E and 10F describe the features/benefits of the requirement, compliance and resource management methodology 140, as described in FIG. 9A.

The key features and benefits of the requirement, compliance and resource management methodology 140 are listed below:

Requirement Processing Module (100A) Feature: Specification author "book boss" assignments. Requirement Processing Module (100A) Benefit: Provides ability to assign personnel with read/write access to specifications and requirements.

Compliance & Legal Module (100B) Feature: Import legal/regularity requirements (i.e., HIPPA). Compliance & Legal Module (100B) Benefit: Single source for legal/regulatory requirement in a true relational database.

Requirement Input Module (100C) Feature (1): Import customer requirements from MS Word/MS Excel/pdf into database. Requirement Input Module (100C) Benefit (1): Seamless import allows users to consolidate requirements into single, true relational database. Requirement Input Module (100C) Feature (2): Incorporates non-textual objects and images into database. Requirement Input Module (100C) Benefit (2): Allows non-textual objects to be associated with requirements objects.

Specifications and Matrices Module (100D) Feature (1): TPM, risk, critical issue tracking and control. Specifications and Matrices Module (100D) Benefit (1): Insightful reporting capability provides visibility to critical issues and unresolved actions, enabling efficient resource allocation. Specifications and Matrices Module (100D) Feature (2): Overall project completion status. Specifications and Matrices Module (100D) Benefit (2): Simple dashboard metrics which provide completion status at all levels of integration up to final end-item delivery. Specifications and Matrices Module (100D) Feature (3): Open action status. Specifications and Matrices Module (100D) Benefit (3): Quick and easy access to program action items and completion status. Specifications and Matrices Module (100D) Feature (4): Program usage statistics. Specifications and Matrices Module (100D) Benefit (4): Real-time metrics which display iris user statistics such as user frequency and duration.

Resource Allocation Module (100E) Feature (1): Hardware/software resource management. Resource Allocation Module (100E) Benefit (1): Allows for quick and easy reservation of hardware/software components needed to perform verification activities in specific facilities/locations. Flags, if there is a scheduling conflict in hardware/software resource allocation. Provides resource time and cost for each event. Resource Allocation Module (100E) Feature (2): Personnel resource management. Resource Allocation Module (100E) Benefit (2): Allows for quick and easy reservation of personnel and subject matter experts needed to perform verification activities in specific facilities/locations. Flags, if there is a scheduling conflict in hardware/software resource allocation. Provides resource time and cost for each event.

Event Verification Module (100F) Feature (1): Allocation of requirements to verification events. Event Verification Module (100F) Benefit (1): Provides real-time visibility to verification strategies, configuration and objectives thereby providing programs the ability to leverage verification activities in support of agile acquisition initiatives. Enables collaboration ensuring early identification of risks. Event Verification Module (100F) Feature (2): Customizable verification event coordination matrix. Event Verification Module (100F) Benefit (2): Customizable event coordination matrix (ECM) generator which allows users to organize and group events by end-item deliverables and engineering disciplines. Provides ability for users to see if they can move requirements to another event and the event in question may also eliminated thereby streamlining verification activities. Event Verification Module (100F) Feature (3): Event resource management. Event Verification Module (100F) Benefit (3): Tightly couples required verification event resources to integrated schedules to better coordinate resources. Event Verification Module (100F) Feature (4): Event configuration control and change history. Event Verification Module (100F) Benefit (4): Ensures verification baseline is under strict configuration control. Maintains a detailed history of all changes against specific verification activities. Event Verification Module (100F) Feature (5): Traceability from requirements to compliance data artifacts. Event Verification Module (100F) Benefit (5): Provides closed-loop automated hyperlinks which provide quick access to requirements compliance data and related artifacts. Event Verification Module (100F) Feature (6): Verification activity linkage to MS project schedules. Event Verification Module (100F) Benefit (6): Tightly couples with verification activities with program milestones to ensure timely end-item delivery. Event Verification Module (100F) Feature (7): Electronic signature (event planning and completion). Event Verification Module (100F) Benefit (7): Electronic signature capability dramatically reduces test activity approval cycle. Event Verification Module (100F) Feature (8): Enterprise integration with external data sources. Event Verification Module (100F) Benefit (8): Allows for correlation of data elements across the enterprise dramatically improving collaboration, increasing work force efficiency and reducing cost.

Graphical User Interface Module (100A1) Feature (1): Simple and intuitive GUI user interface. Graphical User Interface Module (100A1) Benefit (1): Simple, intuitive interface provides powerful capabilities for importing, linking, analyzing, reporting and managing requirements, including traceability to associated project verification events and team assignments. Requires minimal user training. Graphical User Interface Module (100A1) Feature (2): Ready for use upon installation. Graphical User Interface Module (100A1) Benefit (2): No custom scripting required results in lower implementation cost, faster usage. May be tailored to support specific project processes.

Question & Answer Format For Requirement Input Module (100C1) Feature (1) Project setup question and answer. Question & Answer Format For Requirement Input Module (100C1) Benefit (1): Step-by-step question and answer that allows user to quickly and easily set up a new project.

Fuzzy Logic Algorithm Module 100F1 Feature (1): Verification completion decision (fuzzy logic). Fuzzy Logic Algorithm Module 100F1 Benefit (1): Enables program decision makers to assess when verification is good enough. Fuzzy Logic Algorithm Module 100F1 Feature (2): "Requirement goodness" estimation (fuzzy logic). Fuzzy Logic Algorithm Module 100F1 Benefit (2): Evaluates requirement goodness thereby reducing requirement rework and verification resource waste.

Weighting Logic Algorithm Module (100F3) Feature (1): TPM calculator (weighting logic). Weighting Logic Algorithm Module (100F3) Benefit (1): Allows program to calculate value of TPM throughout integration process.

Figure 11A:
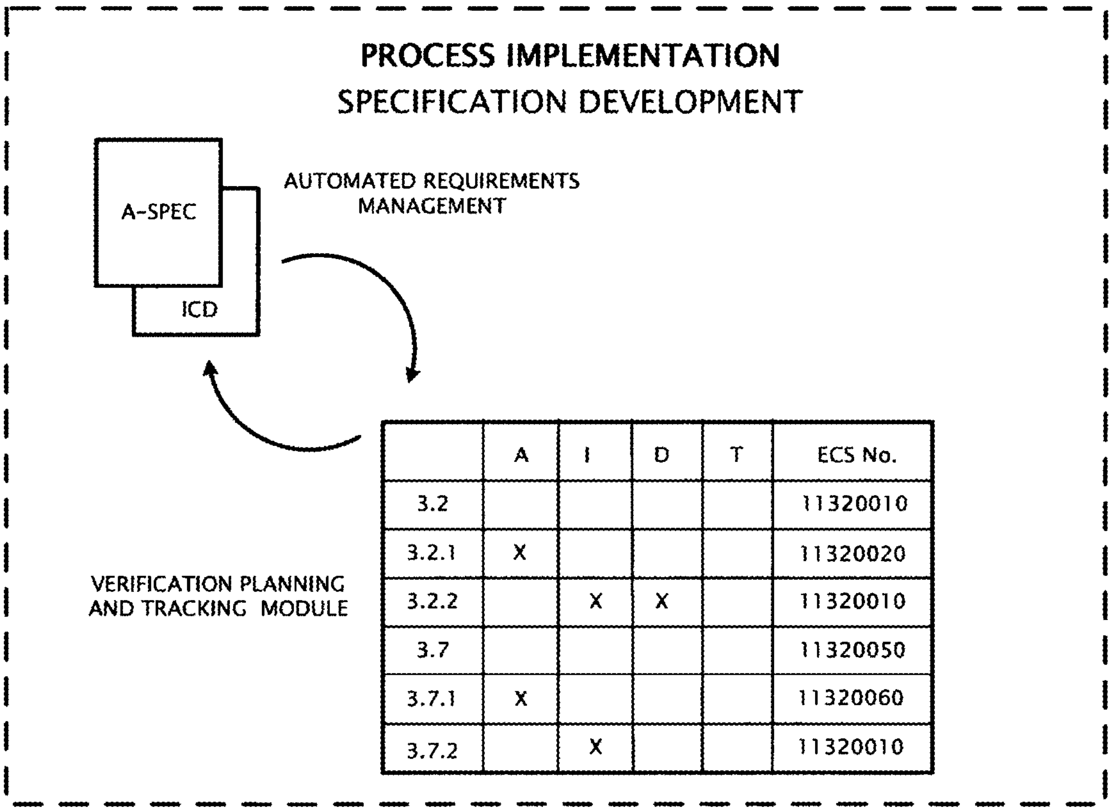
FIGS. 11A (schematic chart), 11B (schematic chart), 11C (schematic chart), 11D (schematic chart), 11E (schematic chart), 11F (schematic chart) and 11G (schematic chart) describe details of a typical process implementation.

FIGS. 11A (schematic chart) and 11B (schematic chart), describe specification development of a process implementation.

Figure 11C:
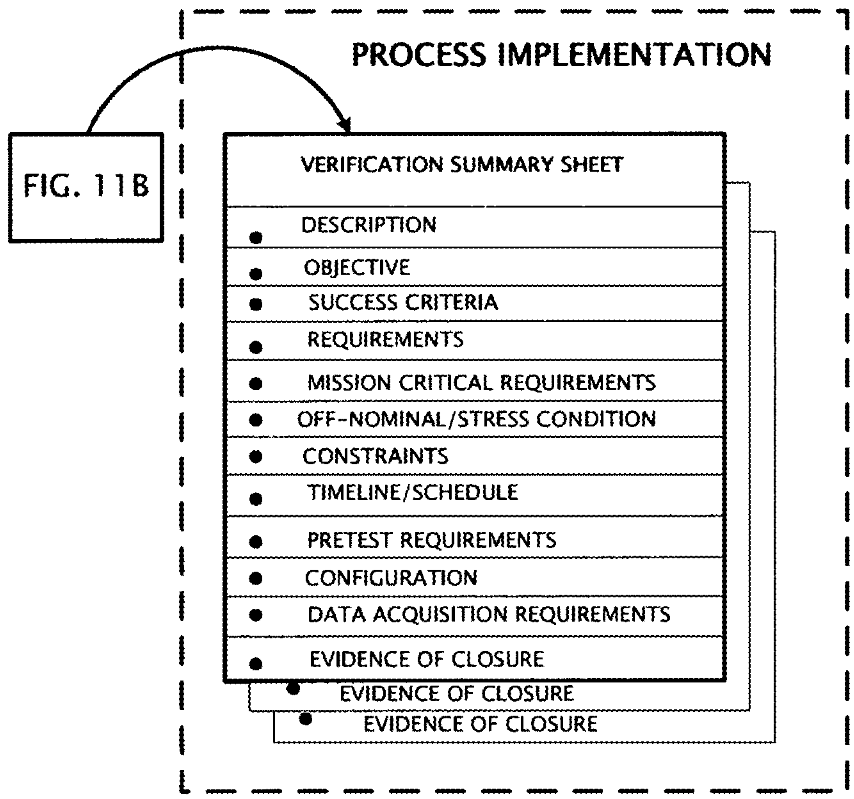
FIG. 11C describes a granular view of a typical process implementation, connecting with FIG. 11B.

FIG. 11C (schematic chart) describes a typical verification summary sheet of a process implementation.

Figure 11D:
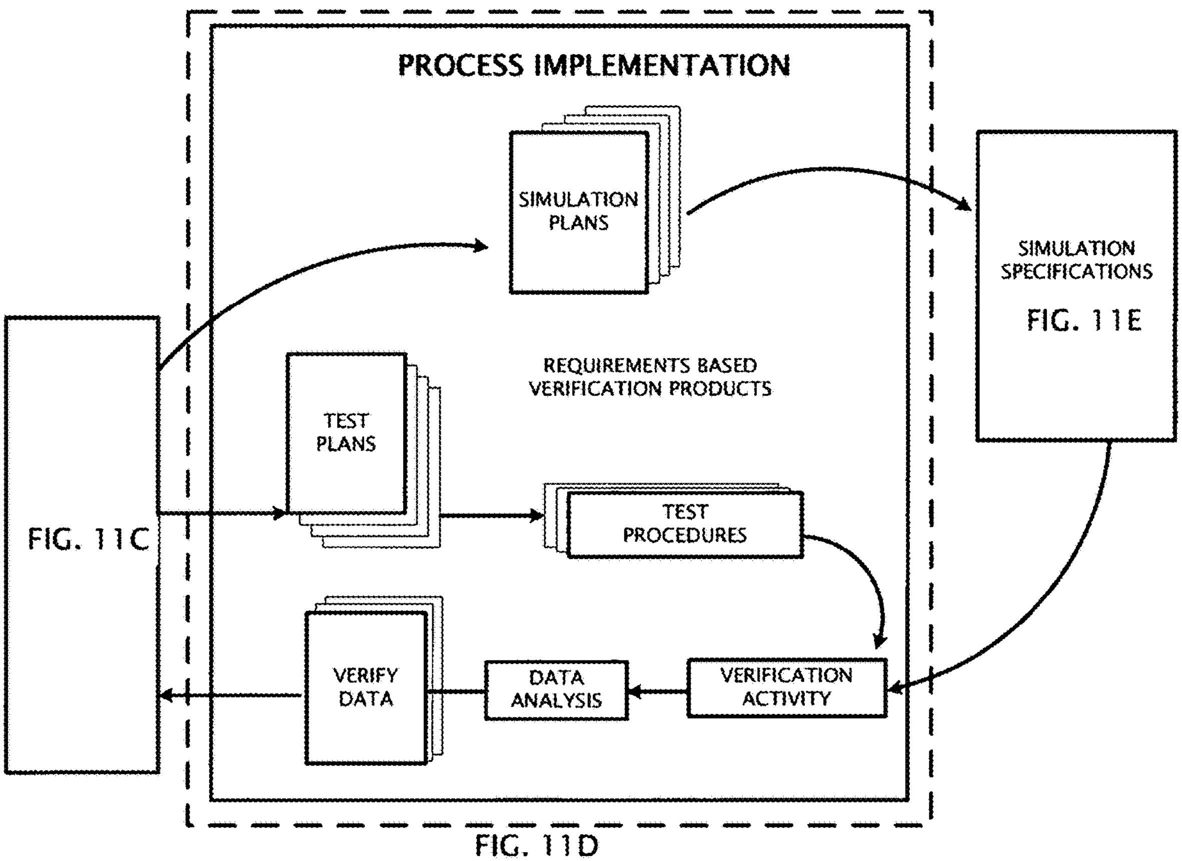
FIG. 11D describes a granular view of a typical process implementation, connecting with FIGS. 11C and 11E (wherein FIG. 11E consists of FIG. 11E1 and FIG. 11E2).

FIG. 11D (schematic chart) describes interaction between summary sheet of a process implementation (as described in FIG. 11C), simulation plans, test plans, test procedures, data verification and data analysis (as described in FIG. 11D) and simulation specifications (as described in FIG. 11E).

FIG. 11E (schematic chart) describes a typical simulation specification of a process implementation.

Figure 11F:
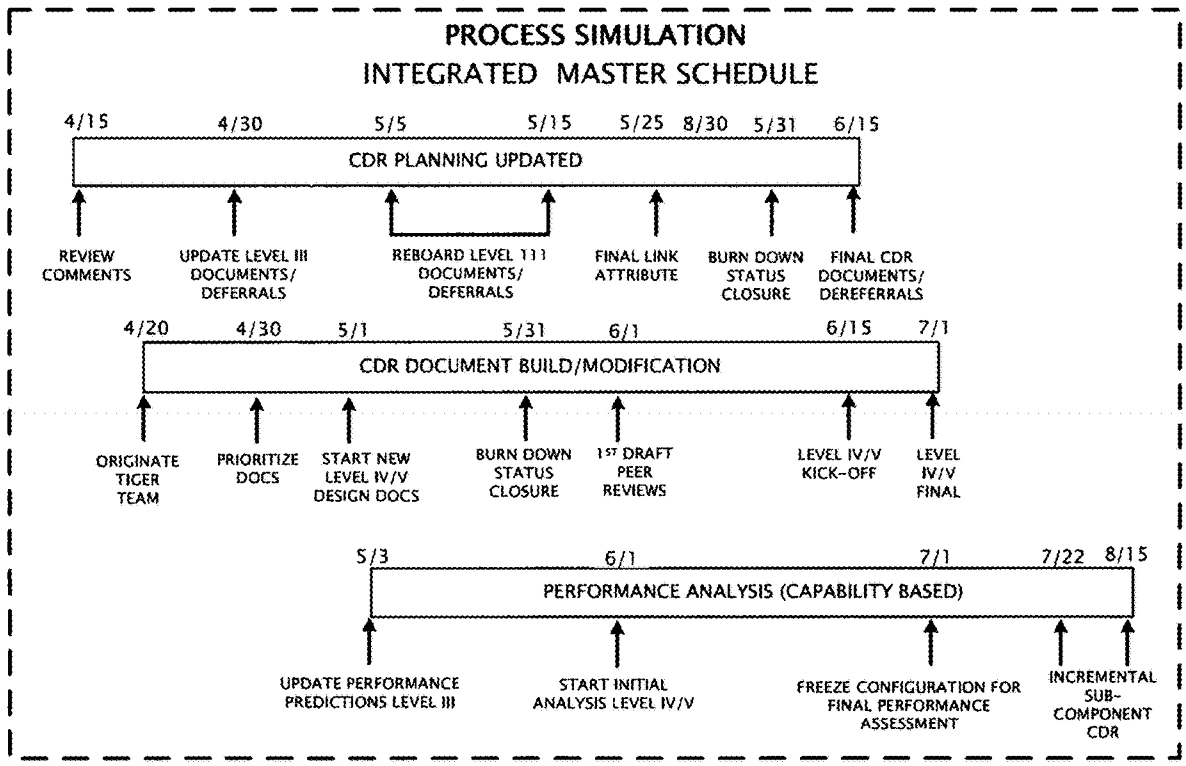
FIG. 11F describes an example integrated master schedule.

FIG. 11F (schematic chart) describes a typical integrated master schedule of a process implementation.

Figure 11G:
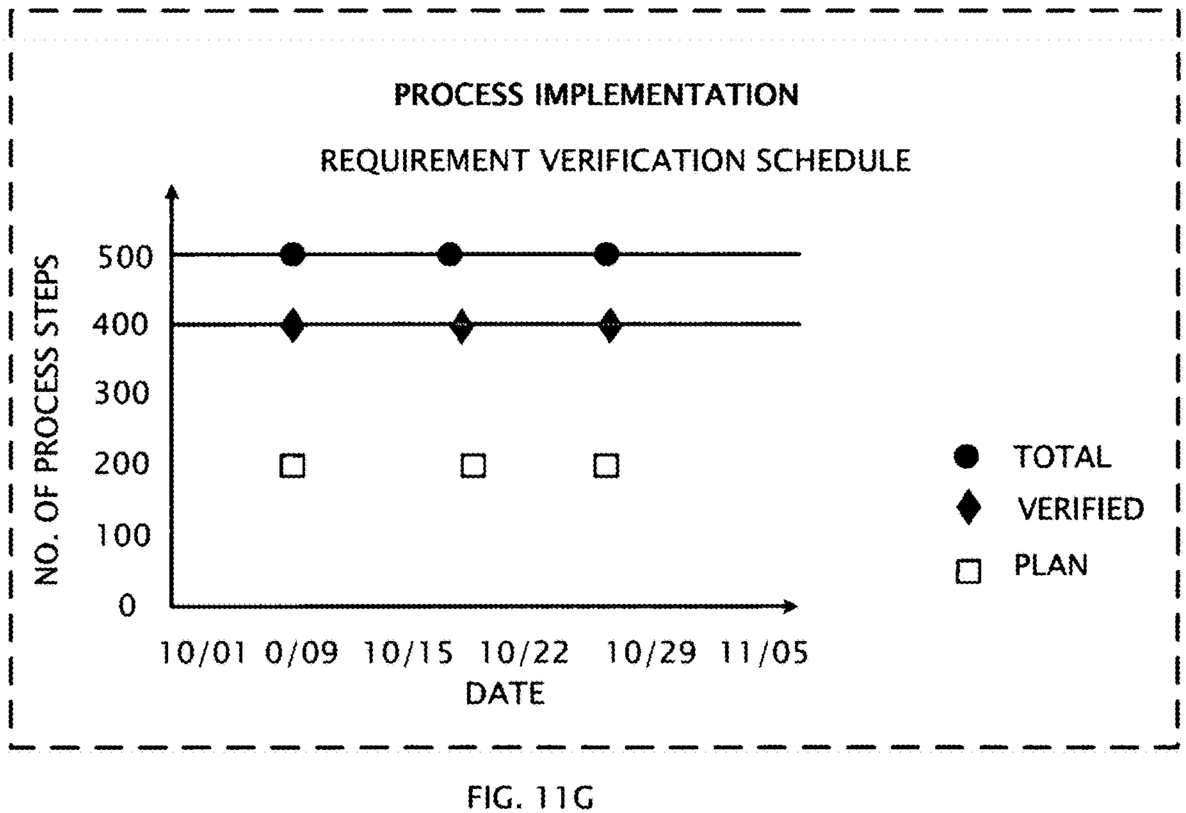
FIG. 11G describes how a section of the integrated master schedule (e.g., a requirement verification schedule) compares with total process steps, verified process steps and planned process steps.

FIG. 11G (schematic chart) describes a requirement verification schedule of a process implementation.

In FIGS. 11A-11B the development of the Event Coordination Sheets (ECS) starts with the baseline specifications. In section 4.0 of system specifications, verification methods are assigned to each requirement in accordance with applicable standards. Requirements are then mapped into verification events based on the event objectives. One approach to defining verification events and determining which requirements should be mapped into specific verification events is to develop a spreadsheet similar to that shown in FIGS. 11A and 11B. TPMs and Mission Critical requirements are then identified. A balanced VSS approach will carefully allocate requirements into appropriate venues such that redundant verification, or "double-booking", is minimized.

In FIGS. 11C-11E once requirements have been allocated into verification venues, the ECS can now be created using the instructions below:

Description: A concise statement delineating the verification to be performed. If the verification has more than one sequence, break the sequence out here. Describe relationships among verification methods (e.g., where test output will be used to perform an analysis). If verification activities have been completed, type "Refer to referenced report(s)." If N/A, provide a brief explanation.

Objectives: Provide a concise overview of verification activity objectives. If the verification activity is conducted in several sequences, objectives may be written for each sequence, provided they address the requirements Success Criteria: Provide a brief description of verification activity pass/fail criteria. This must include the specific data and the results of any analyses that may be required to interpret the data and conclude whether or not the requirement has been successfully verified.

Requirements: (Include requirement paragraph and/or requirement ID.): Provide a comprehensive list of all the requirements that have been allocated to a given verification activity.

Timeline/Schedule: Define the expected duration of the verification activity relative to program milestones. Includes the expected duration of the entire verification activity including verification activity preparation, execution, data acquisition and data post processing and data analysis.

Constraints: Identify limitations on the extent of the verification activity conducted. Identify any special conditions on the test setup, test article, environmental conditions etc.

Pre-Test Requirements: Identify any special test equipment or resources. Reference report number and title only. (Applies only if verification procedure has been completed and report written.) If not applicable ("N/A"), to provide a brief explanation.

Configuration: Identify the hardware or software configuration for use during this verification procedure(s).

Data Acquisition Requirements: List verification procedure data requirements and products. Reference report number and title only. (Applies only if verification procedure has been completed and report written.).

Evidence of Closure: Identify the document title and number of the referenced report that contains the data which verifies that this (these) requirement(s) have been met. Attach referenced material to verification event form.

Each event will be coordinated using the requirement, compliance and resource management methodology (100/120/140)' dynamic schedule linking capability, which synchronizes events with the Integrated Master Schedule as shown in FIGS. 11F and 11G.

Figure 12A:
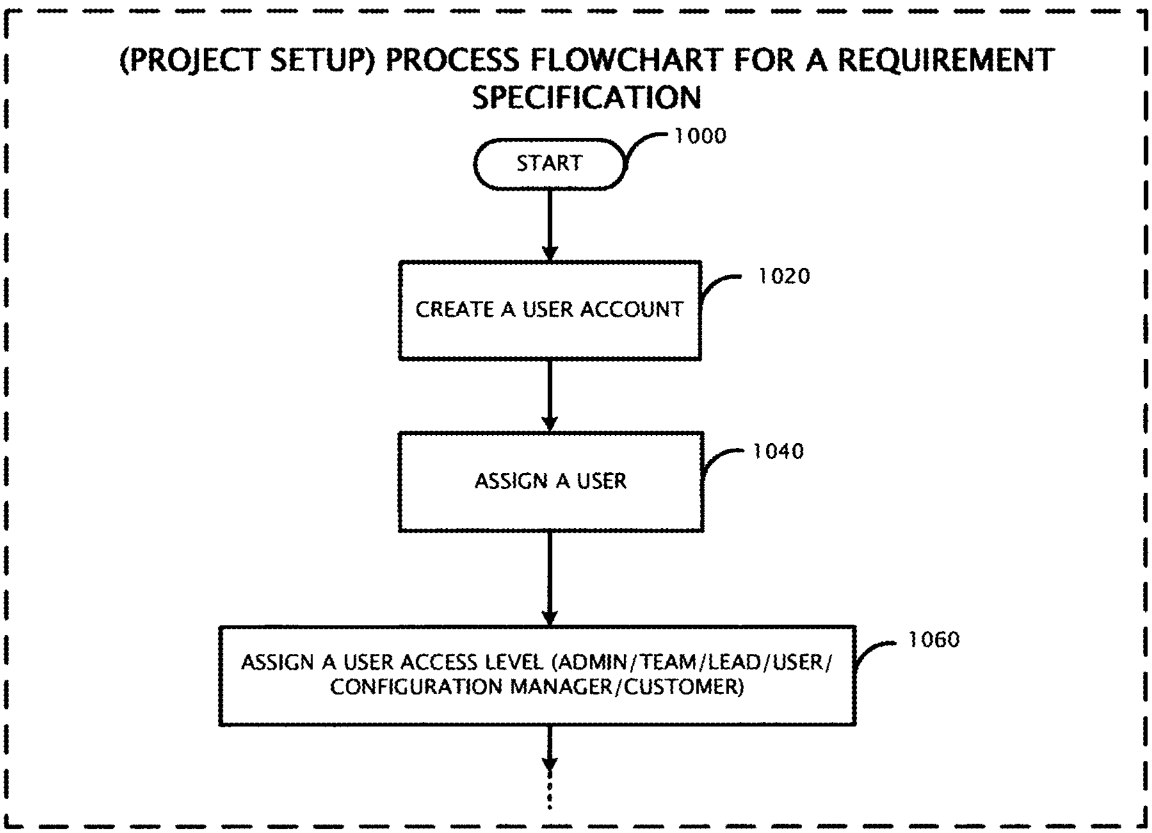
FIGS. 12A and 12B describe a process flowchart for a requirement specification within a project setup.
Figure 12B:
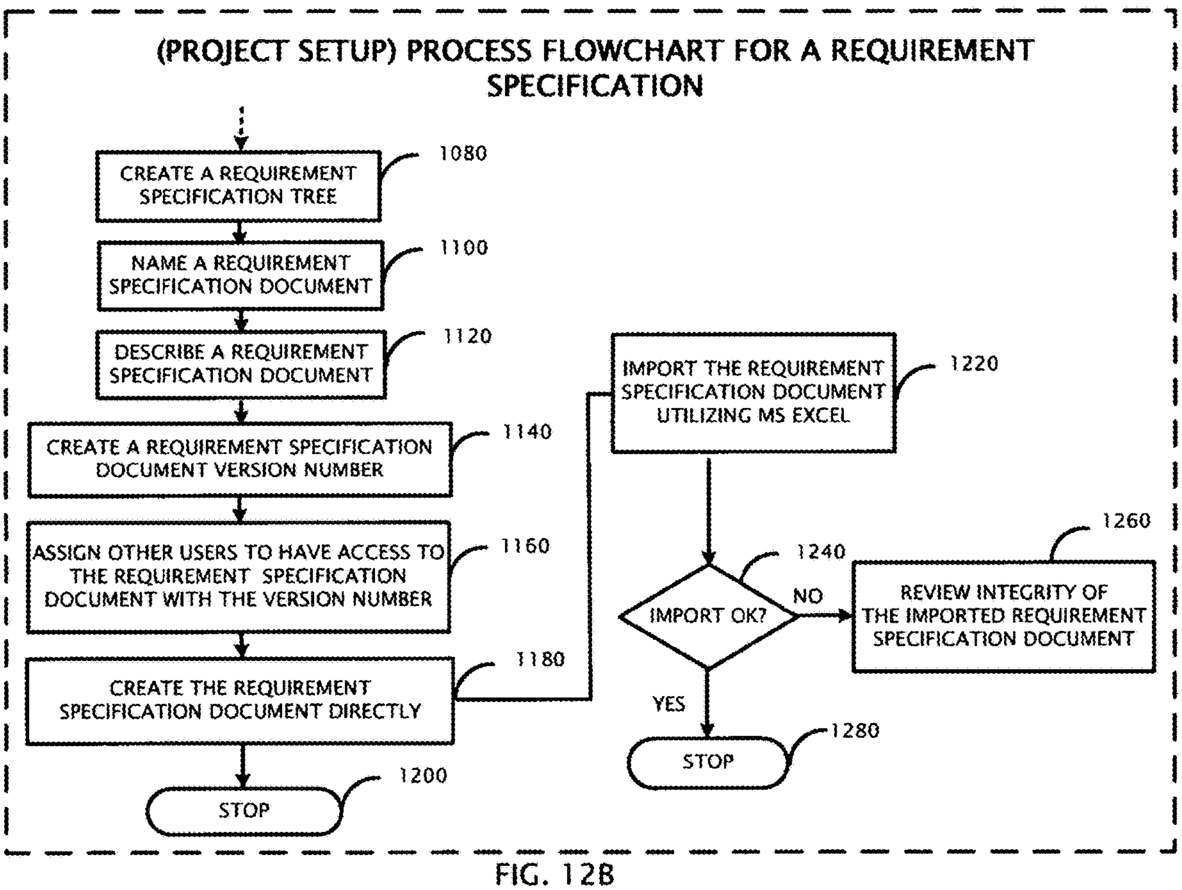

FIGS. 12A and 12B describe a process flowchart for requirement specification within a project setup.

In step 1020, one can create a user account, in step 1040, one can assign an access to a user and in step 1060, one can assign a level of access to the user.

In step 1080, the user can create a requirement specification tree, in step 1100, the user can name a requirement specification document, in step 1120, the user can describe the requirement specification document, in step 1140, the user can create the requirement specification document version number, in step 1160, the user can assign an access to other users, regarding the requirement specification document with a specific version, in step 1180, the user can create the requirement specification document directly, or otherwise in step 1220, the user can import the requirement specification document utilizing MS Excel program. In step 1240, if the imported requirement specification document is OK, then the user can stop in step 1280; otherwise the user can review the integrity of the imported requirement specification document in step 1260.

Figure 13:
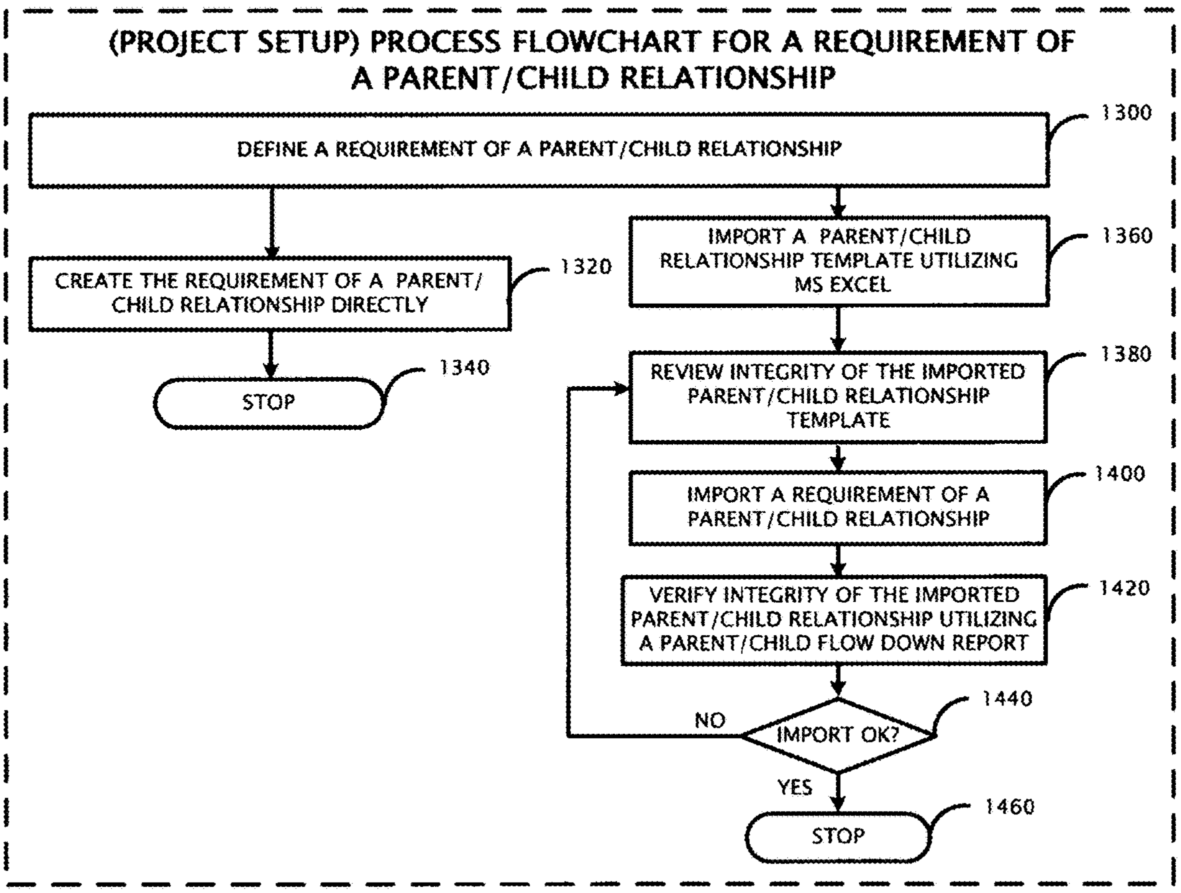
FIG. 13 describes a process flowchart for a requirement of a parent/child (also known as master/slave) relationship within a project setup.

FIG. 13 describes a process flowchart for a requirement of parent/child (also known as master/slave) relationship within a project setup.

In step 1300, the user can define a requirement of importing parent/child relationship. In step 1320, the user can create the requirement of parent/child relationship directly and if this direct creation of the requirement of parent/child relationship is successful, then the user can stop in step 1340; otherwise, in step 1360, the user can import the parent/child relationship template by utilizing MS Excel program, in step 1380, the user can review the integrity of the imported parent/child relationship template. In step 1400, the user can import a requirement of parent/child relationship, in step 1420, the user can verify the integrity of the imported requirement of parent/child relationship utilizing a parent/child flow down report. In step 1440, if the imported requirement of parent/child relationship is OK, then the user can stop in step 1460; otherwise the user can reiterate to step 1380.

Figure 14:
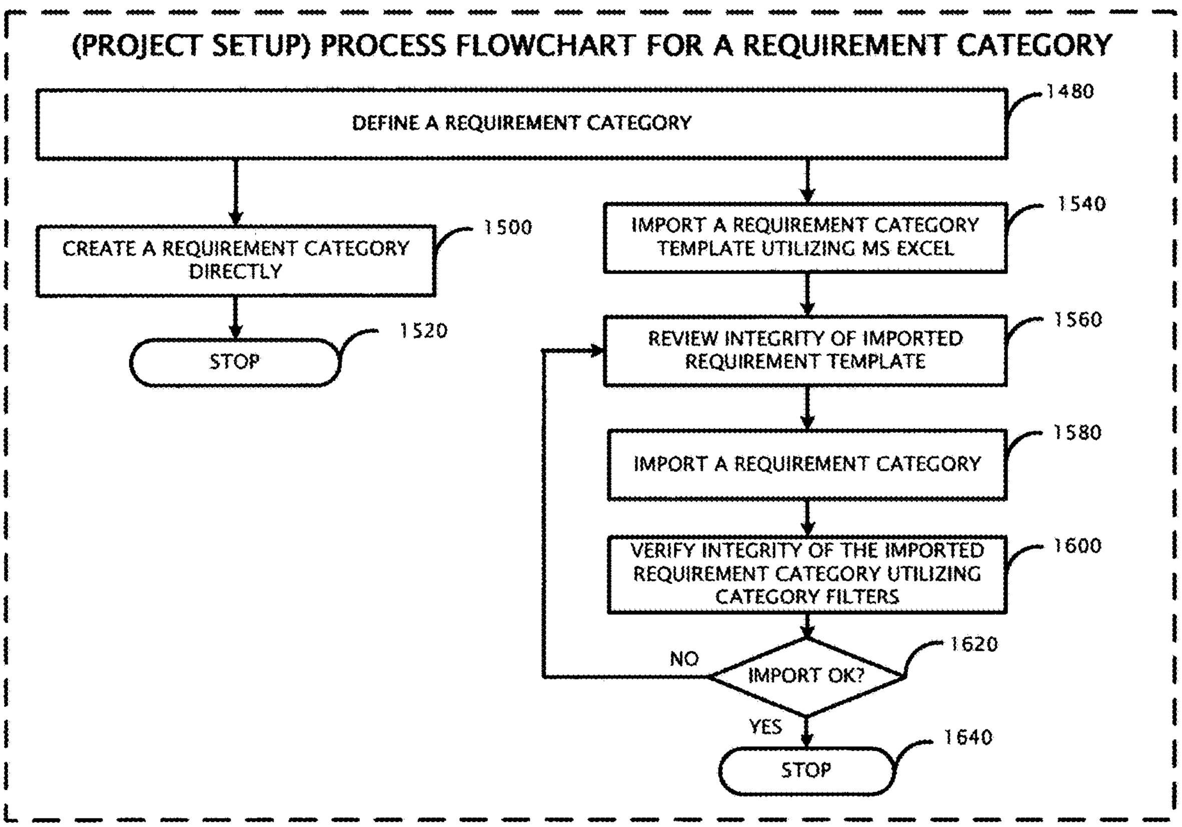
FIG. 14 describes a process flowchart for a requirement category within a project setup.

FIG. 14 describes a process flowchart for a requirement category within a project setup.

In step 1480, the user can define a requirement category. In step 1500, the user can create a requirement category directly. If the direct creation of the requirement category is successful, then the user can stop in step 1520; otherwise in step 1540, the user can import a requirement category template utilizing MS Excel program. In step 1560, the user can review the integrity of the imported requirement category template, in step 1580, the user can import a requirement category and in step 1600, the user can verify the integrity of the imported requirement category utilizing category filters. In step 1620, if the imported requirement category is OK, then the user can stop in step 1640; otherwise the user can reiterate to step 1560.

Figure 15:
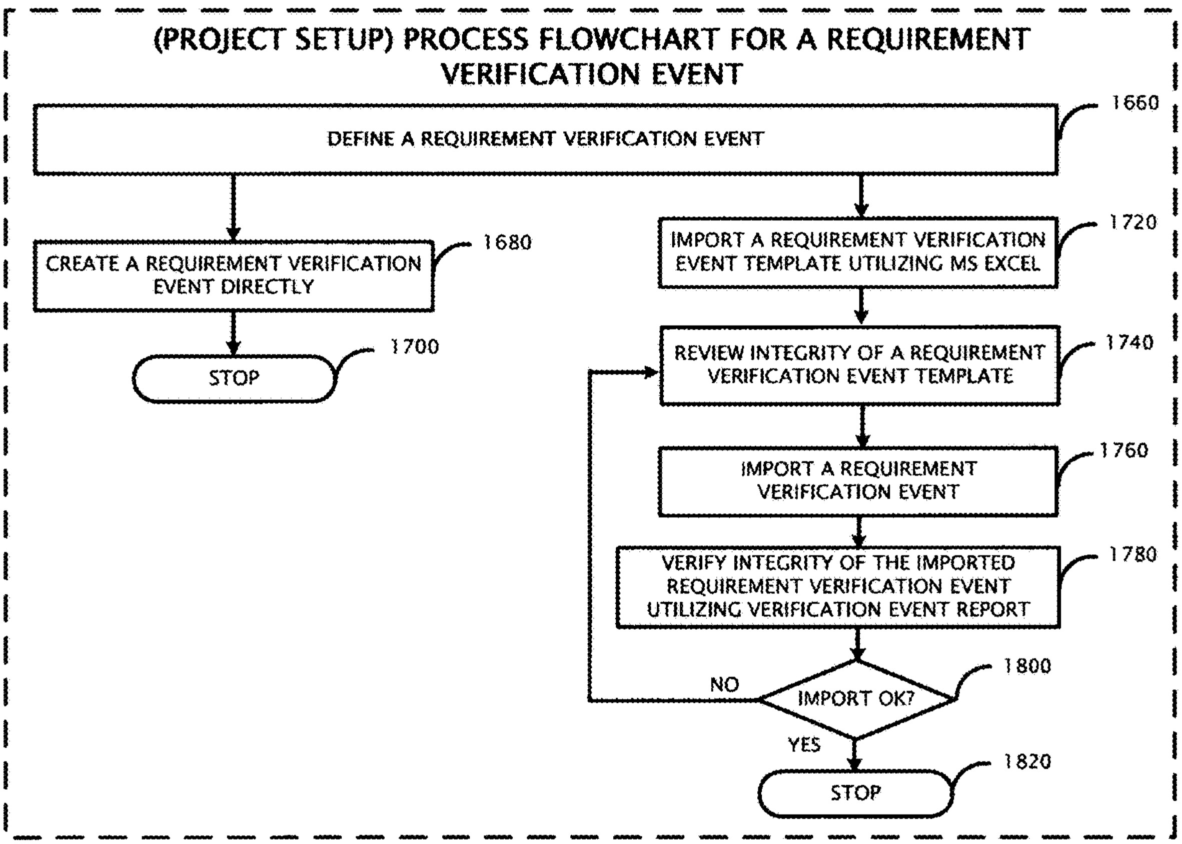
FIG. 15 describes a process flowchart for a requirement verification event within a project setup.

FIG. 15 describes process flowchart for a requirement verification event within a project setup. A verification event is a generic activity used to verify requirements by inspection, demonstration, analysis and test.

In step 1660, the user can define a requirement verification event within a project setup. In step 1680, the user can create a requirement verification event directly. If the direct creation of requirement verification event is successful, then the user can stop in step 1700; otherwise in step 1720, the user can import a requirement verification event template utilizing MS Excel program. In step 1740, the user can review the integrity of the imported requirement verification event template, in step 1760, the user can import a requirement verification event, in step 1780, the user can verify the integrity of the imported requirement verification event, utilizing a verification event report, in step 1800, if the imported requirement verification event is OK, then the user can stop in step 1820; otherwise the user can reiterate to step 1740.

Figure 16:
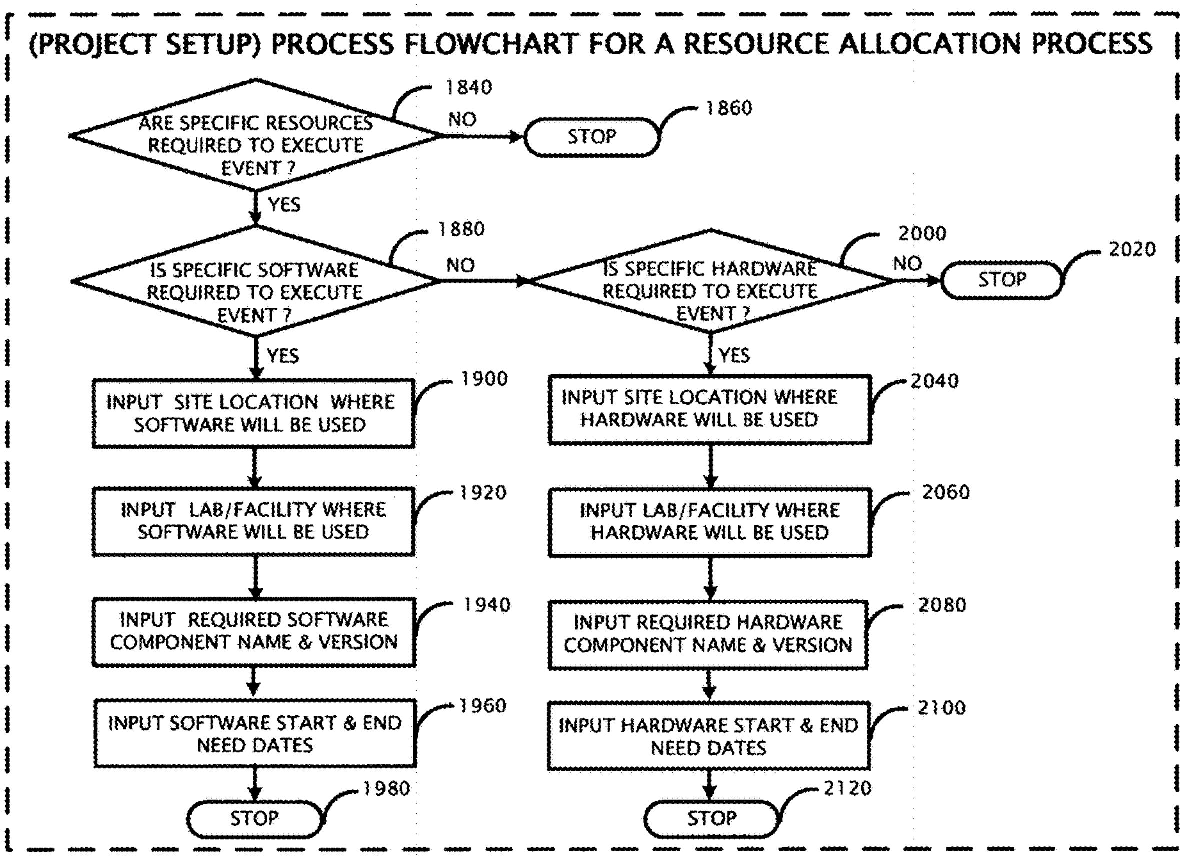
FIG. 16 describes a process flowchart for a resource allocation process within a project setup.

FIG. 16 describes process flowchart for a resource allocation process within a project setup.

In step 1840, the user can ask a question if there are required resources to execute the event, if the answer is no, then the user can stop in step 1860. However, if the answer to the above question is yes, then the user can proceed to step 1880.

In step 1880, the user can ask a question if there are required software to execute the event, if the answer is no, then the user can proceed to step 2000. However, if the answer to the above question is yes, then the user can proceed to step 1900.

In step 1900, the user can input site location, where software will be used. In step 1920, the user can input lab/facility (within the site location) where the software will be used. In step 1940, the user can input required software component name and version. In step 1960, the user can input software start date and end date.

If the answer to the question (is there specific hardware to execute the event?) in step 2000, is yes, then the user can proceed to step 2040; otherwise the user can stop at 2020. In step 2040, the user can input site location, where hardware will be used. In step 2060, the user can input lab/facility (within the site location) where the hardware will be used. In step 2080, the user can input required hardware component name and version. In step 2100, the user can input hardware start date and end date and stop is indicated as step 2120.

Figure 17A:
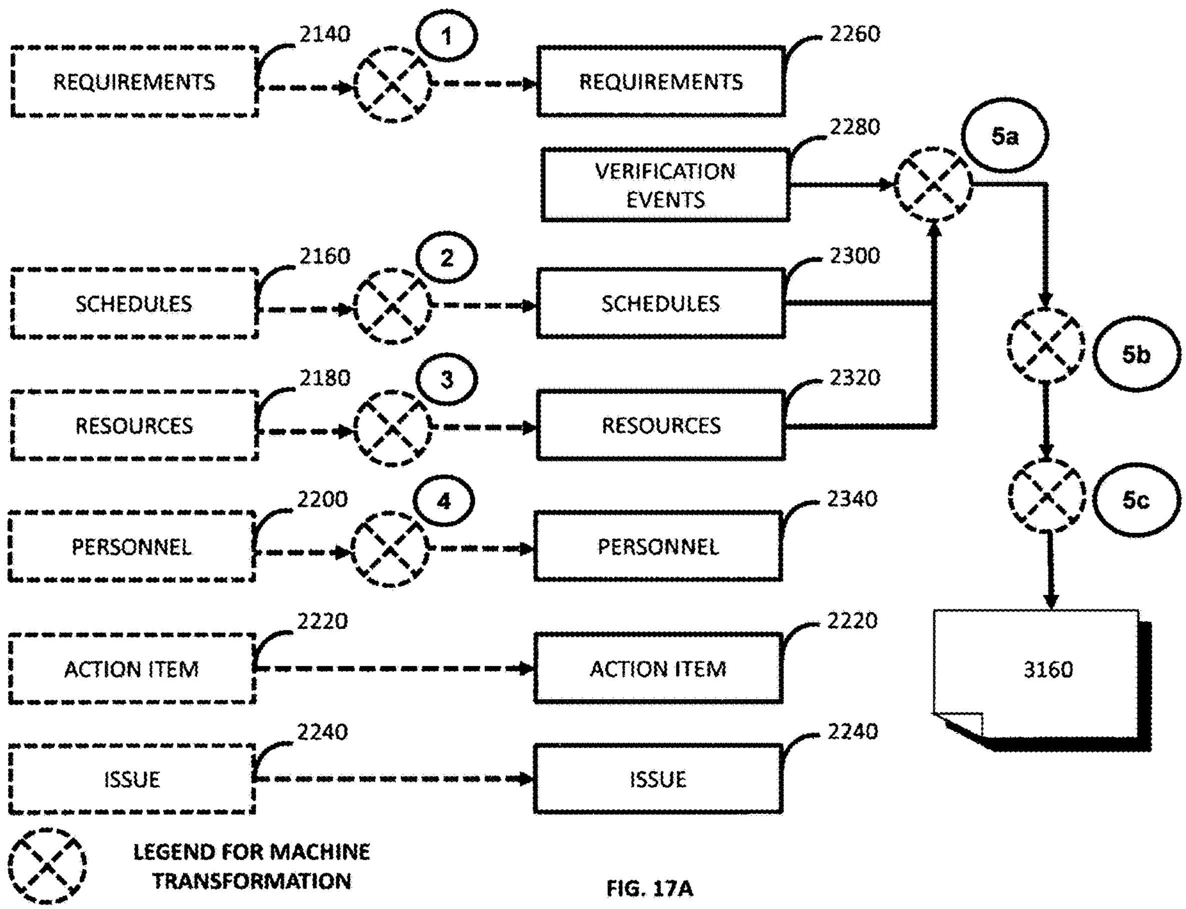
FIG. 17A describes requirements, schedules, resources and personnel before the machine transformation.

In FIG. 17A, requirements, schedules, resources and personnel are identified as 2140, 2160, 2180 and 2200 respectively before the machine transformation.

In FIG. 17A, requirements, schedules, resources and personnel are identified as 2260, 2300, 2320 and 2340 respectively after the machine transformation.

In FIG. 17A, action item, issue and verification events are identified as 2220, 2240 and 2280 respectively.

Furthermore, FIG. 17A, incorporates various machine transformations, which are denoted as 1, 2, 3, 4, 5*a*, 5*b* and 5*c*.

Figure 17B:
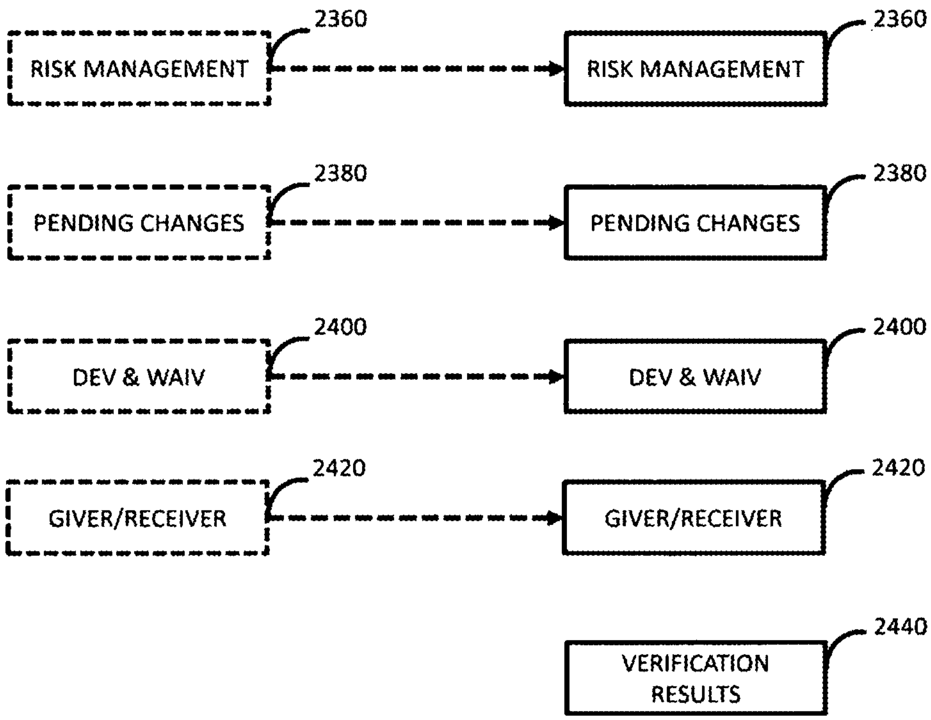
FIG. 17B describes risk management, pending changes, deviation and waiver ("dev & waiv"), giver/receiver and verification.

Furthermore, in FIG. 17B, risk management, pending changes, deviation and waiver ("dev & waiv"), giver/receiver and verification results are denoted by 2360, 2380, 2400, 2420 and 2440 respectively.

Figure 18A:
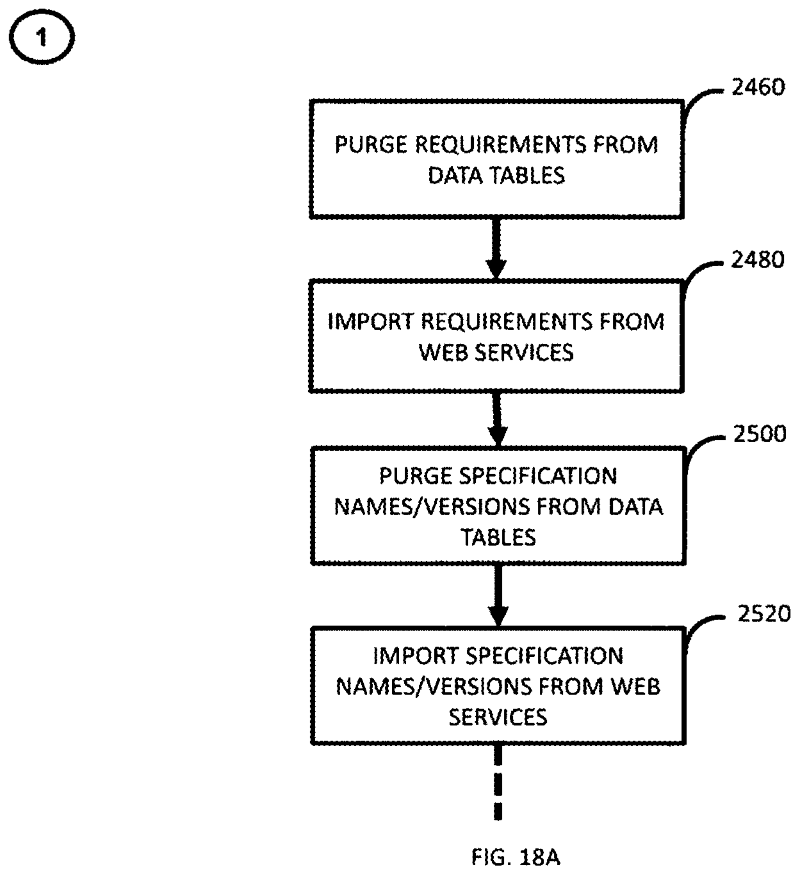
FIGS. 18A and 18B describe the machine transformation of requirements.
Figure 18B:
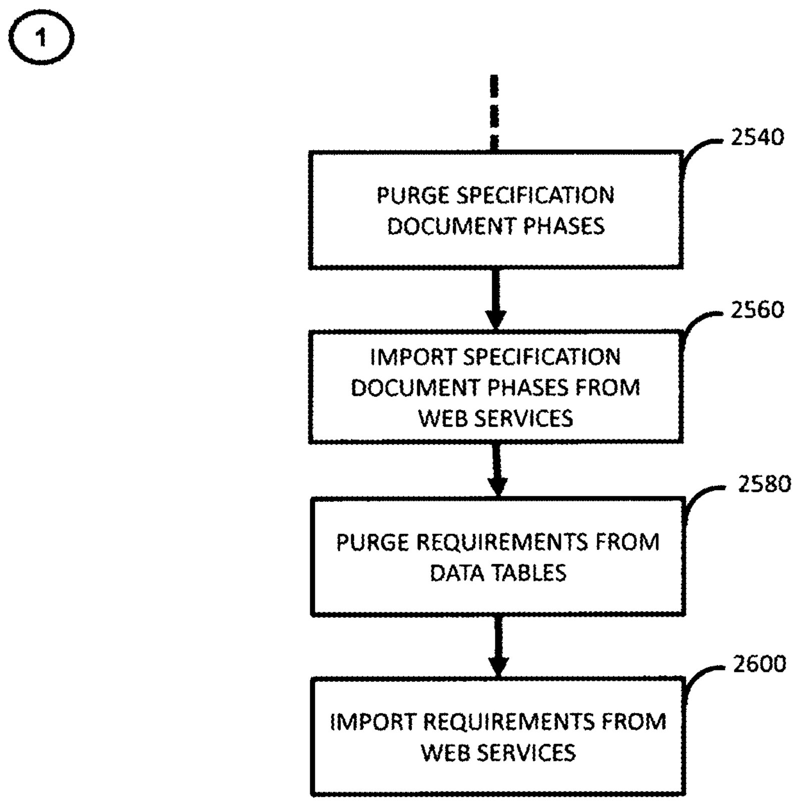

FIGS. 18A and 18B illustrate the machine transformation of requirements denoted as 1.

In FIG. 18A, in step 2460, purge requirements from data tables, in step 2480, import requirements from web services, in step 2500, purge specification names/versions from data tables, in step 2520, import specification names/versions from web services.

In FIG. 18B, in step 2540, purge specification document phases, in step 2560, import specification document phases from web services, in step 2580, purge requirements from data tables and in step 2600, import requirements from web services.

Figure 19:
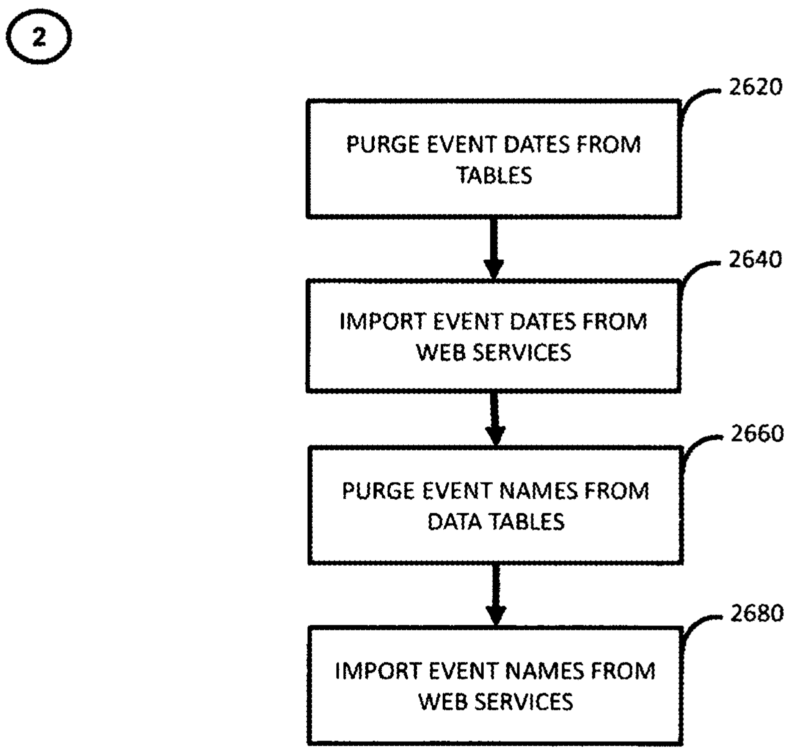
FIG. 19 describes the machine transformation of schedules.

FIG. 19 illustrates the machine transformation of schedules denoted as 2. In step 2620, purge event dates from tables, in step 2640, import event dates from web services, in step 2660, purge event names from data tables and in step 2680, import event names from web services.

Figure 20A:
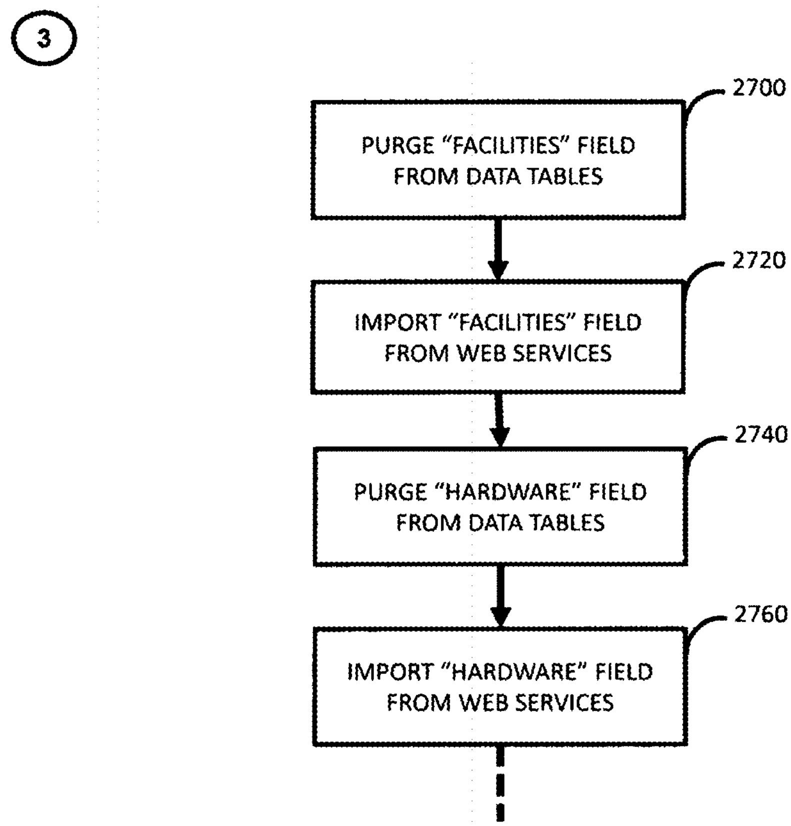
FIGS. 20A and 20B describe the machine transformation of resources.
Figure 20B:
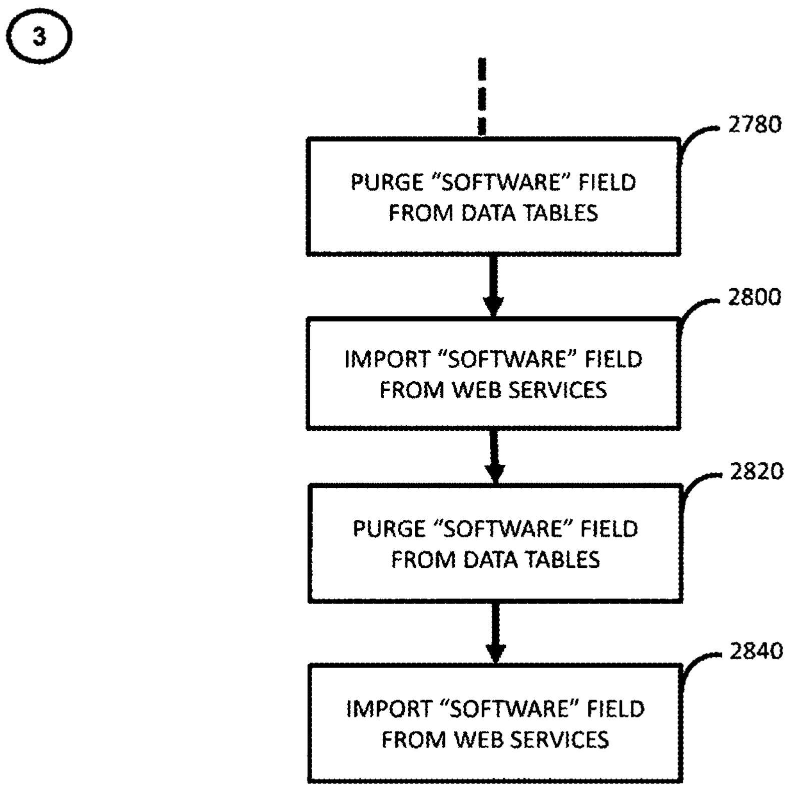

FIGS. 20A and 20B illustrate the machine transformation of resources denoted as 3.

In FIG. 20A, in step 2700, purge "facilities" field from data tables, in step 2720, import "facilities" field from web services, in step 2740, purge "hardware" field from data tables and in step 2760, import "hardware" field from web services.

In FIG. 20B, in step 2780, purge "software" field from data tables, in step 2800, import "software" field from web services, in step 2820, purge "software" field from data tables and in step 2840, import "software" field from web services.

Figure 21:
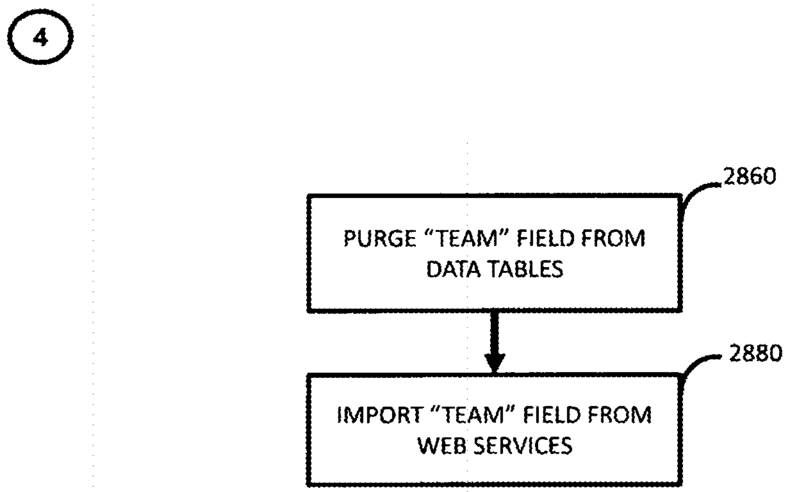
FIG. 21 describes the machine transformation of personnel.

FIG. 21 illustrates the machine transformation of personnel and the machine transformation of personnel is denoted as 4.

In FIG. 21, in step 2860, purge "team" field from data tables and in step 2880, import "team" field from web services.

Figure 22:
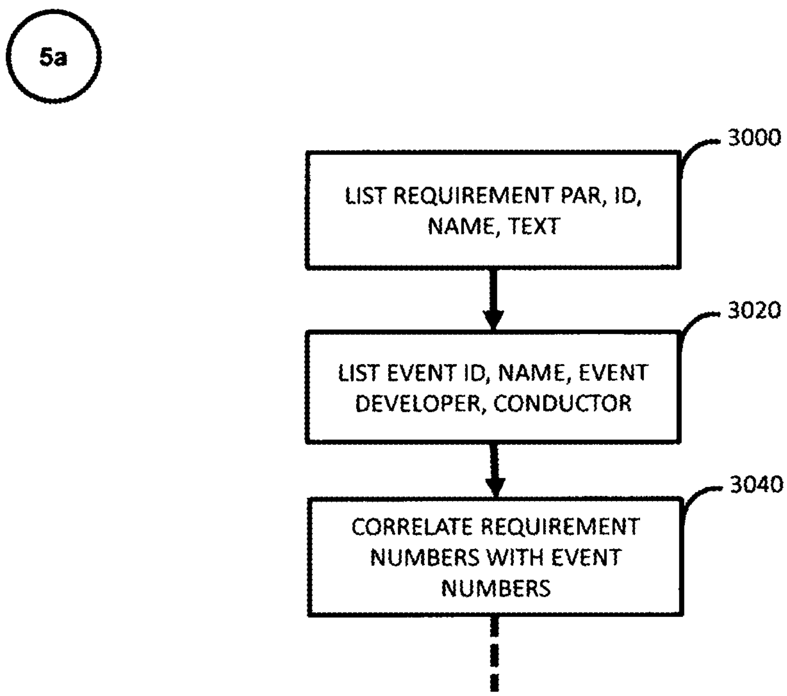
FIG. 22 describes the machine transformation, denoted as 5*a* (5*a* as in FIG. 17A). 5*a* denotes the first machine transformation of the verification event.

FIG. 22 illustrates the machine transformation, denoted as 5*a*. In FIG. 22, in step 3000 list requirement parameter, ID, name and text, in step 3020, list event ID, name, event developer and conductor and in step 3040, correlate requirement numbers with event numbers.

Figure 23:
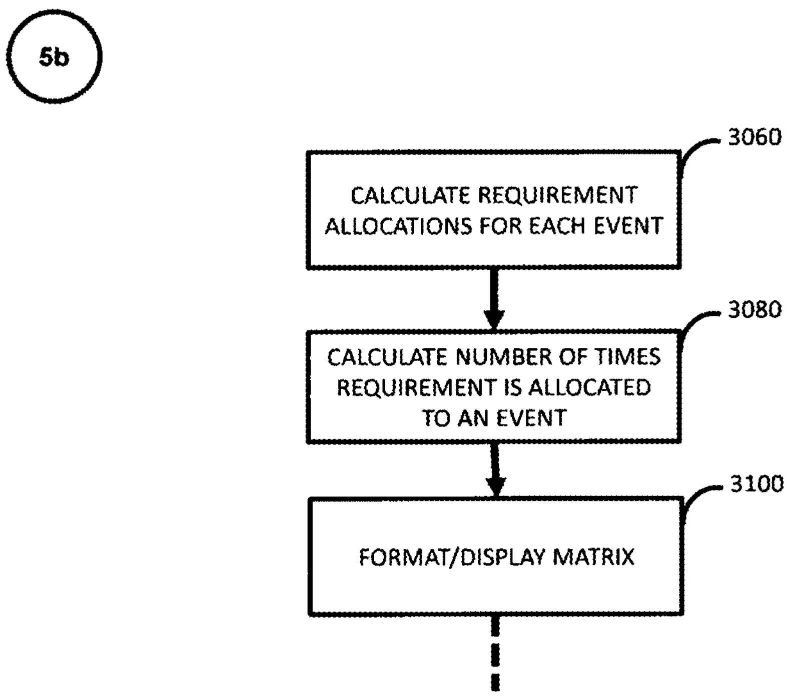
FIG. 23 describes the machine transformation, denoted as 5*b* (5*b* as in FIG. 17A). 5*b* denotes the second machine transformation of the verification event.

FIG. 23 illustrates the machine transformation, denoted as 5*b*. In FIG. 23, in step 3060, calculate requirement allocations for each event, in step 3080, calculate number of times requirement is allocated to an event and in step 3100, enables format/display matrix.

Figure 24:
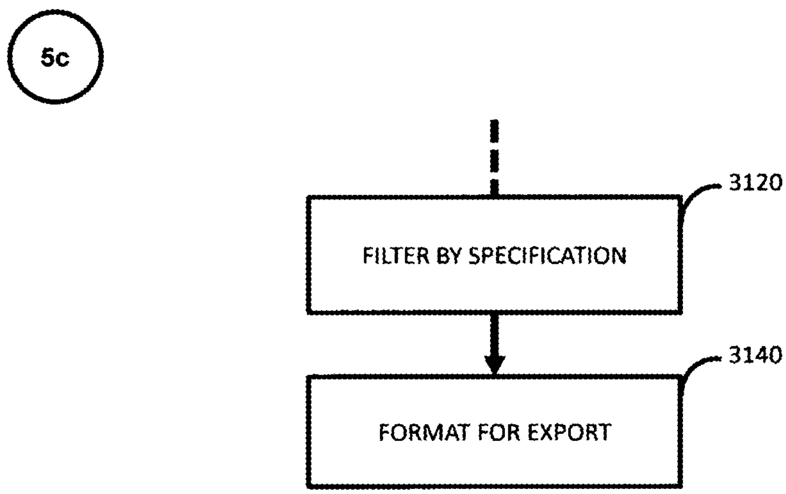
FIG. 24 describes the machine transformation, denoted as 5*c* (5*c* as in FIG. 17A). 5*c* denotes the third machine transformation of the verification event.

FIG. 24 illustrates the machine transformation, denoted as 5*c*. In FIG. 24, in step 3120, enables filter by specification and in step 3140, enables format for export.

Figure 25I:
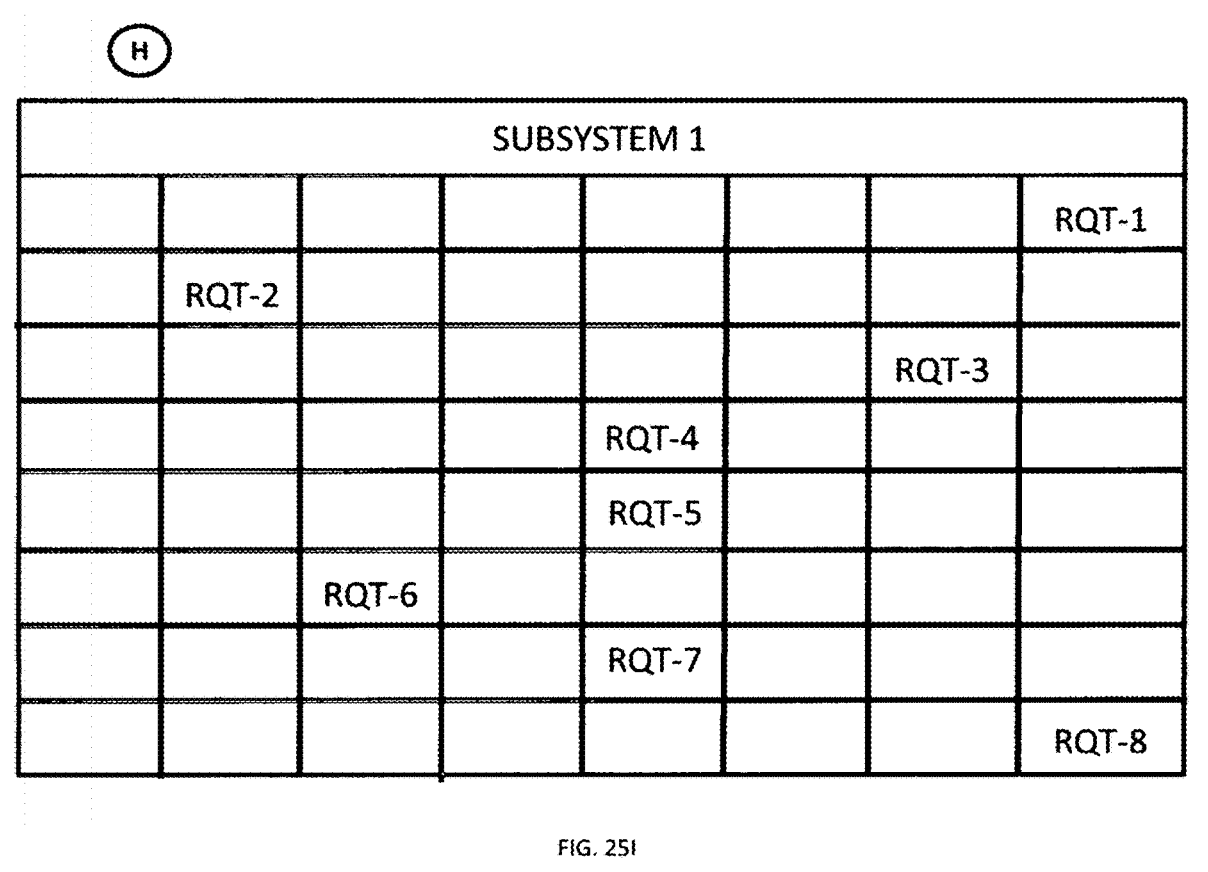

FIG. 25A illustrates module 3160 with cells identified as A, B, C, D, E, F, G, H, I and J. 3160 module is a matrix correlating verification events, as illustrated in A, B, C, event EIS developer/conductor (Event Integration Sheet—EIS), as illustrated in D, E, F with specified requirements and/or compliance attributes as illustrated in G.

FIGS. 25B, 25C, 25D, 25E, 25F, 25G, 25H, 25I, 25J and 25 K illustrate cells A, B, C, D, E, F, G, H, I and J respectively for module 3160.

Figure 26A:
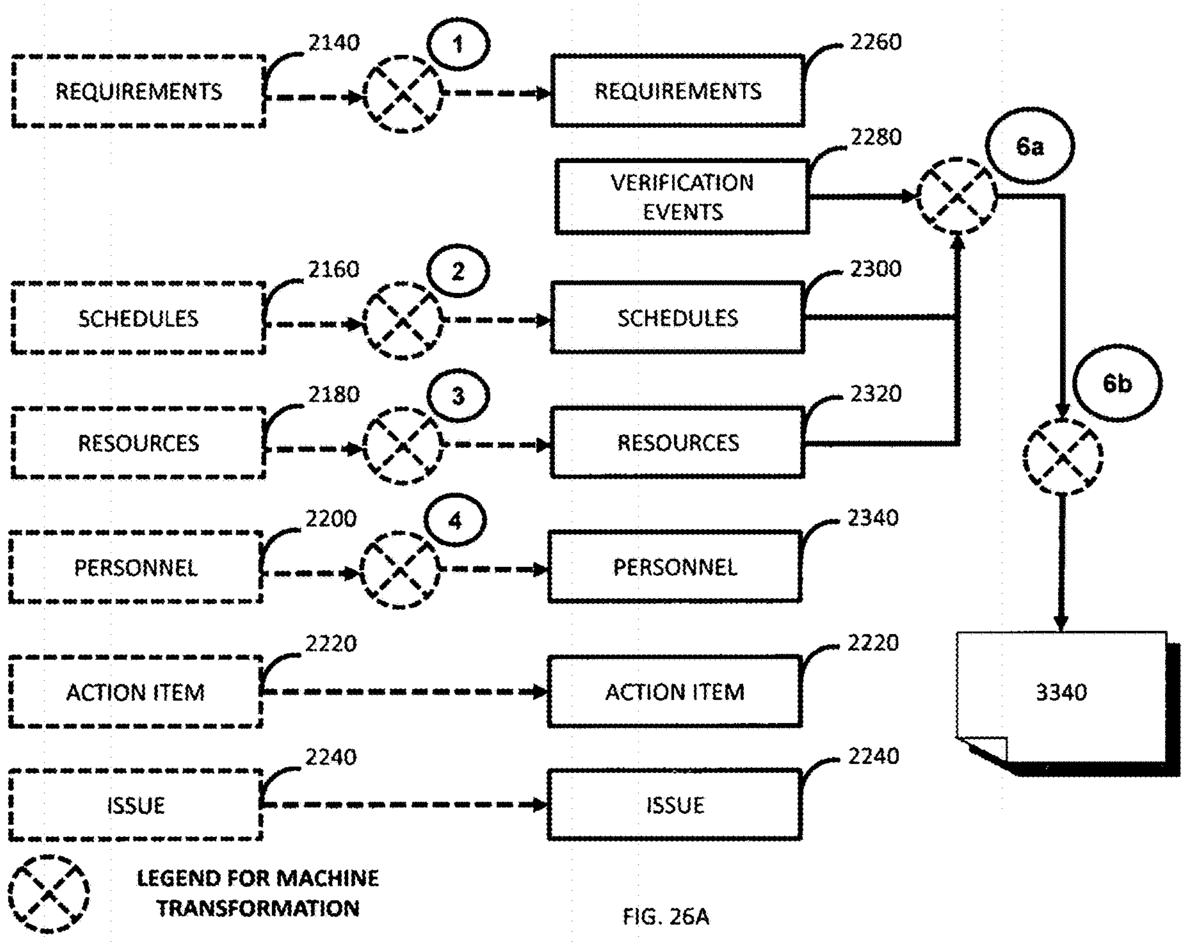
FIG. 26A describes requirements, schedules, resources and personnel before the machine transformation.

In FIG. 26A, requirements, schedules, resources and personnel are identified as 2140, 2160, 2180 and 2200 respectively before the machine transformation.

In FIG. 26A, requirements, schedules, resources and personnel are identified as 2260, 2300, 2320 and 2340 respectively after the machine transformation.

In FIG. 26A, action item, issue and verification events are identified as 2220, 2240 and 2280 respectively.

Furthermore, FIG. 26A, incorporates various machine transformations, which are denoted as 1, 2, 3, 4, 6*a* and 6*b*.

The machine transformations denoted as 1, 2, 3 and 4 have been illustrated in the previous paragraphs.

Figure 26B:
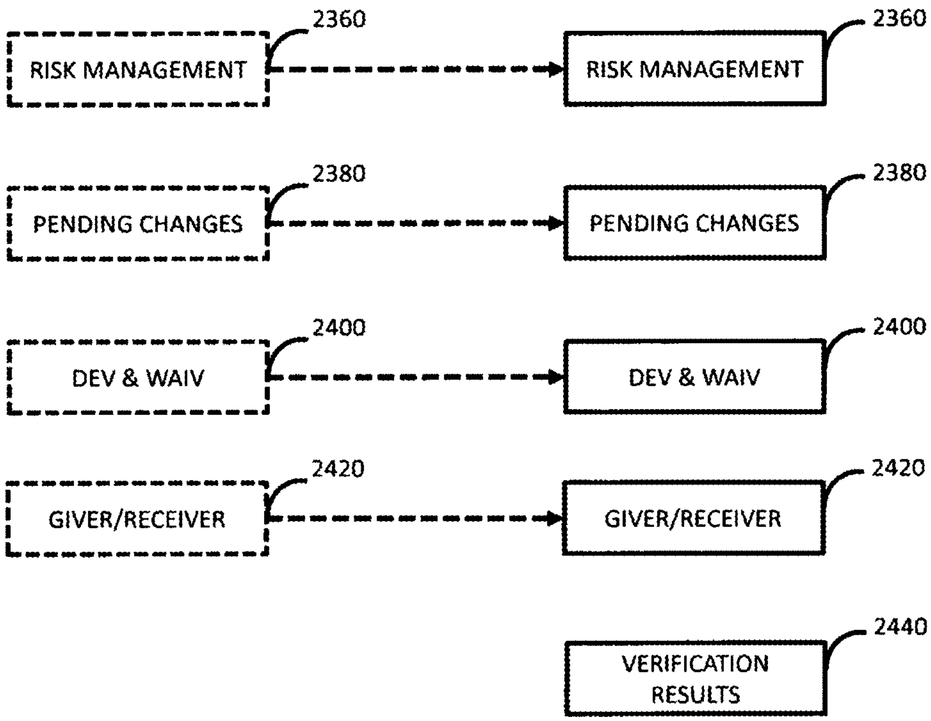
FIG. 26B describes risk management, pending changes, deviation and waiver ("dev & waiv"), giver/receiver and verification.

In FIG. 26B, risk management, pending changes, dev & waiv, giver/receiver and verification results are denoted by 2360, 2380, 2400, 2420 and 2440 respectively.

Figure 26C:
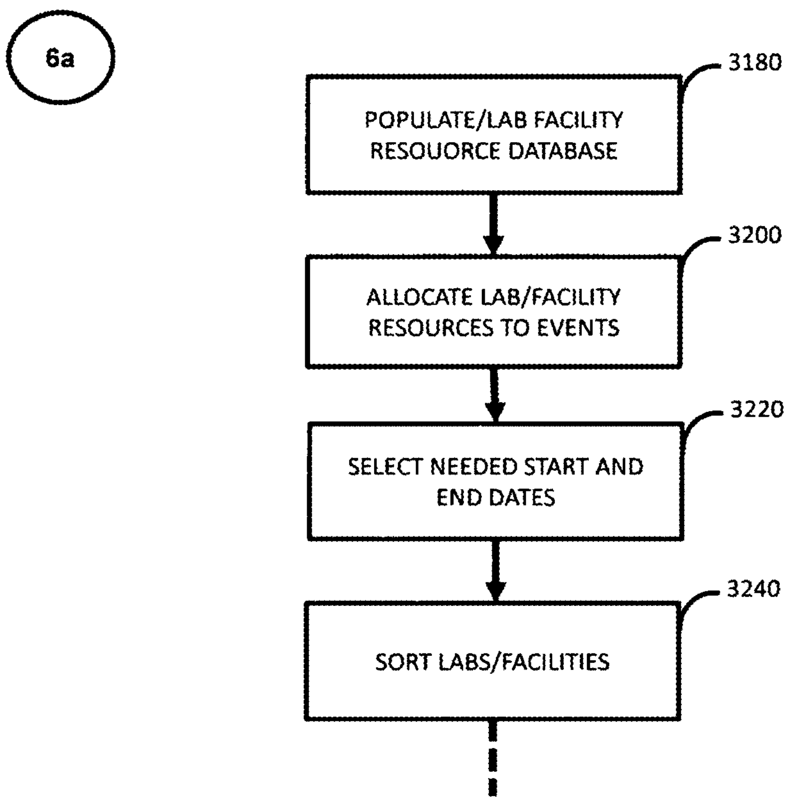
FIG. 26C describes the machine transformation, denoted as 6*a* (6*a* as in FIG. 26A). 6*a* denotes the first machine transformation of the verification event.

FIG. 26C illustrates the machine transformation, denoted as 6*a*. In FIG. 26C, in step 3180, populate/lab facility resource data base, in step 3200, allocate lab/facility resources to events, in step 3220, select needed start and end date and in step 3240, sort labs/facilities.

Figure 26D:
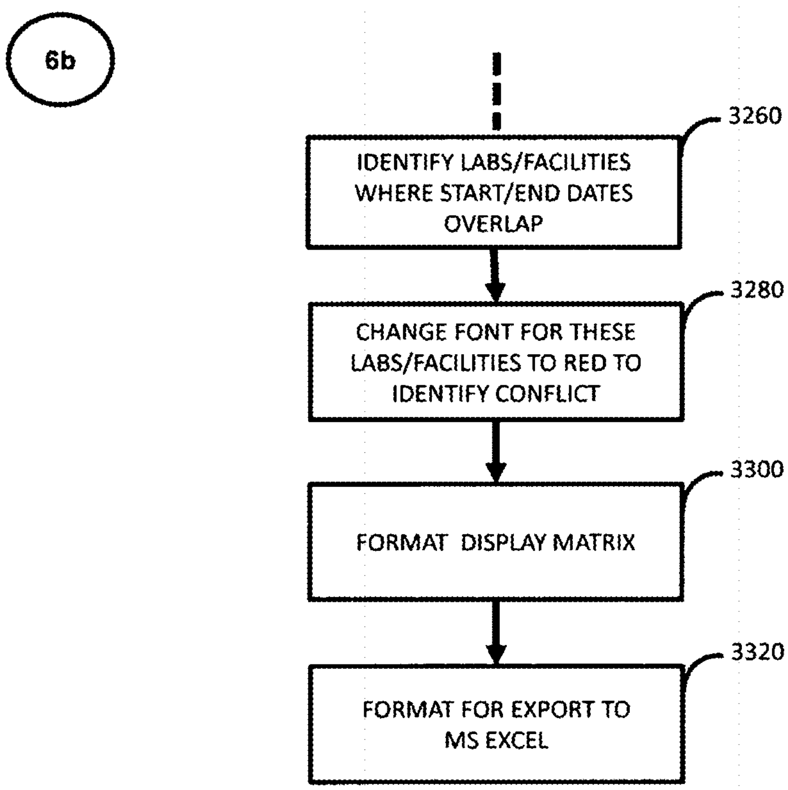
FIG. 26D describes the machine transformation, denoted as 6*b* (6*b* as in FIG. 26A). 6*b* denotes the second machine transformation of the verification event.

FIG. 26D illustrates the machine transformation, denoted as 6*b*. In FIG. 26D, in step 3260, identify labs/facilities where start/end dates overlap, in step 3280, change fonts for these labs/facilities to red to identify conflict, in step 3300, format display matrix and in step 3320, format for export to MS Excel.

Figure 26E:
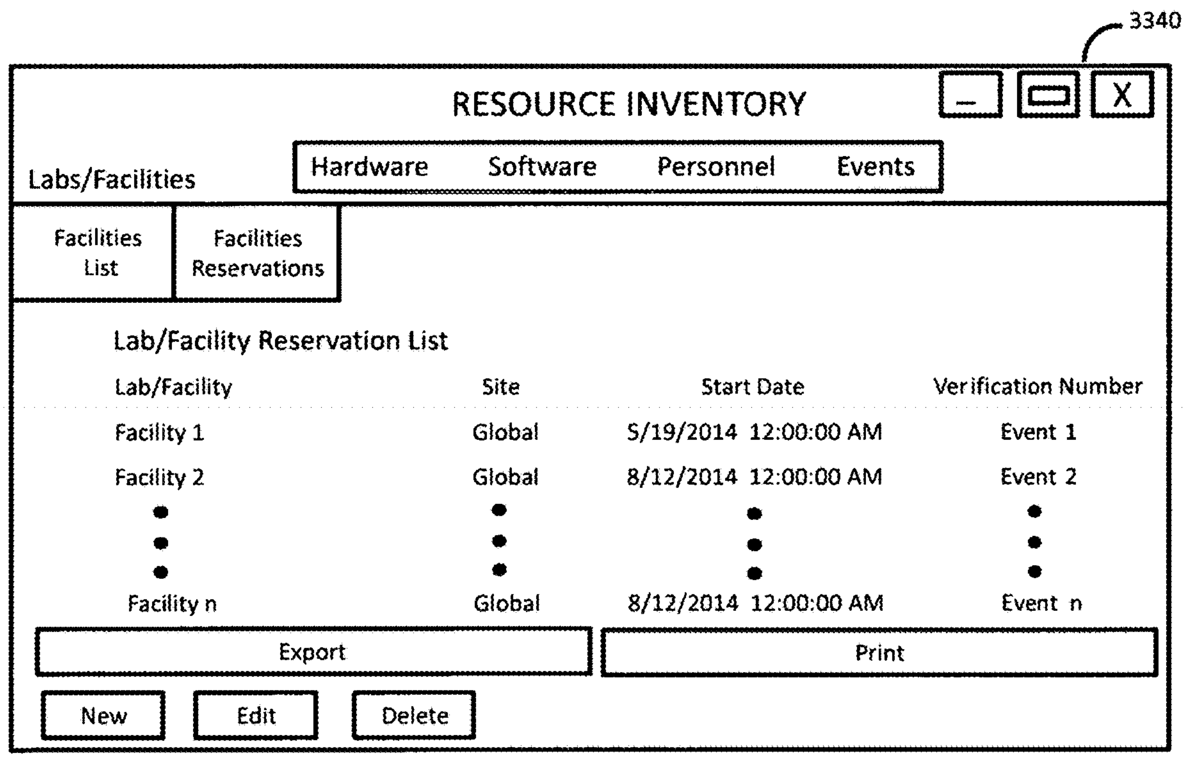
FIG. 26E describes the module 3340 (3340 as in FIG. 26A).

FIG. 26E illustrates a module 3340, which is a consolidated lab facilities resource management and verification event reservation output display. Lab facilities resources with conflicting schedules are highlighted in red text for resolution.

Figure 27A:
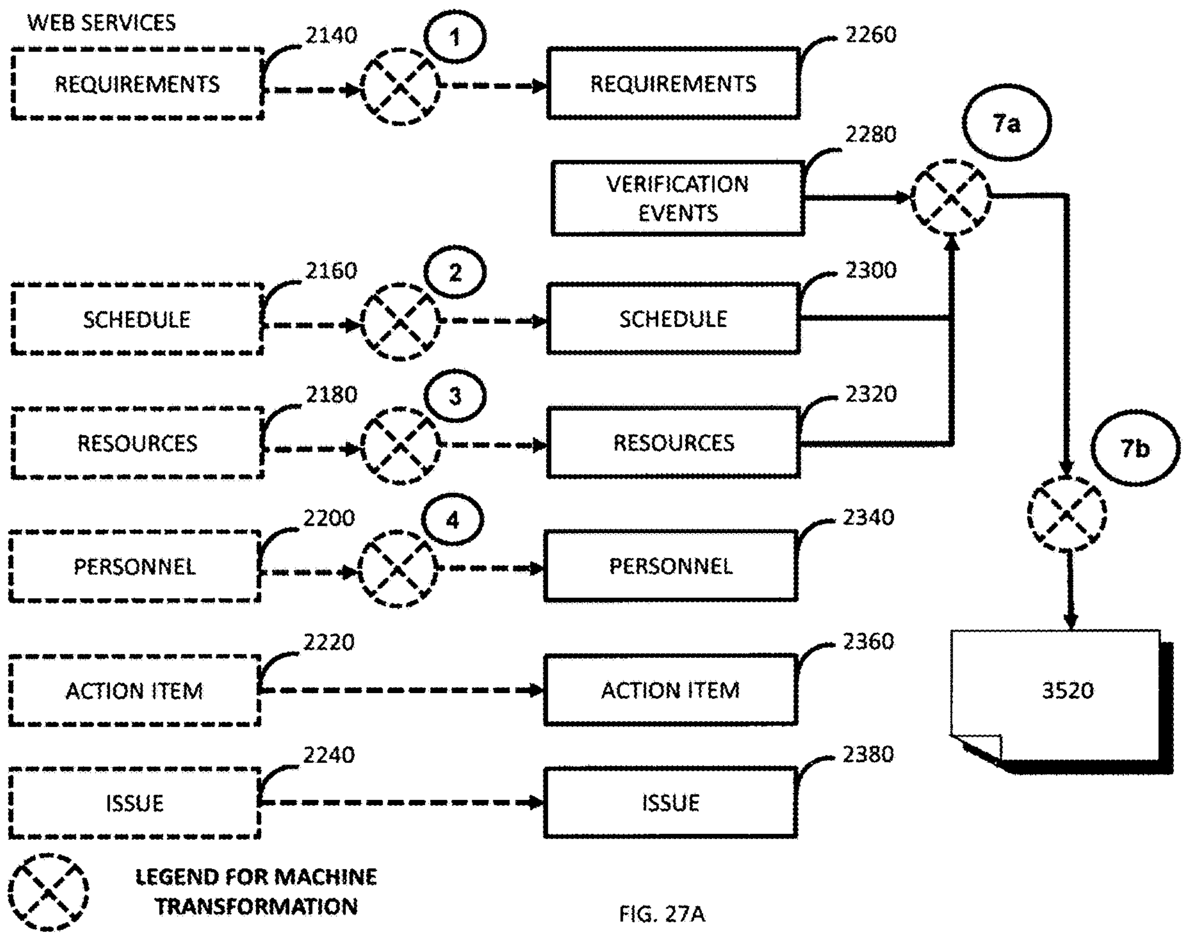
FIG. 27A describes requirements, schedules, resources and personnel before the machine transformation.

In FIG. 27A, requirements, schedules, resources and personnel are identified as 2140, 2160, 2180 and 2200 respectively before the machine transformation.

In FIG. 27A, requirements, schedules, resources and personnel are identified as 2260, 2300, 2320 and 2340 respectively after the machine transformation.

In FIG. 27A, action item, issue and verification events are identified as 2220, 2240 and 2280 respectively.

Furthermore, FIG. 27A, incorporates various machine transformations, which are denoted as 1, 2, 3, 4, 7*a* and 7*b*.

The machine transformations denoted as 1, 2, 3 and 4 have been illustrated in the previous paragraphs.

Figure 27B:
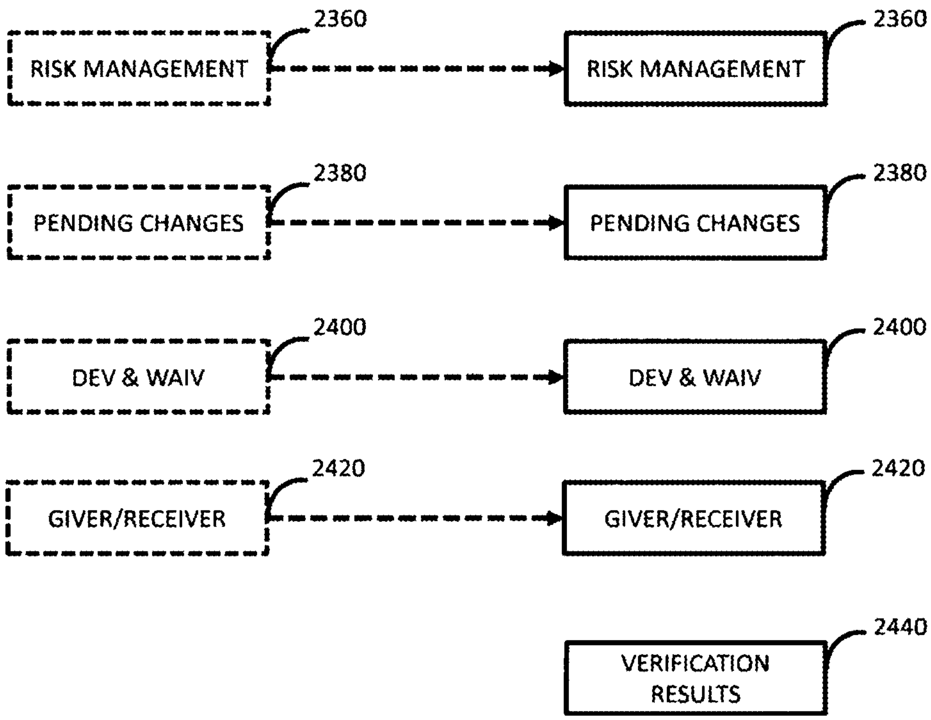
FIG. 27B describes risk management, pending changes, deviation and waiver ("dev & waiv"), giver/receiver and verification.

In FIG. 27B, risk management, pending changes, dev & waiv, giver/receiver and verification results are denoted by 2360, 2380, 2400, 2420 and 2440 respectively.

Figure 27C:
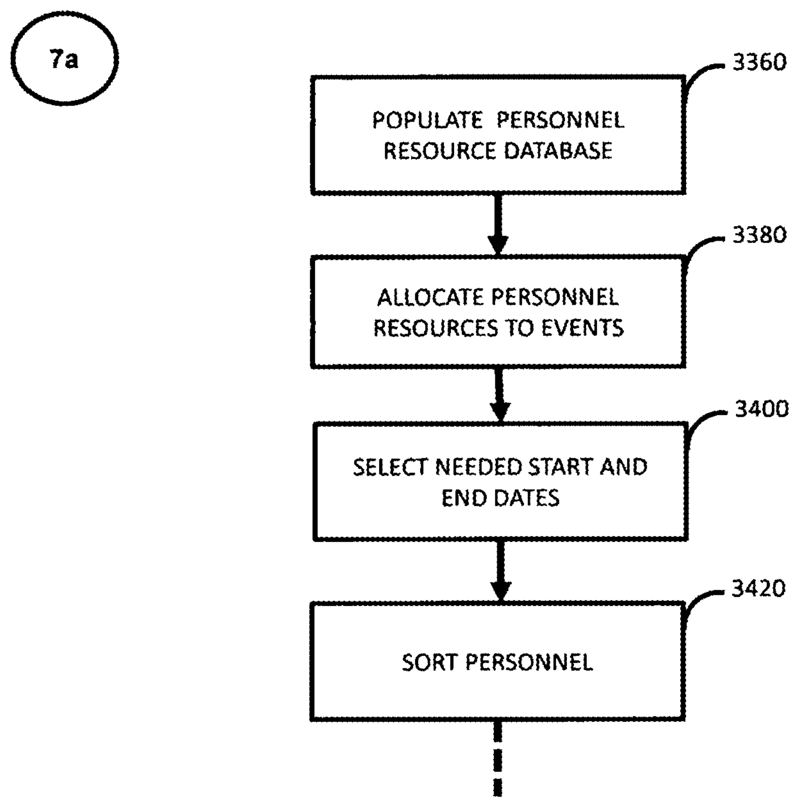
FIG. 27C describes the machine transformation, denoted as 7*a* (7*a* as in FIG. 27A). 7*a* denotes the first machine transformation of the verification event.

FIG. 27C illustrates the machine transformation, denoted as 7*a*. In FIG. 27C, in step 3360, populate personnel resource database, in step 3380, allocate personnel resources to events, in step 3400, select needed start and end dates and in step 3420, sort personnel.

Figure 27D:
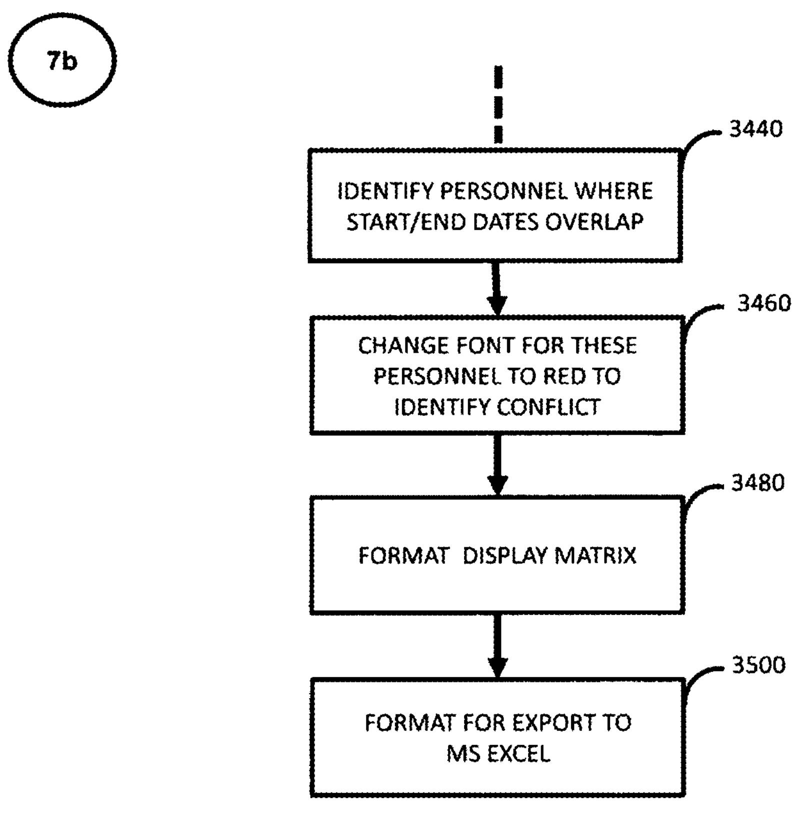
FIG. 27D describes the machine transformation, denoted as 7*b* (7*b* as in FIG. 27A). 7*b* denotes the second machine transformation of the verification event.

FIG. 27D illustrates the machine transformation, denoted as 7*b*. In FIG. 27D, in step 3440, identify personnel where start/end dates overlap, in step 3460, change fonts for the personnel to red to identify conflict, in step 3480, format display matrix and in step 3500, format for export to MS Excel.

Figure 27E:
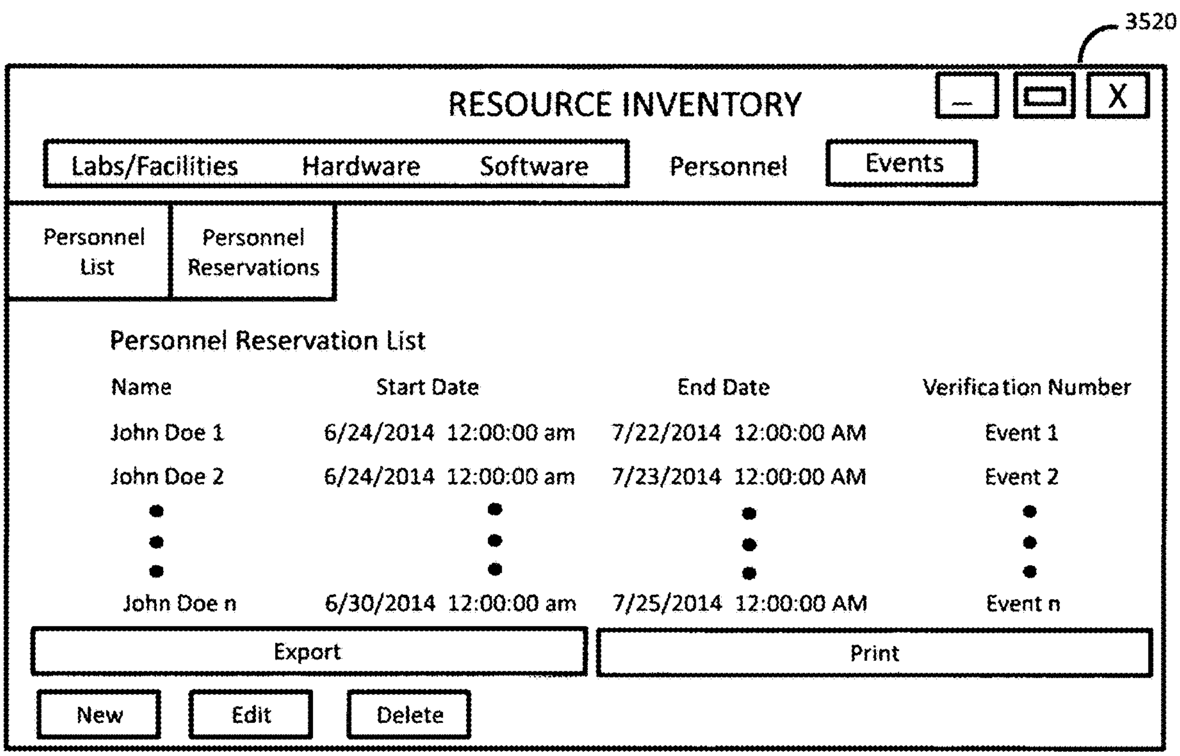
FIG. 27E describes the module 3520 (3520 as in FIG. 27A).

FIG. 27E illustrates a module 3520, which is a consolidated personnel resource management and verification event reservation output display. Personnel resources with conflicting schedules are highlighted in red text for resolutions.

Figure 28A:
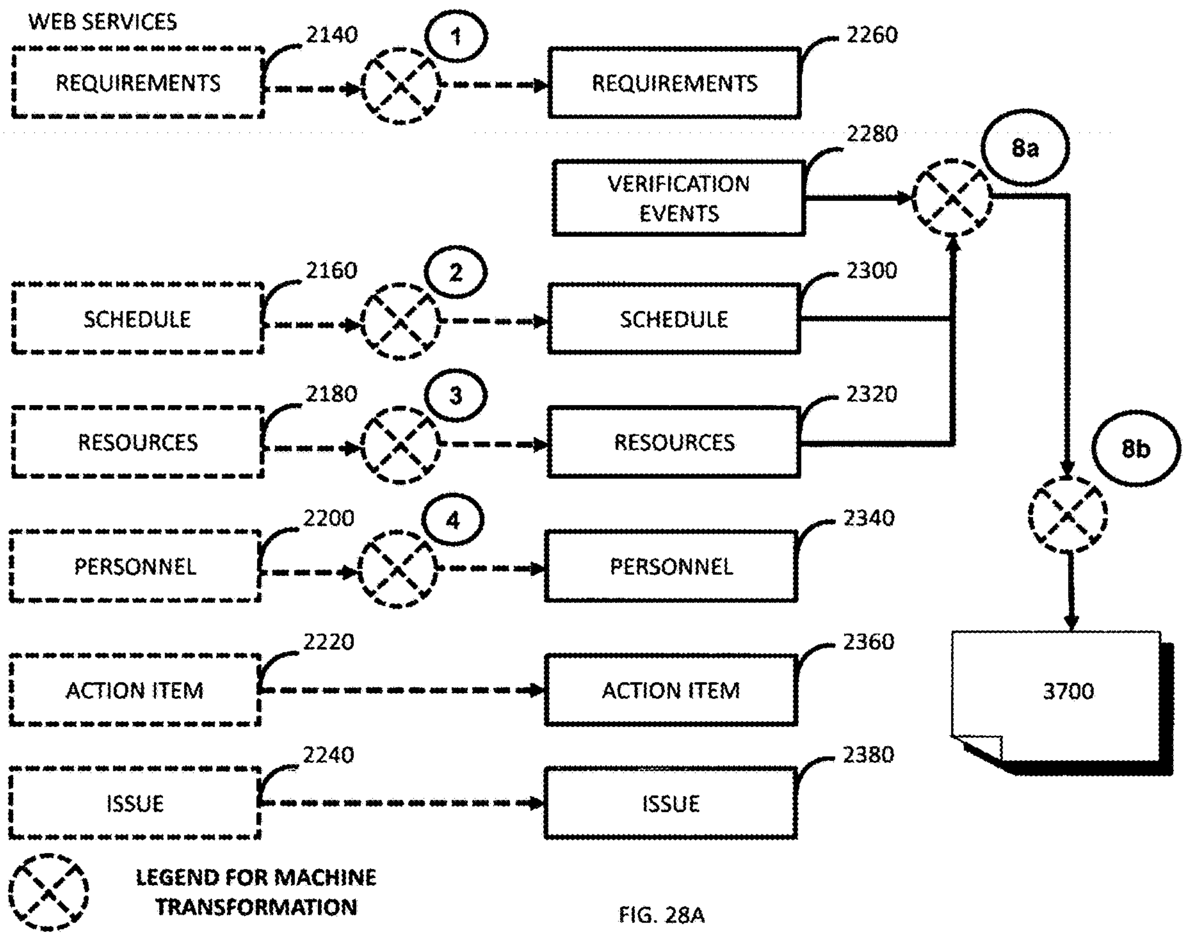
FIG. 28A describes requirements, schedules, resources and personnel before the machine transformation.

In FIG. 28A, requirements, schedules, resources and personnel are identified as 2140, 2160, 2180 and 2200 respectively before the machine transformation.

In FIG. 28A, requirements, schedules, resources and personnel are identified as 2260, 2300, 2320 and 2340 respectively after the machine transformation.

In FIG. 28A, action item, issue and verification events are identified as 2220, 2240 and 2280 respectively.

Furthermore, FIG. 28A, incorporates various machine transformations, which are denoted as 1, 2, 3, 4, 8*a* and 8*b*.

The machine transformations denoted as 1, 2, 3 and 4 have been illustrated in the previous paragraphs.

Figure 28B:
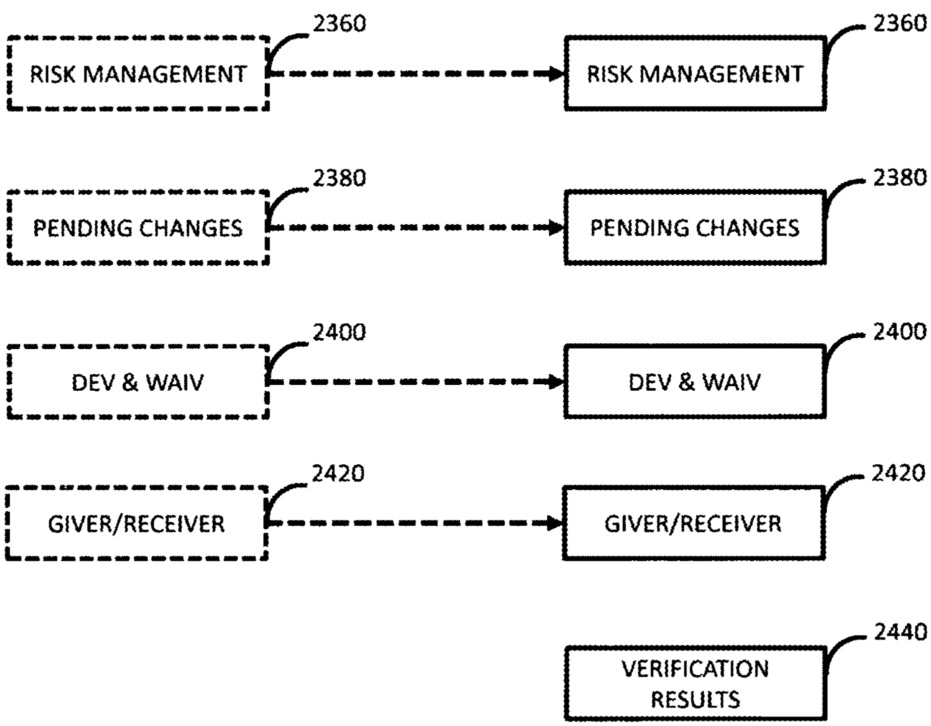
FIG. 28B describes risk management, pending changes, deviation and waiver ("dev & waiv"), giver/receiver and verification.

In FIG. 28B, risk management, pending changes, dev & waiv, giver/receiver and verification results are denoted by 2360, 2380, 2400, 2420 and 2440 respectively.

Figure 28C:
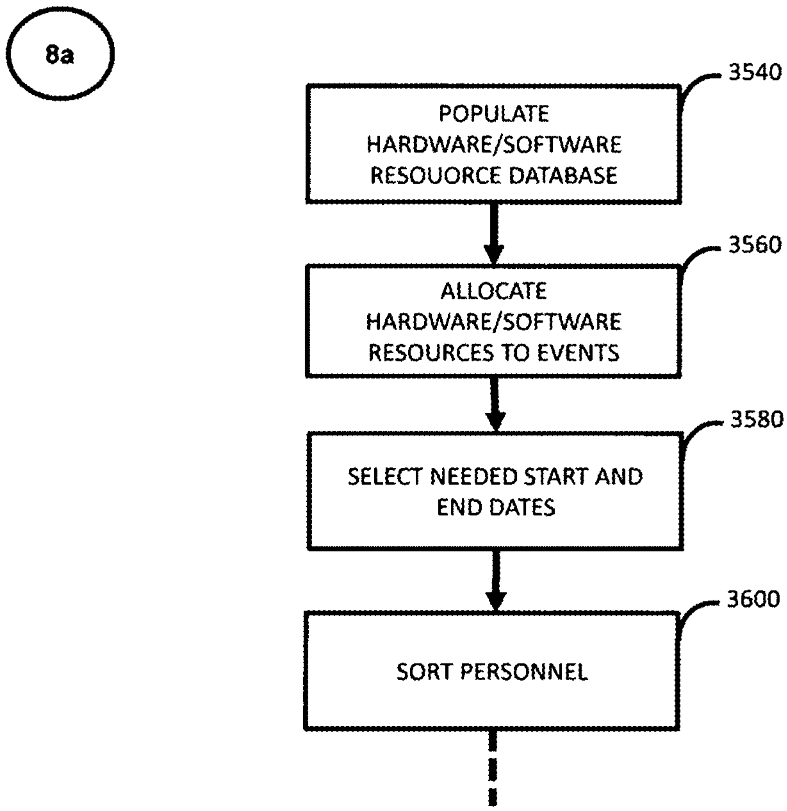
FIG. 28C describes the machine transformation, denoted as 8*a* (8*a* as in FIG. 28A). 8*a* denotes the first machine transformation of the verification event.

FIG. 28C illustrates the machine transformation, denoted as 8*a*. In FIG. 28C, in step 3540, populate hardware/software resource database, in step 3560, allocate hardware/software resource to events, in step 3580, select needed start and end dates and in step 3600, sort personnel.

Figure 28D:
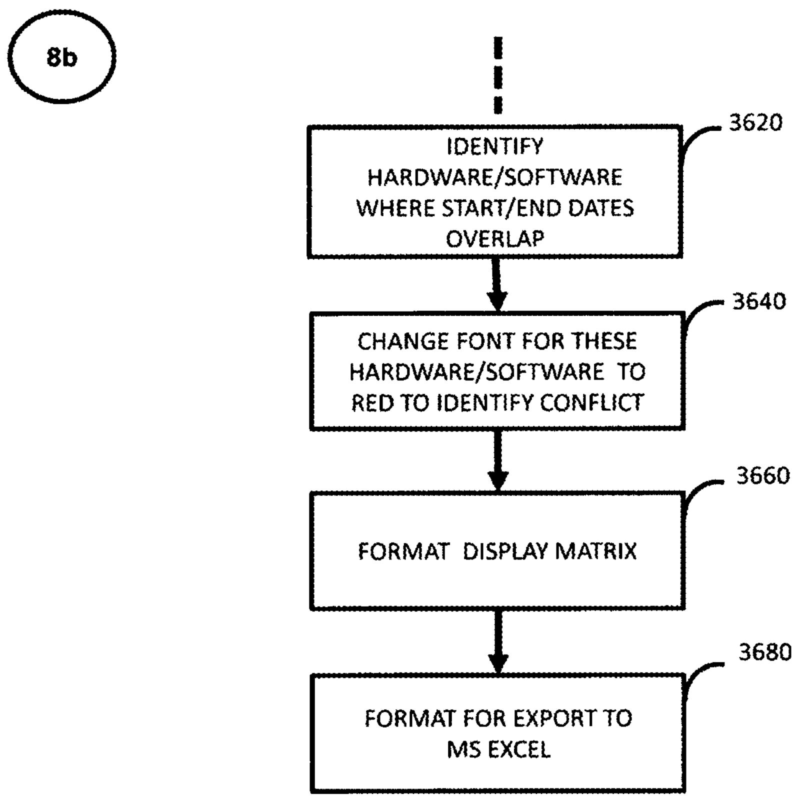
FIG. 28D describes the machine transformation, denoted as 8*b* (8*b* as in FIG. 28A). 8*b* denotes the second machine transformation of the verification event.

FIG. 28D illustrates the machine transformation, denoted as 8*b*. In FIG. 28D, in step 3620, identify hardware/software where start/end dates overlap, in step 3640, change fonts for this hardware/software to red to indentify conflict, in step 3660, format display matrix and in step 3680, format for export to MS Excel.

Figure 28E:
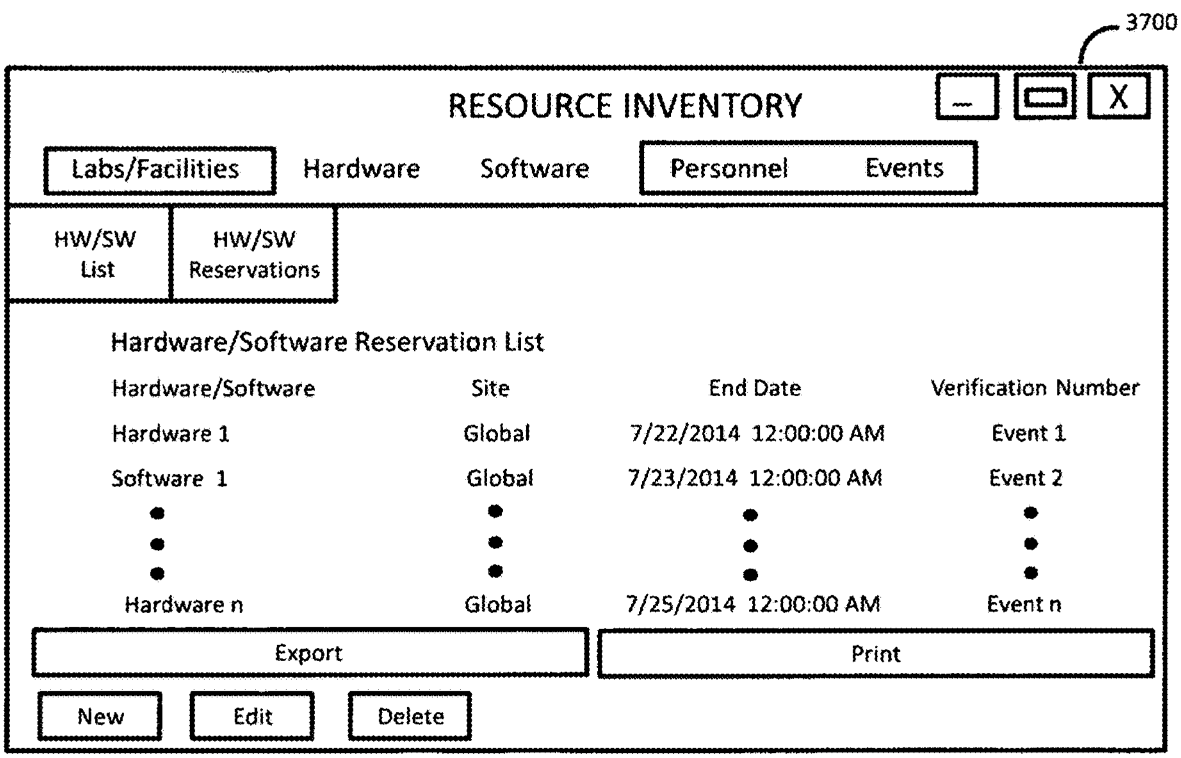
FIG. 28E describes the module 3700 (3700 as in FIG. 28A).

FIG. 28E illustrates a module 3700, which is a consolidated hardware and software resource management and verification event reservation output display. Hardware and software resources with conflicting schedules are highlighted in red text for resolutions.

Figure 29A:
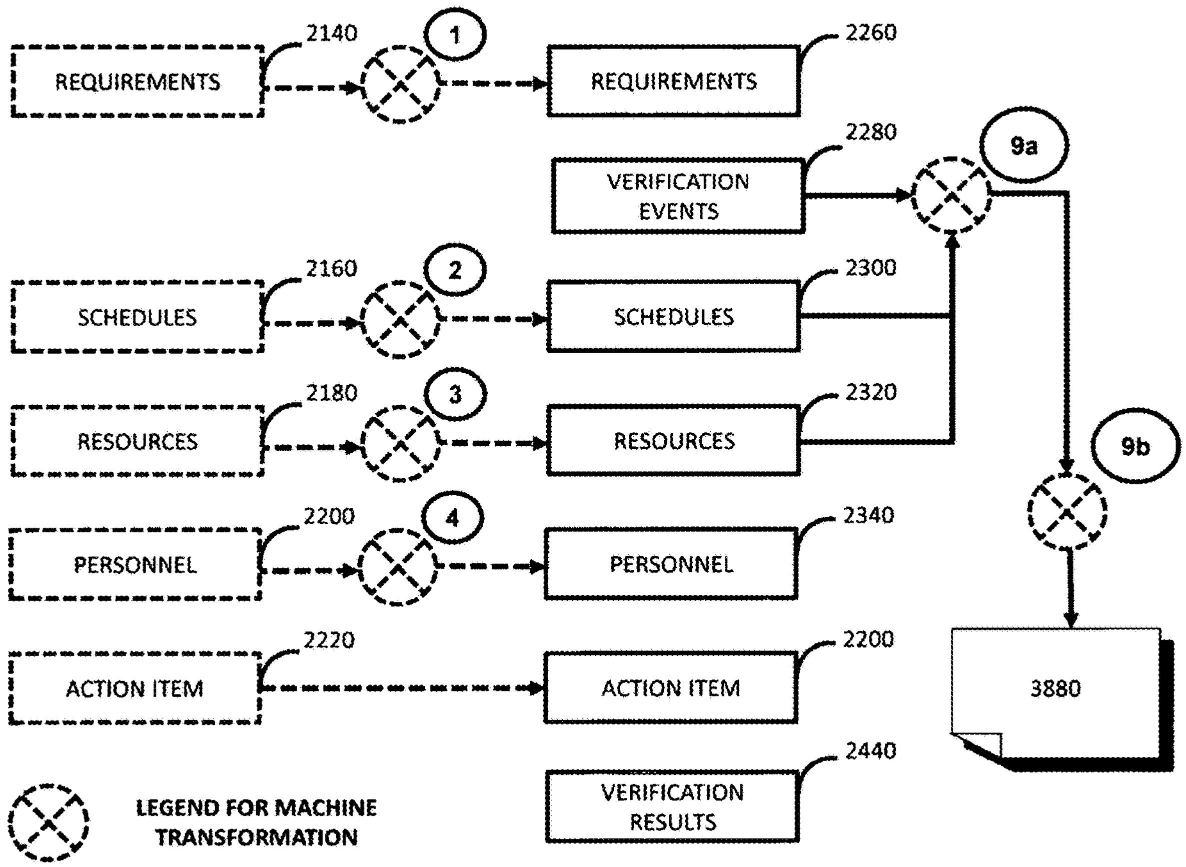
FIG. 29A describes requirements, schedules, resources and personnel before the machine transformation.

In FIG. 29A, requirements, schedules, resources and personnel are identified as 2140, 2160, 2180 and 2200 respectively before the machine transformation.

In FIG. 29A, requirements, schedules, resources and personnel are identified as 2260, 2300, 2320 and 2340 respectively after the machine transformation.

In FIG. 29A, action item, verification events and verification results are identified as 2220, 2280 and 2440 respectively.

Furthermore, FIG. 29A, incorporates various machine transformations, which are denoted as 1, 2, 3, 4, 9*a* and 9*b*.

The machine transformations denoted as 1, 2, 3 and 4 have been illustrated in the previous paragraphs.

Figure 29B:
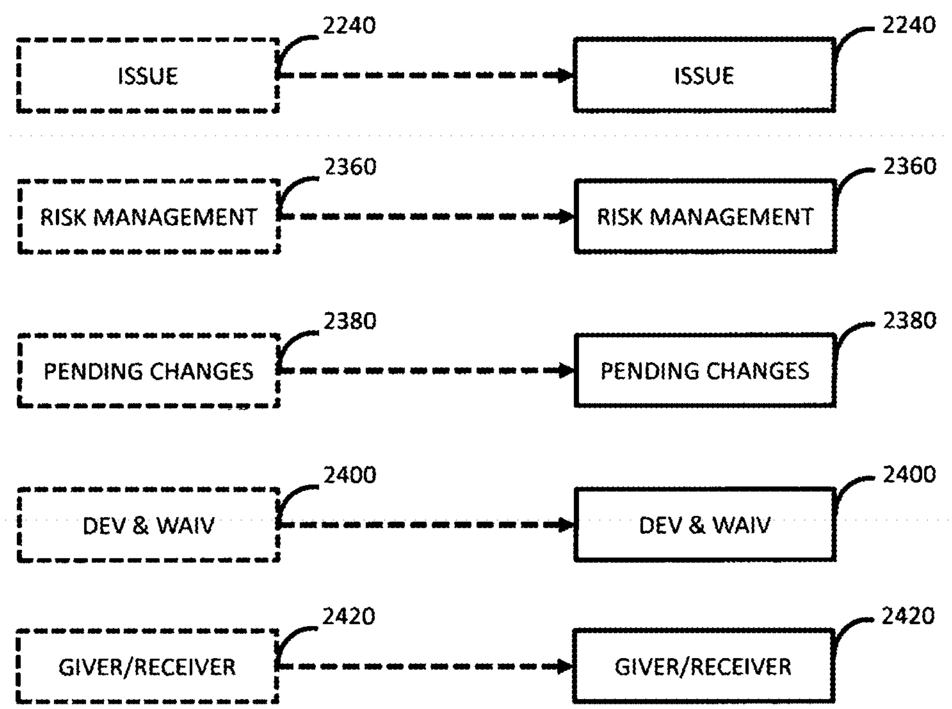
FIG. 29B describes risk management, pending changes, deviation and waiver ("dev & waiv"), giver/receiver and verification.

In FIG. 29B, issue, risk management, pending changes, dev & waiv, and giver/receiver are denoted by 2240, 2360, 2380, 2400 and 2420 respectively.

Figure 29C:
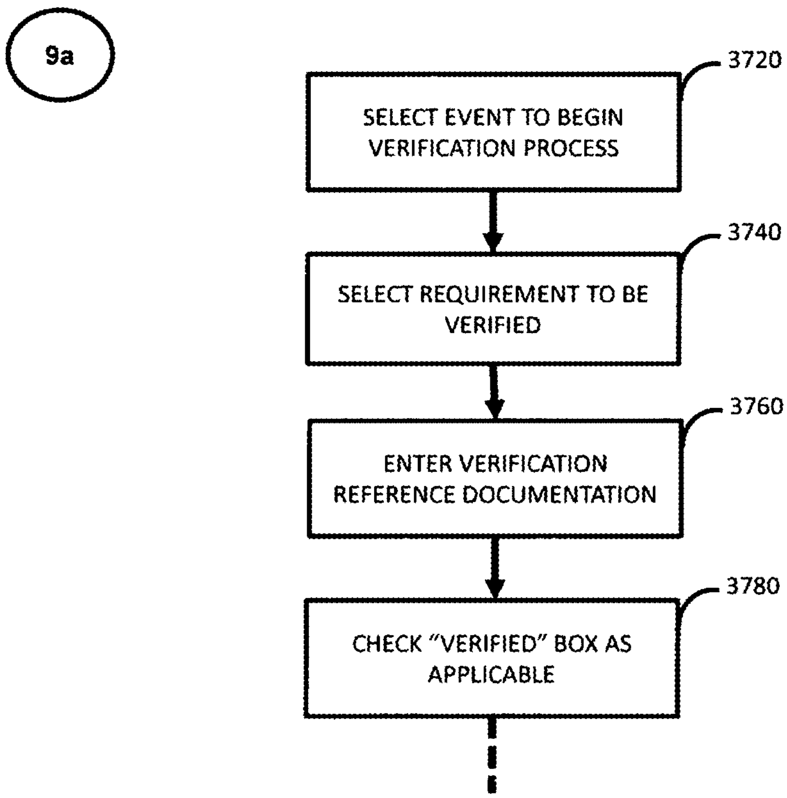
FIG. 29C describes the machine transformation, denoted as 9*a* (9*a* as in FIG. 29A). 9*a* denotes the first machine transformation of the verification event.

FIG. 29C illustrates machine transformation, denoted as 9*a*. In FIG. 29C, in step 3720, select event to begin verification process, in step 3740, select requirement to be verified, in step 3760, enter verification reference documentation and in step 3780, check "verified" box as applicable.

Figure 29D:
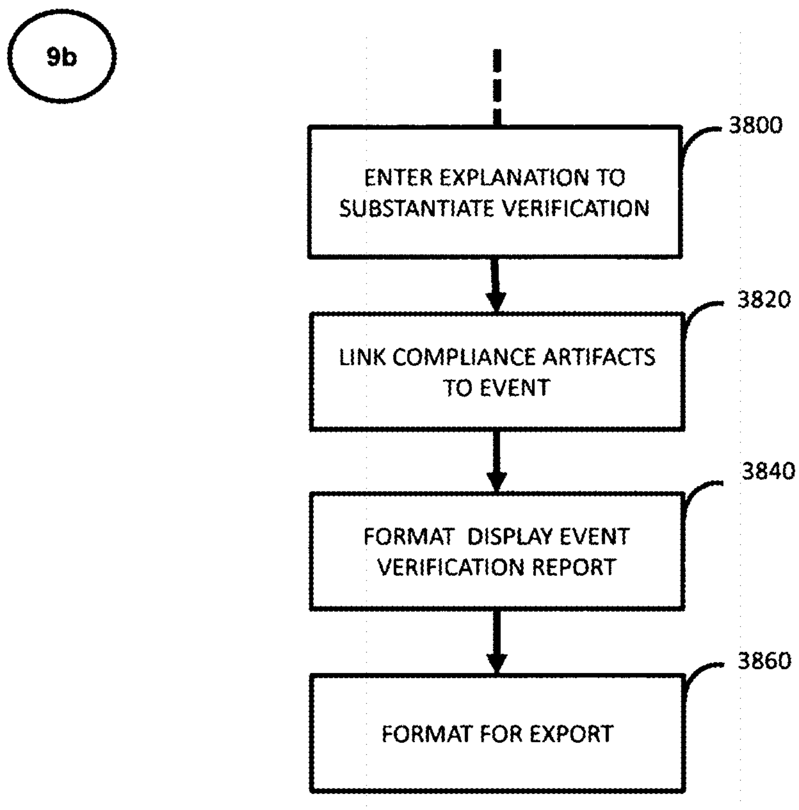
FIG. 29D describes the machine transformation, denoted as 9*b* (9*b* as in FIG. 29A). 9*b* denotes the second machine transformation of the verification event.

FIG. 29D illustrates machine transformation, denoted as 9*b*. In FIG. 29D, in step 3800, enter explanation to substantiate verification, in step 3820, link compliance artifacts to event, in step 3840, format display event verification report and in step 3860, format for export.

Figure 29E:
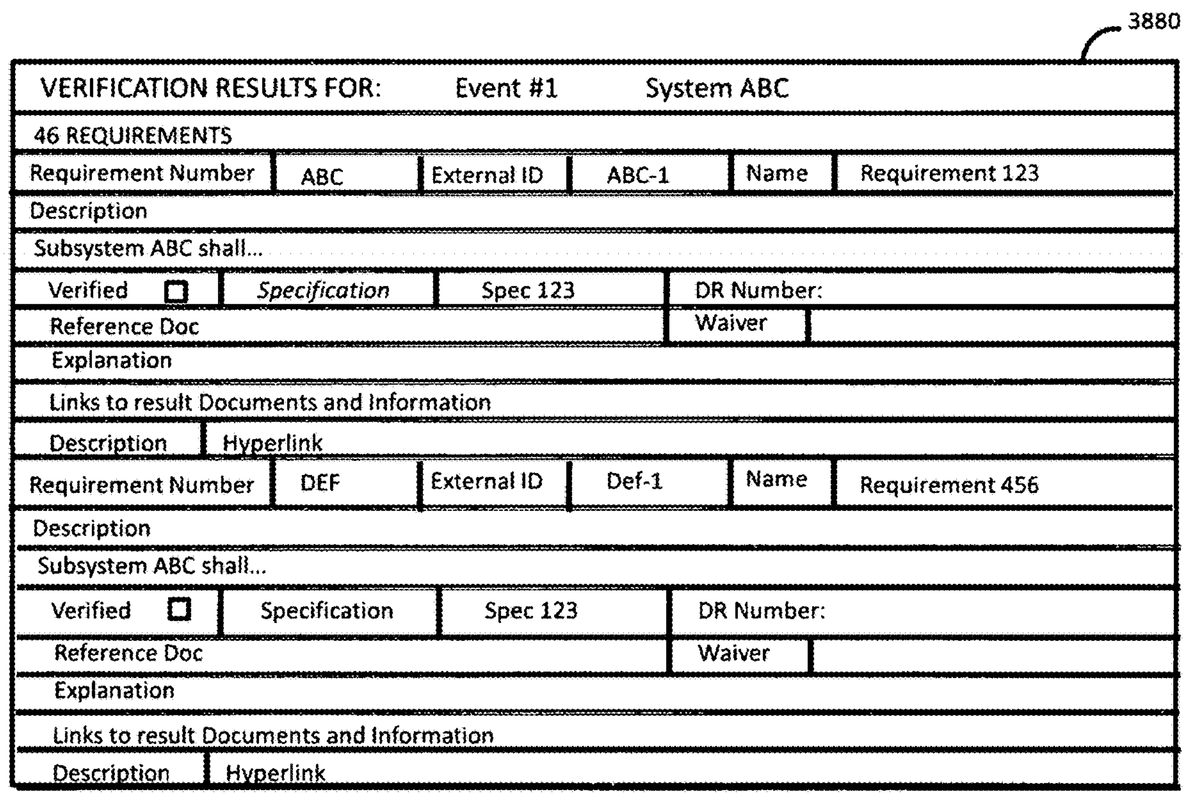
FIG. 29E describes the module 3880 (3800 as in FIG. 29A).

FIG. 29E illustrates a module 3880, which is an example output display of results of verification events by requirement and/or compliance attributes. Actual analysis or test documentation details are hyperlinked.

Figure 30A:
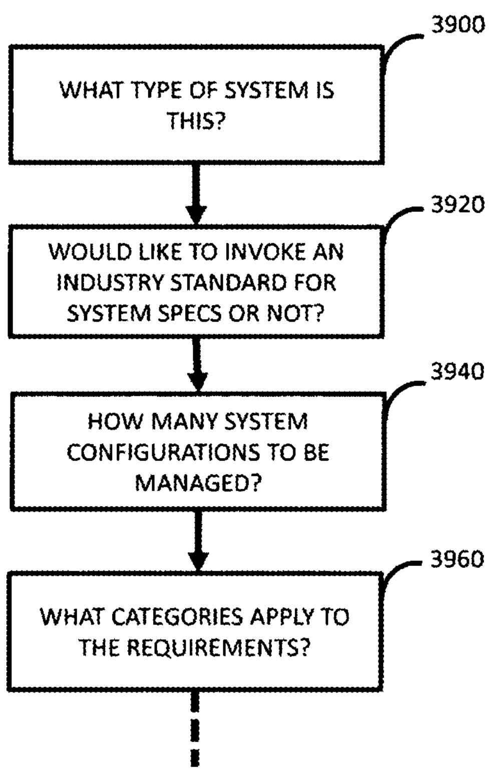
FIGS. 30A, 30B, 30C and 30D describe an example to establish a flowchart for the module 3880.

In FIG. 30A, in step 3900, describes the type of system, in step 3920, if or not an industry standard for system specification is used, in step 3940, to specify how many configurations to be managed and in step 3960, apply categories to the requirements.

Figure 30B:
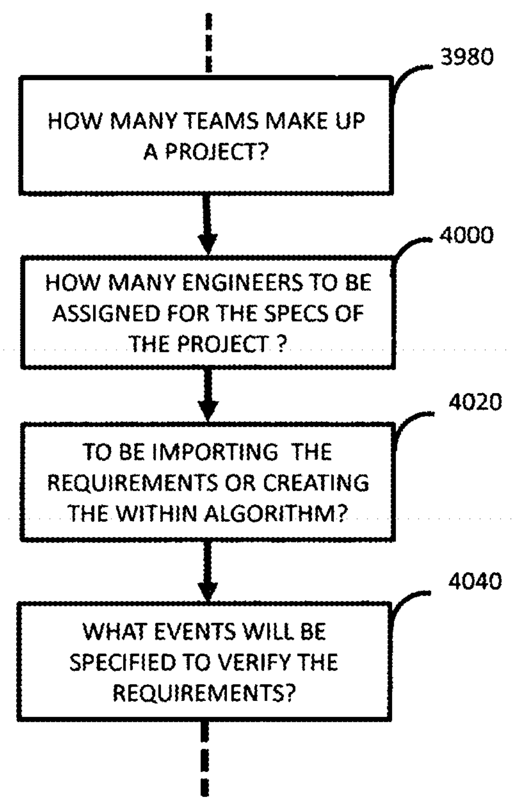

In FIG. 30B, in step 3980, specify how many teams in a project, in step 4000, if engineers are to be assigned to the specifications of the project, in step 4020, if requirements are to be imported or to be created within the algorithm and in step 4040, specify events to verify requirements, if known.

Figure 30C:
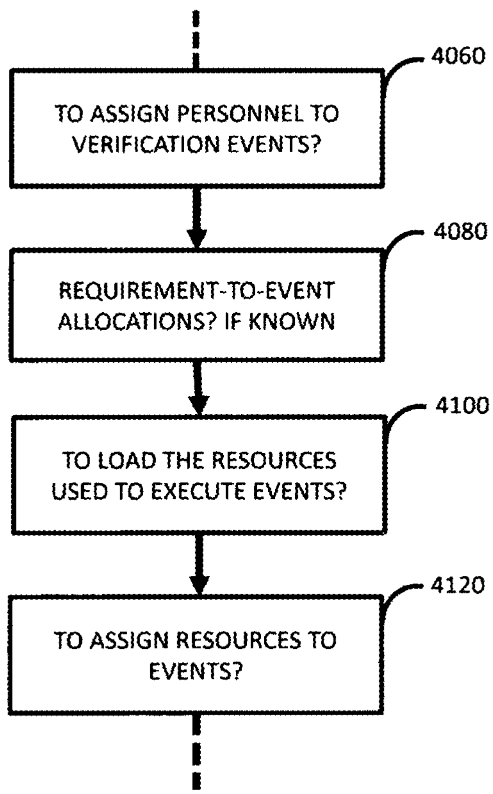

In FIG. 30C, in step 4060, assign personnel to verification events, in step 4080, specify requirement-to-event allocations, if known, in step 4100, if resources to execute events to be loaded, and in step 4120, if resources to be assigned to events.

Figure 30D:
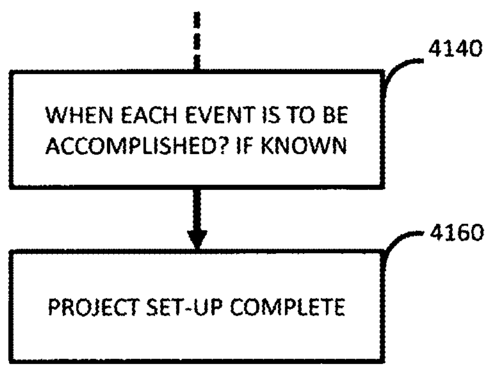

In FIG. 30D, in step 4140, to specify when (time frame) each event to be completed, if known and in step 4160, complete the project set up.

Figure 31A:
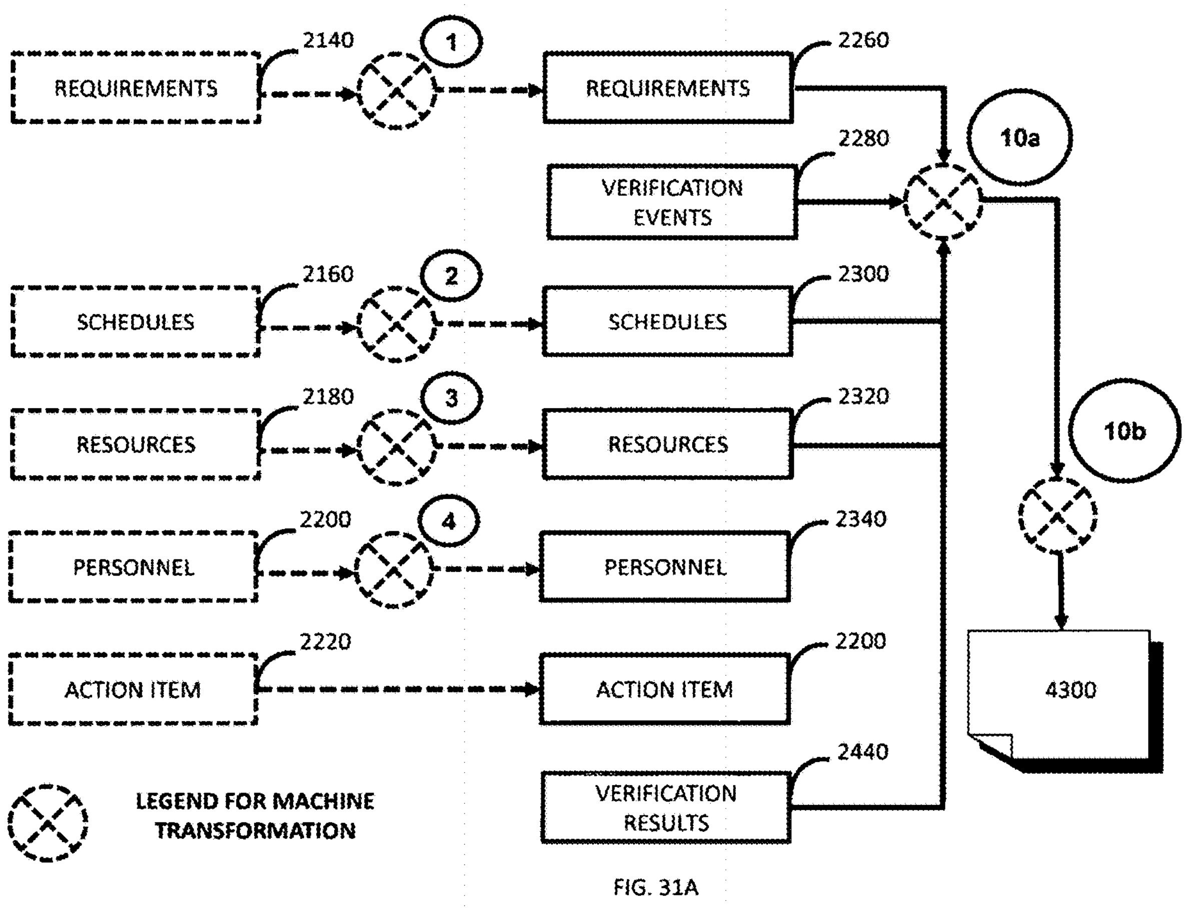
FIG. 31A describes requirements, schedules, resources and personnel before the machine transformation.

In FIG. 31A, requirements, schedules, resources and personnel are identified as 2140, 2160, 2180 and 2200 respectively before the machine transformation.

In FIG. 31A, requirements, schedules, resources and personnel are identified as 2260, 2300, 2320 and 2340 respectively after the machine transformation.

In FIG. 31A, action item, verification events and verification results are identified as 2220, 2280 and 2440 respectively.

Furthermore, FIG. 31A, incorporates various machine transformations, which are denoted as 1, 2, 3, 4, 10*a* and 10*b*.

The machine transformations denoted as 1, 2, 3 and 4 have been illustrated in the previous paragraphs.

Figure 31B:
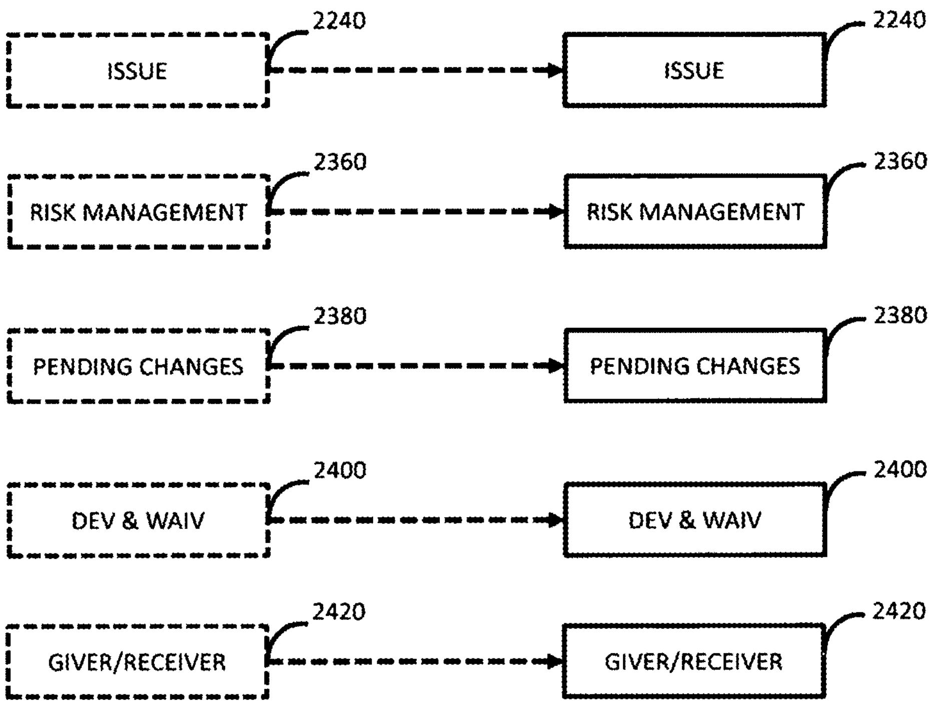
FIG. 31B describes risk management, pending changes, deviation and waiver ("dev & waiv"), giver/receiver and verification.

In FIG. 31B, issue, risk management, pending changes, dev & waiv, and giver/receiver are denoted by 2240, 2360, 2380, 2400 and 2420 respectively.

Figure 31C:
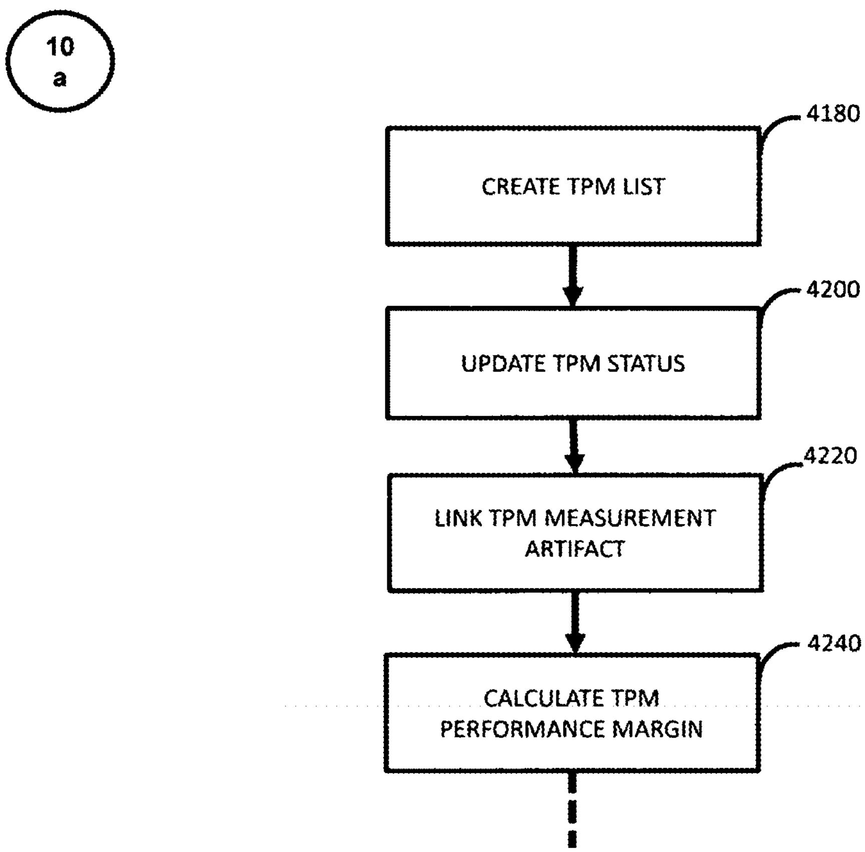
FIG. 31C describes the machine transformation, denoted as 10*a* (10*a* as in FIG. 31A). 10*a* denotes the first machine transformation of the verification event.

In FIG. 31C, in step 4180, create technical performance measure (TPM) list, in step 4200, update TPM status, in step 4220, link TPM measurement artifact and in step 4240, calculate TPM performance margin.

Figure 31D:
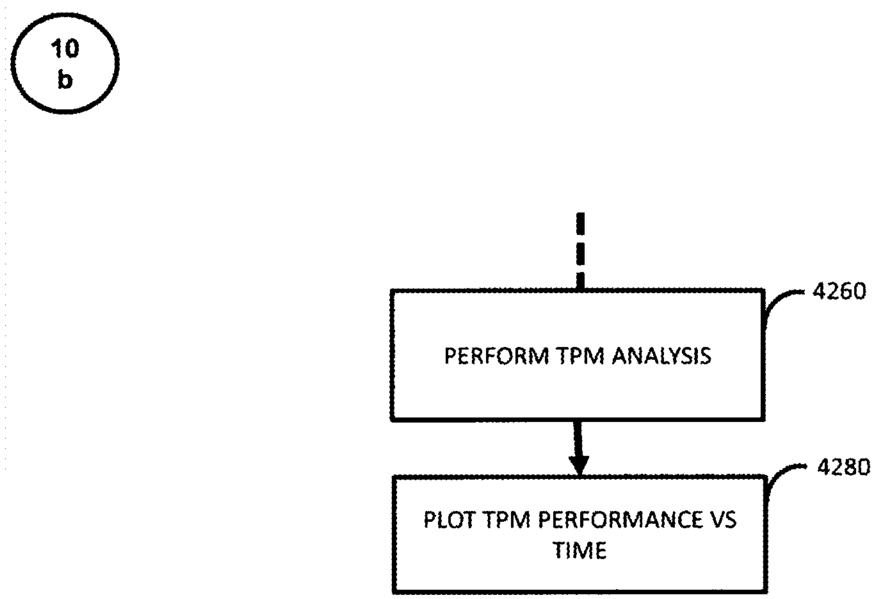
FIG. 31D describes the machine transformation, denoted as 10*b* (10*b* as in FIG. 31A). 10*b* denotes the second machine transformation of the verification event.

In FIG. 31D, in step 4260, perform TPM analysis and in step 4280, plot TPM performance versus time.

Figure 31E:
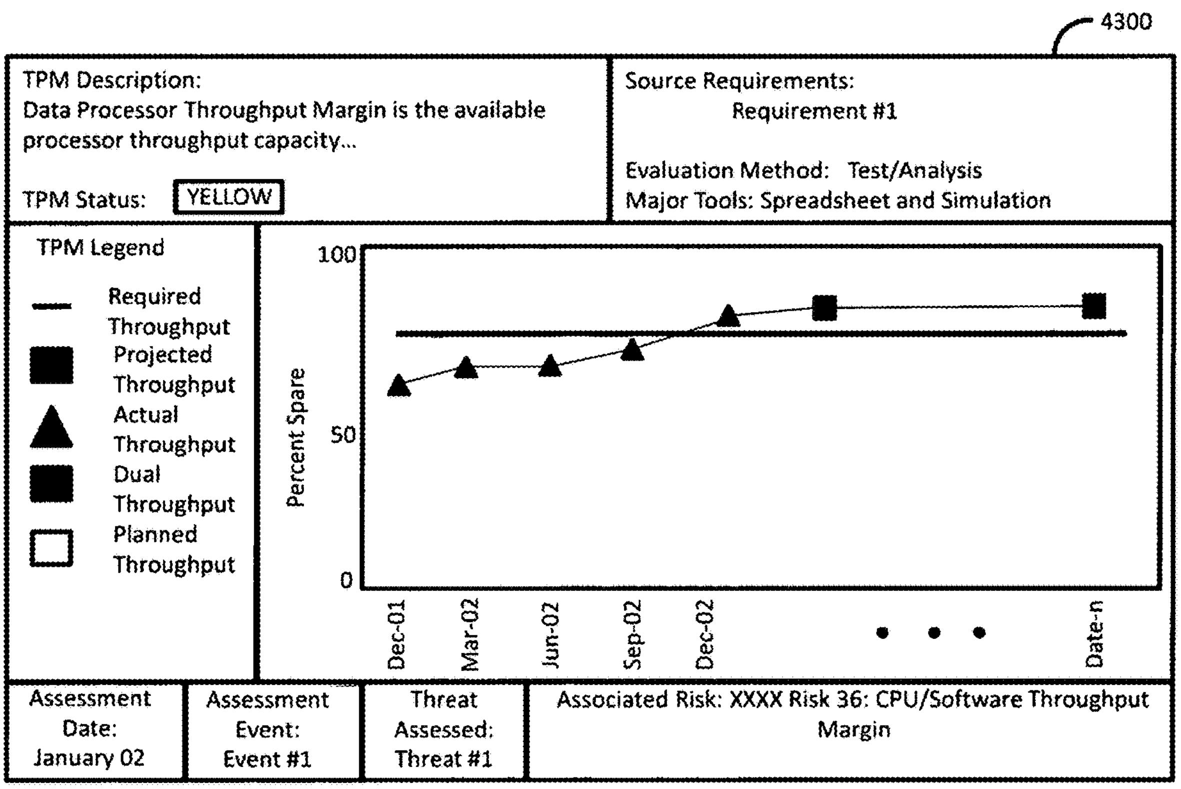
FIG. 31E describes the graphical output of the module 4300 (4300 as in FIG. 31A).

FIG. 31E illustrates module a 4300, which is an example output display of identified system and/or subsystem technical performance measures indicating compliance to technical attributes, tolerances and margins. Such an output display of identified system and/or subsystem technical performance measures is tracked over a specified time span.

Figure 32A:
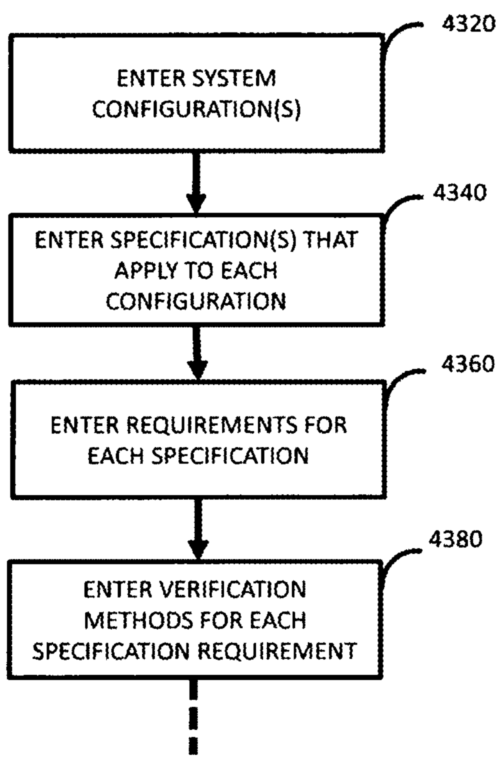
FIGS. 32A and 32B describe an example to establish a flowchart for the module 4300.

In FIG. 32A, in step 4320, enter system configuration(s), in step 4340, enter specification(s) that apply to each configuration, in step 4360, enter requirements for each specification and in step 4380, enter verification methods for each specification requirement.

Figure 32B:
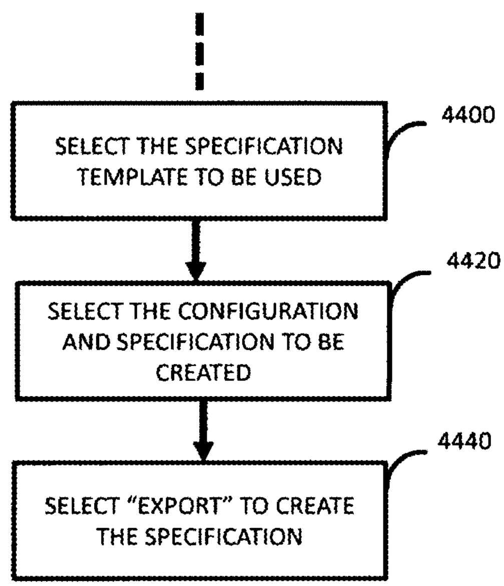

In FIG. 32B, in step 4400, select specification template to be used, in step 4420, select the configuration and specification to be created and in step 4440, select "export" to create the specification.

Figure 33A:
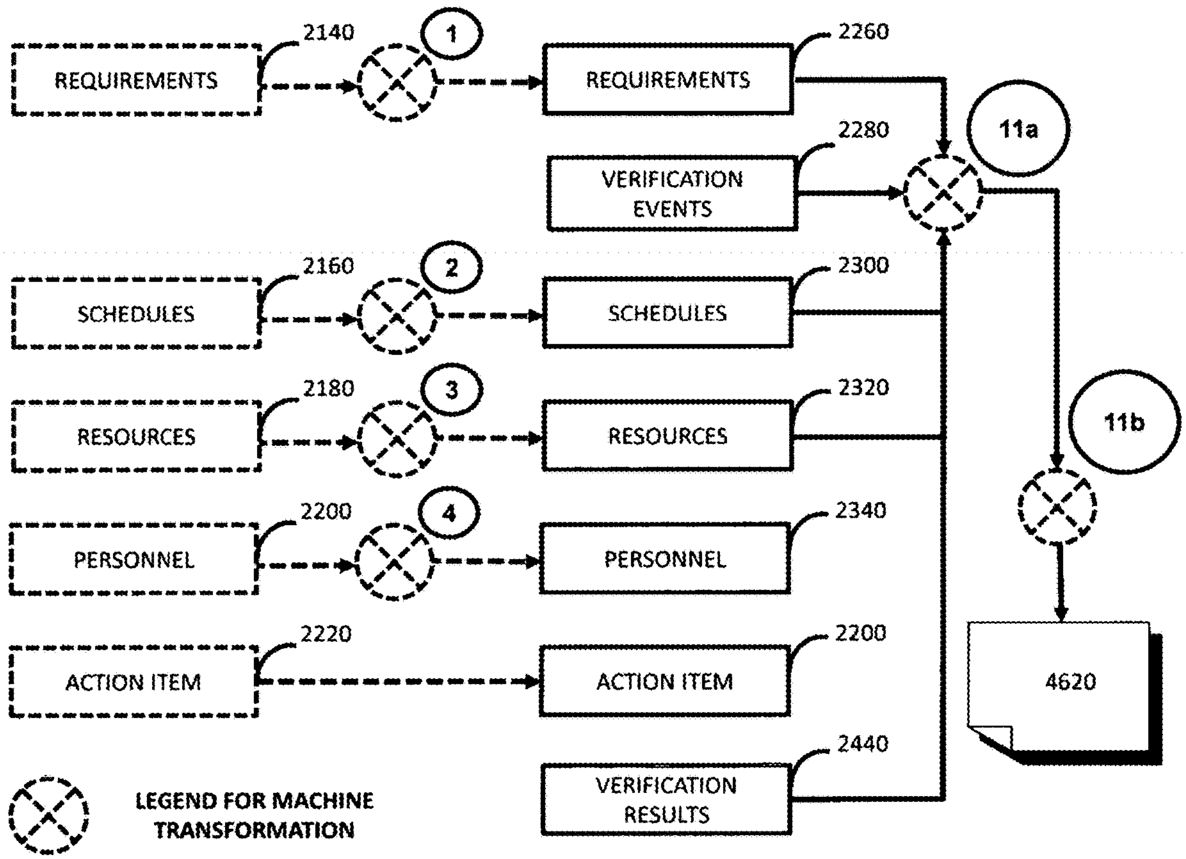
FIG. 33A describes requirements, schedules, resources and personnel before the machine transformation.

In FIG. 33A, requirements, schedules, resources and personnel are identified as 2140, 2160, 2180 and 2200 respectively before the machine transformation.

In FIG. 33A, requirements, schedules, resources and personnel are identified as 2260, 2300, 2320 and 2340 respectively after the machine transformation.

In FIG. 33A, action item, verification events and verification results are identified as 2220, 2280 and 2440 respectively.

Furthermore, FIG. 33A, incorporates various machine transformations, which are denoted as 1, 2, 3, 4, 11*a* and 11*b*.

The machine transformations denoted as 1, 2, 3 and 4 have been illustrated in the previous paragraphs.

Figure 33B:
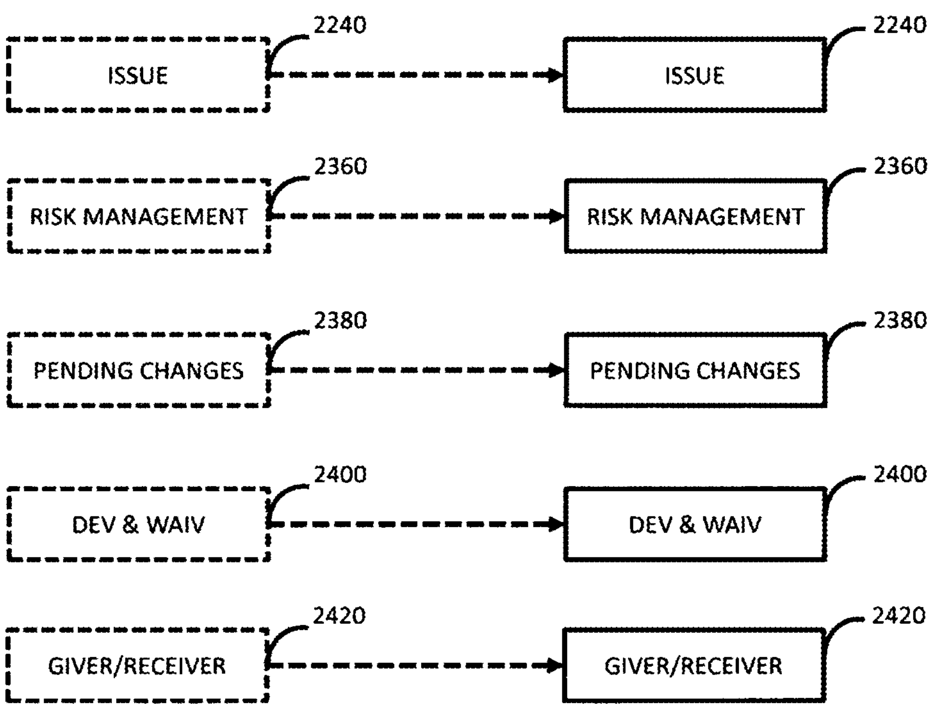
FIG. 33B describes risk management, pending changes, deviation and waiver ("dev & waiv"), giver/receiver and verification.

In FIG. 33B, issue, risk management, pending changes, dev & waiv, and giver/receiver are denoted by 2240, 2360, 2380, 2400 and 2420 respectively.

Figure 33C:
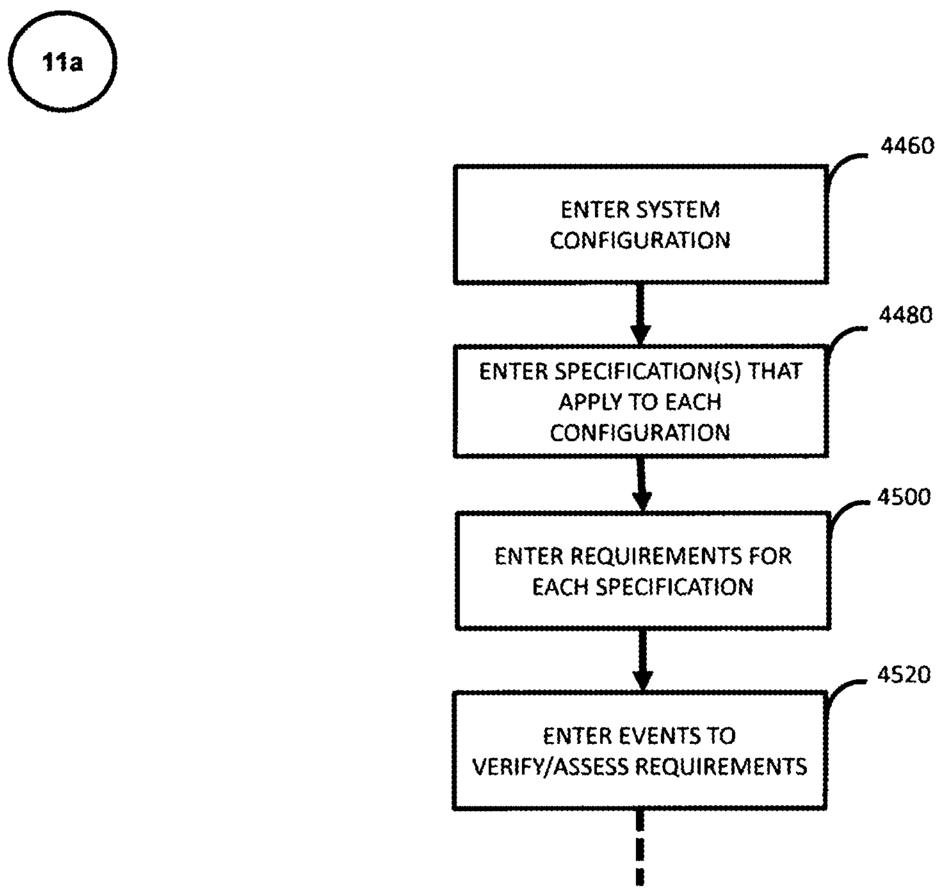
FIG. 33C describes the machine transformation, denoted as 11*a* (11*a* as in FIG. 33A). 11*a* denotes the first machine transformation of the verification event.

In FIG. 33C, in step 4460, enter system configuration, in step 4480, enter specification(s) that apply to each configuration, in step 4500, enter requirement for each specification and in step 4520, enter events to verify/assess requirements.

Figure 33D:
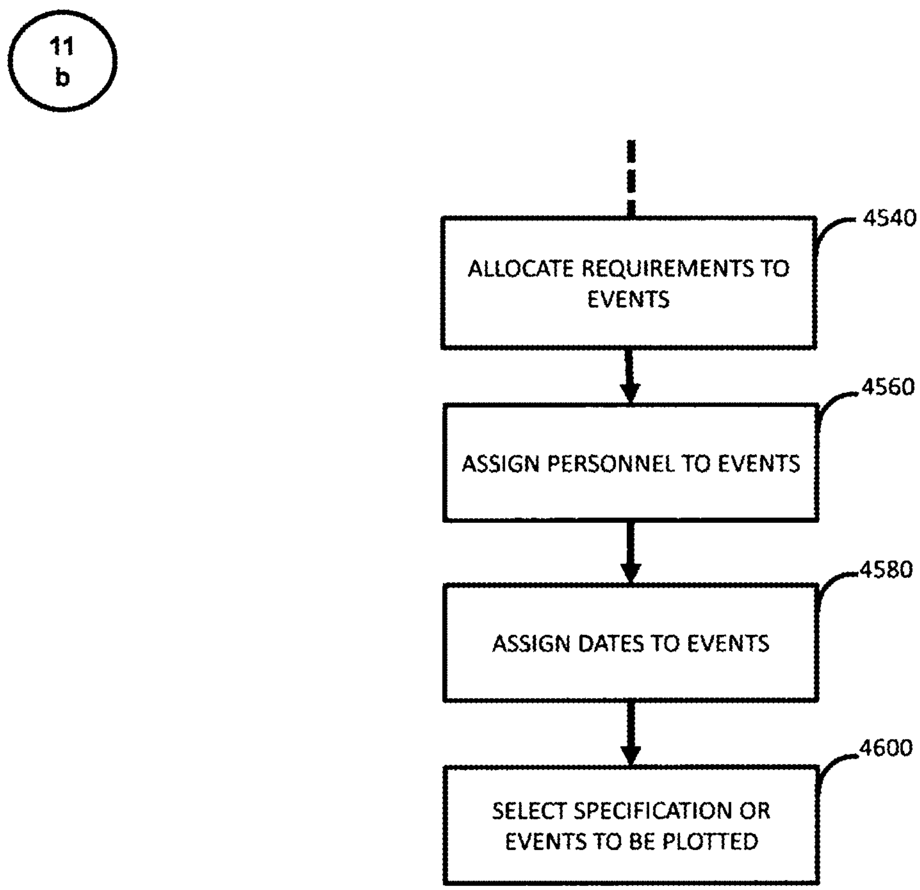
FIG. 33D describes the machine transformation, denoted as 11*b* (11*b* as in FIG. 33A). 11*b* denotes the second machine transformation of the verification event.

In FIG. 33D, in step 4540, allocate requirements to events, in step 4560, assign personnel to events, in step 4580, assign dates to events and in step 4600, select specification or events for plotting.

Figure 33E:
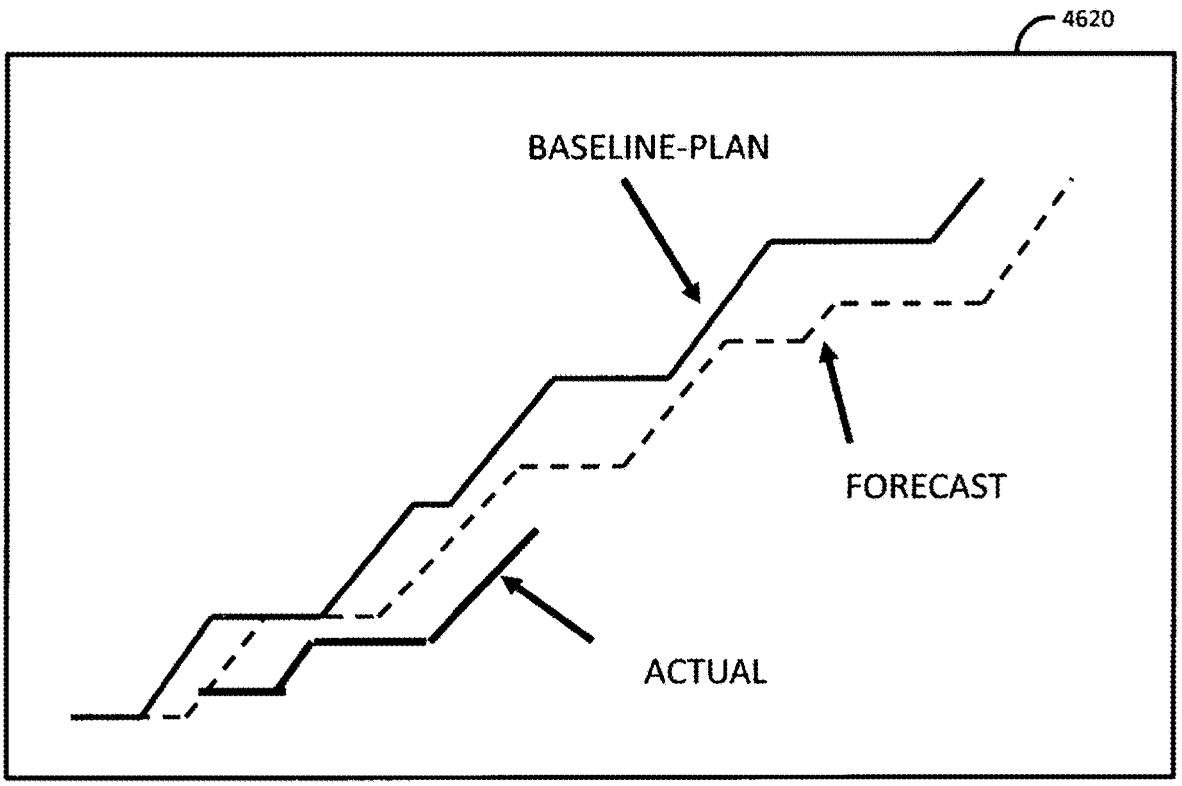
FIG. 33E describes the graphical output of the module 4620 (4620 as in FIG. 33A).

FIG. 33E illustrates a module 4620, which is an example output display metric of verification event-baseline plan vs. forecast vs. actual. Such a metric of verification event is tracked over a specified time span.

Figure 34A:
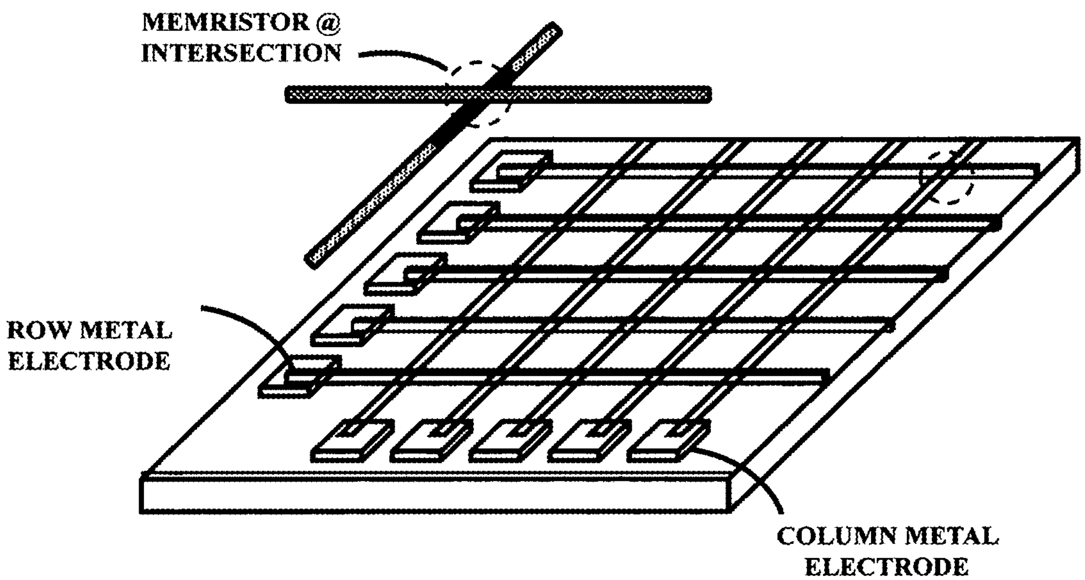
FIG. 34A describes memristors in a two-dimensional configuration.

FIG. 34A describes memristors in a two-dimensional configuration. Memristors are nano devices that remember information permanently, switch in nanoseconds, are super dense, and power efficient. That makes memristors potential replacements for DRAM, flash, and disk. Memristors can be dynamically configured on the fly to act as either memory or logic. With memristors some block can be memory or a switching network, or logic. Memristors integrated with processing elements (e.g., CMOS processing elements) can enable a hybrid CMOS-memristor reconfigurable logic.

Synapses and axons in a human brain are both effectively memristors. Memristors can mimic neurons and can enable learning or relearning based on neural networks without supervision.

Figure 34B:
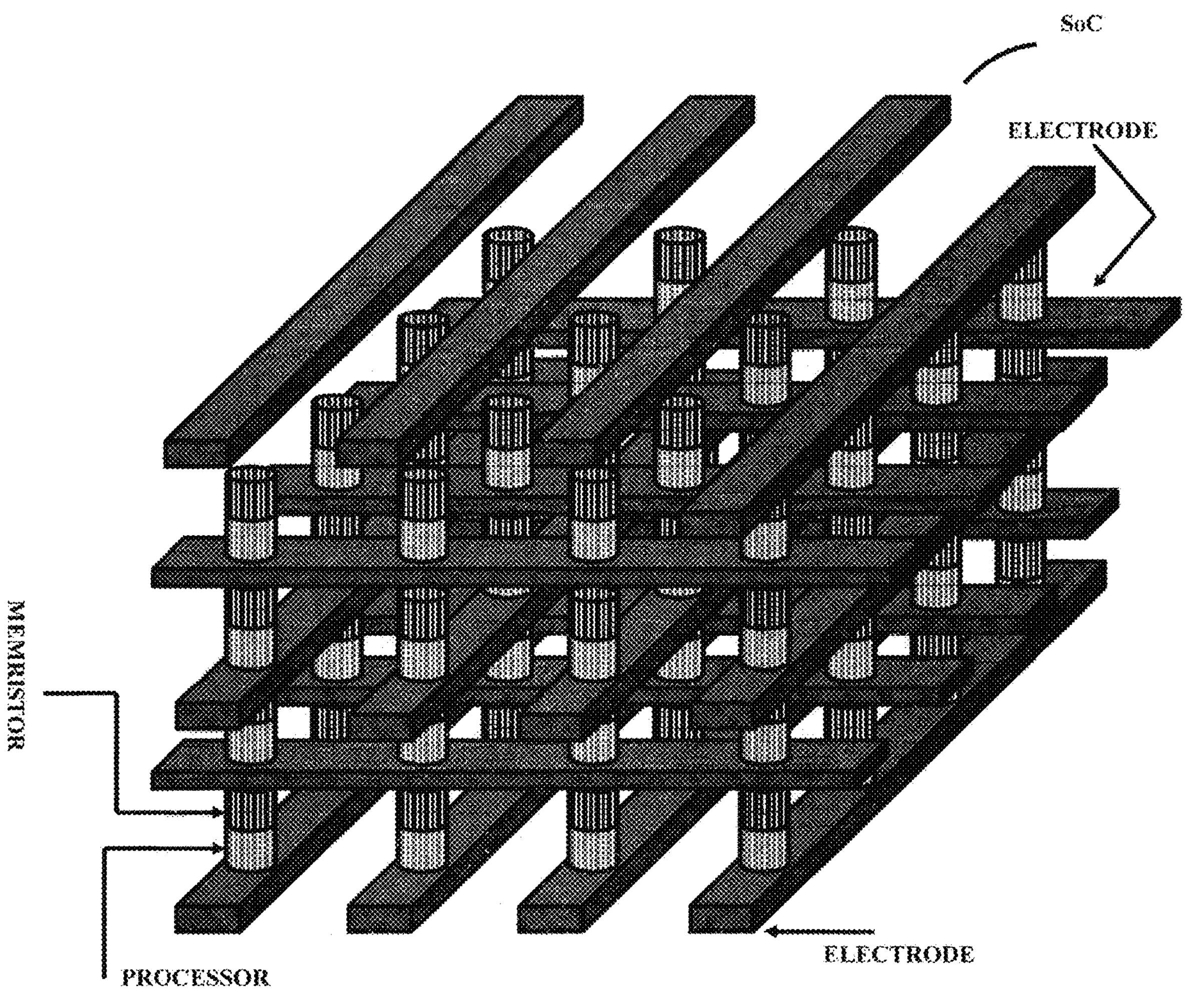
FIG. 34B describes system on chip of memristors and hardware processors in a three-dimensional configuration.

FIG. 34B describes a system on chip of memristors and hardware processors in a three-dimensional configuration for learning/relearning computer. This is an embodiment of a system on chip based on neural networks, wherein memristors and hardware processors are coupled electrically in a three-dimensional manner to enable learning (relearning) computer to store and process massive datasets (Big Data). Various embodiments of the system on chips have been described/disclosed in "SYSTEM ON CHIP (SOC) BASED ON NEURAL PROCESSOR OR MICROPROCESSOR, U.S. patent application Ser. No. 15/530,191 Filed on Dec. 12, 2016 and in "SYSTEM ON CHIP (SOC) BASED ON PHASE TRANSITION AND/OR PHASE CHANGE MATERIAL", U.S. Pat. No. 9,558,779, Issued on Jan. 31, 2017.

The system on chips can have Cog Ex machines/Machine OS, as an operating algorithm/system.

System on chips, optically interconnected can enable the learning (relearning) computer to store and process massive datasets. Furthermore, the system on chips (optically interconnected) based on neural networks and a machine learning algorithm(s)/artificial intelligence based algorithm(s)/neural networks based algorithm(s)/neuro-fuzzy logic based algorithm(s) can enable for supervised, unsupervised and semi-supervised learning.

The learning (or relearning) computer can have a chatbot interface(s) that can help train the learning (or relearning) computer to become smarter. The chatbot interface(s) can enable a user(s) to become more accustomed to interact with the learning (or relearning) computer. The chatbot interface(s) can be coupled with the learning (or relearning) computer.

The chatbot interface(s) can include dialogue systems (goal-oriented dialogue system/conversational dialogue system) or spoken dialogue systems, utilizing a natural language.

The chatbot interface(s) can include a smartbot interface(s). The smartbot interface(s) can do more, when powered by learning (or relearning) computer capabilities, such as image analysis, natural language processing/natural language understanding and text analytics. Thus, the smartbot interface(s) can understand concepts in a sentence, identify objects within an image and extract entities and sentiment in a given text.

The smartbot interface(s) can be coupled with natural language processing/natural language understanding to enable Sentiment Analysis, (For example, "I really liked USC football game from last week. Looking forward to the next one" is positive with a 95% score)

Entity Extraction, (For example, extracting useful information from the text, places, people (names), companies and phone numbers, etc.)

Concept Extraction (based on data mining/text mining),

Speech Recognition,

Graph Analysis, (For example, a user can ask to the smartbot interface(s): "I'm new in New York. What are interesting attractions in New York?")

Anomaly Detection,

Predictive Analysis, (For example, the smartbot can store all past sales data of customers, regions, products, time of sale. Once it has enough data it can use it to perform predictions for potential successful sales).

Image Recognition,

Geo Analysis.

It should be noted that a machine learning algorithm(s)/artificial intelligence based algorithm(s)/neural networks based algorithm(s)/neuro-fuzzy logic based algorithm(s) can be self-learning/relearning.

Additionally, a machine learning algorithm(s)/artificial intelligence based algorithm(s)/neural networks based algorithm(s)/neuro-fuzzy logic based algorithm(s) can be coupled/integrated with an algorithm(s) (e.g., topological data analysis (TDA) or clustering algorithms) to analyze a massive set of data (e.g., Big Data).

Topological data analysis (TDA) is an approach to the analysis of a large volume of data, utilizing techniques from topology (e.g., shape of datasets). Topological data analysis (TDA) can enable the geometric features of a large volume of data, utilizing topology Extraction of information from a large volume of data that is high-dimensional, incomplete and noisy is generally challenging. But, topological data analysis (TDA) provides a general framework to analyze a large volume of data in a manner that is insensitive to the particular metric chosen and provides dimensionality reduction and robustness to noise. One of the advantages of topological analysis is low dimensional representation of higher dimensional connectivity.

Topological data analysis (TDA) coupled/integrated with a machine learning algorithm(s)/artificial intelligence based algorithm(s)/neural networks based algorithm(s)/neuro-fuzzy logic based algorithm(s) can enable to spot/analyze/learn (a) patterns in a large volume of data (that would have been impossible to identify using traditional statistical methods), (b) segments in a large volume of data on many levels, (c) texts, images and sensors' data, (d) complex dependencies in a large volume of data without a supervision Clustering algorithms are powerful meta-learning tool to accurately analyze a large volume of data. In particular, they can be utilized to categorize data into clusters such that objects, which are grouped in the same cluster when objects are similar according to specific metrics.

Furthermore, game theory is an excellent tool to integrate with requirement, compliance and resource management algorithm, at least for accounting for conflict in the requirement input data or compliance input data.

A project can be conceived as a single continuum or recurring negotiations with multiple participants with varying concerns. Game theory can be classified into two categories: (a) non-cooperative game, where a decision-making unit treats the other participants as competitors and (b) a cooperative game, where a group of decision-making units decide to undertake a project together in order to achieve their shared business objectives.

In game theory, individuals/groups/units become players, when their respective decisions coupled with the decisions made by other players, produce an outcome/output. The options available to players to bring about particular outcomes are called as strategies, which are linked to outcomes/outputs by a mathematical function that specifies the consequences of the various combinations of strategy choices by the all players in a game. A coalition refers to the formation of sub-sets of players' options under coordinated strategies. In game theory, the core is the set of feasible allocations that cannot be improved upon by a coalition. An imputation $X=\{x_1, x_2 \ldots x_n\}$ is in the core of an n-person game if and only if for each subset, S of N:

$$\sum_{i=1}^{n} x_i \geq V(S)$$

where V(s) is the characteristic function V of the subset S indicating the amount (reward) that the members of S can be sure of receiving, if they act together and form a coalition (or the amount of S can get without any help from players who are not in S). Above equation states that an imputation x is the core (that X is undominated), if and only if for every coalition S, the total of the received by the players in S (according to X) is at least as large a V(S). The core can also be defined by the equation below as the set of stable imputations:

$$C:\left\{x = (x_1, \ldots, x_n): \sum_{i \in N} x_i = V(N) \text{ and } \sum_{i \in S} x_i \geq V(S), \forall S \subset N\right\}$$

The imputation x is unstable through a coalition S, if the equation below is true, otherwise is stable.

$$V(S) > \sum_{i \in S} x_i$$

The core can consist of many points. The size of the core can be taken as a measure of stability or how likely a negotiated agreement is prone to be upset. To determine the maximum penalty (cost) that a coalition in the network can be sure of receiving, the linear programming problem represented by the equation below can be used, when maximize $x_1+x_2+x_3+\ldots+$ $$\sum_{i=C} x_i \leq V(C) \forall C \subset N$$

subject to $(x_1, x_2, \ldots, x_n) \geq 0$

Thus, as outlined above, a game theory based algorithm can account for any conflict in the requirement input data or compliance input data.

A blockchain is a global distributed ledger/database running on millions of devices and open to anyone, where not just information, but anything of value. In essence it is a shared, trusted public ledger that everyone can inspect, but which no single user controls. A blockchain creates a distributed document of (outputs/transactions) in a form of a digital ledger, which can be available on a network of computers. When a transaction happens, the users propose a record to the ledger. Records are bundled into blocks (groups for processing) and each block receives a unique fingerprint derived from the records it contains. Each block includes the fingerprint of the prior block, creating a robust and unbreakable chain. It's easy to verify the integrity of the entire chain and nearly impossible to falsify historic records. In summary, blockchain is a public ledger of transactions, which critically provides trust, based upon mathematics rather than human relationships/institutions.

Public blockchain: a public blockchain is a blockchain that anyone in the world can read, anyone in the world can send transactions to and expect to see them included if they are valid, and anyone in the world can participate in the consensus process—the process for determining what blocks get added to the chain and what the current state is.

Consortium blockchain: a consortium blockchain is a blockchain where the consensus process is controlled by a pre-selected set of nodes. For example, one might imagine a consortium of 20 units (e.g., companies), each of which operates a node and of which 20 must sign every block in order for the block to be valid. The right to read the blockchain may be public, or restricted to the participants, and there are also hybrid routes such as the root hashes of the blocks being public together with an API that allows members of the public to make a limited number of queries and get back cryptographic proofs of some parts of the blockchain state. These blockchains may be considered "partially decentralized".

Private blockchain: a private blockchain is a blockchain where write permissions are kept centralized to one organization. Read permissions may be public or restricted to an arbitrary extent. Likely applications include database management, auditing, etc internal to a single company, and so public readability may not be necessary in many cases at all, though in other cases public auditability is desired.

A public blockchain or a consortium blockchain or a private blockchain is an excellent tool for compliance and it can be integrated with the requirement, compliance and resource management algorithm, utilizing an application programming interface, at least for:

- a requirement or a requirement input data from a data source or an inputting device,
- a compliance input data from a data source or an inputting device,
- a resource (e.g., a hardware resource, a software resource, a human resource and a financial resource),
- a distributed document (e.g., the specification output) and its past revisions, which are generated by the requirement, compliance and resource management algorithm.
- Public blockchains could potentially be compared to the internet, where organizations/users could exchange and retrieve information with anyone who has access to a service provider. Whereas private chains could be compared to organizations intranet pages, where information is only shared and exchanged internally with those who have been authorized to access the site.

Public blockchains could potentially be compared to the internet, where organizations/users could exchange and retrieve information with anyone who has access to a service provider.

Private blockchains could be compared to organizations intranet pages, where information is only shared and exchanged internally with those who have been authorized to access the site.

Application to Cyber Security Utilizing the Disclosure in Previous Paragraphs Cyber crime costs are projected to reach $2 Trillion by 2019. General causes of Cyber crime (attack) are listed below:

Vulnerability
- Careless/Unaware Employees
- Related to Cloud Computing
- Related to Mobile Computing
- Related to Social Media
- Outdated Information Security Controls/Architecture
- Unauthorized Access Threat
- Cyber Attack To Steal Intellectual Property
- Cyber Attack to Steal Financial Data
- Cyber Attack to Deface an Organization
- Distributed Denial of Service (DDoS)
- Espionage
- Fraudulent Spam
- Natural Disaster
- Phishing
- Malware (e.g., Viruses, Worms & Trojan Horses)

Several strategies and algorithms as shown below can be coupled to enhance Cyber security:

- Hardening Firewalls (e.g., may include closing any unused ports, disabling unused protocols and removing inactive user accounts and/or prevent traffic from entering a network that should not be there at the first place and/or maintain the highest level of security-denying all traffic by default, then inspect data flow and enable services as needed)
- High-Level Security Implementation (e.g., Two-Factor Authorization and/or ATM Card, Temporary Pass Code to an authorized user's mobile number/email).
- Biometric Security Implementation (e.g., Fingerprint, Voice Print, Facial Recognition, Iris Scan).
- Hardware Authentication (e.g., baking authentication into the user's hardware. Downloading an app onto the user's phone and then verifying for the phone's Bluetooth signal to verify the user's computer location with respect to Bluetooth signal).
- Log-in Limits (e.g., authorized user's log-in can be limited to number of sessions per day).
- Monitoring Incoming/Outgoing Network Traffic & User Log-ins.
- Data Encryption (e.g., encryption keys with public/private key infrastructure can be Lattice based or Multivariate based or Hash based or Coding based or never repeating pattern, and they are generally quantum computing resistant cryptography).
- Real-time Redundant of backing up of data.
- Endpoint Detection and Response (EDR) (e.g., typically record numerous endpoint and network events and store the information locally or in a centralized database. Databases of known indicators of network compromise. Behavior analytics and machine-learning (and neural network based deep learning techniques can used to continuously search the data for the early identification of breaches, including insider threats and to rapidly respond to those attacks.)
- User/Entity Behavioral Analytics (UEBA) (e.g., it provides user-centric analytics around user behavior, but also around other entities such as endpoints, networks and applications. The correlation of the analyses across various entities makes the analytics' results more accurate and threat detection more effective).
- Microsegmentation/Network Traffic Flow Visibility (e.g., microsegmentation (more granular segmentation) of network traffic. Visualization tool can enable operations and security administrators to understand flow patterns, set segmentation policies and monitor for deviations.
- Remote Browser (e.g., Most Cyber attacks start by targeting end-users with malware delivered via email, URLs and/or malicious web sites. A browser session from a browser server running on-premises or delivered as a cloud-based service. By isolating the browsing function from the rest of the endpoint and network, malware is kept off of the end-user's system and by shifting the risk of attack to the server sessions, which can be reset to a known good state on every new browsing session, tab opened or URL accessed.
- Remote Browser Coupled With An Array of Memristors (Furthermore, server sessions can be coupled with unclonable (even by machine learning algorithm) and unpredictable/random output state(s) of a 100×100 crossbar device of including an array of memristors (wherein each memristor can respond to applied voltage/current and remember its state of resistance based on its history of applied voltage/current).
- Deception (Deception technologies are defined by the use of deceits and/or tricks designed to thwart, or throw off an attacker's automation tools, delay an attacker's activities or disrupt breach progression. For example, deception capabilities create fake vulnerabilities, systems, shares and cookies).

In U.S. NIST Special Publication 800-171 dated Dec. 31, 2017, will regulate the protection of the Controlled Unclassified Information (CUI) in non-federal information systems and organizations.

Over in Europe, the General Data Protection Regulation (GDPR) will ensure organizations worldwide that handle information relating to European citizens regarding what data they have, where it is stored and who is responsible for it. These, along with stricter penalties for non-compliance, will require businesses to upgrade their data privacy controls.

Organizations generally use a combination of Antivirus Software and Data Loss Prevention (DLP) tools to Security Information and Event Management (SIEM) Software in an attempt to reduce data breach risk. Security Information and Event Management can generate a large volume of data, thus making it hard to spot immediate breach.

Insider privilege misuse has been the major source of security breaches, as outside threats. An algorithm of the User and Entity Behavior Analytics (UEBA) (in real-time/near real-time) can enable spotting the immediate data breach.

An algorithm of the Continuous Risk and Trust Assessment (CRTA) (in real-time/near real-time) can enable assessment of risk and trust. An example is to grant extended access rights to users, wherein the previous patterns of behavior on the network have been carefully by verified by the User and Entity Behavior Analytics to show they present minimal risk.

For the Cyber security, a learning algorithm (including deep learning), or a quantum learning algorithm (including deep learning) can learn and/or adopt regarding suspicious virus codes and/or create various combinations and permutations of the said suspicious virus codes to immunize (similar to antigen-antibody in biological system) the enterprise network for active compliance, before any Cyber attack in real-time/near real-time.

Generally, a quantum learning algorithm can be designed on an error-prone quantum computer or on a traditional Moore's law based computer, coupled with an error-prone quantum computer (for example, as illustrated in FIGS. 34C-34F) by QISKit program.

A deep learning (neural network) algorithm combines multiple nonlinear processing layers, using simple elements operating in parallel and inspired by biological nervous systems. It consists of an input layer, several hidden layers and an output layer. The layers are interconnected via nodes or neurons, with each hidden layer using the output of the previous layer as its input.

It should be noted that a learning algorithm (including deep learning), or a quantum learning algorithm (including deep learning) can be self-learning/relearning. A learning algorithm (supervised or unsupervised) enables the clustering and analysis of colossal volumes of data that would be otherwise impossible to do using traditional means. The learning algorithm (supervised or unsupervised) is needed to be trained using correctly labeled emails to properly identify a spam from legitimate emails.

Additionally, a learning algorithm (including deep learning), or a quantum learning algorithm (including deep learning) can be coupled/integrated with a topological data analysis (TDA) or a clustering algorithms to analyze a massive set of data (e.g., Big Data). Topological data analysis (TDA) is an approach to the analysis of a large volume of data, utilizing techniques from topology (e.g., shape of datasets). Topological data analysis (TDA) can enable the geometric features of a large volume of data, utilizing topology Extraction of information from a large volume of data that is high-dimensional, incomplete and noisy is generally challenging. But, topological data analysis (TDA) provides a general framework to analyze a large volume of data in a manner that is insensitive to the particular metric chosen and provides dimensionality reduction and robustness to noise. One of the advantages of topological analysis is low dimensional representation of higher dimensional connectivity.

A learning algorithm (including deep learning), or a quantum learning algorithm (including deep learning) can be integrated or coupled with a semantic web and/or blockchain, and/or hardware authentication to reduce any Cyber security risk.

Furthermore, a learning algorithm (including deep learning), or a quantum learning algorithm (including deep learning) can be integrated or coupled with one or more software agents, wherein the one or more software agents are coupled to search through Internet to discover any potential Cyber security risk. The software agent can be coupled with the learning computer.

In some cases, one option could be shutting down the entire enterprise network, until the risk/threat is fully examined in real-time/near real-time.

Active compliance is based on a principle of: "activate-anticipate-act" in constant motion with/without the active detection.

Furthermore, with a blockchain technology, data can be stored in a decentralized and distributed manner. Instead of residing at a single location, data can be stored in an open source distributed ledger. In order to make updates to a particular piece of data, the owners of that data must add a new block of the data on top of the previous block of the data, creating a specific chain or sequence of codes. Thus, every single alteration or change to any piece of data is tracked and no data is lost or deleted because participants in blockchain can always look at previous versions of a block to identify what is different in the latest version. This distributed record-keeping can detect blocks that have incorrect or false data, preventing loss, damage and corruption. Thus, it renders mass data hacking or data tampering much more difficult, because all participants in the blockchain (network) can see that the ledger had altered in some way in real-time/near real-time. Thus, a blockchain can enable security of sensitive information.

With regards to data immutability, it is important to consider how a blockchain can fit side by side with the data privacy laws—the right to be forgotten in a blockchain technology, wherein the blockchain technology guarantees that nothing will be erased is a challenge, but there are at least two (2) solutions.

One solution is to encrypt the personal information written in the system to ensure that, when the time comes, forgetting the keys will ensure that sensitive information is no longer accessible.

Another solution is to focus on the value of blockchain to provide unalterable evidence by writing the hash of transactions to it, while the transactions themselves can be stored outside of the system. This maintains the integrity of transactions, while enabling the ability to erase the transactions, leaving only traces of forgotten information in the blockchain.

Blockchains do not have a single point of failure, which highly decreases the chances of a Cyber attack disrupting a normal operation. If one node of a network is taken down by Cyber attack, the data is still accessible/available via other nodes within the network, since all of them maintain a full copy of the data at all times. However, multiple verification protocols are needed to increase the trust in the integrity of the data, entering the blockchain. If an attacker gains access to a blockchain, then it does not necessarily mean the attacker can read or retrieve the data blocks.

It is possible for businesses may make blockchain corporately visible within their organization to see every transaction taking place. The blockchain can detect suspicious online behavior and isolate the connection, giving the user of the suspicious online behavior restricted access, until the transaction(s) of the user of the suspicious online behavior has sanctioned by the IT security team. Essentially, blockchain becomes the implementer of the zero trust policy. It can assist in forensic investigations. For example, an organization that had confidential intellectual property stolen can take their immutable blockchain to court and prove that an unauthorized person extracted/copied a set of data.

At the heart of blockchain, there is

Distributed data storage,

Cryptographic security that protects that storage from unauthorized modification, and Synchronized, consensus-based third-party validation on every recorded transaction.

Basically, when a transaction is executed through blockchain, it's grouped together in a block with all other transactions that recently occurred. In order for these transactions to be finalized, they must be validated by more than 50% of the systems within the blockchain's network. Once that validation is complete, the block is time stamped and linked to the rest of the chain. Every ledger in the network is continually updated, so that no participant in the blockchain has incorrect information—and everyone with the proper access can see each transaction dating back to the time of the chain's creation.

Blockchain platforms break many of the flaws associated with traditional network security. It relies on cryptographic data structures instead of failure prone secrets. This in turn offers foundations on which to add security protocols. And lastly, it uses algorithmic consensus mechanisms. Such properties render them fault tolerant and able to align the efforts of honest nodes to ignore fraudulent ones. When combined, these properties allow system designers to rethink and redesign the fundamental architectures of Cyber networks and systems.

From a Cyber security perspective, with blockchain technology, there's no middleman that could potentially serve as a source of leaks or compromised data. Digital certificates can keep every transactional participant completely anonymous and a private-public key mechanism coupled with powerful cryptographic algorithms can keep everything secure.

Full encryption of the data blocks can be applied to data being transacted, effectively guaranteeing its confidentiality, considering the latest encryption standards are followed.

Public key infrastructure (PM) can authenticate and authorize parties and encrypt their communications. Public key infrastructure is a set of rules, policies, and procedures required to create, manage, use, store and revoke digital certificates and manage public-key encryption.

Furthermore, a cryptographic algorithm, used for public/private key generation generally relies on integer factorization problems, which are hard to break with current computing power.

Using encryption keys with public key infrastructure can provide a higher level of security. However, advances in quantum computing will become significant for the security of blockchain due to their impact on the cryptographic algorithm.

However quantum computers can simultaneously process exponentially larger numbers of calculations than today's classical computers are capable of, enabling them to solve previously intractable problems and further challenges the status quo of public security infrastructure.

Current strategies for sharing encryption keys rely on the difficulty in factoring a large multiplication back into its prime constituents, a problem that is beyond the reach of classic computers in a reasonable time frame. A quantum computer can crack this mathematical challenge quickly, making public key infrastructure (the process of sharing keys) insecure.

Encryption keys with public key infrastructure can be Lattice based or Multivariate based or Hash based or Coding based or never repeating pattern, and they are generally quantum computing resistant cryptography.

Encrypting data on a blockchain can provide a higher level of protection from a data confidentiality and data access control perspective. A blockchain can also bring a new paradigm to software development such as, implementing secure coding and security testing. Furthermore, a blockchain can bring secure intermediate coupling between two Internet connected devices or Things (IoT), enabling an executable trustworthy smart contract.

Public blockchains could potentially be compared to the internet, where organizations/users could exchange and retrieve information with anyone who has access to a service provider. Whereas private chains could be compared to organizations intranet pages, where information is only shared and exchanged internally with those who have been authorized to access the site.

Key characteristics of a blockchain powered Cyber security are listed below:

Transparency: One of the potentially biggest transformations to Cyber security to come from blockchain technology is that of transparency. The distributed nature of distributed blockchain ledgers means that no one administrative agency has a master copy; everybody with access to it can see the same transactions and no one can change or alter entries in it. This is itself can and does work as a deterrent for Cyber crime as, if people are aware that their actions will be permanently and unalterably logged within the blockchain, they would be less likely to indulge in behaviors that would be seen as unethical or illegal.

Data. Integrity: Another benefit of blockchain technology within Cyber security is data integrity. Given the transparency that blockchain technologies bring, users can trust that the data they are seeing and using is quality data that hasn't been tampered or interfered with in anyway. Solutions such as keyless signature structure (KSS) work by storing hashes of original content on the blockchain network itself ensuring that appropriate encryption has taken place. These kinds of solutions could have far reaching implications for Cyber security systems that utilise operations such as change-auditing and fine-grained authorization, enabling object level security.

Decentralization: As with many facets of technology nowadays, blockchain technologies decentralize typically centralized infrastructures. In this regard, the breach of a single terminal by a hacker looking for sensitive or personally identifiable information (PII) won't compromise the data as it would be stored across various different encrypted nodes and blocks. One of the major flaws of domain name services systems is their over-reliance on caching, this in term leaves them open to distributed denial of service (DDoS) attacks. With blockchain technologies in place, a decentralized distributed database would be much more of a challenge for hackers to disrupt.

The application of "System and Method of a Requirement, Compliance and Resource Management" can be applied to Active Compliance of Cyber Security, utilizing a learning computer system, wherein the learning computer system comprises: a premise computer system, a mobile computer system and a cloud computer system, wherein the learning computer system further comprises: one or more hardware processors or system on chips based on neural networks, in communication with a non-transitory computer readable medium, wherein the non-transitory computer readable medium stores one or more software modules, including step-by-step instructions for the method of requirement, active compliance, active detection and resource management algorithm for Cyber security, one or more learning algorithms and/or quantum learning algorithms that are executable by the one or more hardware processors or system on chips based on neural networks, wherein the one or more learning algorithms and/or quantum learning algorithms are coupled with learning and/or adoption and/or data analysis in any (potential) Cyber security risk in real-time or near real-time, wherein the method of requirement, active compliance, active detection and resource management algorithm comprises: steps (a), (b) and (c), at least in an ordered manner or an ordered sequence, (a) an algorithm or a set of step-by-step instructions for a user behavior, or an entity behavior, (b) an algorithm or a set of step-by-step instructions for a deceptive network credential in real-time or near real-time and (c) an algorithm or a set of step-by-step instructions for a continuous risk, or trust assessment of cyber security in real-time or near real-time, wherein the method of requirement, active compliance, active detection and resource management algorithm of cyber security is coupled with hardware authentication to reduce any risk of cyber security, wherein the method of requirement, active compliance, active detection and resource management algorithm of cyber security is further coupled with a semantic web or an algorithm or a set of step-by-step instructions for analysis of a large set of data.

The above method can further interface with an algorithm or a set of step-by-step instructions for (contextual) data analysis of a large set of data in real-time or near real-time.

The above method can further couple with a neuro-fuzzy logic algorithm or a set of step-by-step instructions to account for inexactness of (contextual) data analysis.

The above method can further interface with a set of encrypted data blocks in real-time or near real-time.

The above method can further couple with one more software agents (coupled with the learning computer) to search the Internet for Cyber security risk in real-time or near real-time.

The above method can further couple with a remote browser to reduce any risk of cyber security.

The above method can further couple with a physical un-clonable function device (PUFD) to reduce any risk of cyber security, wherein the physical un-clonable function device comprises one or more memristors.

The above method can further couple with a blockchain to reduce any risk of cyber security.

The above method can further couple with a quantum computing resistant cryptosystem.

Alternatively, the application of "System and Method of a Requirement, Compliance and Resource Management" can be applied to Active Compliance of Cyber Security, utilizing a learning computer system, wherein the learning computer system comprises: a premise computer system, a mobile computer system and a cloud computer system, wherein the learning computer system further comprises: one or more hardware processors or system on chips based on neural networks, in communication with a non-transitory computer readable medium, wherein the non-transitory computer readable medium stores one or more software modules, including step-by-step instructions for the method of requirement, active compliance, active detection and resource management algorithm for Cyber security, one or more learning algorithms and/or quantum learning algorithms that are executable by the one or more hardware processors or system on chips based on neural networks, wherein the one or more learning algorithms and/or quantum learning algorithms are coupled with learning and/or adoption and/or data analysis in any (potential) Cyber security risk in real-time or near real-time, wherein the method of requirement, active compliance, active detection and resource management algorithm comprises: steps (a), (b), (c), (d), (e) and (f), at least in an ordered manner or an ordered sequence, (a) a compliance requirement input collection algorithm or a set of step-by-step instructions for collecting compliance of cyber security or a compliance input data of cyber security from a data source or an inputting device, (b) a verification algorithm or a set of step-by-step instructions for verifying the compliance input data of cyber security or the compliance of cyber security, (c) a neuro-fuzzy logic algorithm or a set of step-by-step instructions for accounting for inexactness of the compliance input data of cyber security, or the compliance of cyber security, (d) an algorithm or a set of step-by-step instructions for a user behavior or an entity behavior, (e) an algorithm or a set of step-by-step instructions for assigning a deceptive network credential in real-time or near real-time and (f) a traceability generation algorithm or a set of step-by-step instructions for tracing the compliance input data of cyber security or the compliance of cyber security, wherein the method of requirement, active compliance, active detection and resource management algorithm of cyber security is interfacing with a set of encrypted data blocks or an algorithm or a set of step-by-step instructions for analysis of a large set of data.

The above method can further couple with a remote browser to reduce any risk of cyber security, wherein the remote browser can couple with a physical un-clonable function device (PUFD) to reduce any risk of cyber security, wherein the physical un-clonable function device comprises one or more memristors.

The above method can further couple with a semantic web to reduce any risk of cyber security.

The above method can further couple with a blockchain to reduce any risk of cyber security.

The above method can further couple with hardware authentication to reduce any risk of cyber security.

The above method can further couple with a quantum computing resistant cryptosystem.

The above method can further couple with a neuro-fuzzy logic algorithm or a set of step-by-step instructions to account for inexactness of data analysis.

The above method can further couple with a set of step-by-step instructions for a continuous risk or trust assessment of cyber security.

The above method can further couple with a set of step-by-step instructions for identifying a risk, when the requirement of cyber security changes.

The above method can further couple with one more software agents to search the Internet for Cyber security risk in real-time or near real-time, wherein the one software agent is coupled with the learning computer system.

Alternatively, the application of "System and Method of a Requirement, Compliance and Resource Management" can be applied to Active Compliance of Cyber Security, utilizing a learning computer system, wherein the learning computer system comprises: a premise computer system, a mobile computer system and a cloud computer system, wherein the learning computer system further comprises: one or more hardware processors or system on chips based on neural networks, in communication with a non-transitory computer readable medium, wherein the non-transitory computer readable medium stores one or more software modules, including step-by-step instructions for the method of requirement, active compliance, active detection and resource management algorithm for Cyber security, one or more learning algorithms and/or quantum learning algorithms and/or one or more software agents, that are executable by the one or more hardware processors or system on chips based on neural networks, wherein the one or more learning algorithms and/or quantum learning algorithms are coupled with learning and/or adoption and/or data analysis in any (potential) Cyber security risk in real-time or near real-time, wherein the method of requirement, active compliance, active detection and resource management algorithm comprises: steps (a), (b), (c), (d), (e), (f), (g) and (h), at least in an ordered manner or an ordered sequence, (a) a requirement input collection algorithm or a set of step-by-step instructions for collecting a requirement of cyber security or a requirement input data of cyber security from a data source or an inputting device, (b) a compliance requirement input collection algorithm or a set of step-by-step instructions for collecting compliance of cyber security or a compliance input data of cyber security from a data source, or an inputting device, (c) a requirement analysis algorithm or a set of step-by-step instructions for analyzing the requirement of cyber security, the requirement input data of cyber security, the compliance input data of cyber security or the compliance of cyber security, (d) a specification generation algorithm or a set of step-by-step instructions for generating a specification of the requirement based on the analysis of the requirement of cyber security, the requirement input data of cyber security, the compliance input data of cyber security or the compliance of cyber security, (e) a verification algorithm or a set of step-by-step instructions for verifying, the requirement of cyber security, the requirement input data of cyber security, the compliance input data of cyber security or the compliance of cyber security, (f) a fuzzy logic algorithm or a set of step-by-step instructions for accounting for inexactness of the requirement input data of cyber security or inexactness of interpretation of the requirement input data of cyber security, (g) an algorithm or a set of step-by-step instructions for a user behavior or an entity behavior, and (h) a traceability generation algorithm or a set of step-by-step instructions for tracing the requirement input data of cyber security or the requirement output data of cyber security, wherein the above method is further interfacing with a semantic web or an algorithm or a set of step-by-step instructions for analysis of a large set of data.

The above method can further couple with a remote browser to reduce any risk of cyber security. The remote browser is further coupled with a physical un-clonable function device to reduce any risk of cyber security, wherein the physical un-clonable function device comprises one or more memristors.

The above method can further couple with a blockchain to reduce any risk of cyber security.

The above method can further couple with hardware authentication to reduce any risk of cyber security.

The above method can further couple with a quantum computing resistant cryptosystem.

The above method can further couple with a neuro-fuzzy logic algorithm or a set of step-by-step instructions to account for inexactness of data analysis.

The above method can further couple with set of step-by-step instructions for a continuous risk, or trust assessment of cyber security.

The above method can further couple with a set of step-by-step instructions for identifying a risk, when the requirement of cyber security changes.

Figure 34C:
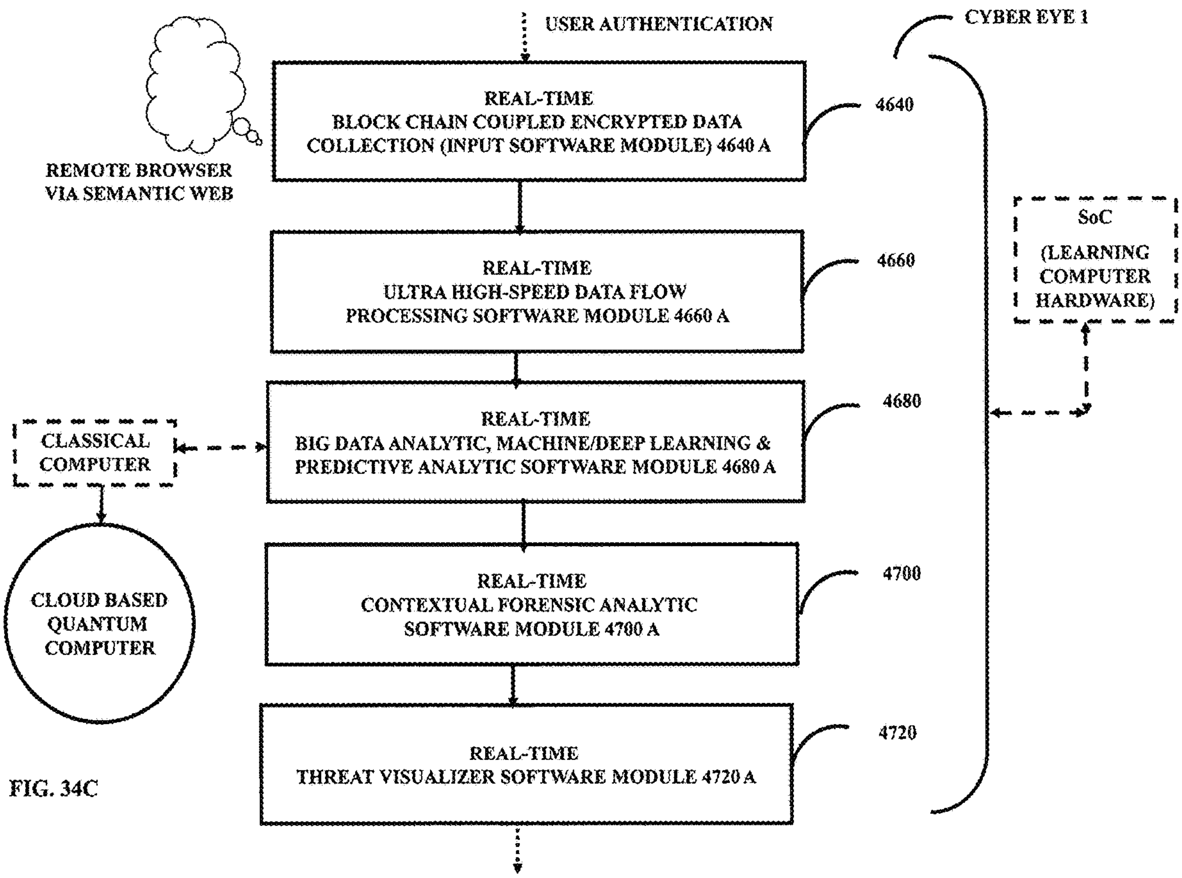
FIGS. 34C-34D describe learning computing based Cyber eye 1.
Figure 34D:
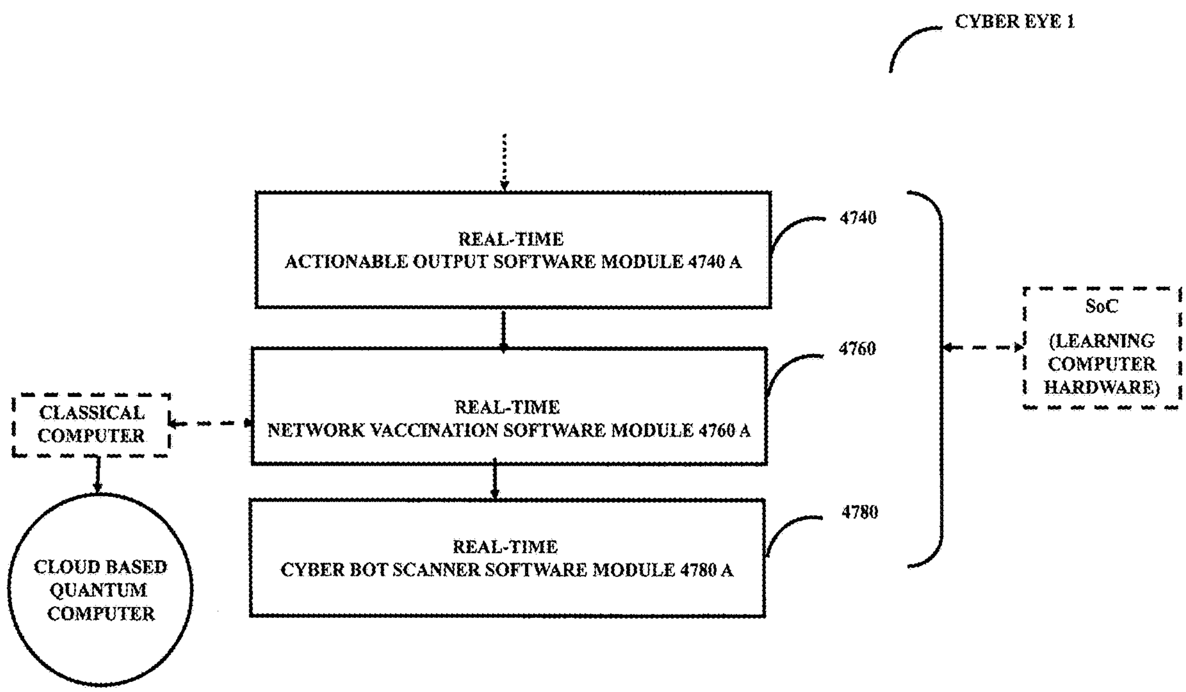

FIGS. 34C-34D describe learning computing based Cyber eye 1.

In FIG. 34C, a user is authenticated. In step 4640, the real-time encrypted data is collected by a real-time encrypted data collection software module 4640A (which can be coupled with a remote browser, wherein the remote browser can be further coupled with via semantic web). In step 4660, the real-time encrypted data is processed by a real-time data flow processing software module 4660A. In step 4680, the real-time encrypted data is further analyzed by a Big Data analytic/machine learning/deep learning/predictive analytic software module 4680A (which can be coupled with a cloud based quantum computer, which is then coupled with a classical computer). In step 4700, the real-time encrypted data is further analyzed by a (contextual) forensic analytic software module 4700A. In step 4720, threat is visualized by a threat visualize software module 4720A. In step 4740, real-time actionable output is presented by a real-time actionable output software module 4740A. In step 4760, the network is vaccinated (similar to an immune system) in real-time by a real-time network vaccination software module 4760A (which can be coupled with a cloud based quantum computer, which is then coupled with a classical computer). In step 4780, the network is monitored in real-time by Cyber attack, by using one or more Cyber bot scanner software modules 4780As.

All above steps and software modules can be coupled with the learning computer.

Figure 34E:
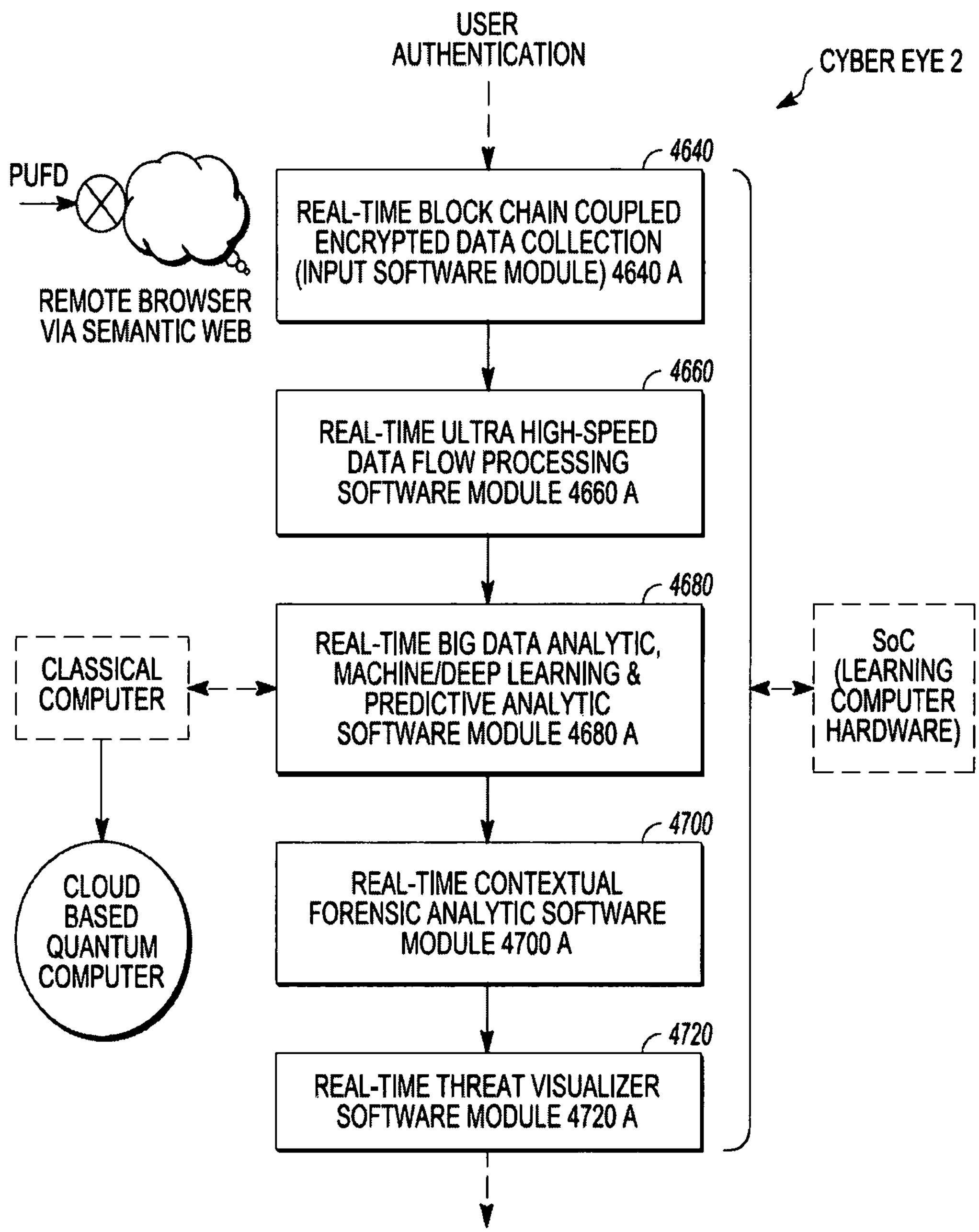
FIGS. 34E-34F describe learning computing based Cyber eye 2.
Figure 34F:
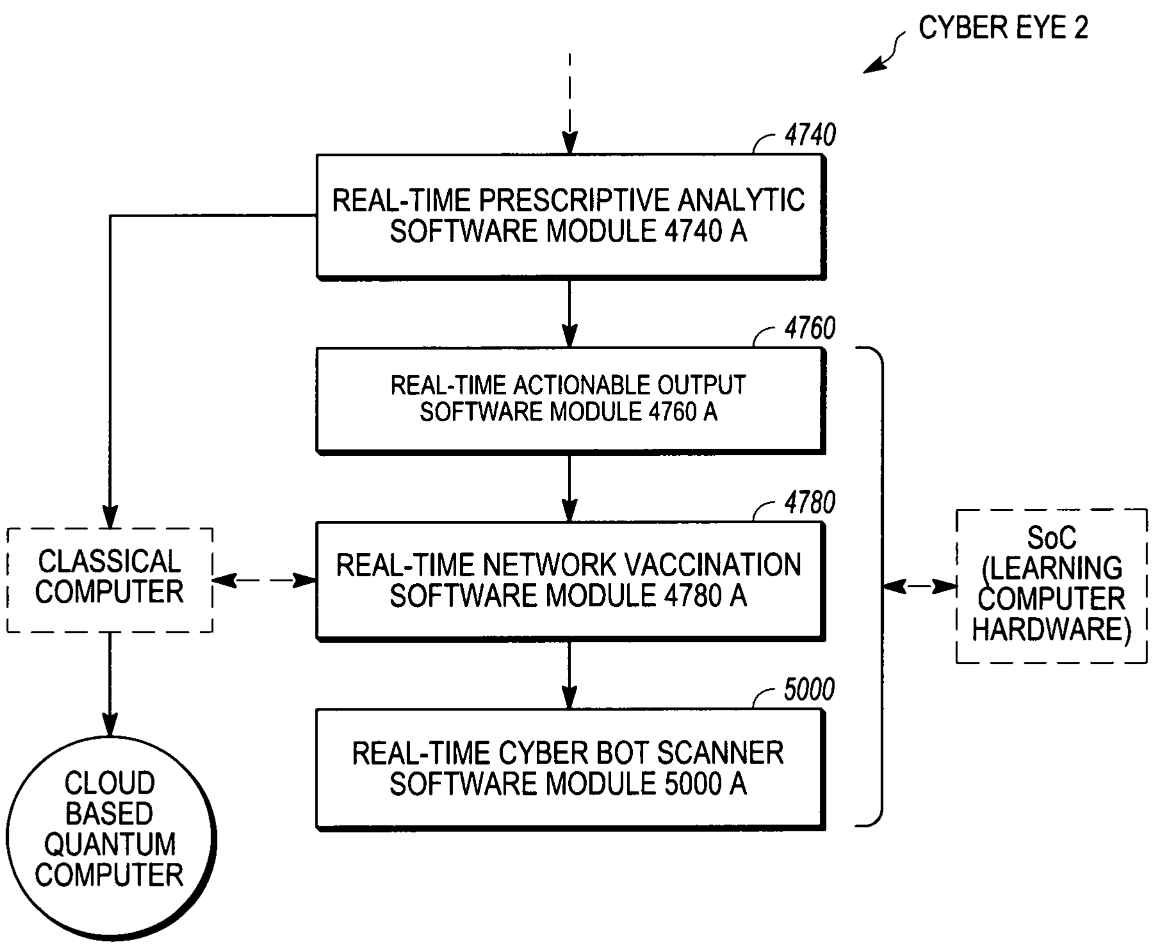

FIGS. 34E-34F describe learning computing based Cyber eye 2. FIGS. 34E-34F are similar to FIGS. 34C-34D, except the remote browser is coupled with a Physical Un-clonable Function Device. The Physical Un-clonable Function Device can include an array of memristors.

FIGS. 35-81 illustrates the implementation of active compliance of Cyber security.

Figure 35:
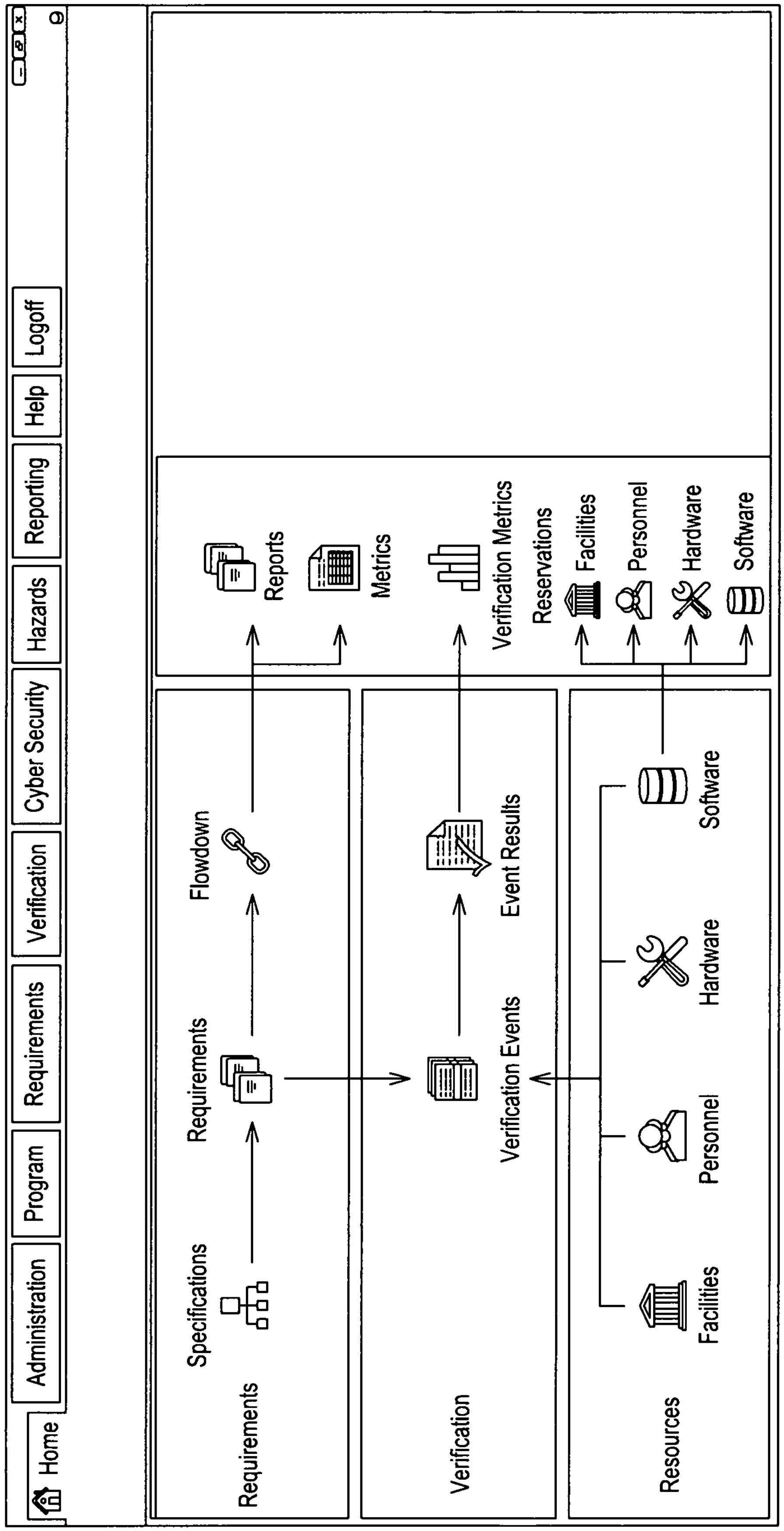
FIG. 35 illustrates Cyber security home page launch button: Cyber security module launch button as implemented within the core software application home page.

FIG. 35 illustrates Cyber security home page launch button: Cyber security module launch button as implemented within the core software application home page.

Figure 36:
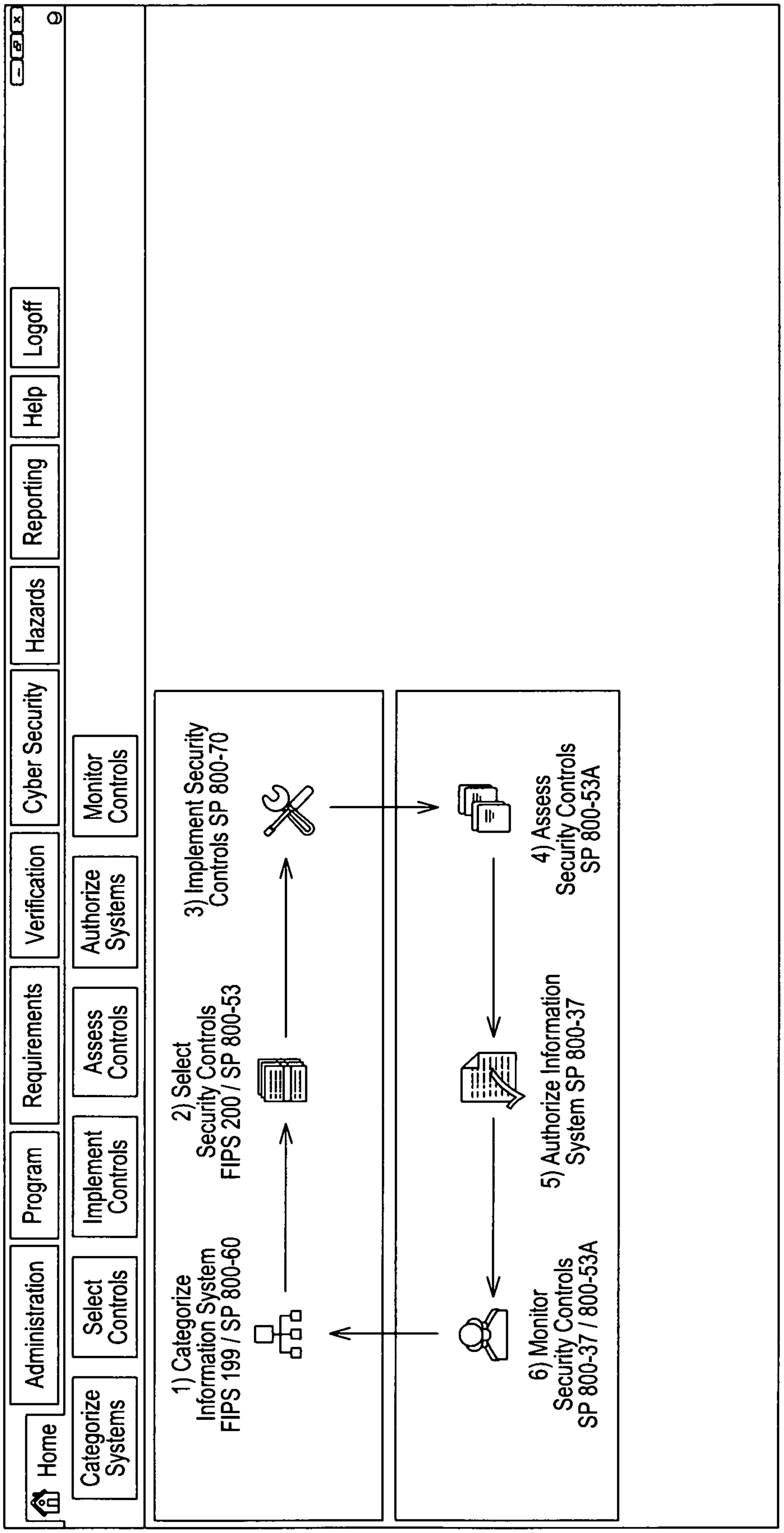
FIG. 36 illustrates Cyber security Home Page: Home page with navigation button and icons which enable access to all Cyber security module functionality, metrics and reporting.

FIG. 36 illustrates Cyber security Home Page: Home page with navigation button and icons which enable access to all Cyber security module functionality, metrics and reporting.

Figure 37:
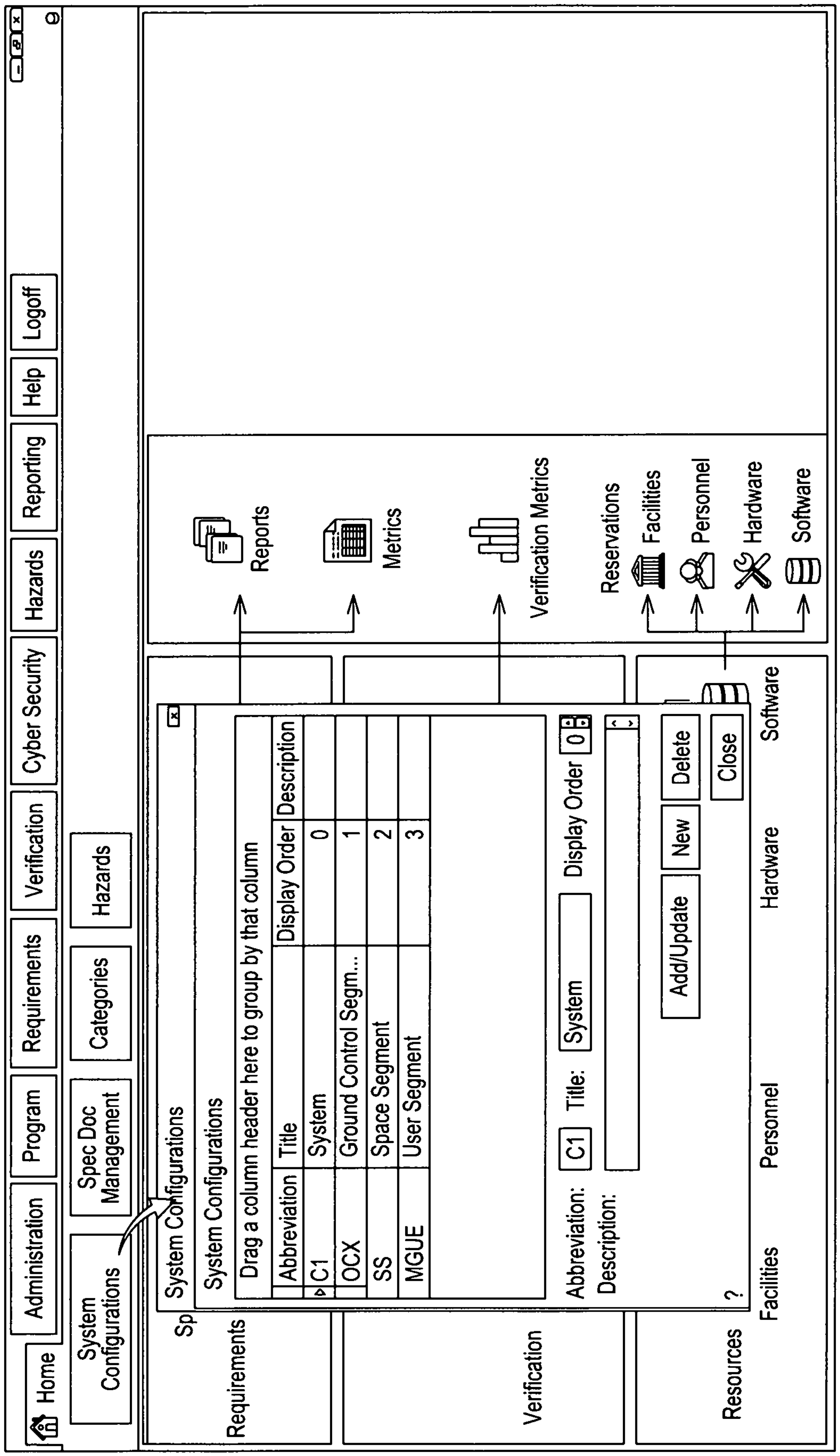
FIG. 37 illustrates Cyber security configuration setup page: Pop-up form is used to define Information System (IS) configurations, including technical description for each configuration.

FIG. 37 illustrates Cyber security configuration setup page: Pop-up form is used to define Information System (IS) configurations, including technical description for each configuration.

Figure 38:
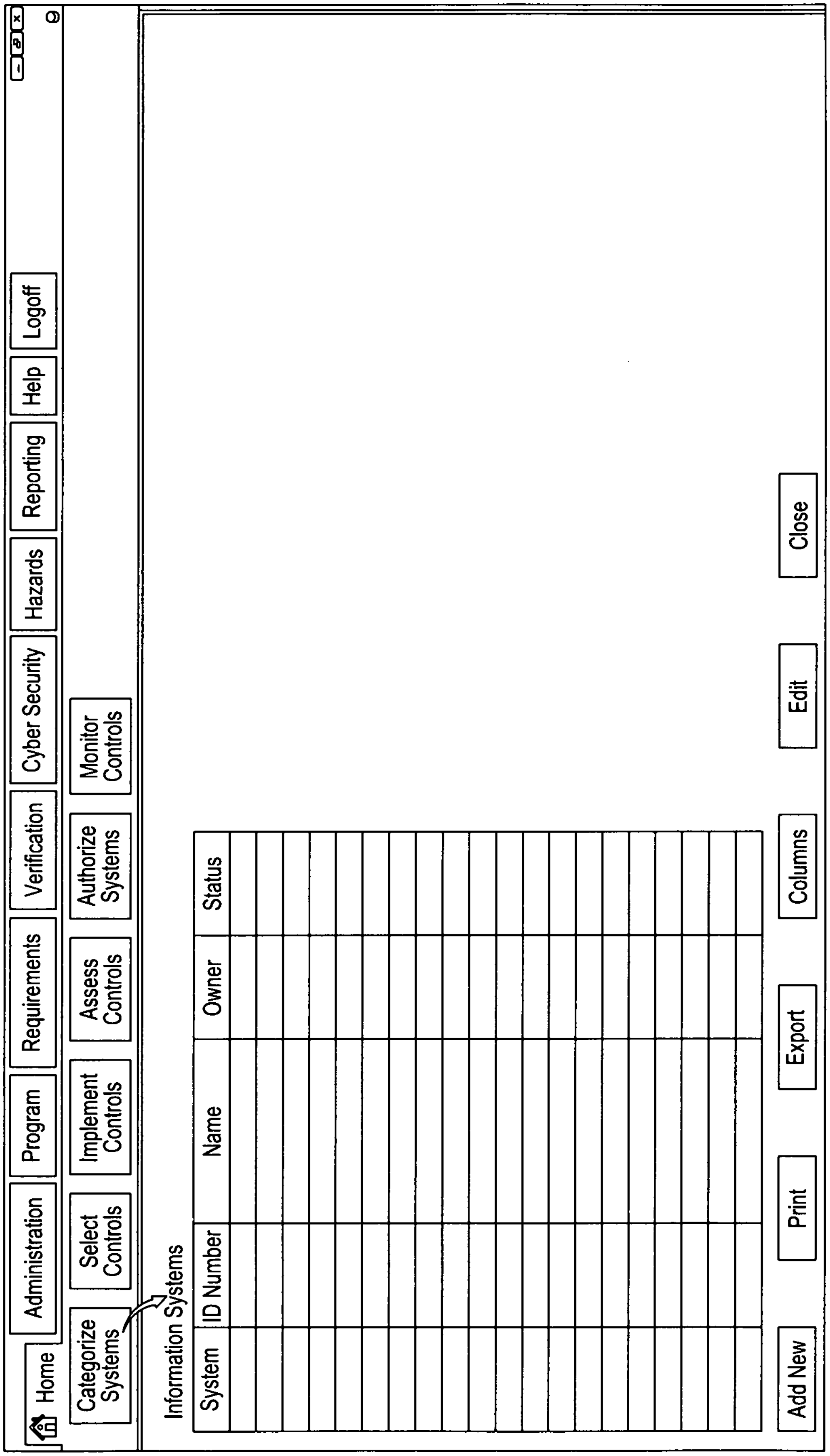
FIG. 38 illustrates Cyber security IS listing page: Comprehensive listing of all IS's that will be processed by the Cyber security module. Each IS is identified using a unique ID number and IS operational status.

FIG. 38 illustrates Cyber security IS listing page: Comprehensive listing of all IS's that will be processed by the Cyber security module. Each IS is identified using a unique ID number and IS operational status.

Figure 39:
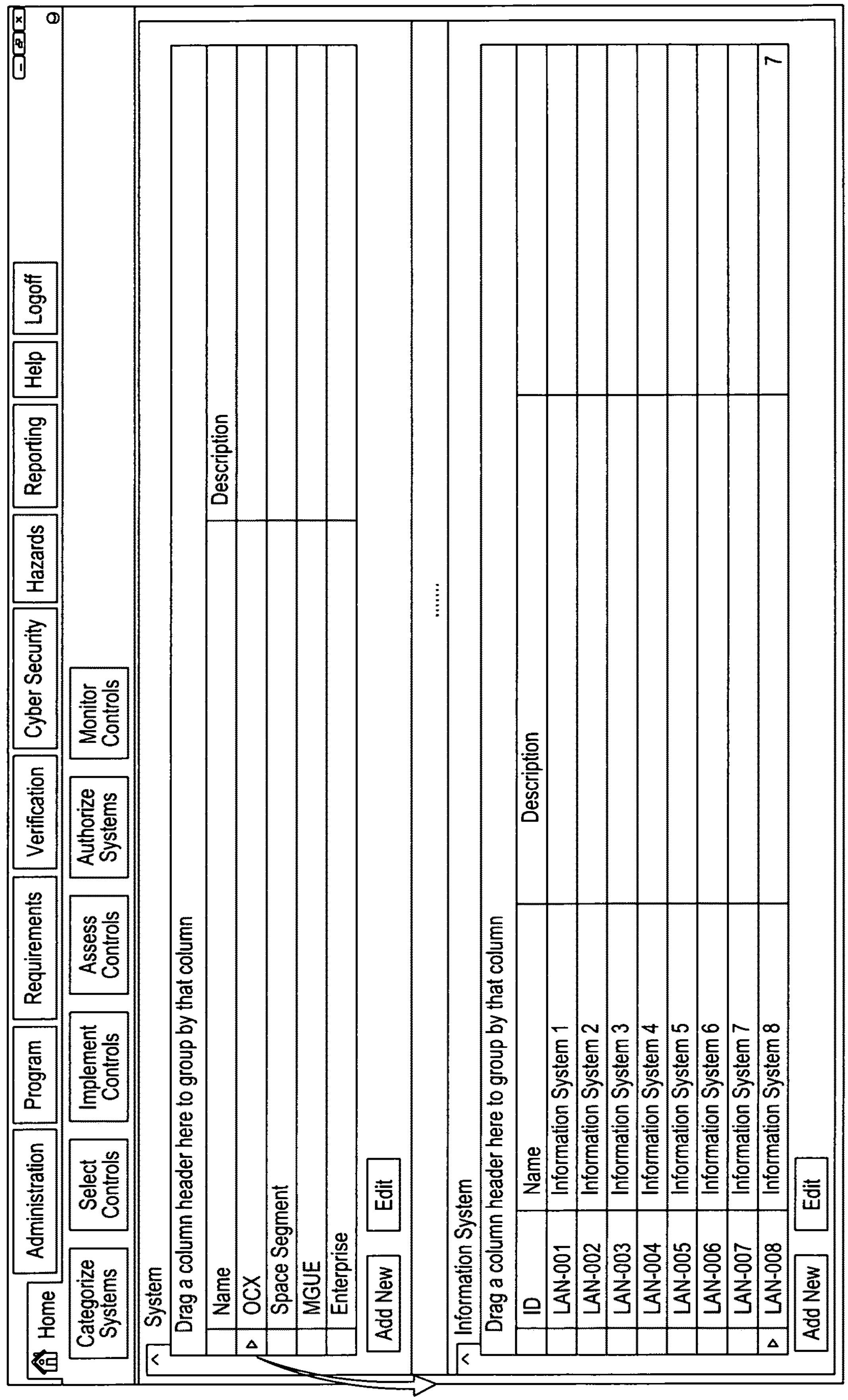
FIG. 39 illustrates Cyber security configuration relationship to IS: Form links IS to its top-level system configuration item defined in item 3 above.

FIG. 39 illustrates Cyber security configuration relationship to IS: Form links IS to its top-level system configuration item defined in item 3 above.

Figure 40:
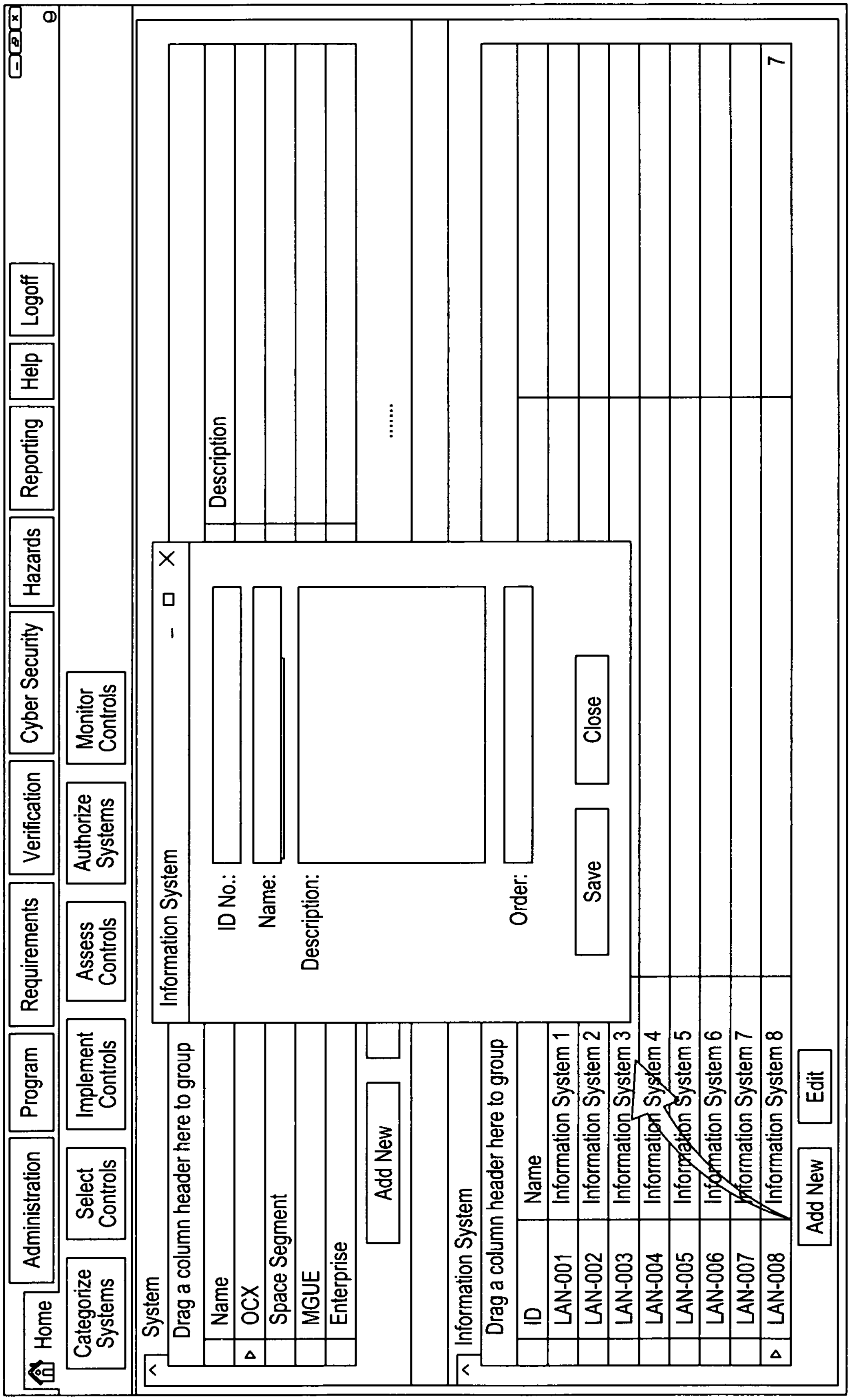
FIG. 40 illustrates IS Description Pop-up Form: data entry form used to define IS system identification number, name, and technical description.

FIG. 40 illustrates IS Description Pop-up Form: data entry form used to define IS system identification number, name, and technical description.

Figure 41:
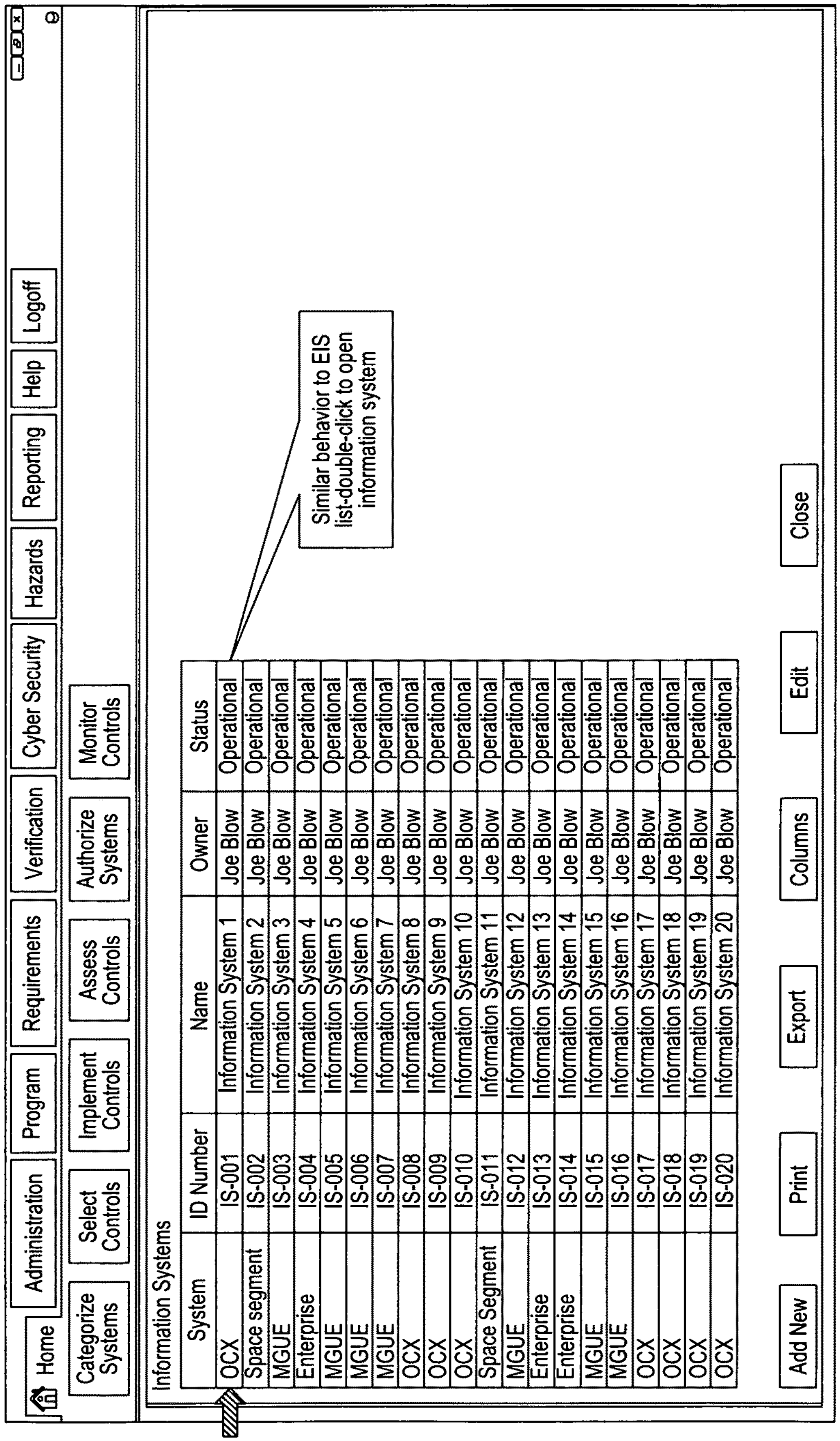
FIG. 41 illustrates Populated Cyber security IS listing page: Comprehensive listing of all IS's that will be processed by the Cyber security module. This form contains a navigation feature that enables users to double-click anywhere in the IS row to navigate to the IS system definition page.

FIG. 41 illustrates Populated Cyber security IS listing page: Comprehensive listing of all IS's that will be processed by the Cyber security module. This form contains a navigation feature that enables users to double-click anywhere in the IS row to navigate to the IS system definition page.

Figure 42:
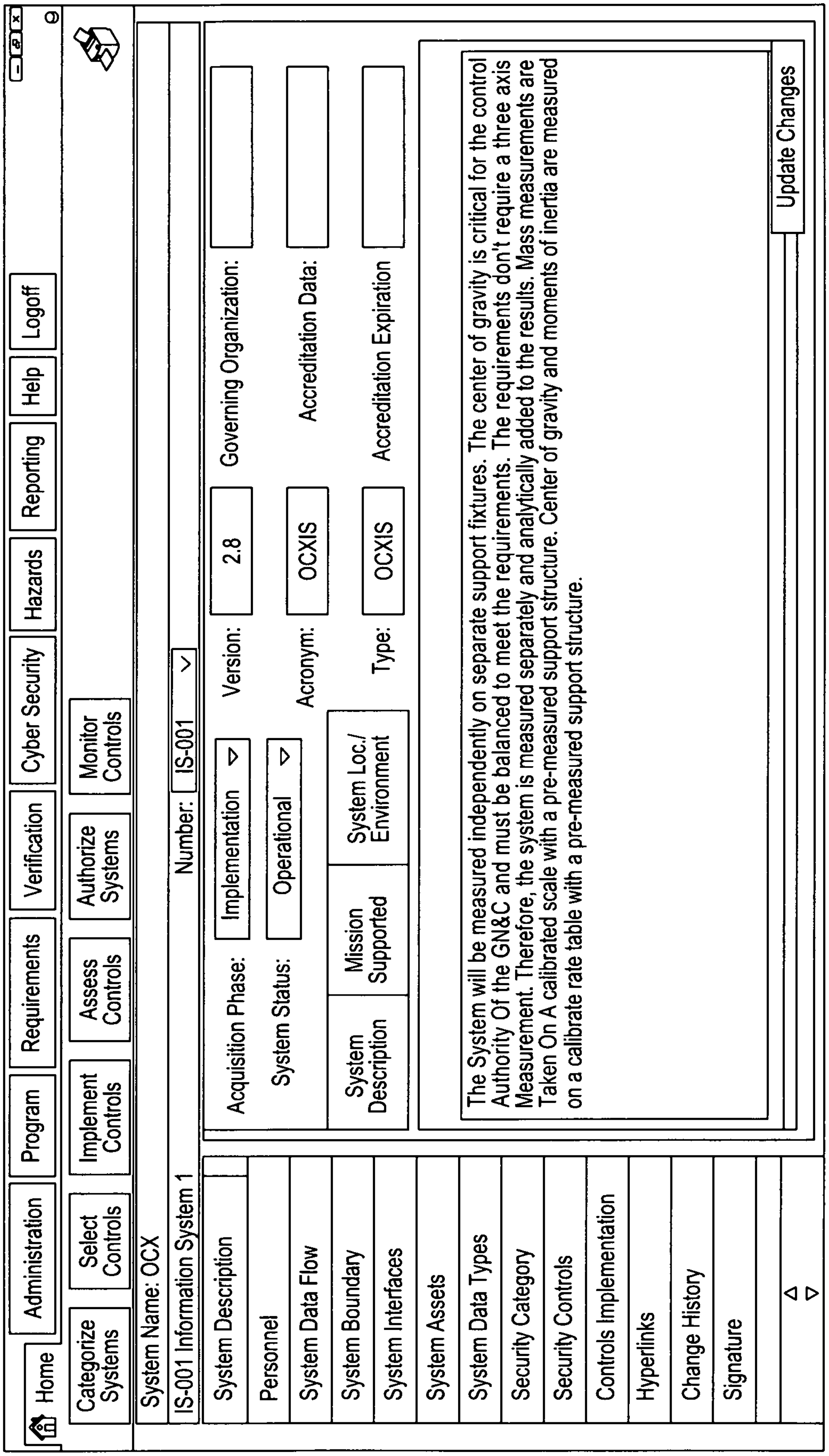
FIG. 42 illustrates IS System Definition Page, System Description: Form provides information that helps for the IS system baseline including IS system version number, system status, and responsible personnel/organizations.

FIG. 42 illustrates IS System Definition Page, System Description: Form provides information that helps for the IS system baseline including IS system version number, system status, and responsible personnel/organizations.

Figure 43:
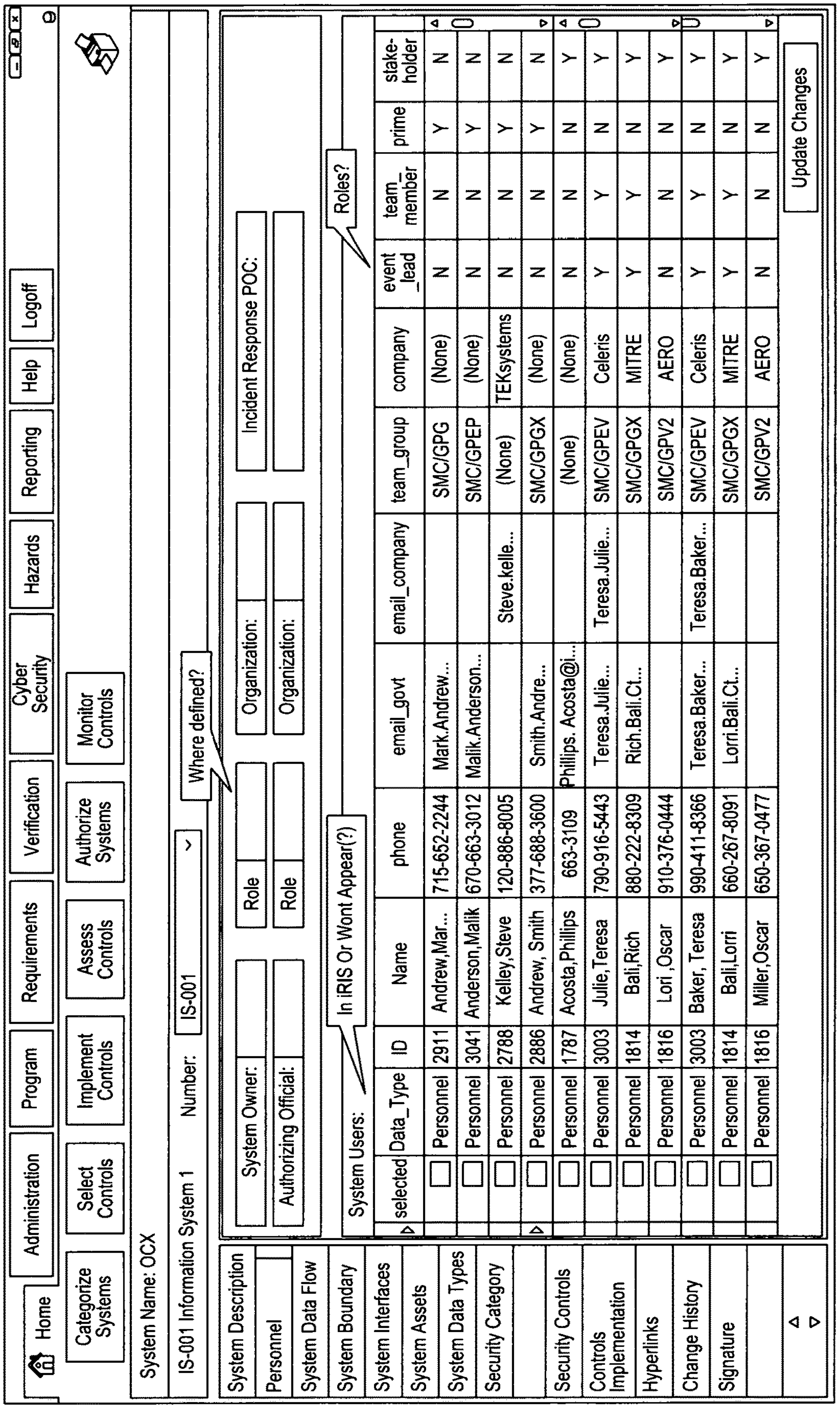
FIG. 43 illustrates IS System Definition Page, Personnel: Form serves as data entry point for IS system responsible personnel and system users. Entries include personnel roles, responsibilities, and organizations to which personnel belong.

FIG. 43 illustrates IS System Definition Page, Personnel: Form serves as data entry point for IS system responsible personnel and system users. Entries include personnel roles, responsibilities, and organizations to which personnel belong.

Figure 44:
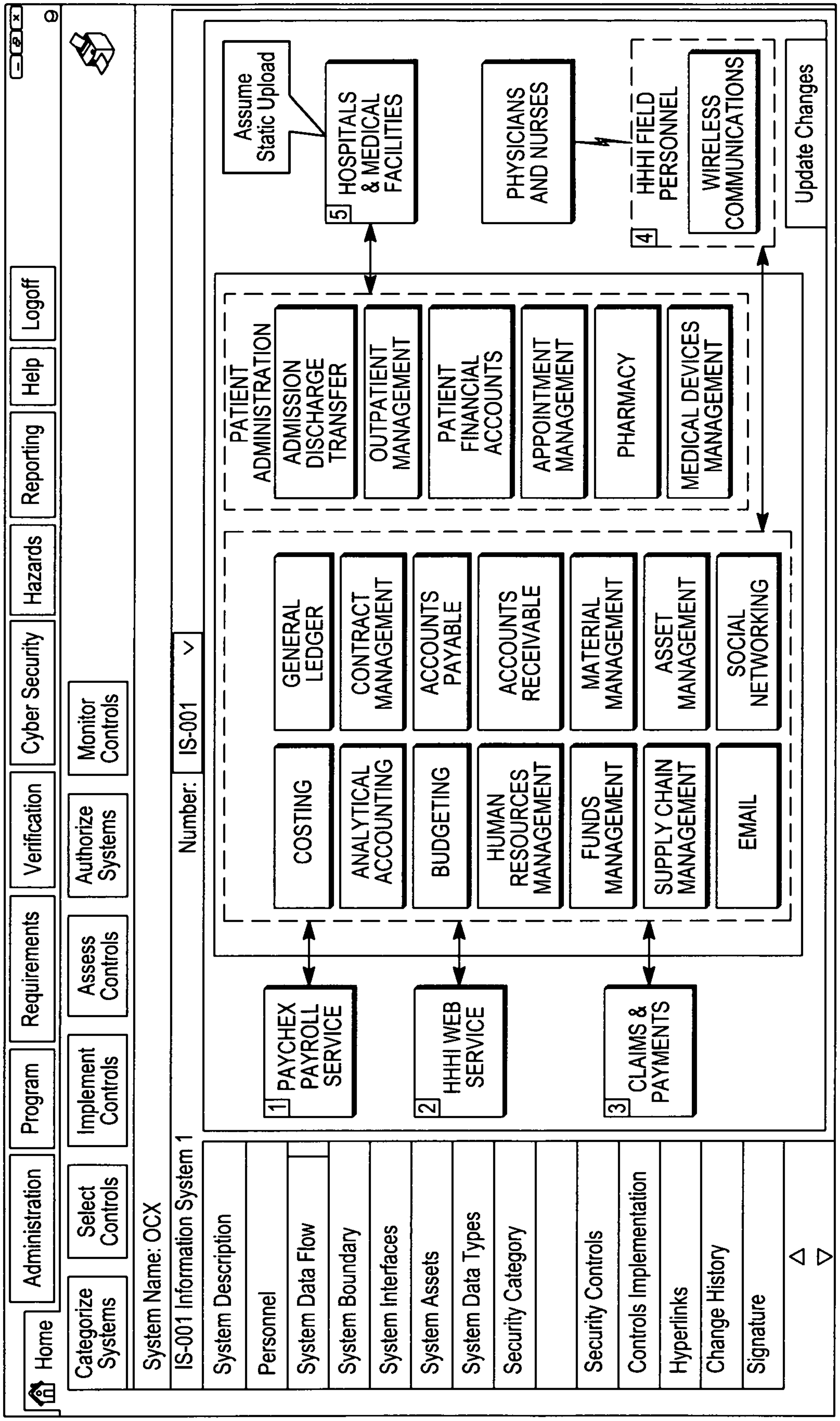
FIG. 44 illustrates IS System Data Flow Diagram: Interactive block interface that enables users to identify major IS system components as well as communication data flow direction.

FIG. 44 illustrates IS System Data Flow Diagram: Interactive block interface that enables users to identify major IS system components as well as communication data flow direction.

Figure 45:
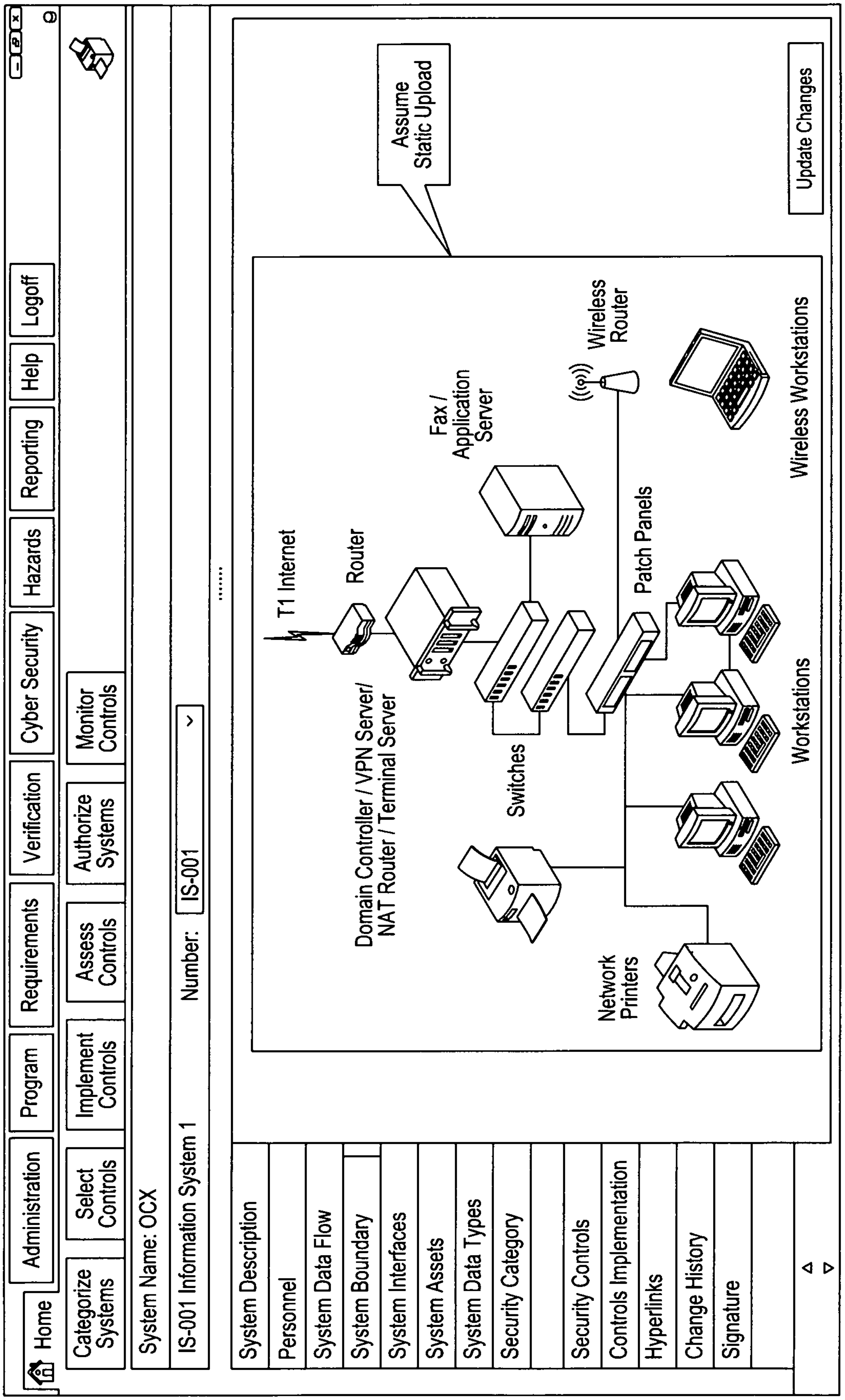
FIG. 45 illustrates IS System Boundary Diagram: Interactive block diagram that enables users to identify major IS system components as well as communication IS system boundary.

FIG. 45 illustrates IS System Boundary Diagram: Interactive block diagram that enables users to identify major IS system components as well as communication IS system boundary.

Figure 46:
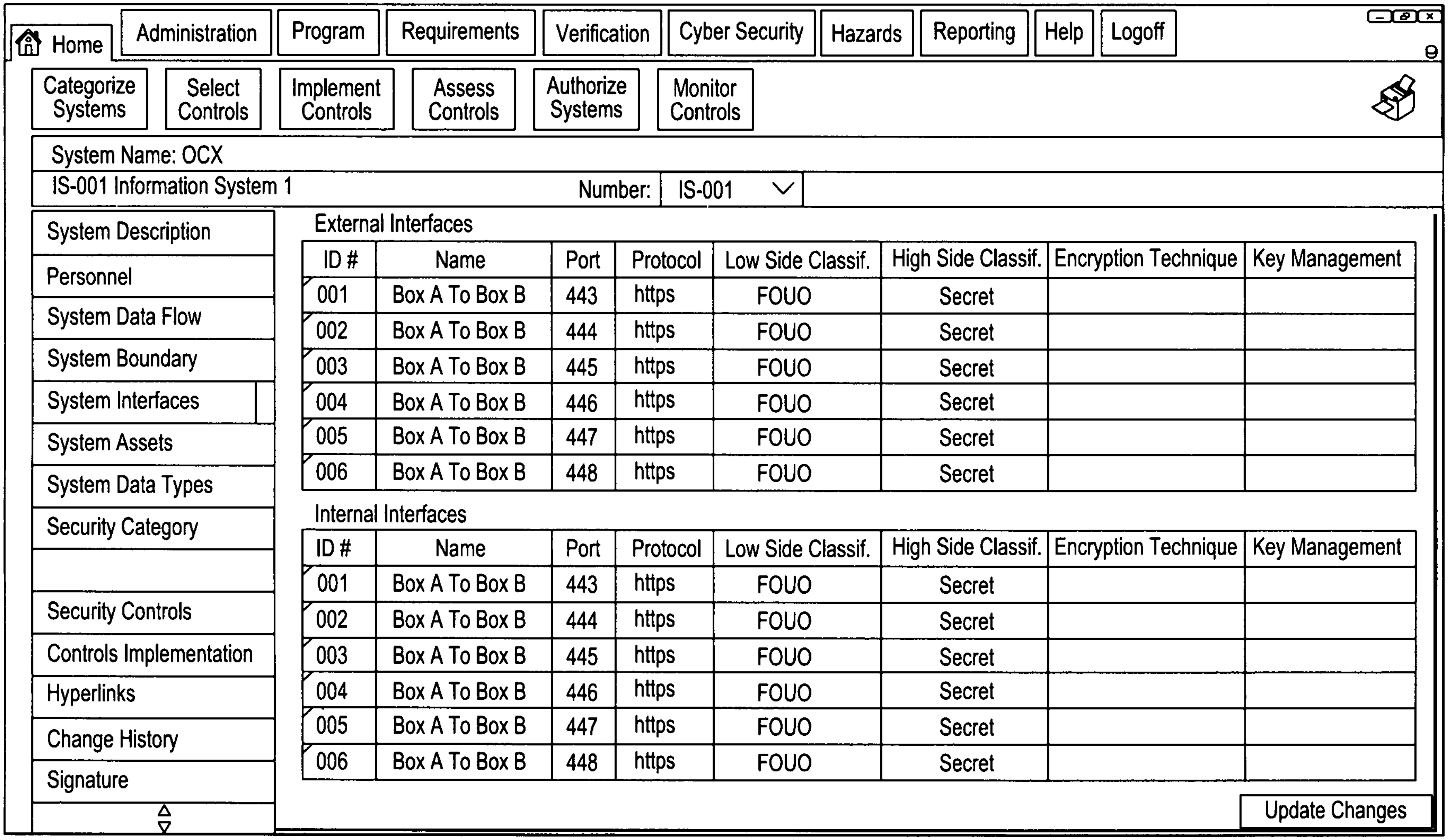
FIG. 46 illustrates IS System Interface Listing: Comprehensive listing of all IS internal and external interfaces. Fields include interface unique ID numbers as well as security classification levels and each interface endpoint as well as the implanted data encryption technique.

FIG. 46 illustrates IS System Interface Listing: Comprehensive listing of all IS internal and external interfaces. Fields include interface unique ID numbers as well as security classification levels and each interface endpoint as well as the implanted data encryption technique.

Figure 47:
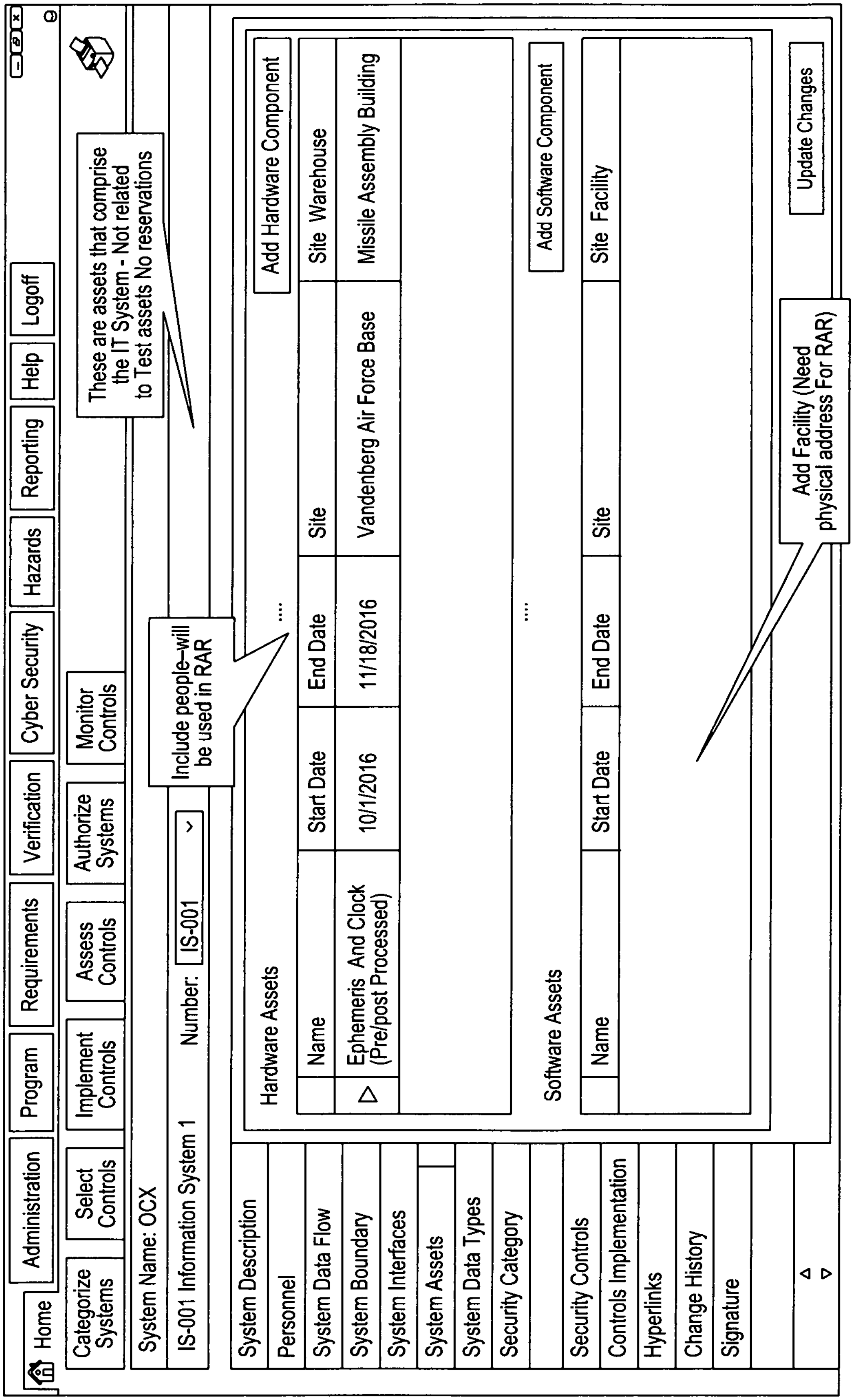
FIG. 47 illustrates IS System Assets: Comprehensive listing of all hardware and software assets that comprise the IS. Form incorporates a feature to add/edit/delete assets.

FIG. 47 illustrates IS System Assets: Comprehensive listing of all hardware and software assets that comprise the IS. Form incorporates a feature to add/edit/delete assets.

Figure 48:
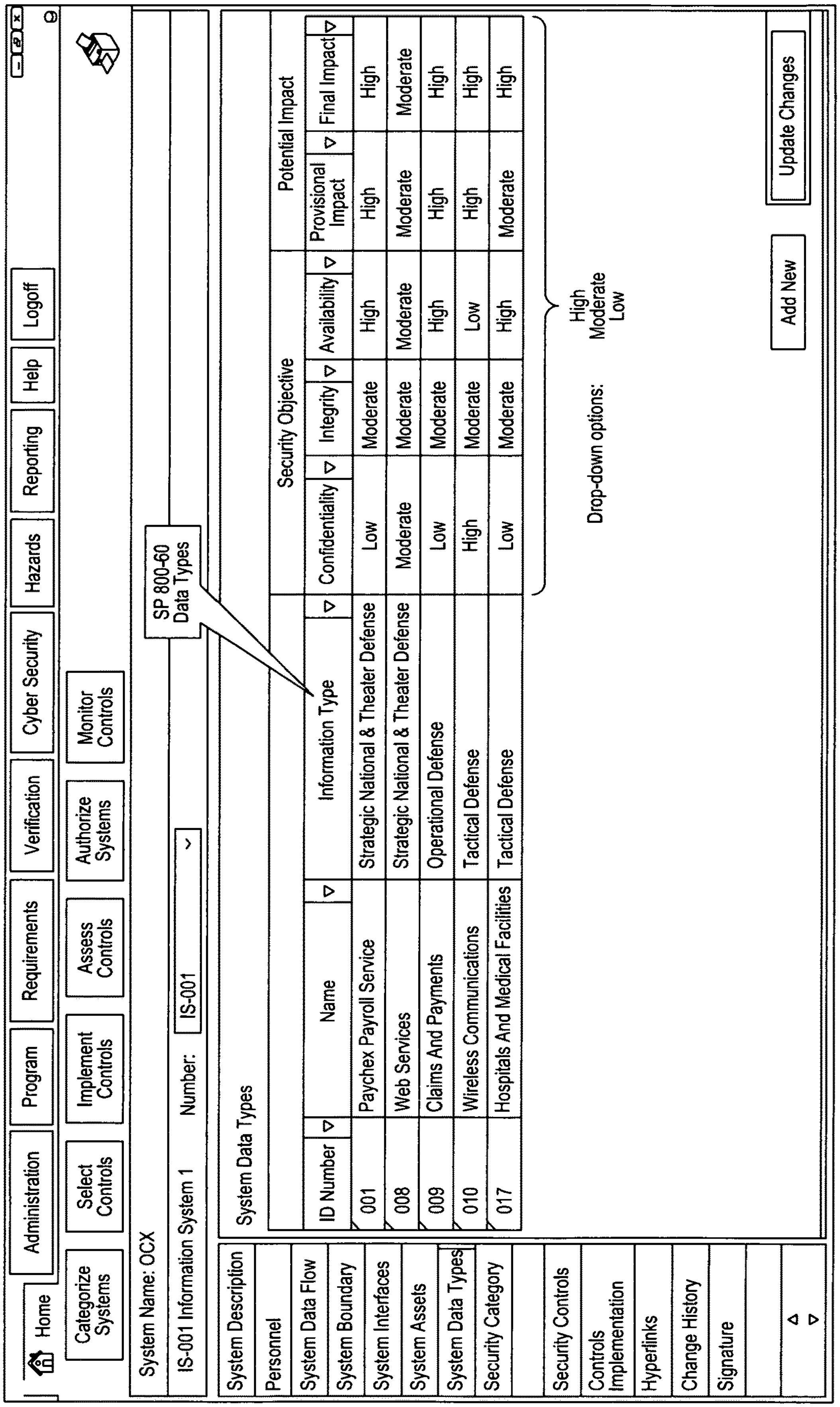
FIG. 48 illustrates IS System data Types: Interactive form that enables users to define system data types in accordance with NIST SP 800-60 for each interface defined in the system interface definition GUI (form 12 above). The form also contains the potential impact to the IS if an interface is compromised (Low/Moderate/High).

FIG. 48 illustrates IS System data Types: Interactive form that enables users to define system data types in accordance with NIST SP 800-60 for each interface defined in the system interface definition GUI (form 12 above). The form also contains the potential impact to the IS if an interface is compromised (Low/Moderate/High).

Figure 49:
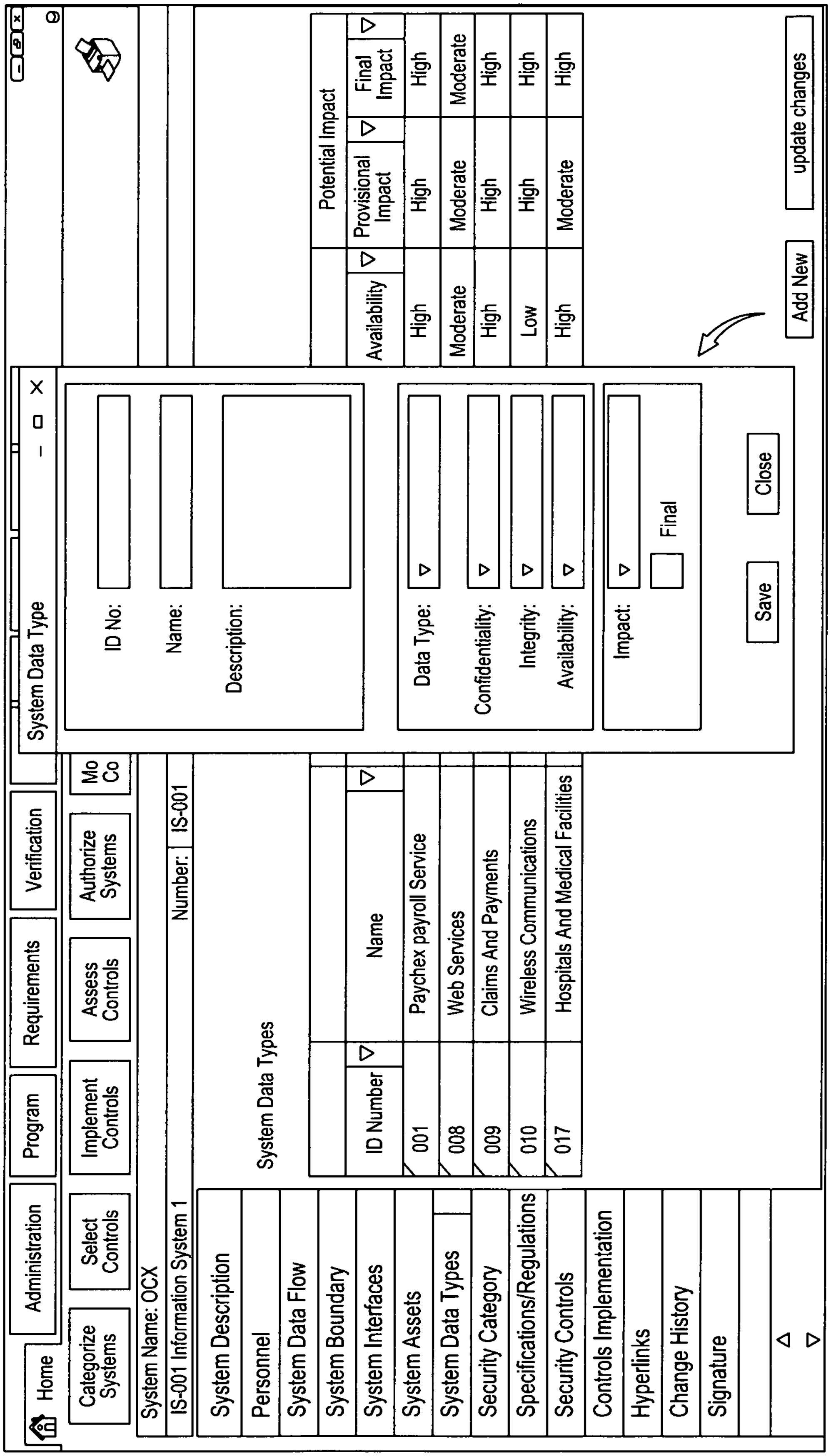
FIG. 49 illustrates IS System Data Type assignment Pop-up Form: Form is used to assign data types to each interface defined in Form 12. In addition to assigning the data type, users can assign confidentiality, integrity, availability and impact IAW NIST SP 800-60 using a drop-down form as well as enter a textual description of the type of data processed by the IS.

FIG. 49 illustrates IS System Data Type assignment Pop-up Form: Form is used to assign data types to each interface defined in Form 12. In addition to assigning the data type, users can assign confidentiality, integrity, availability and impact IAW NIST SP 800-60 using a drop-down form as well as enter a textual description of the type of data processed by the IS.

Figure 50:
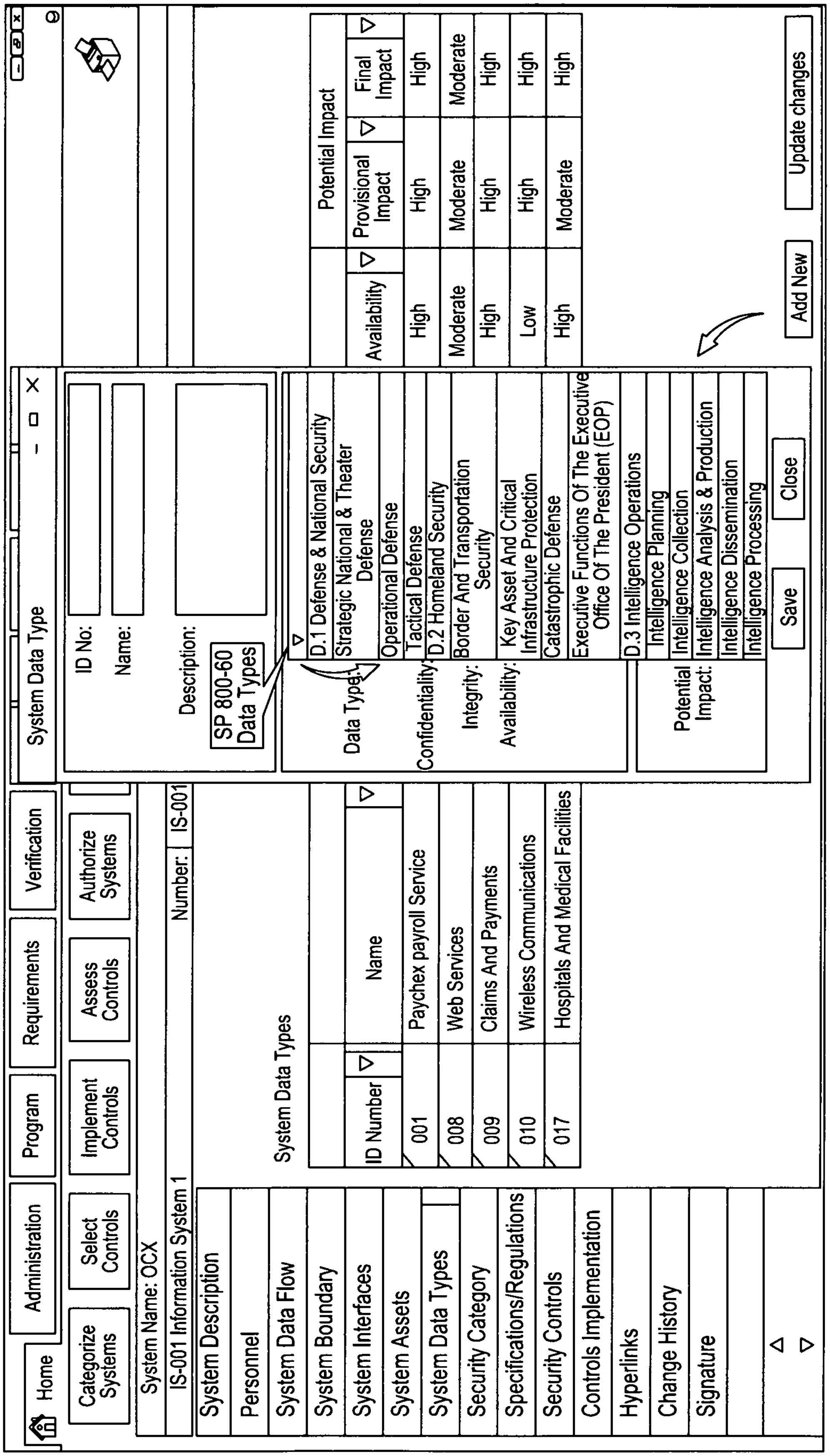
FIG. 50 illustrates IS System Data Type assignment Pop-up Form: Form is used to assign pre-loaded data types to each interface defined in Form 12 IAW NIST SP 800-60 using a drop-down form.

FIG. 50 illustrates IS System Data Type assignment Pop-up Form: Form is used to assign pre-loaded data types to each interface defined in Form 12 IAW NIST SP 800-60 using a drop-down form.

Figure 51:
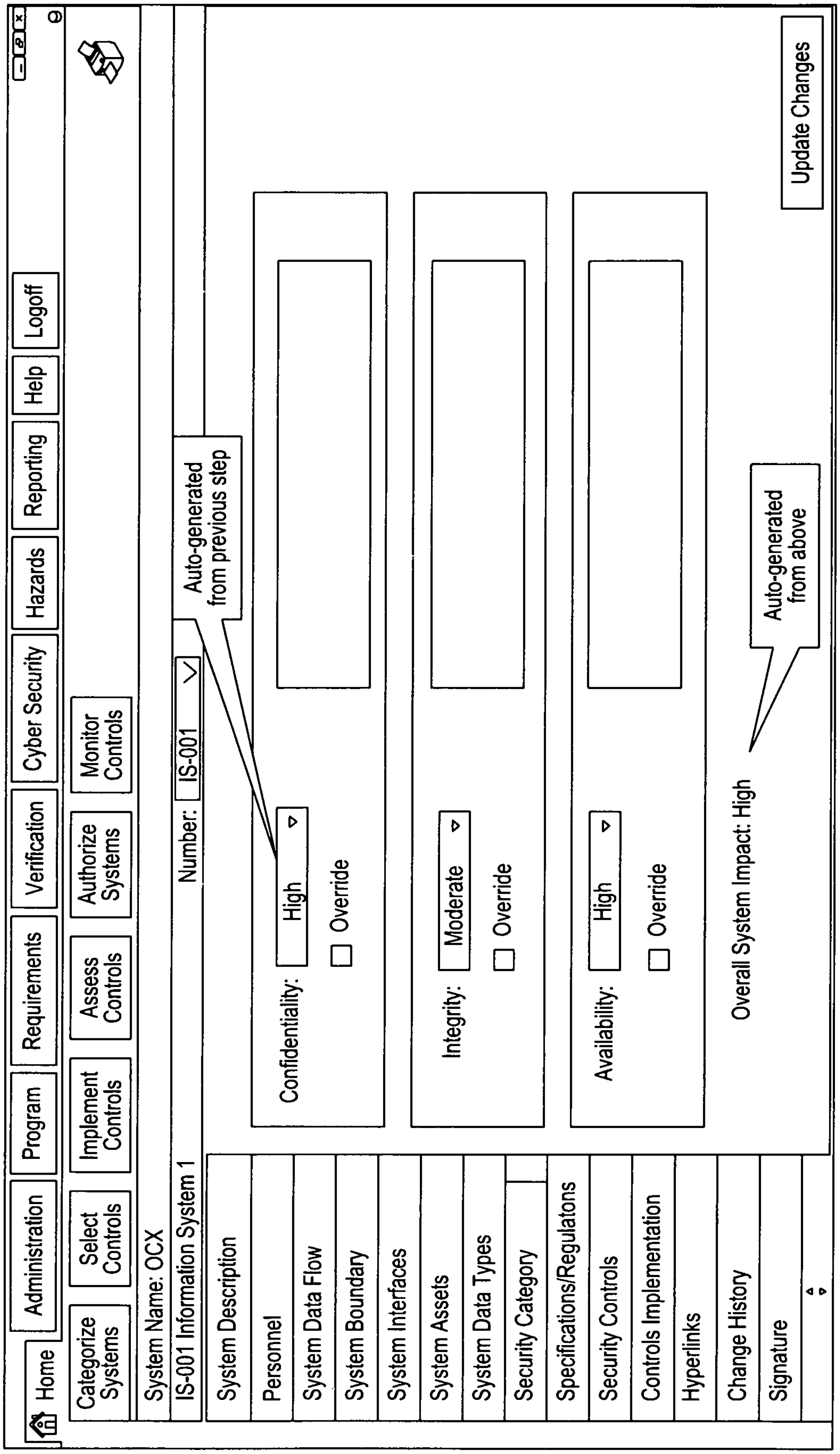
FIG. 51 illustrates IS System Category Form: Displays the overall IS system category information for confidentiality, integrity, and availability in High/Moderate/Low category ratings. Each rating is auto-generated by inheriting the worst-case category assignment from the system data type category assignment (Form 16).

FIG. 51 illustrates IS System Category Form: Displays the overall IS system category information for confidentiality, integrity, and availability in High/Moderate/Low category ratings. Each rating is auto-generated by inheriting the worst-case category assignment from the system data type category assignment (Form 16).

Figure 52:
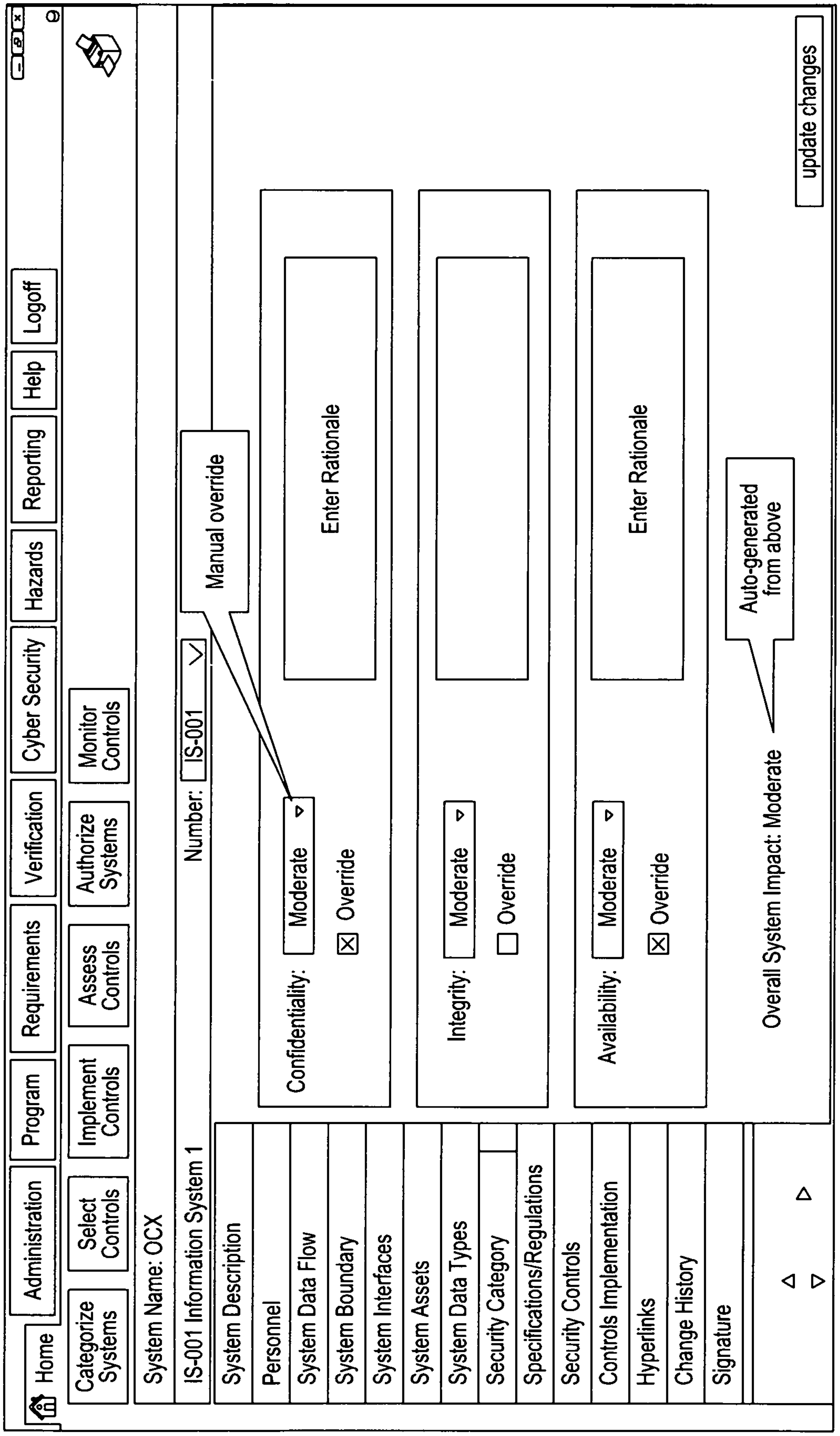
FIG. 52 illustrates IS System Category Form Override: Provides users with the ability to manually override the ratings generated during the automated categorization process. For any manual overrides, users must enter rationale for the override. The overall system impact displayed at the bottom of this form will automatically inherit the worst case rating from confidentiality/integrity/availability rating.

FIG. 52 illustrates IS System Category Form Override: Provides users with the ability to manually override the ratings generated during the automated categorization process. For any manual overrides, users must enter rationale for the override. The overall system impact displayed at the bottom of this form will automatically inherit the worst case rating from confidentiality/integrity/availability rating.

Figure 53:
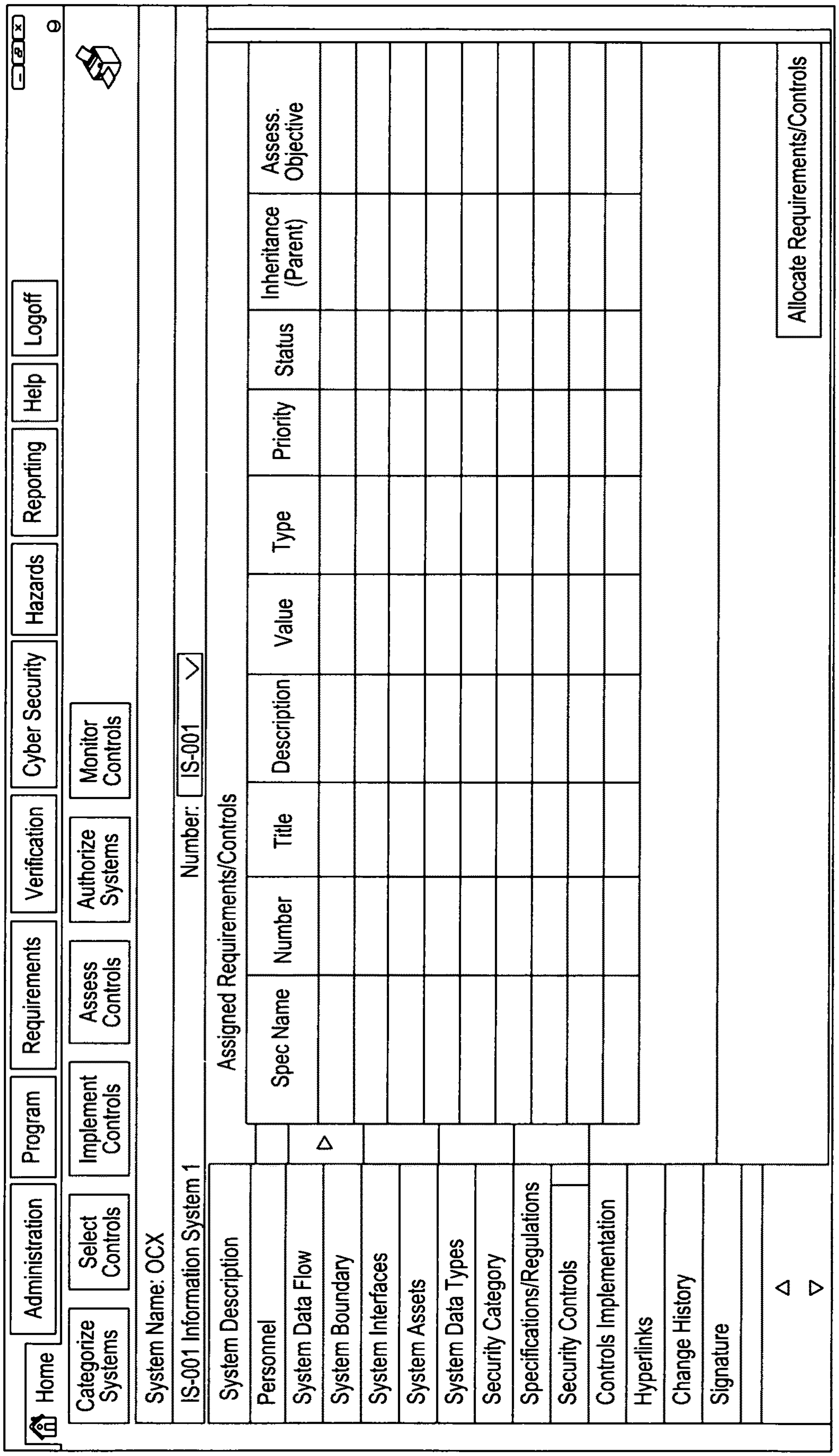
FIG. 53 illustrates Security Controls Interface: Interface used to add/edit/delete security controls and requirements associated with the IS. Fields include unique IS number for each control/requirements as well as the requirement title, description, status, and parent requirement.

FIG. 53 illustrates Security Controls Interface: Interface used to add/edit/delete security controls and requirements associated with the IS. Fields include unique IS number for each control/requirements as well as the requirement title, description, status, and parent requirement.

Figure 54:
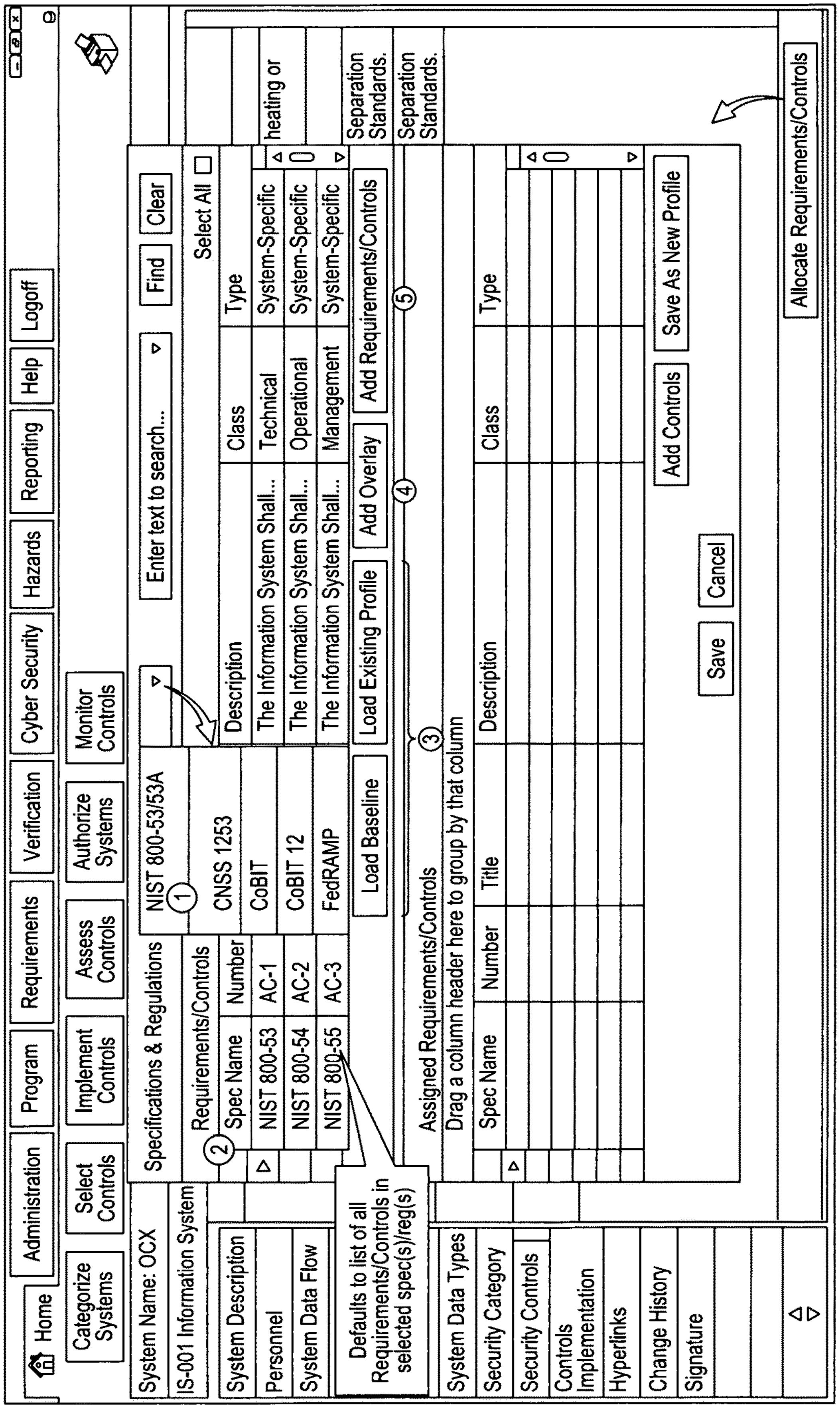
FIG. 54 illustrates Security Controls Add/Edit/Delete Pop-up Interface: Once the "Allocate requirements/controls" button is pushed, this form launches and enables users to assign pre-loaded and custom controls to the IS. To assign pre-loaded controls, users first select a specification or regulation from a drop-down menu. The controls/requirements associated with the selected regulation/specification then appear and can then be selected and assigned (added) to the IS by clicking the "Add Requirements/Controls" button.

FIG. 54 illustrates Security Controls Add/Edit/Delete Pop-up Interface: Once the "Allocate requirements/controls" button is pushed, this form launches and enables users to assign pre-loaded and custom controls to the IS. To assign pre-loaded controls, users first select a specification or regulation from a drop-down menu. The controls/requirements associated with the selected regulation/specification then appear and can then be selected and assigned (added) to the IS by clicking the "Add Requirements/Controls" button.

Figure 55:
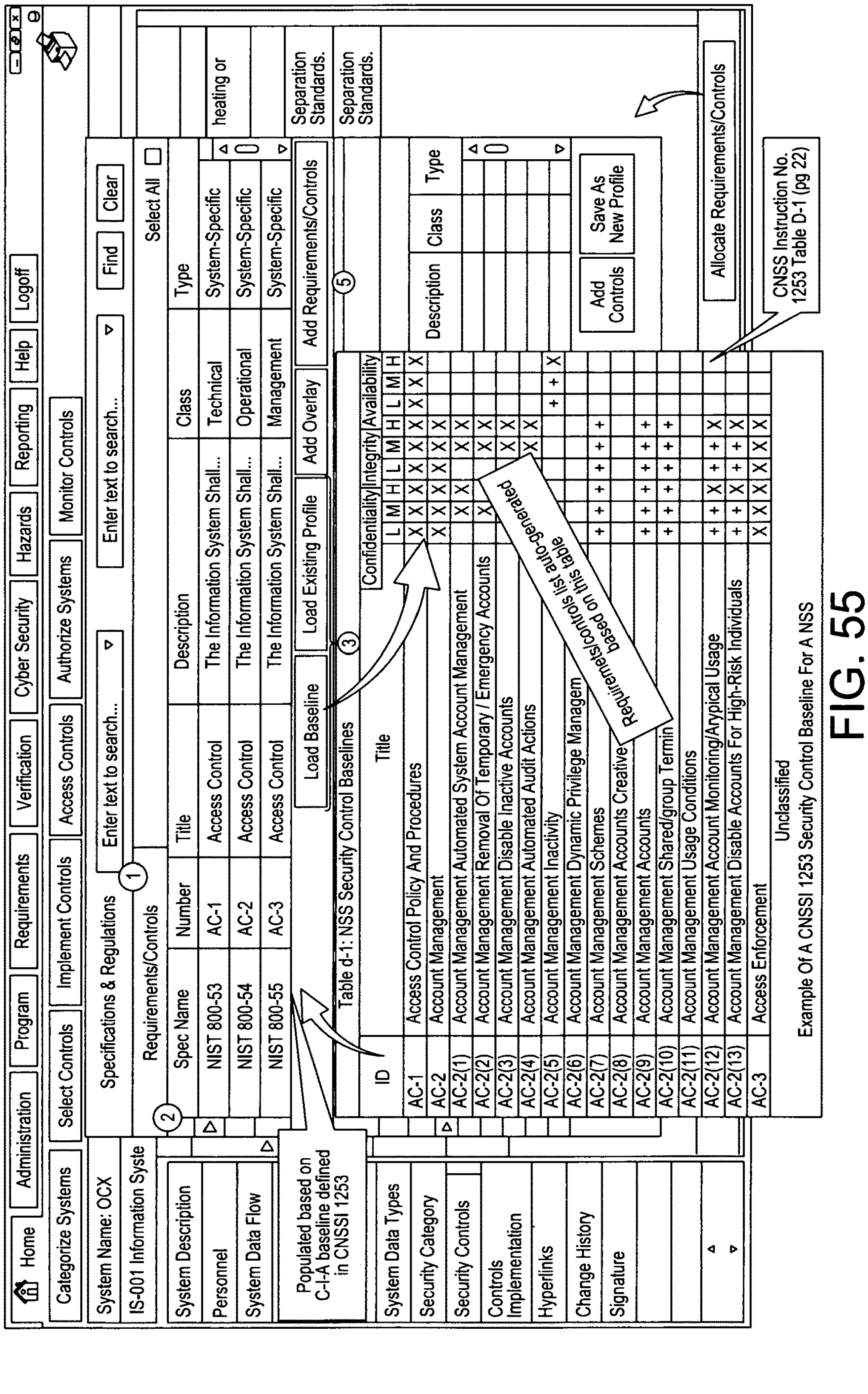
FIG. 55 illustrates Security Controls Baseline Load: Feature enables users to apply pre-defined controls/requirements set, or baseline, to an IS. Feature dramatically reduces the time required to manually select control profiles that apply to similar ISs.

FIG. 55 illustrates Security Controls Baseline Load: Feature enables users to apply pre-defined controls/requirements set, or baseline, to an IS. Feature dramatically reduces the time required to manually select control profiles that apply to similar ISs.

Figure 56:
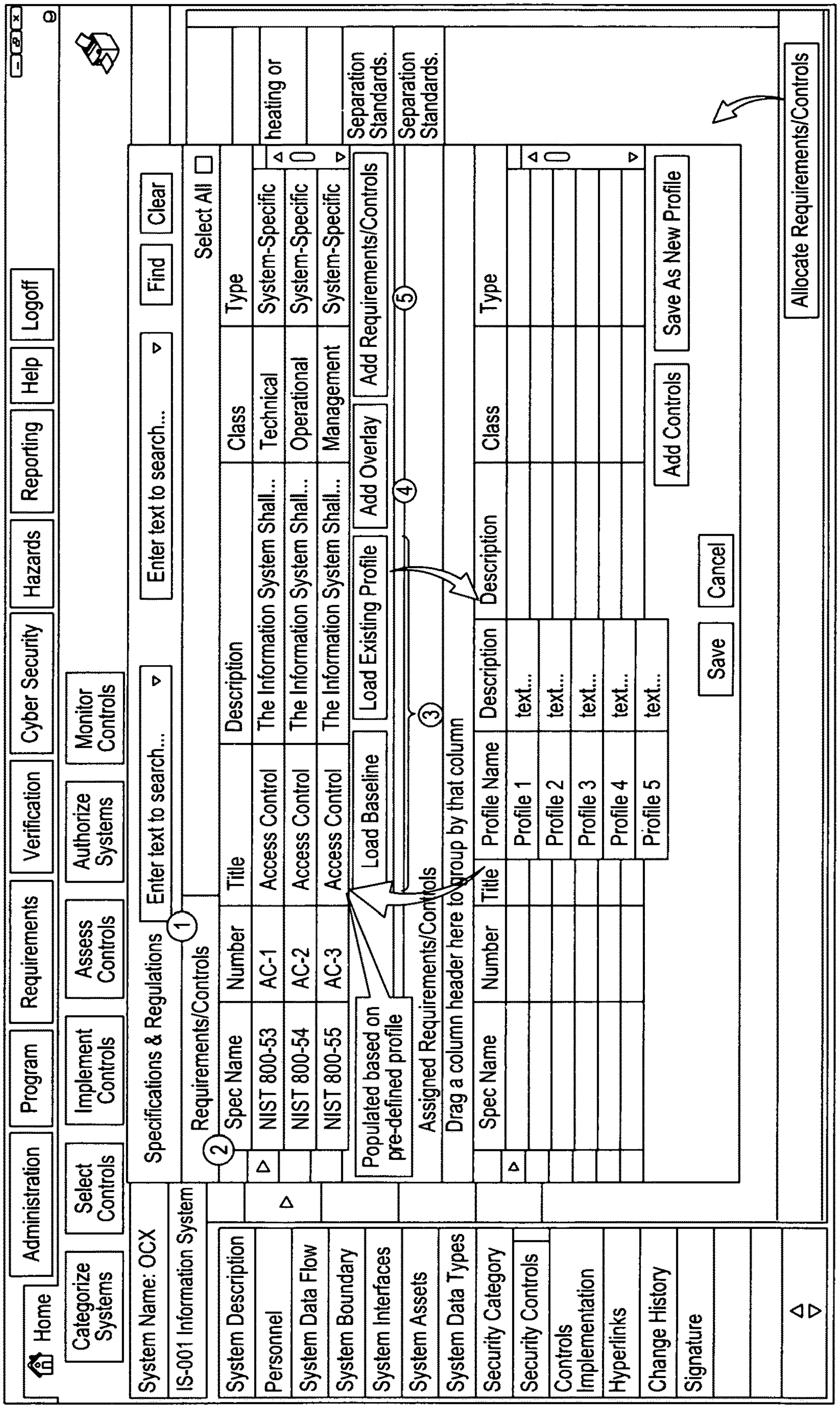
FIG. 56 illustrates Security Controls Profile Definition. Feature enables users to create a pre-defined controls/requirements set, or profile, which will be assigned to an IS. Profile can consist of any set of requirements/controls including a modified baseline set of controls/requirements. Feature dramatically reduces the time required to manually select control profiles that apply to similar ISs. Security Controls Profile Load. Feature enables users to assign pre-defined controls/requirements set, or profile, to an IS.

FIG. 56 illustrates Security Controls Profile Definition. Feature enables users to create a pre-defined controls/requirements set, or profile, which will be assigned to an IS. Profile can consist of any set of requirements/controls including a modified baseline set of controls/requirements. Feature dramatically reduces the time required to manually select control profiles that apply to similar ISs. Security Controls Profile Load. Feature enables users to assign pre-defined controls/requirements set, or profile, to an IS.

Figure 57:
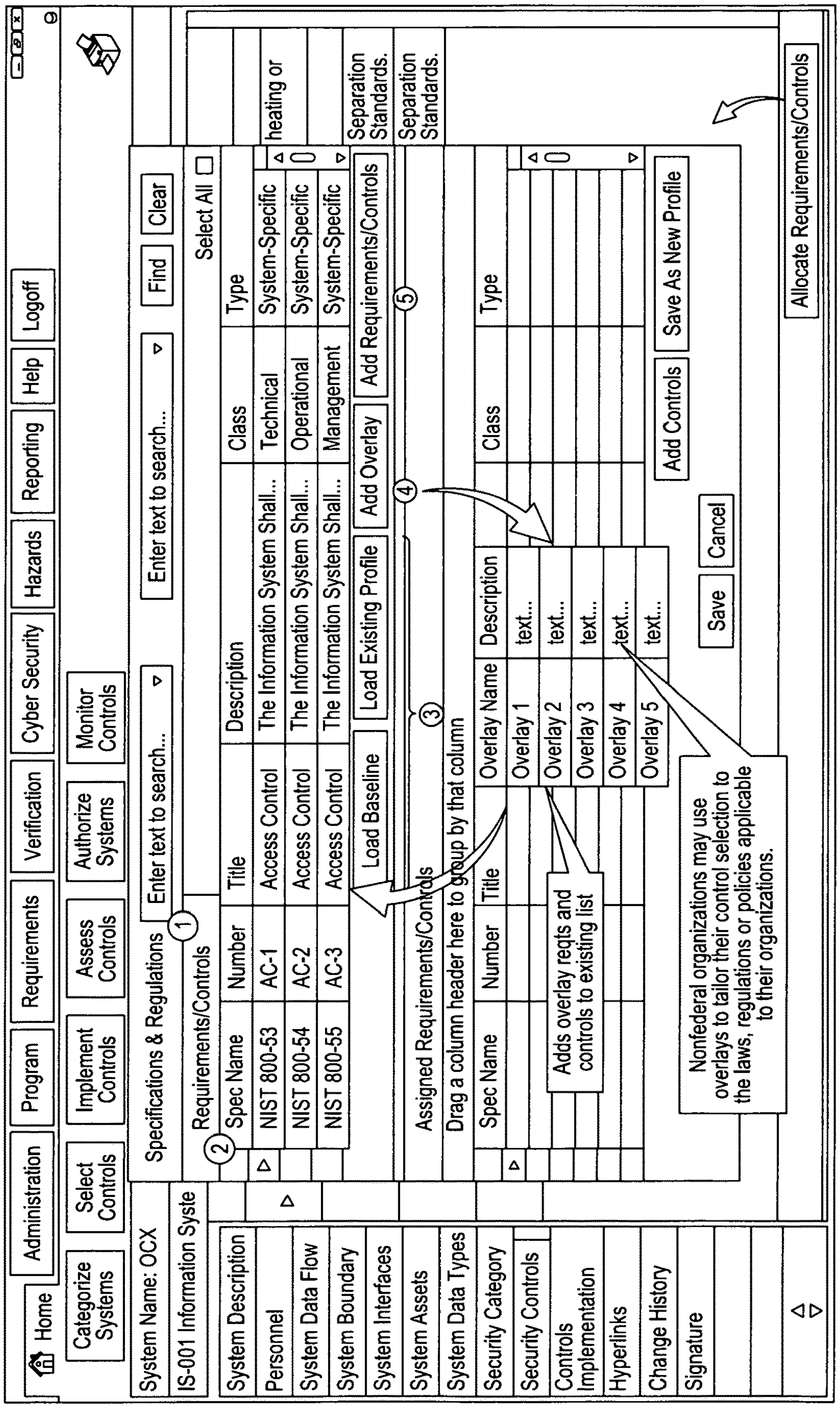
FIG. 57 illustrates Security Controls Overlay: Feature enables users to "overlay" or add additional requirements to selected baseline or profile controls/requirements.

FIG. 57 illustrates Security Controls Overlay: Feature enables users to "overlay" or add additional requirements to selected baseline or profile controls/requirements.

Figure 58:
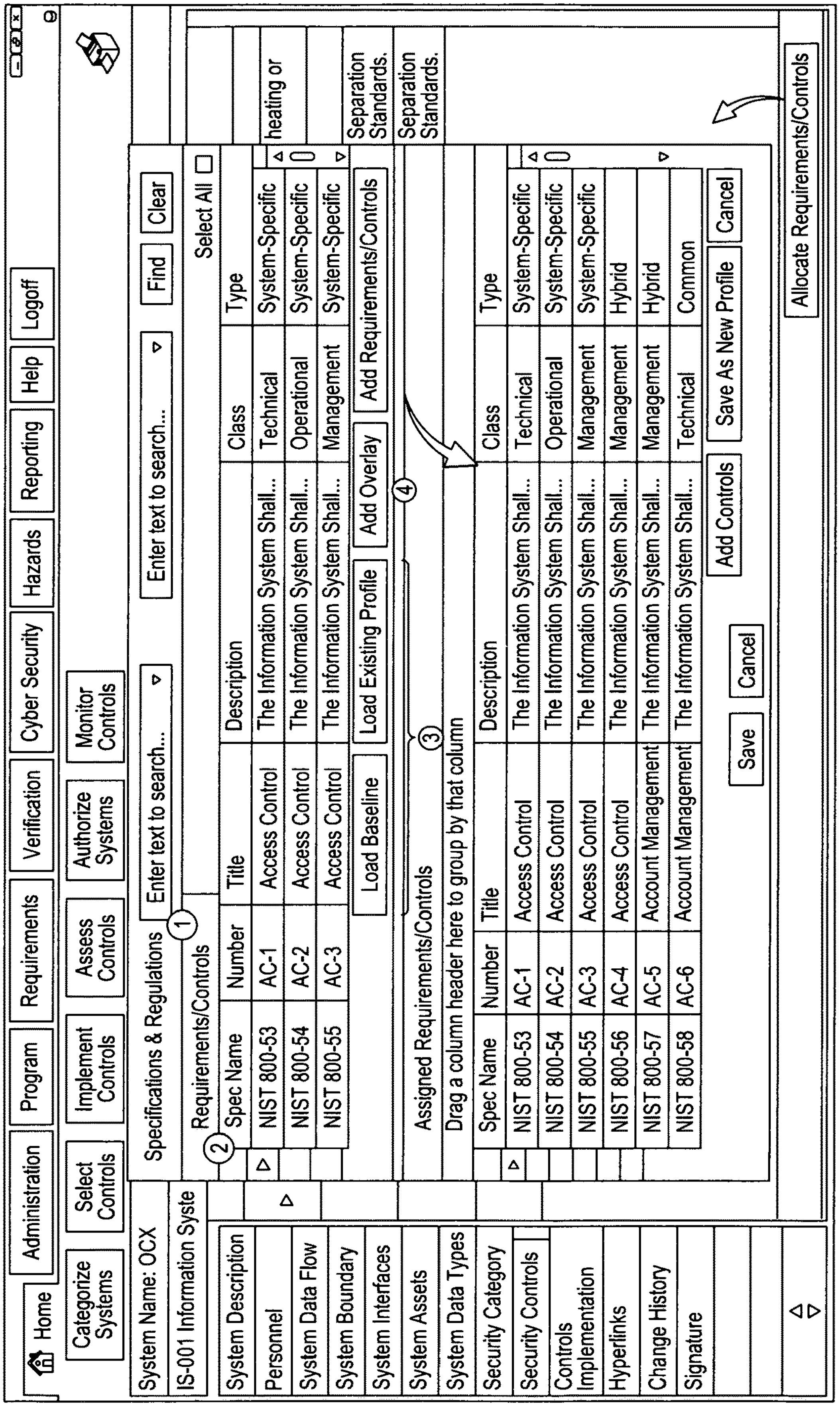
FIG. 58 illustrates Add Requirements/Controls: The physical action of clicking the "Add Requirements/Controls" button allocates the selected requirements to the IS. This process creates a unique relationship between the IS unique ID and the control/requirement unique ID.

FIG. 58 illustrates Add Requirements/Controls: The physical action of clicking the "Add Requirements/Controls" button allocates the selected requirements to the IS. This process creates a unique relationship between the IS unique ID and the control/requirement unique ID.

Figure 59:
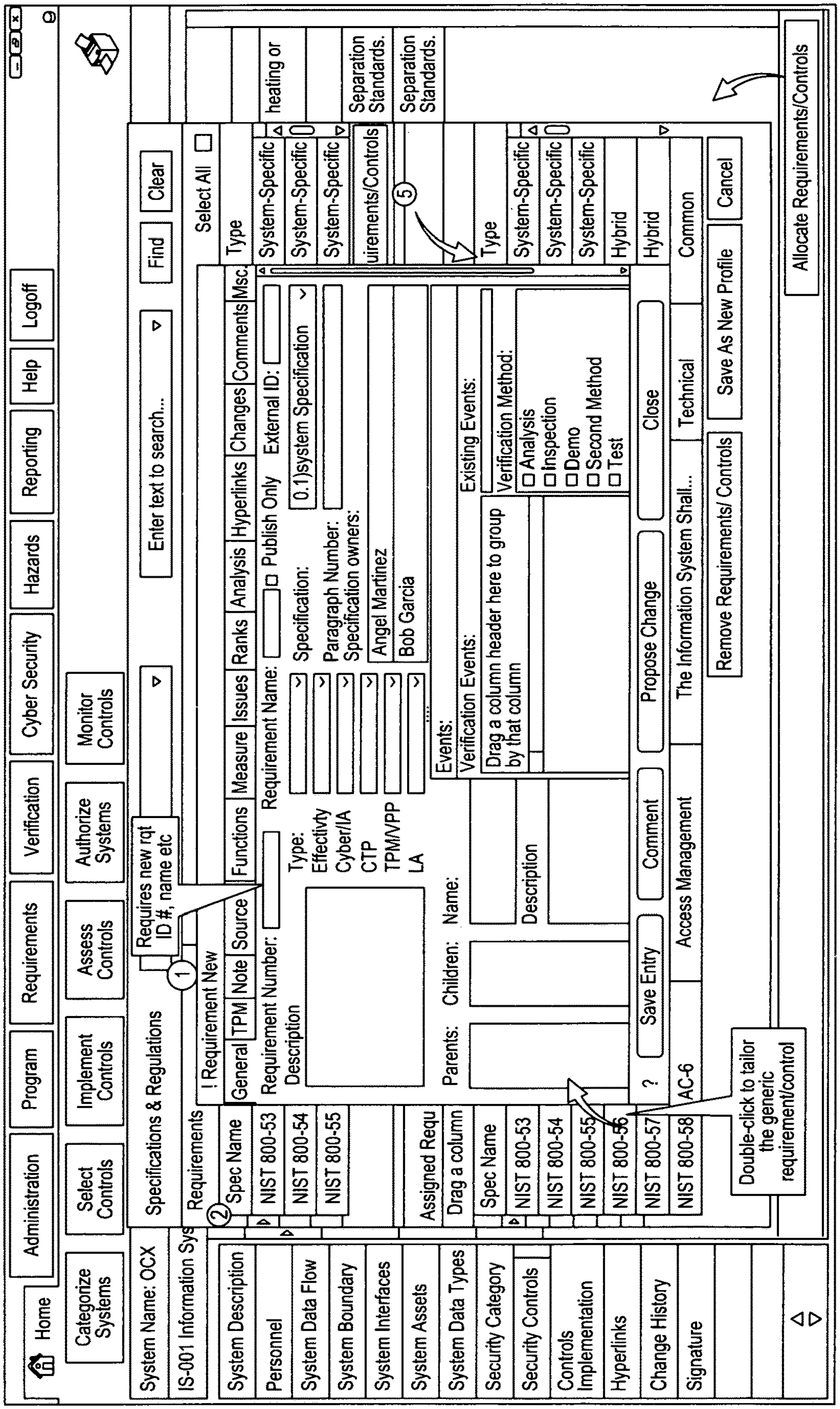
FIG. 59 illustrates Requirements/Control Tailoring: When double-click requirement/control, a pop-up form is presented that provides users with the ability to modify the generic requirement text, including the method to be used for verification.

FIG. 59 illustrates Requirements/Control Tailoring: When double-click requirement/control, a pop-up form is presented that provides users with the ability to modify the generic requirement text, including the method to be used for verification.

Figure 60:
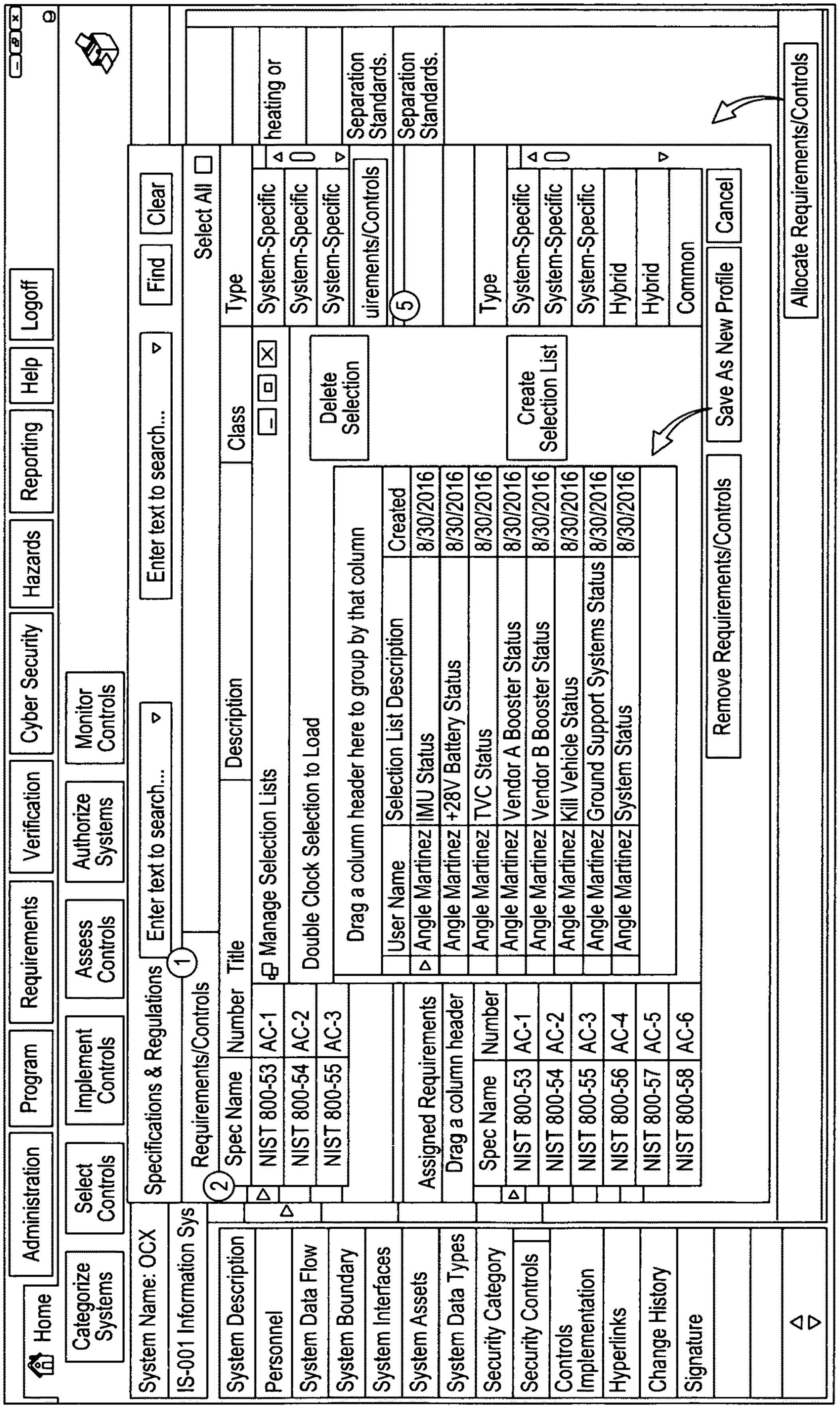
FIG. 60 illustrates New Profile Save Feature: Enables users to save the requirements/controls to a new profile to be used for subsequent ISs, including tailored requirements/controls.

FIG. 60 illustrates New Profile Save Feature: Enables users to save the requirements/controls to a new profile to be used for subsequent ISs, including tailored requirements/controls.

Figure 61:
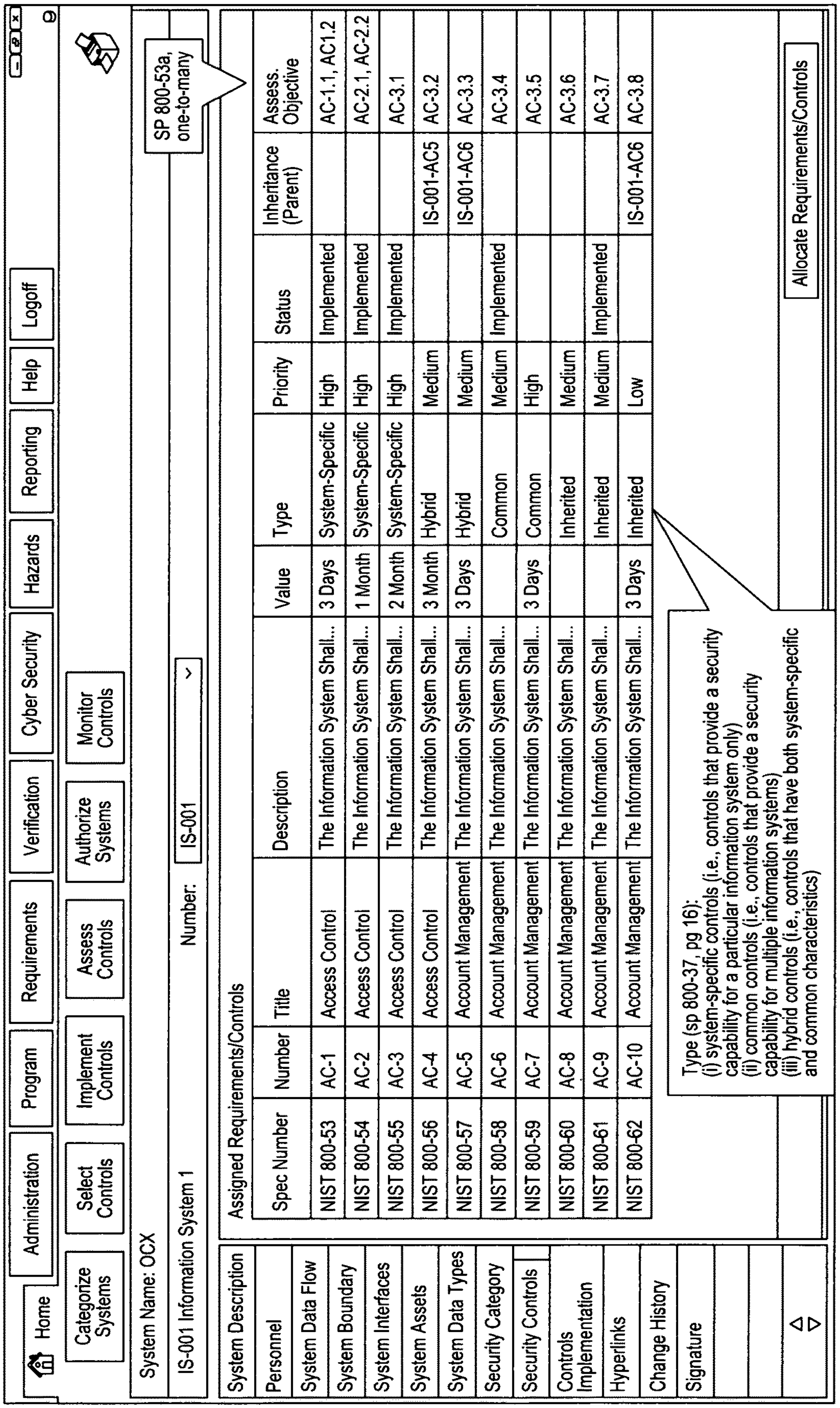
FIG. 61 illustrates Security Controls Display Form: Grid displays the requirements/controls assigned to the IS.

FIG. 61 illustrates Security Controls Display Form: Grid displays the requirements/controls assigned to the IS.

Figure 62:
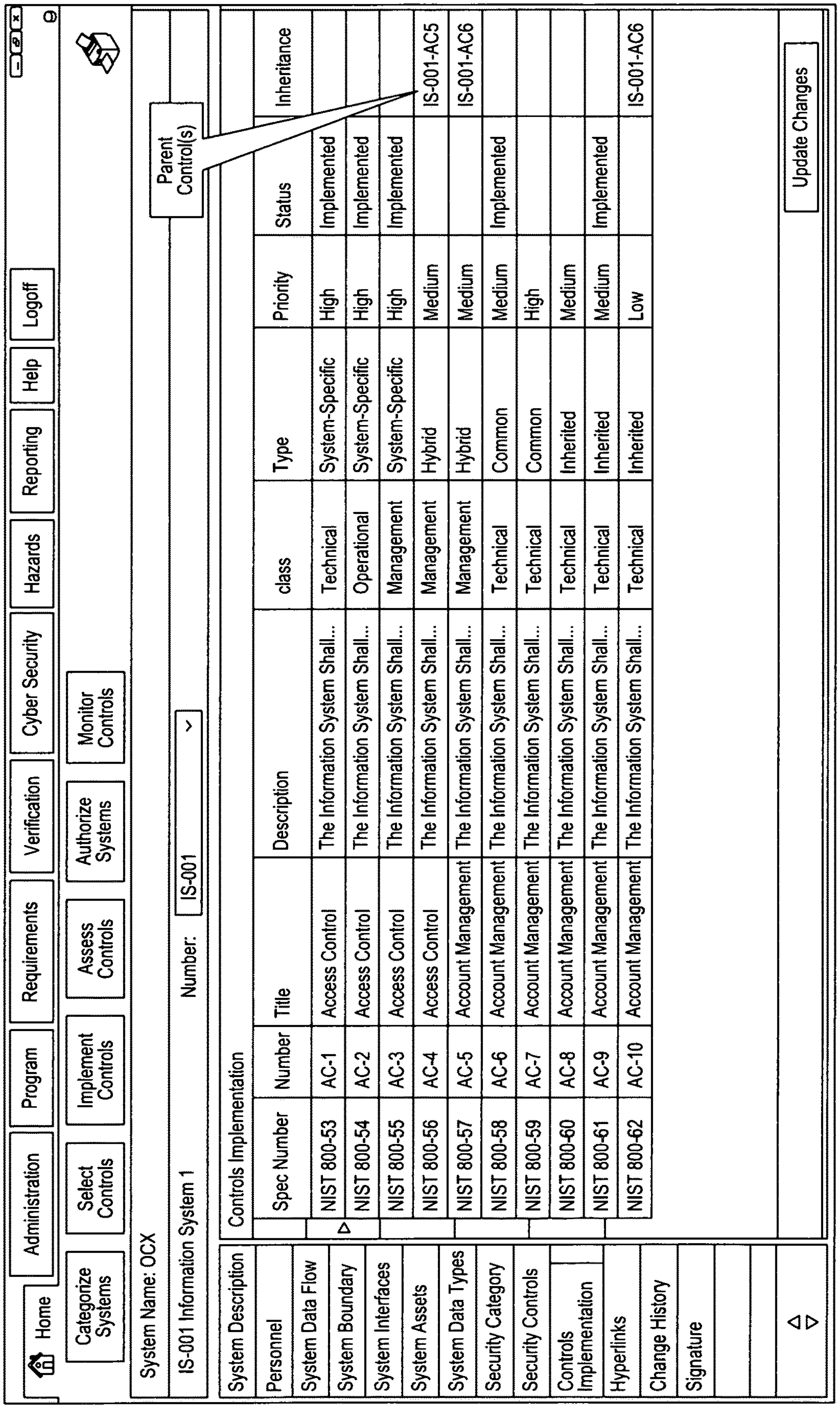
FIG. 62 illustrates Security Controls Display Form-Parent Controls Feature: Display the Parent controls for each control listed.

FIG. 62 illustrates Security Controls Display Form-Parent Controls Feature: Display the Parent controls for each control listed.

Figure 63:
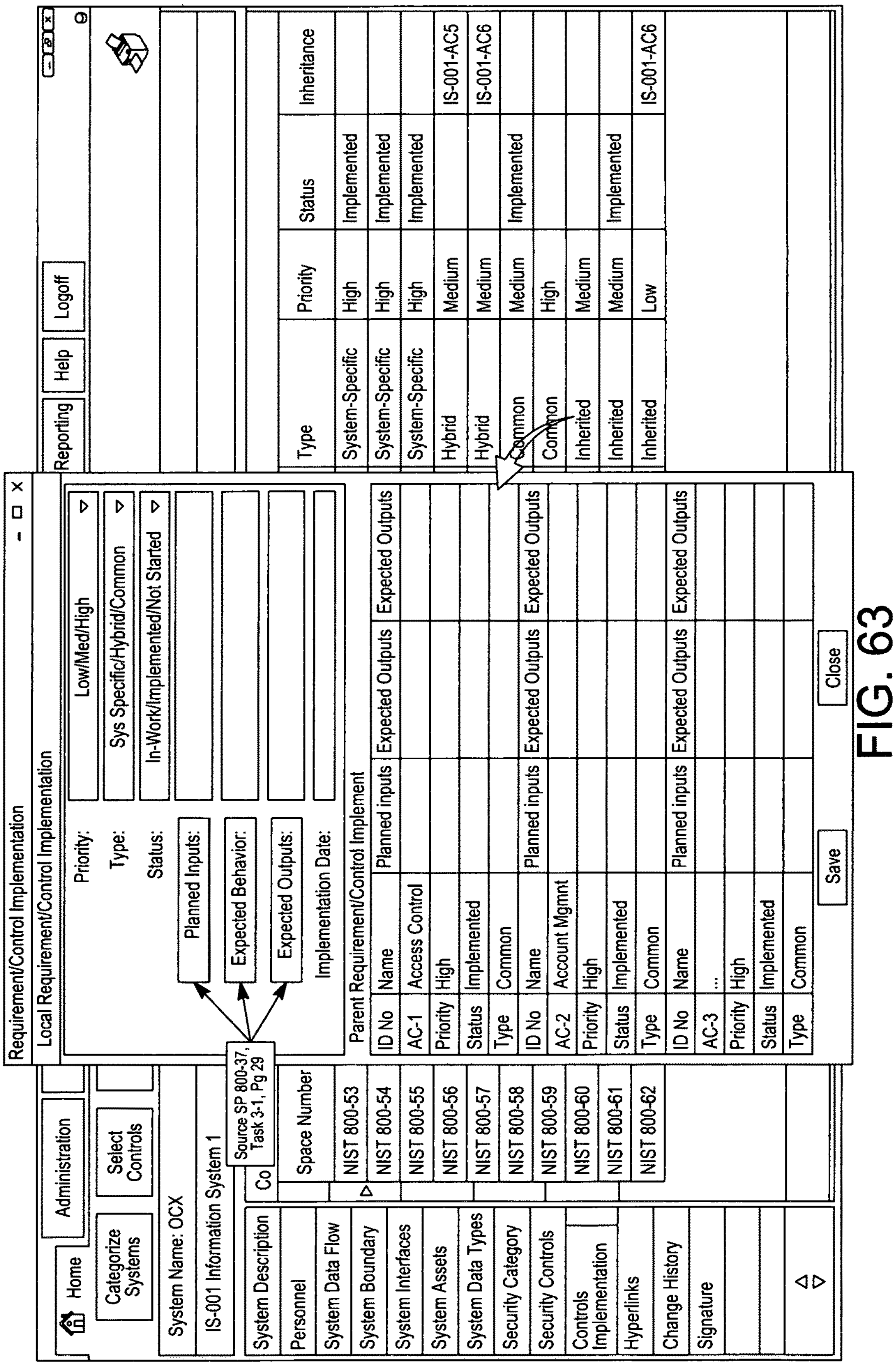
FIG. 63 illustrates Requirement/control Implementation Pop-up Form: Enables users to describe the expected results once the requirement/control is successfully implemented including the expected behavior and the expected outputs once the implementation is exercised.

FIG. 63 illustrates Requirement/control Implementation Pop-up Form: Enables users to describe the expected results once the requirement/control is successfully implemented including the expected behavior and the expected outputs once the implementation is exercised.

Figure 64A:
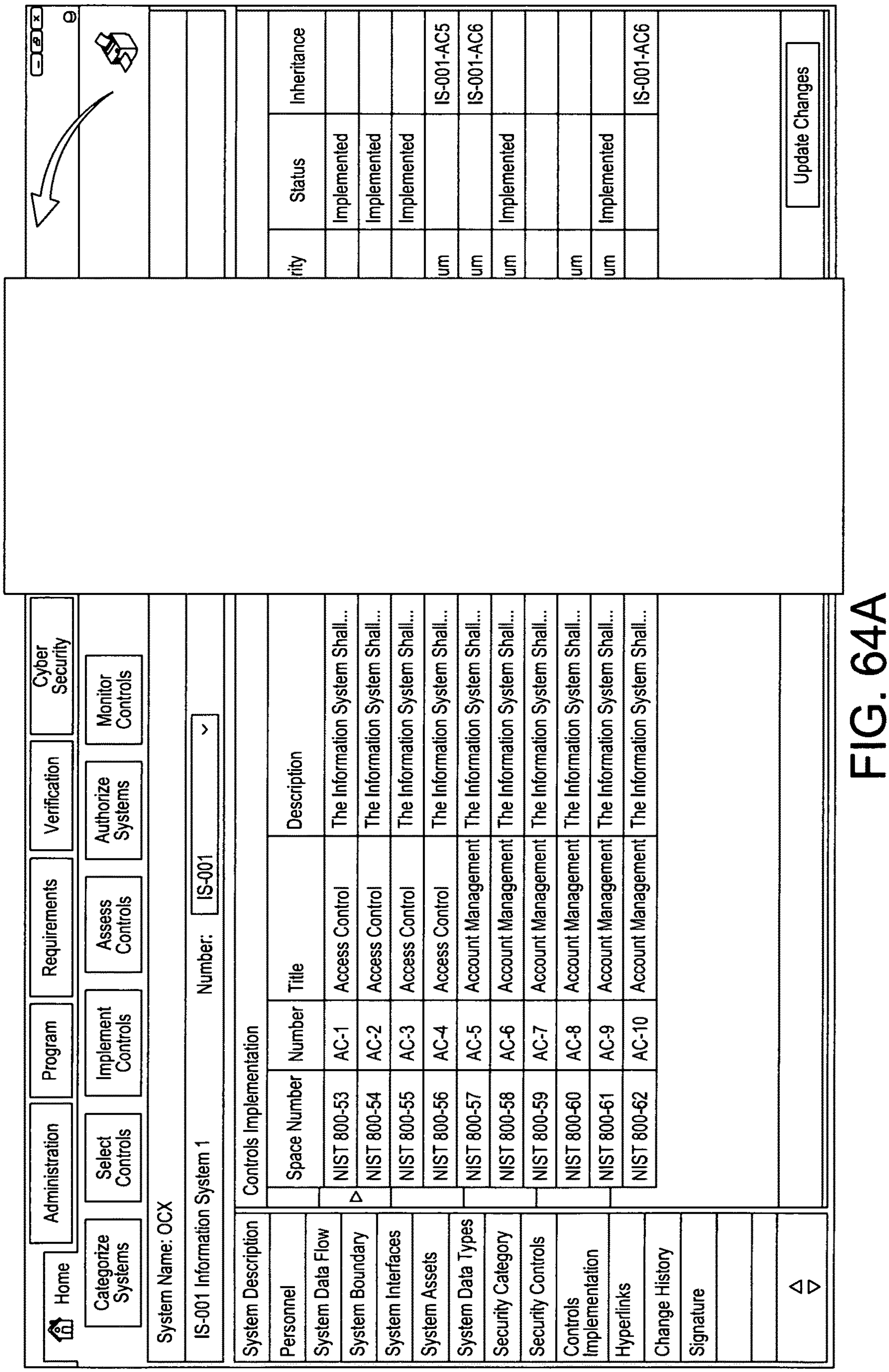
FIG. 64 is divided into FIG. 64A and FIG. 64B. Furthermore.
FIG. 64B is divided into two pages 64B.1 and 64B.2. The entire

FIG. 64 is divided into FIG. 64A and FIG. 64B. Furthermore, FIG. 64B is divided into two pages 64B.1 and 64B.2. The entire FIG. 64 illustrates System Baseline Report: Automated report that summarizes the system baseline by formatting and displaying all data content input using GUI forms 1-29.

FIG. 65 (is divided into FIG. 65A and FIG. 65B) illustrates System Baseline Report: Automated report that summarizes the system baseline by formatting and displaying all data content input using GUI forms 1-29.

Figure 66:
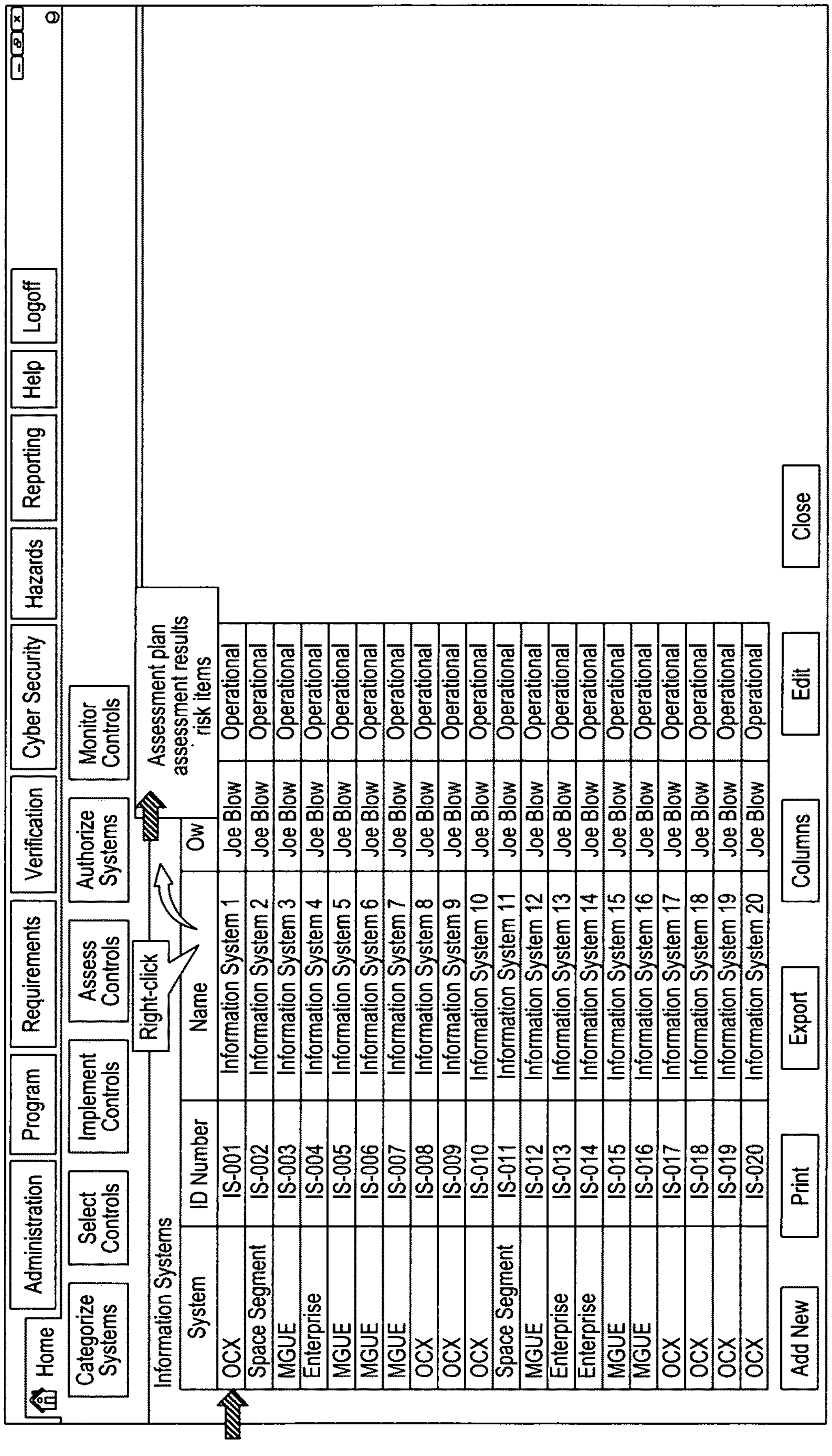
FIG. 66 illustrates IS List Form: Provides comprehensive listing of all ISs entered into database. Right-clicking anywhere in IS row enables users to navigate to the IS assessment plan, assessment results or associated risk items.

FIG. 66 illustrates IS List Form: Provides comprehensive listing of all ISs entered into database. Right-clicking anywhere in IS row enables users to navigate to the IS assessment plan, assessment results or associated risk items.

Figure 67:
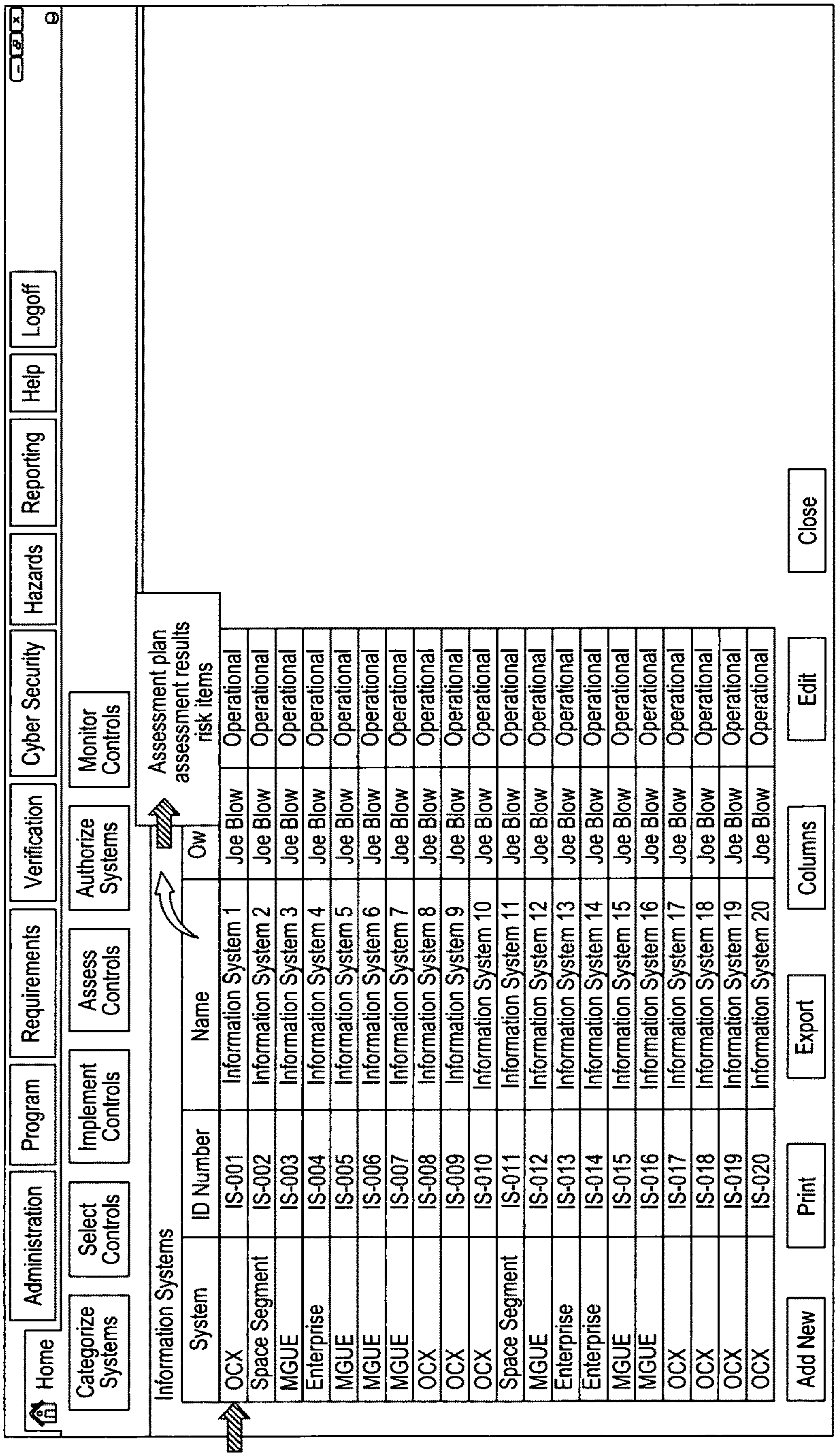
FIG. 67 illustrates IS List Form Navigation to Assessment Results: Provides comprehensive listing of all ISs entered into database. Right-clicking and selecting assessment results enables navigation to assessment results GUI.

FIG. 67 illustrates IS List Form Navigation to Assessment Results: Provides comprehensive listing of all ISs entered into database. Right-clicking and selecting assessment results enables navigation to assessment results GUI.

Figure 68:
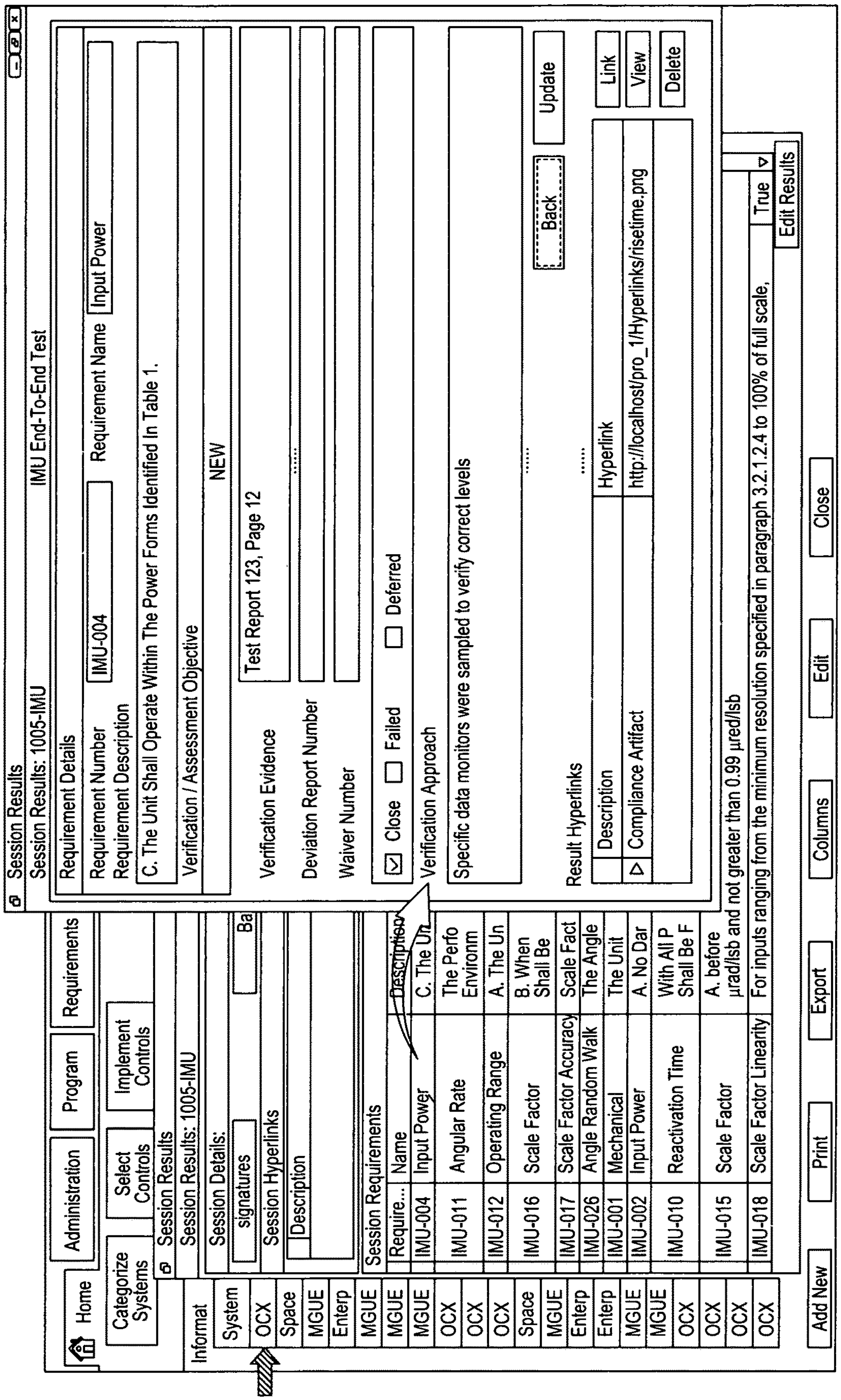
FIG. 68 illustrates Assessment Results Data Input: Provides data entry interface for requirement/control compliance data.

FIG. 68 illustrates Assessment Results Data Input: Provides data entry interface for requirement/control compliance data.

Figure 69:
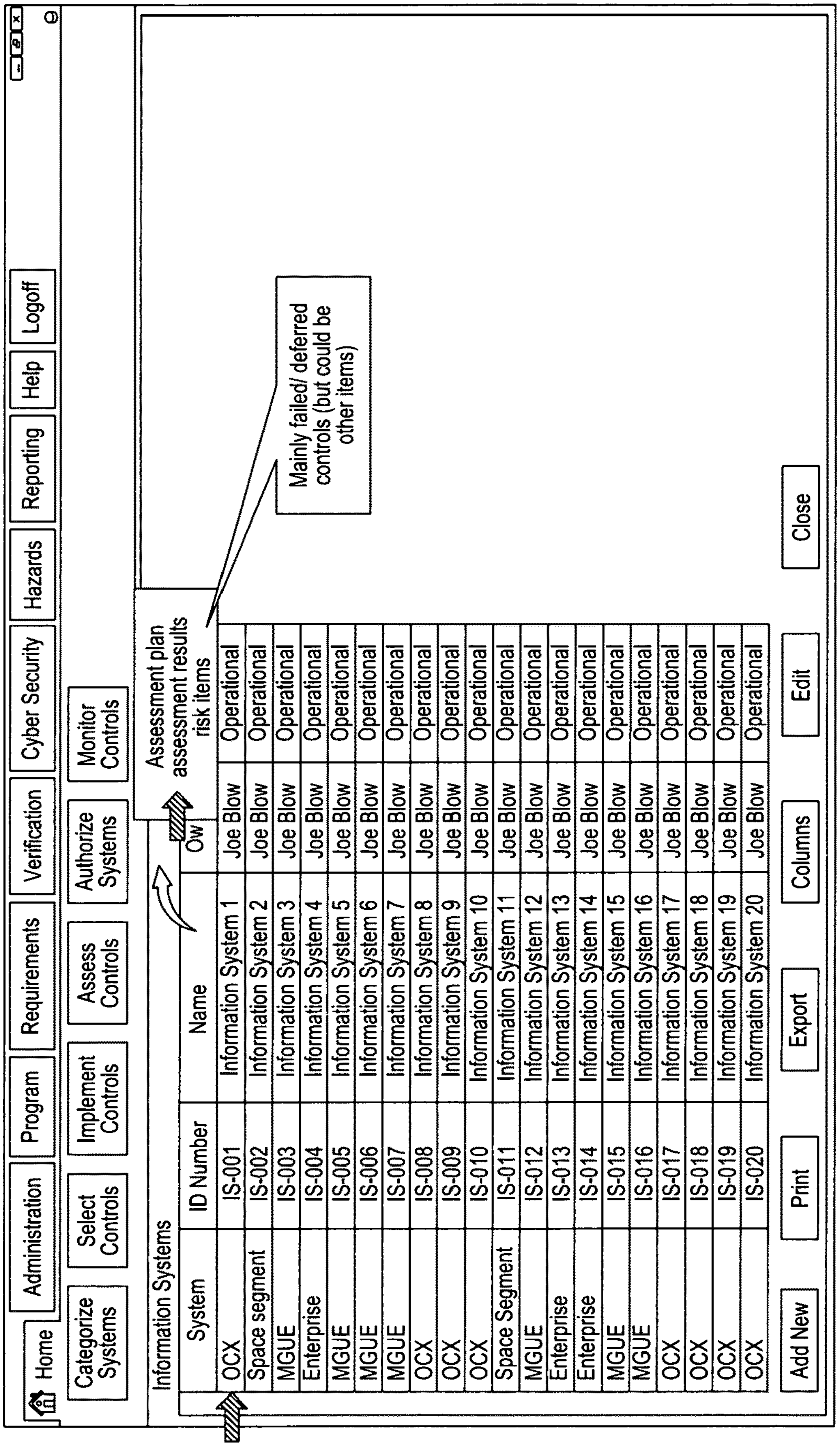
FIG. 69 illustrates IS List Form: Provides comprehensive listing of all ISs entered into database. Right-clicking anywhere in IS row enables users to navigate to the IS associated risk items.

FIG. 69 illustrates IS List Form: Provides comprehensive listing of all ISs entered into database. Right-clicking anywhere in IS row enables users to navigate to the IS associated risk items.

Figure 70:
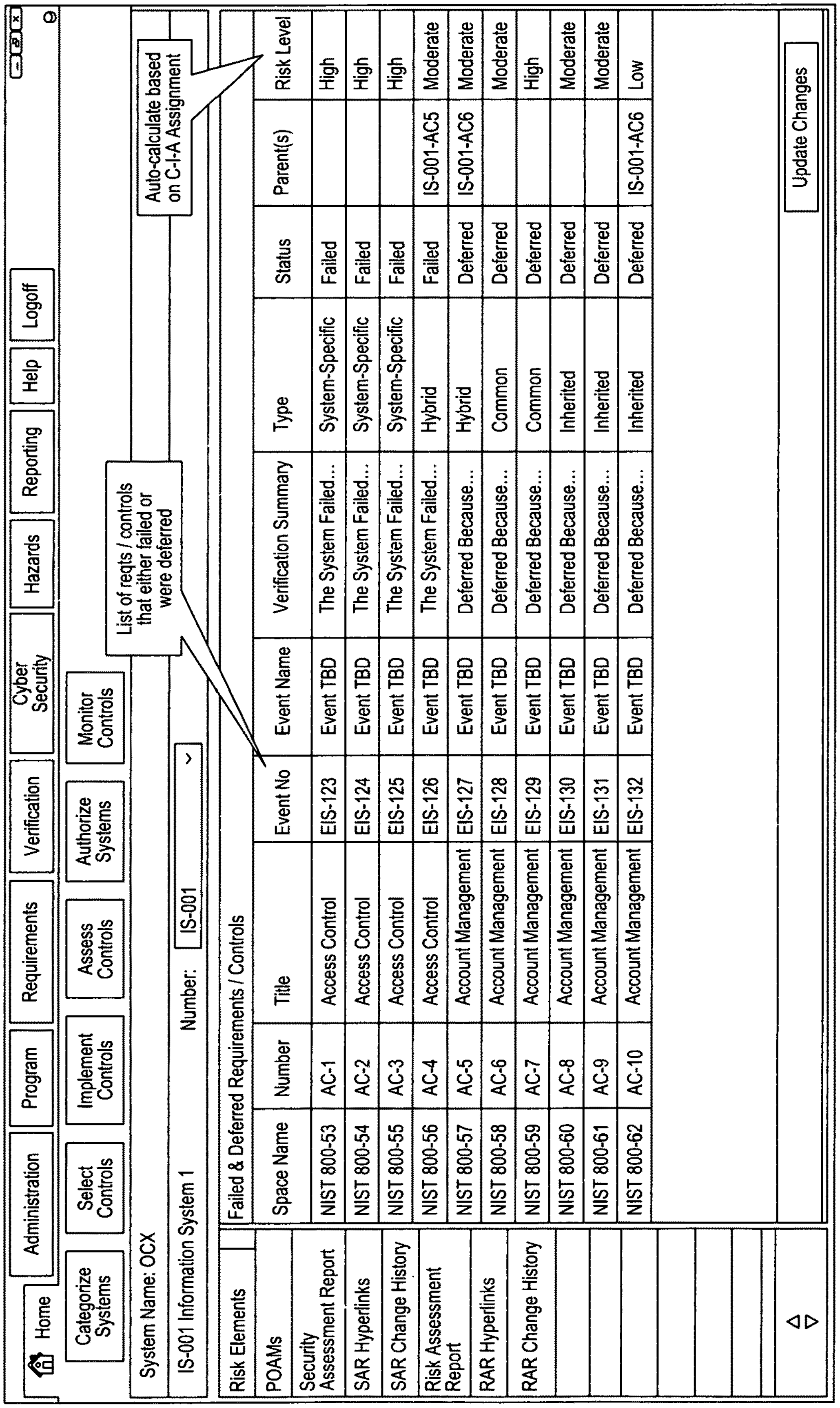
FIG. 70 illustrates IS Risk Element Form: Contains a comprehensive listing of all requirements/controls that either failed or were deferred as a result of compliance event inspection, test or analysis. List also displays parent controls that have a higher-level potential impact to IS risk.

FIG. 70 illustrates IS Risk Element Form: Contains a comprehensive listing of all requirements/controls that either failed or were deferred as a result of compliance event inspection, test or analysis. List also displays parent controls that have a higher-level potential impact to IS risk.

Figure 71:
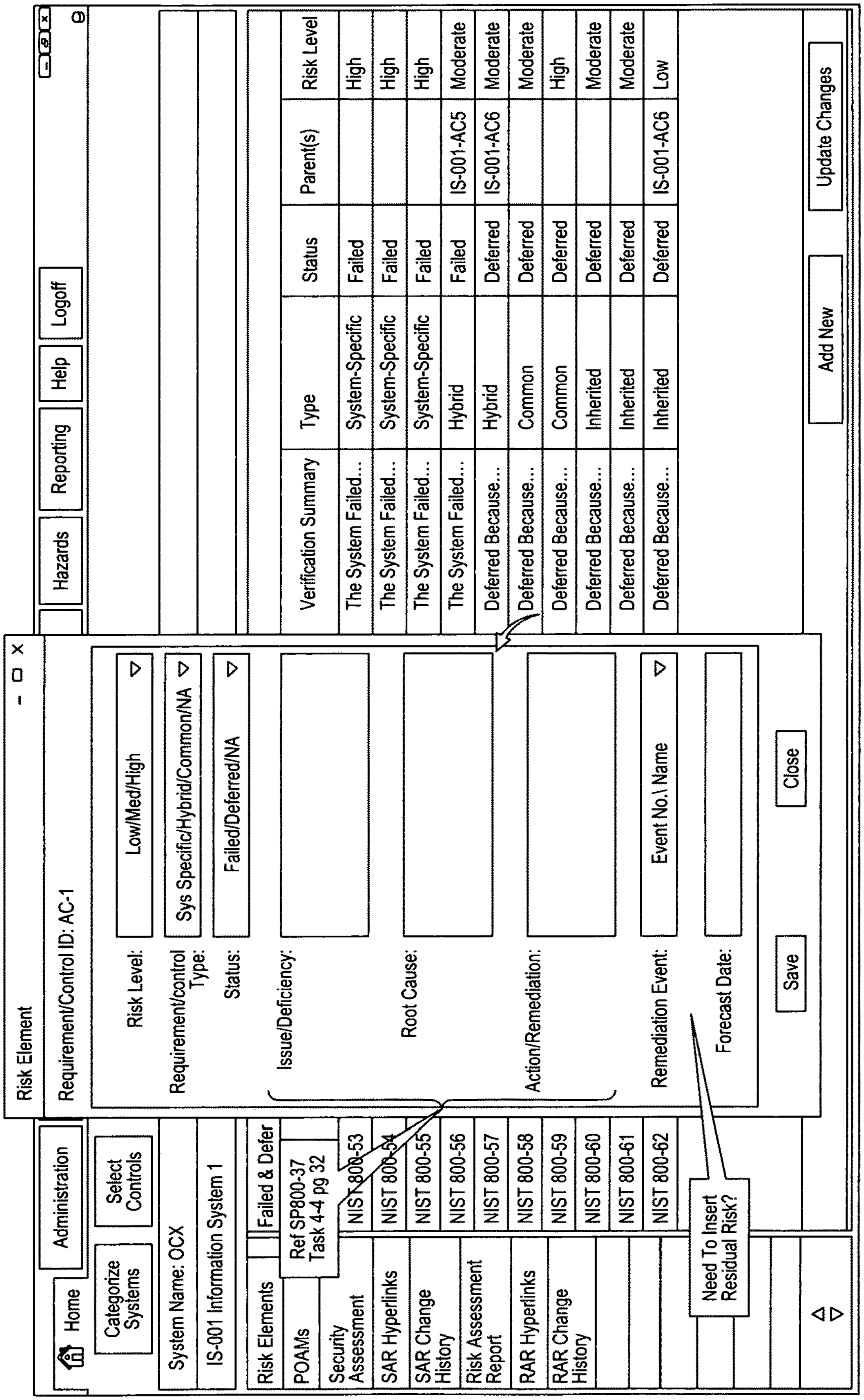
FIG. 71 illustrates Risk element Pop-up Form: User double-clicks anywhere in the risk element form to have activate the pop-up form which enables users to enter data associated with the risk issue/deficiency, root cause, action/remediation and forecast date for issue resolution.

FIG. 71 illustrates Risk element Pop-up Form: User double-clicks anywhere in the risk element form to have activate the pop-up form which enables users to enter data associated with the risk issue/deficiency, root cause, action/remediation and forecast date for issue resolution.

Figure 72:
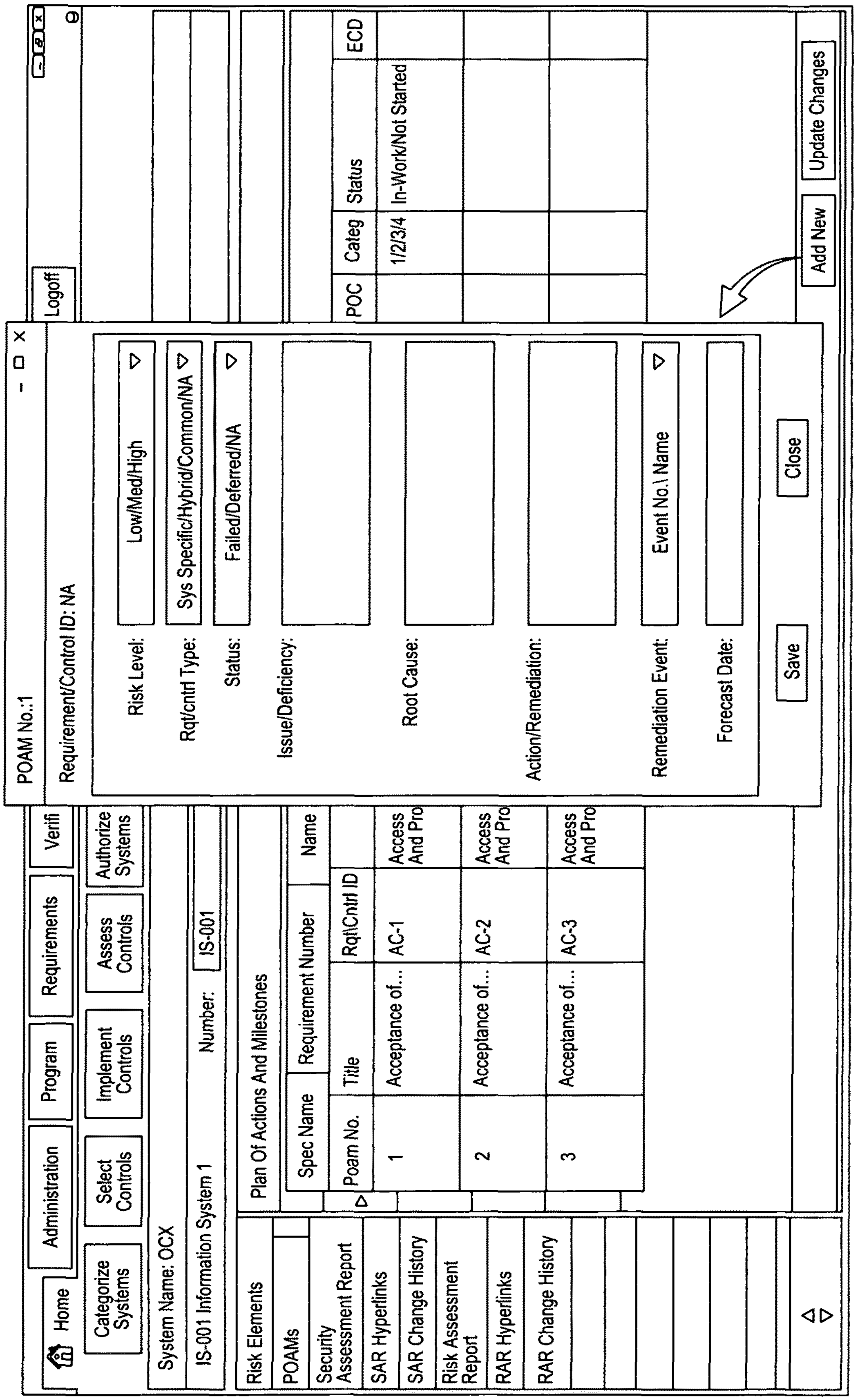
FIG. 72 illustrates Plan of Actions and Milestones (POAM) Form: Pop-up form that enables users to assign discrete POAMs for each failed or deferred requirement/control.

FIG. 72 illustrates Plan of Actions and Milestones (POAM) Form: Pop-up form that enables users to assign discrete POAMs for each failed or deferred requirement/control.

Figure 73:
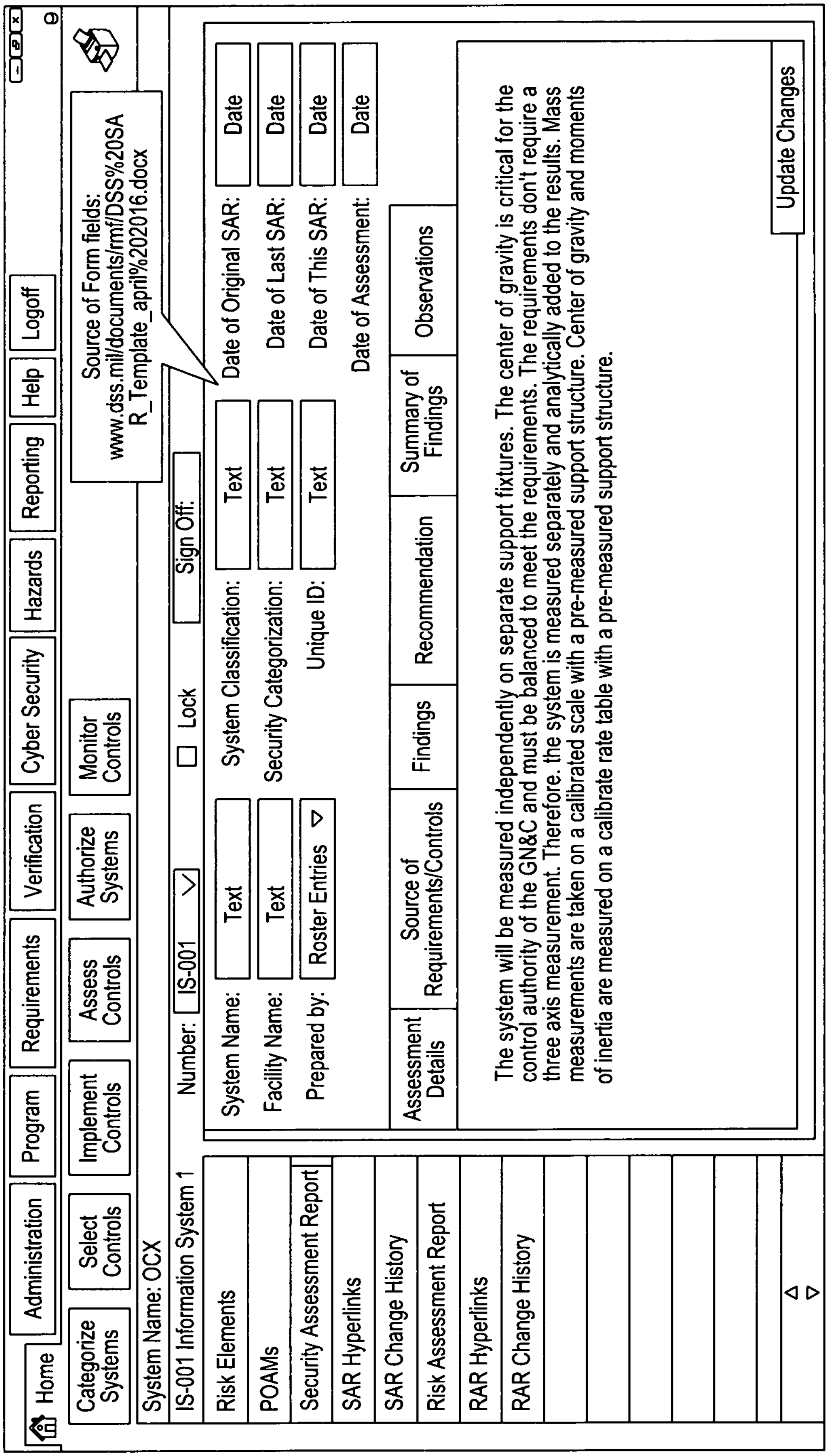
FIG. 73 illustrates Security Assessment Form-Assessment Details: Contains requisite fields needed to be complete to generate a security assessment report in accordance with the NIST-800-37. This GUI displays the assessment details tab which is a text data entry.

FIG. 73 illustrates Security Assessment Form-Assessment Details: Contains requisite fields needed to be complete to generate a security assessment report in accordance with the NIST-800-37. This GUI displays the assessment details tab which is a text data entry.

Figure 74:
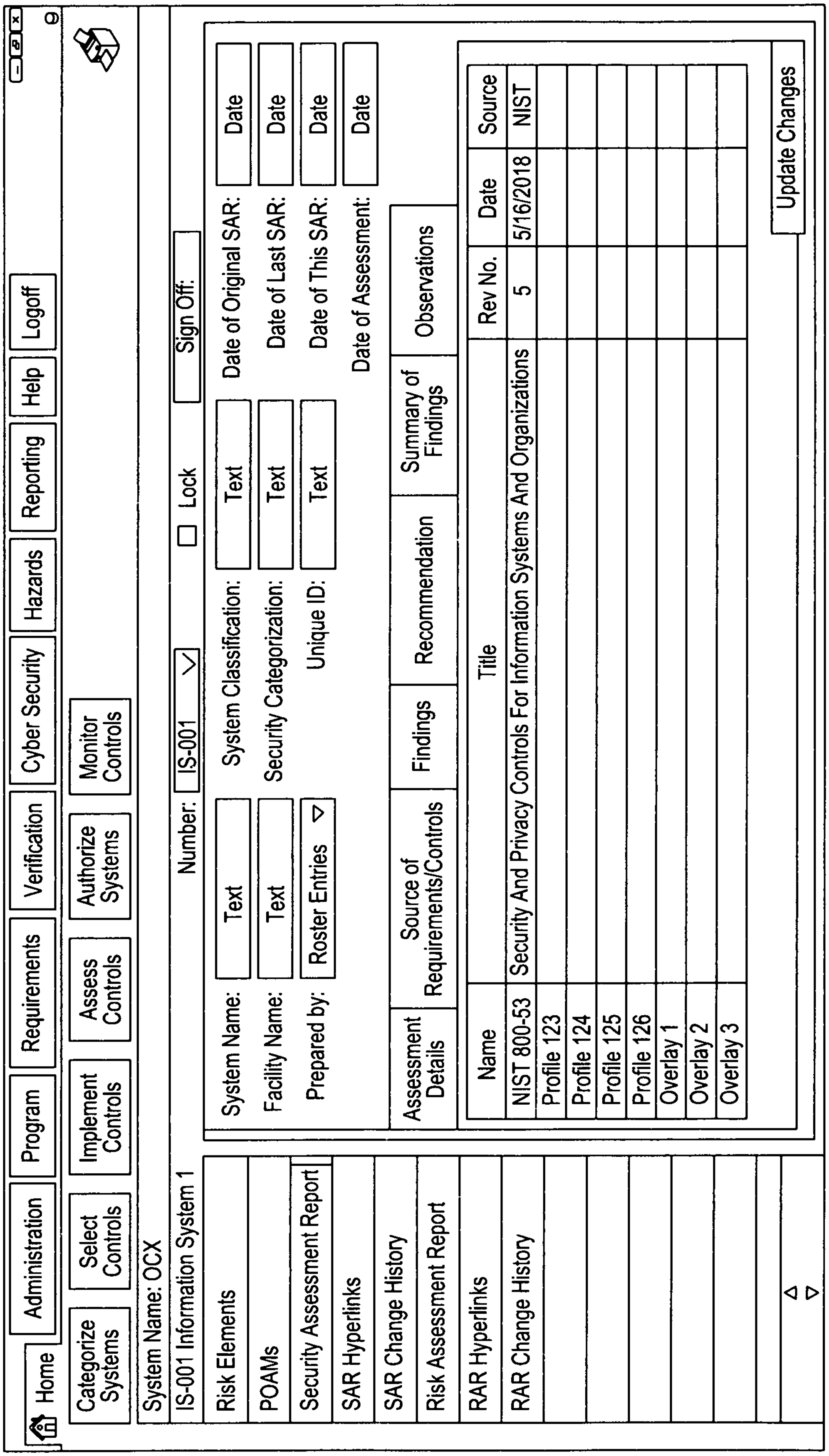
FIG. 74 illustrates Security Assessment Form-Source of Requirements/Controls: Contains requisite fields needed to be complete to generate a security assessment report in accordance with the NIST-800-37. This GUI displays the Source of Requirements/Controls tab which is a text data entry.

FIG. 74 illustrates Security Assessment Form-Source of Requirements/Controls: Contains requisite fields needed to be complete to generate a security assessment report in accordance with the NIST-800-37. This GUI displays the Source of Requirements/Controls tab which is a text data entry.

Figure 75:
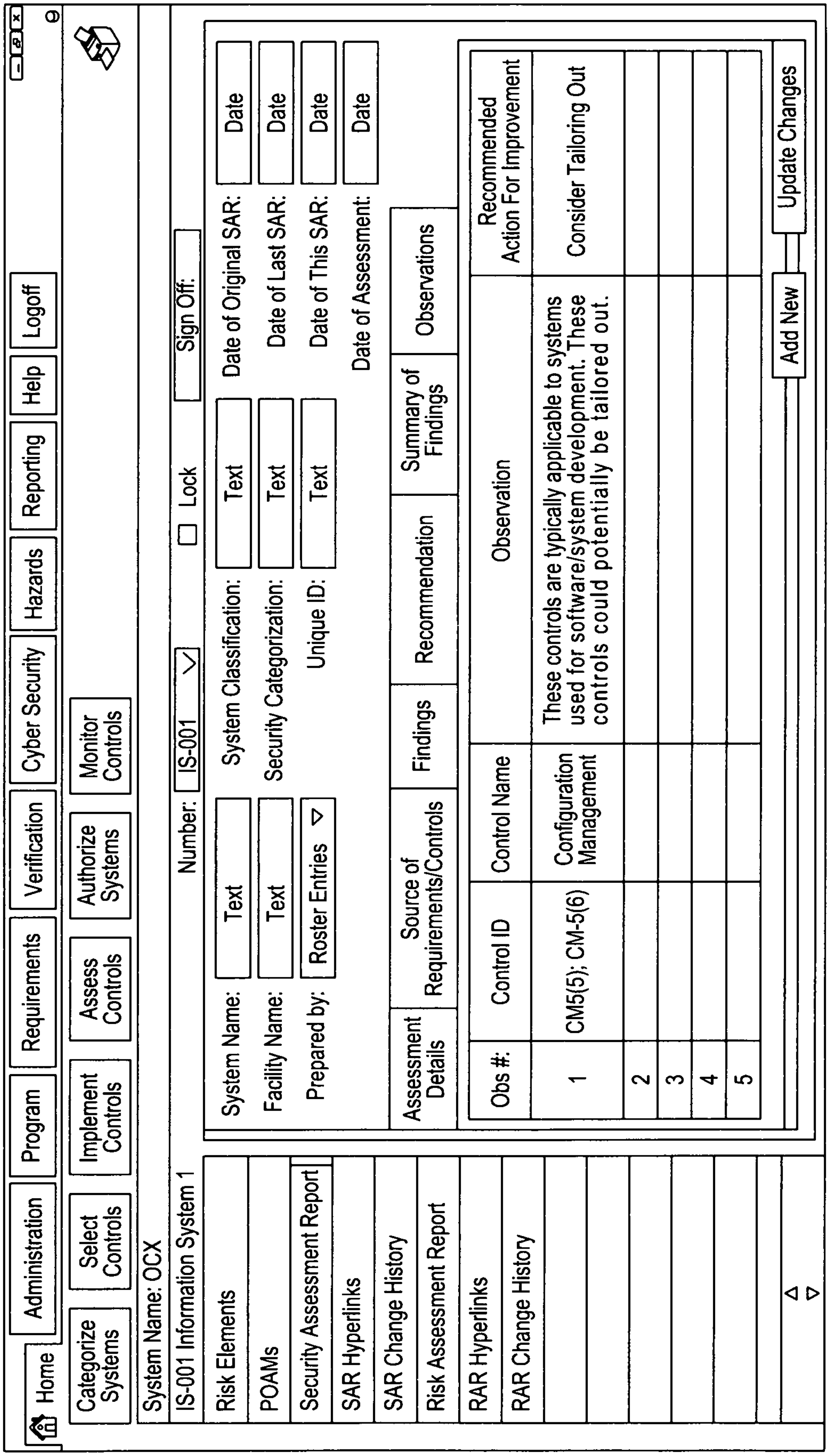
FIG. 75 illustrates Security Assessment Form-Findings: Contains requisite fields needed to be complete to generate a security assessment report in accordance with the NIST-800-37. This GUI displays the Findings tab which is a text data entry.

FIG. 75 illustrates Security Assessment Form-Findings: Contains requisite fields needed to be complete to generate a security assessment report in accordance with the NIST-800-37. This GUI displays the Findings tab which is a text data entry.

Figure 76:
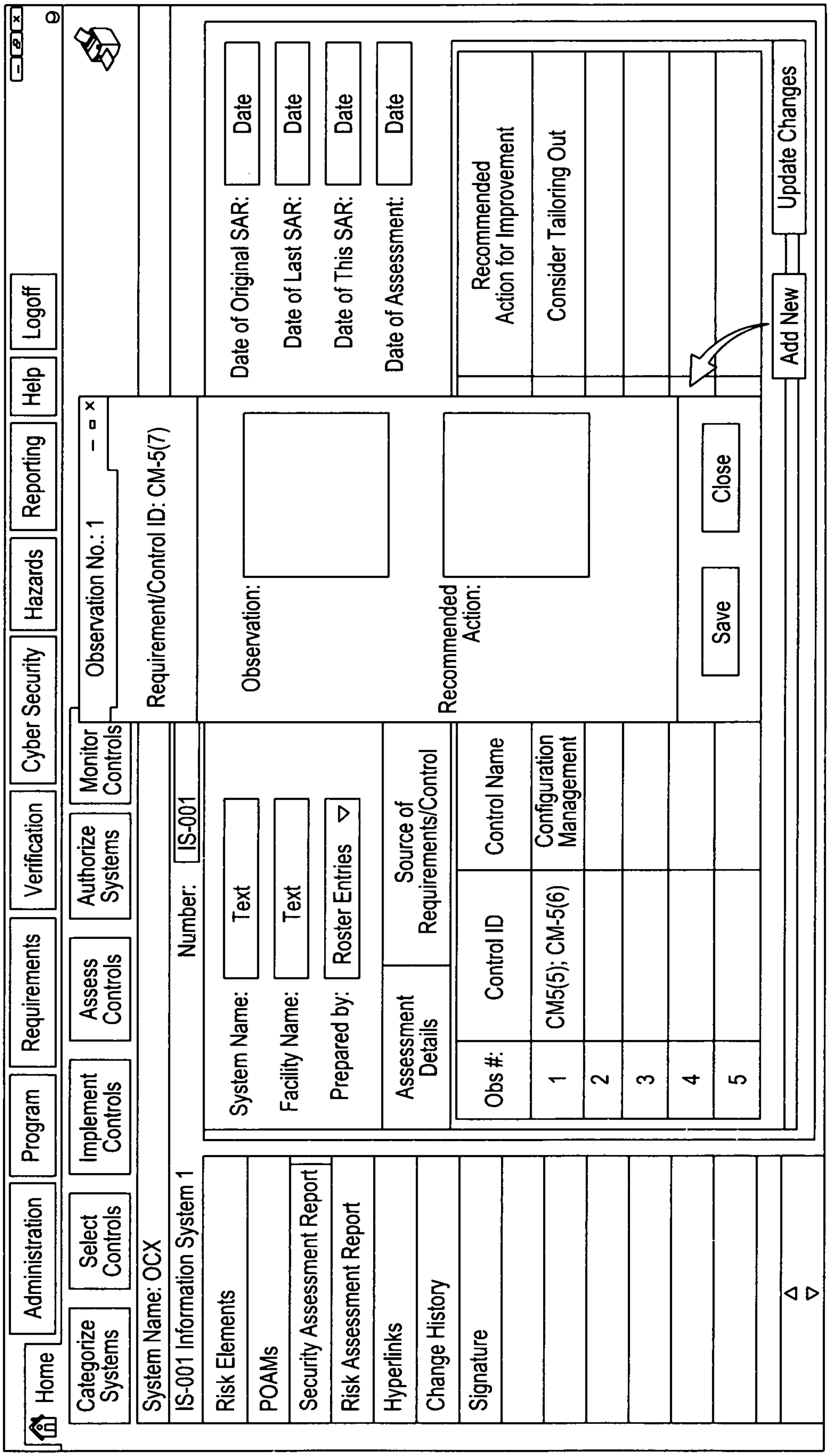
FIG. 76 illustrates Security Assessment Form-Observations: Contains requisite fields needed to be complete to generate a security assessment report in accordance with the NIST-800-37. This GUI displays the Observations tab which is a text data entry. Observations can be entered using the pop-up form as shown, which includes recommended action (if applicable).

FIG. 76 illustrates Security Assessment Form-Observations: Contains requisite fields needed to be complete to generate a security assessment report in accordance with the NIST-800-37. This GUI displays the Observations tab which is a text data entry. Observations can be entered using the pop-up form as shown, which includes recommended action (if applicable).

FIG. 77 is divided into FIG. 77A and FIG. 77B. The entire FIG. 77 illustrates Security Assessment Report (SAR): Report formats and displays SAR data entered in GUIs 39-42.

Figure 78:
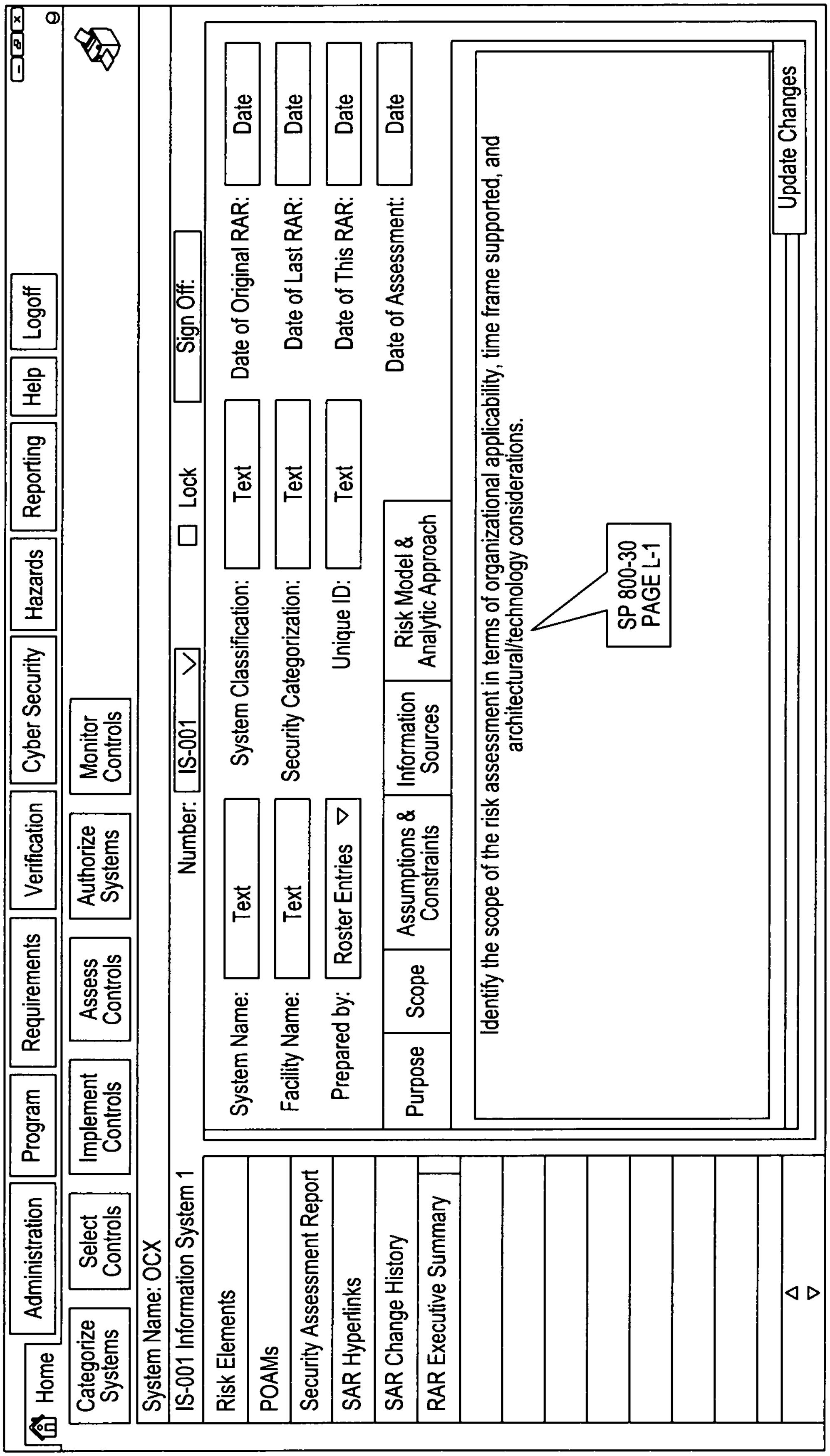
FIG. 78 illustrates Risk Assessment Form-Purpose: Contains requisite fields needed to be complete to generate a risk assessment report in accordance with the NIST-800-37. This GUI displays the purpose details tab which is a text data entry.

FIG. 78 illustrates Risk Assessment Form-Purpose: Contains requisite fields needed to be complete to generate a risk assessment report in accordance with the NIST-800-37. This GUI displays the purpose details tab which is a text data entry.

Figure 79:
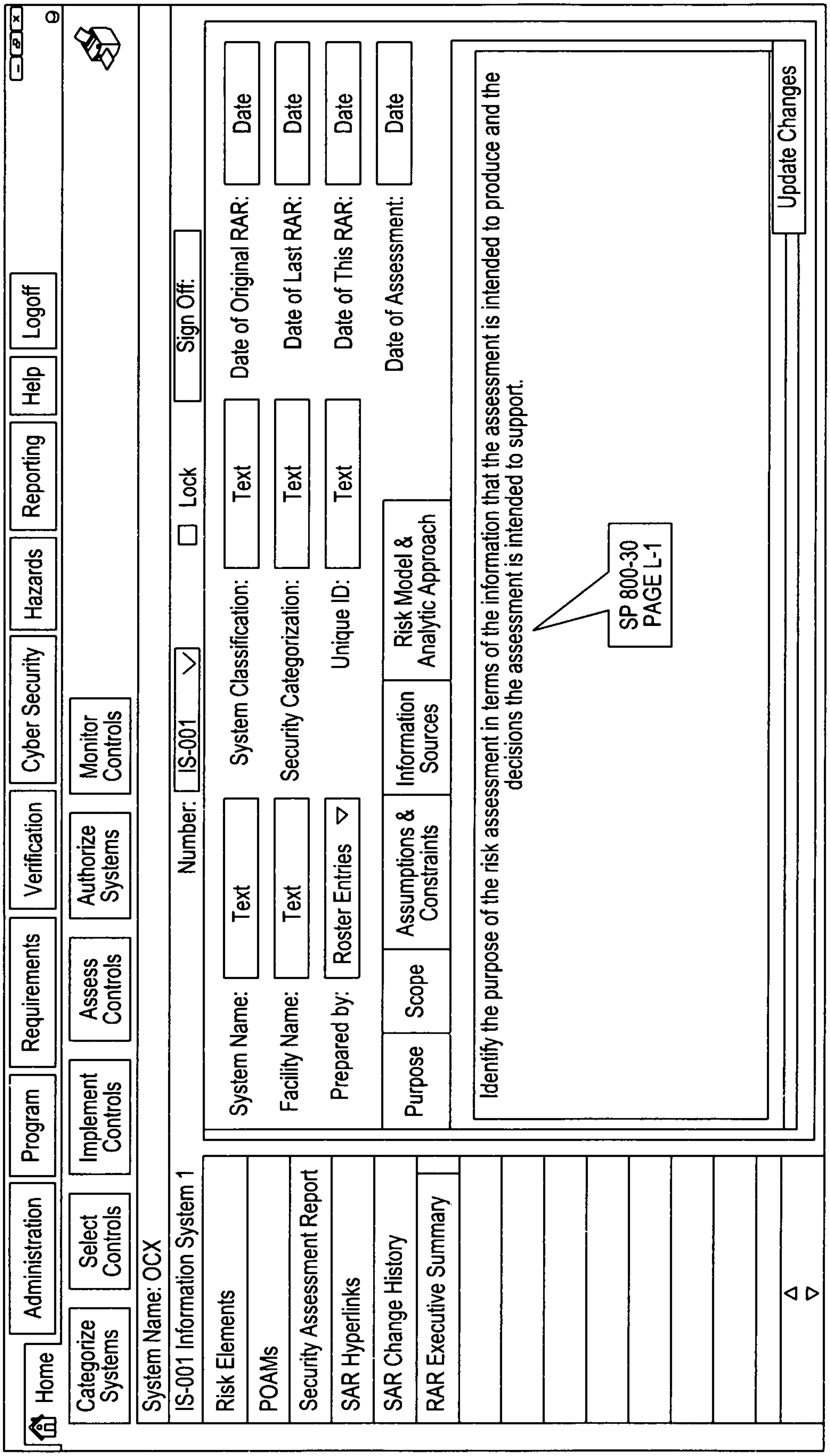
FIG. 79 illustrates Risk Assessment Form-Scope: Contains requisite fields needed to be complete to generate a risk assessment report in accordance with the NIST-800-37. This GUI displays the scope tab which is a text data entry.

FIG. 79 illustrates Risk Assessment Form-Scope: Contains requisite fields needed to be complete to generate a risk assessment report in accordance with the NIST-800-37. This GUI displays the scope tab which is a text data entry.

Figure 80:
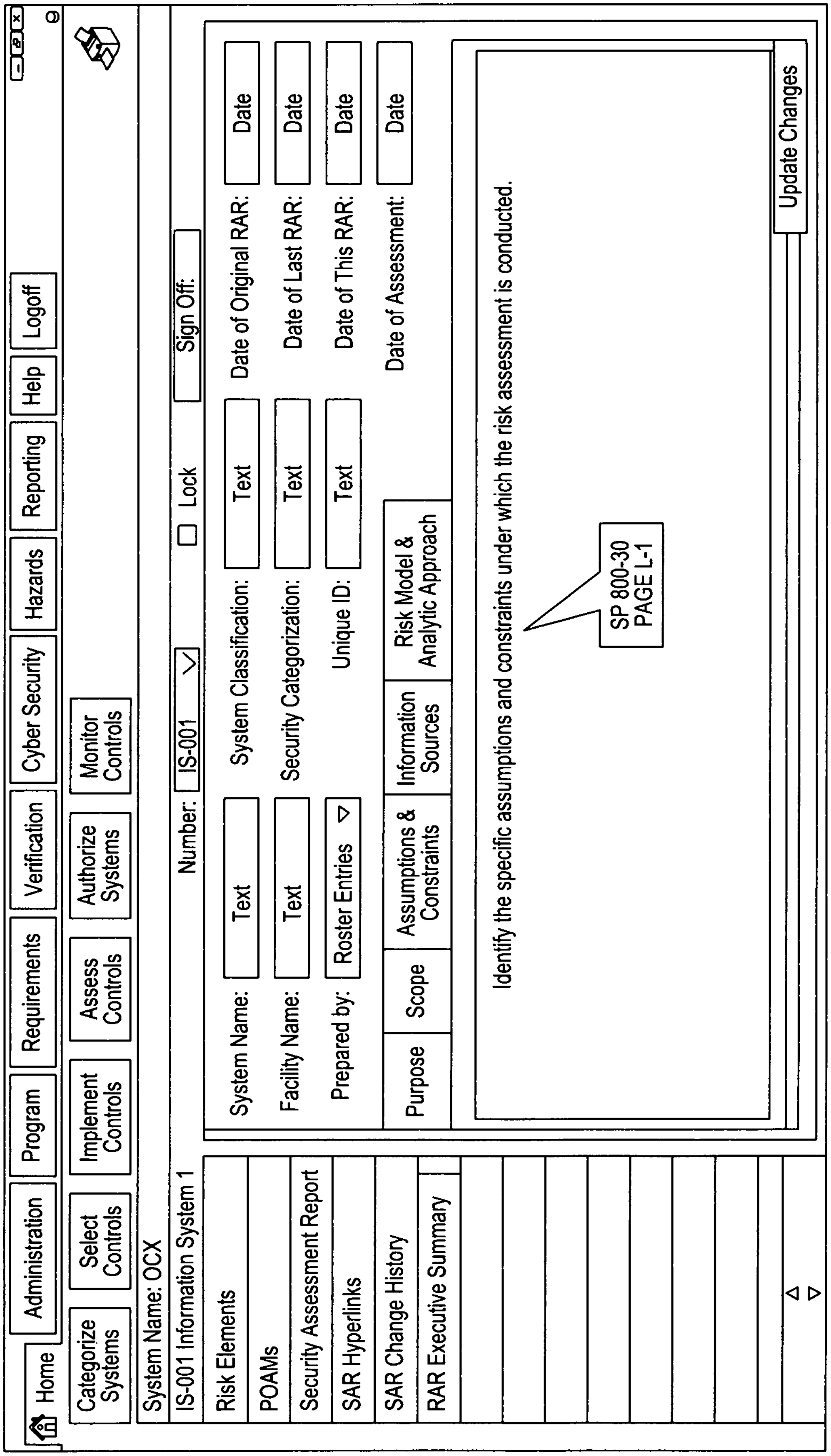
FIG. 80 illustrates Risk Assessment Form-Assumptions & Constraints: Contains requisite fields needed to be complete to generate a risk assessment report in accordance with the NIST-800-37. This GUI displays the Assumptions & Constraints tab which is a text data entry.

FIG. 80 illustrates Risk Assessment Form-Assumptions & Constraints: Contains requisite fields needed to be complete to generate a risk assessment report in accordance with the NIST-800-37. This GUI displays the Assumptions & Constraints tab which is a text data entry.

Figure 81:
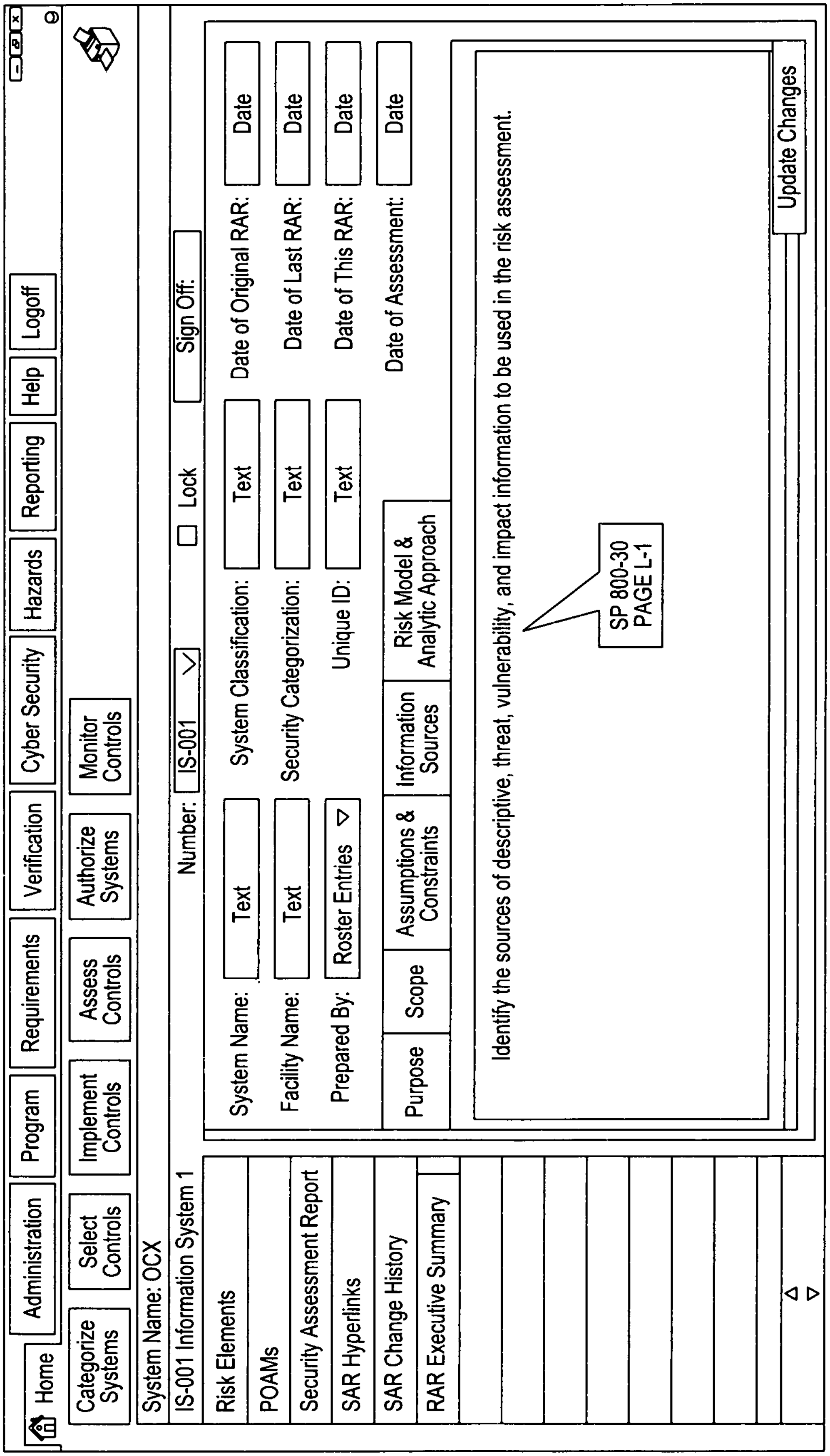
FIG. 81 illustrates Risk Assessment Form-Information Sources: Contains requisite fields needed to be complete to generate a risk assessment report in accordance with the NIST-800-37. This GUI displays the Information Sources tab which is a text data entry.

FIG. 81 illustrates Risk Assessment Form-Information Sources: Contains requisite fields needed to be complete to generate a risk assessment report in accordance with the NIST-800-37. This GUI displays the Information Sources tab which is a text data entry.

Scope and Spirit of the Present Invention of Preferred Best Mode Embodiments

In the above disclosed specifications "/" has been used to indicate an "or".

As used in this application and in the claims, the singular forms "a", "an", and "the" include also the plural forms, unless the context clearly dictates otherwise.

The term "includes" means "comprises". The term "including" means "comprising". The term "couples" or "coupled" does not exclude the presence of an intermediate element(s) between the coupled items.

The term "computer readable medium" means "non-transitory computer readable medium".

Any example in the above disclosed specifications is by way of an example only and not by way of any limitation. Having described and illustrated the principles of the disclosed technology with reference to the illustrated embodiments, it will be recognized that the illustrated embodiments can be modified in any arrangement and detail with departing from such principles. The technologies from any example can be combined in any arrangement with the technologies described in any one or more of the other examples. Alternatives specifically addressed in this application are merely exemplary and do not constitute all possible examples. Claimed invention is disclosed as one of several possibilities or as useful separately or in various combinations. See *Novozymes A/S* v. *DuPont Nutrition Biosciences APS,* 723 F3d 1336,1347.

The best mode requirement "requires an inventor(s) to disclose the best mode contemplated by him/her, as of the time he/she executes the application, of carrying out the invention." " . . . [T]he existence of a best mode is a purely subjective matter depending upon what the inventor(s) actually believed at the time the application was filed." See *Bayer AG* v. *Schein Pharmaceuticals*, Inc. The best mode requirement still exists under the America Invents Act (AIA). At the time of the invention, the inventor(s) described preferred best mode embodiments of the present invention. The sole purpose of the best mode requirement is to restrain the inventor(s) from applying for a patent, while at the same time concealing from the public preferred embodiments of their inventions, which they have in fact conceived. The best mode inquiry focuses on the inventor(s)' state of mind at the time he/she filed the patent application, raising a subjective factual question. The specificity of disclosure required to comply with the best mode requirement must be determined by the knowledge of facts within the possession of the inventor(s) at the time of filing the patent application. See *Glaxo, Inc*. v. *Novopharm Ltd.,* 52 F.3d 1043, 1050 (Fed. Cir. 1995). The above disclosed specifications are the preferred best mode embodiments of the present invention. However, they are not intended to be limited only to the preferred best mode embodiments of the present invention. Numerous variations and/or modifications are possible within the scope of the present invention. Accordingly, the disclosed preferred best mode embodiments are to be construed as illustrative only. Those who are skilled in the art can make various variations and/or modifications without departing from the scope and spirit of this invention. It should be apparent that features of one embodiment can be combined with one or more features of another embodiment to form a plurality of embodiments. The inventor(s) of the present invention is not required to describe each and every conceivable and possible future embodiment in the preferred best mode embodiments of the present invention. See *SRI Int'l* v. *Matsushita Elec. Corp. of America,* 775F.2d 1107, 1121, 227 U.S.P.Q. (BNA) 577, 585 (Fed. Cir. 1985) (en-banc).

The scope and spirit of this invention shall be defined by the claims and the equivalents of the claims only. The exclusive use of all variations and/or modifications within the scope of the claims is reserved. The general presumption is that claim terms should be interpreted using their plain and ordinary meaning. See *Oxford Immunotec Ltd*. v. *Qiagen, Inc*. et al., Action No. 15-cv-13124-NMG. Unless a claim term is specifically defined in the preferred best mode embodiments, then a claim term has an ordinary meaning, as understood by a person with an ordinary skill in the art, at the time of the present invention. Plain claim language will not be narrowed, unless the inventor(s) of the present invention clearly and explicitly disclaims broader claim scope. See *Sumitomo Dainippon Pharma Co*. v. *Emcure Pharm. Ltd*., Case Nos. 17-1798; -1799; -1800 (Fed. Cir. Apr. 16, 2018) (Stoll, J). As noted long ago: "Specifications teach. Claims claim". See *Rexnord Corp*. v. *Laitram Corp.,* 274 F.3d 1336, 1344 (Fed. Cir. 2001). The rights of claims (and rights of the equivalents of the claims) under the Doctrine of Equivalents-meeting the "Triple Identity Test" (a) performing substantially the same function, (b) in substantially the same way and (c) yielding substantially the same result. See *Crown Packaging Tech., Inc*. v. *Rexam Beverage Can Co.,* 559 F.3d 1308, 1312 (Fed. Cir. 2009)) of the present invention are not narrowed or limited by the selective imports of the specifications (of the preferred embodiments of the present invention) into the claims.

While "absolute precision is unattainable" in patented claims, the definiteness requirement "mandates clarity." See *Nautilus, Inc*. v. *Biosig Instruments, Inc.,* 527 U.S., 134 S. Ct. 2120, 2129, 110 USPQ2d 1688, 1693 (2014). Definiteness of claim language must be analyzed NOT in a vacuum, but in light of:

(a) The content of the particular application disclosure,
(b) The teachings of any prior art, and
(c) The claim interpretation that would be given by one possessing the ordinary level of skill in the pertinent art at the time the invention was made. (Id.).

See *Orthokinetics, Inc*. v. *Safety Travel Chairs, Inc.,* 806 F.2d 1565, 1 USPQ2d 1081 (Fed. Cir. 1986)

There are number of ways the written description requirement is satisfied. Applicant(s) does not need to describe every claim element exactly, because there is no such requirement (MPEP § 2163). Rather to satisfy the written description requirement, all that is required is "reasonable clarity" (MPEP § 2163.02). An adequate description may be made in anyway through express, implicit or even inherent disclosures in the application, including word, structures, figures, diagrams and/or equations (MPEP §§ 2163(I), 2163.02). The set of claims in this invention generally covers a set of sufficient number of embodiments to conform to written description and enablement doctrine. See *Ariad Pharm., Inc*. v. *Eli Lilly & Co.,* 598 F.3d 1336, 1355 (Fed. Cir. 2010), *Regents of the University of California* v. *Eli Lilly & Co.,* 119 F.3d 1559 (Fed. Cir. 1997) & *Amgen Inc*. v. *Chugai Pharmaceutical Co*. 927 F.2d 1200 (Fed. Cir. 1991).

Furthermore, *Amgen Inc*. v. *Chugai Pharmaceutical Co*. exemplifies Federal Circuit's strict enablement requirements. Additionally, the set of claims in this invention is intended to inform the scope of this invention with "reasonable certainty". See *Interval Licensing, LLC* v. *AOL Inc*. (Fed. Cir. Sep. 10, 2014). A key aspect of the enablement requirement is that it only requires that others will not have to perform "undue experimentation" to reproduce it. Enablement is not precluded by the necessity of some experimentation, "[t]he key word is 'undue', not experimentation." Enablement is generally considered to be the most important factor for determining the scope of claim protection allowed. The scope of enablement must be commensurate with the scope of the claims. However, enablement does not require that an inventor disclose every possible embodiment of his invention. The scope of enablement must be commensurate with the scope of the claims. The scope of the claims must be less than or equal to the scope of enablement. See *Promega* v. *Life Technologies* Fed. Cir., December 2014, *Magsil* v. *Hitachi Global Storage* Fed. Cir. August 2012. The term "means" was not used nor intended nor implied in the disclosed preferred best mode embodiments of the present invention. Thus, the inventor(s) has not limited the scope of the claims as mean plus function. An apparatus claim with functional language is not an impermissible "hybrid" claim; instead, it is simply an apparatus claim including functional limitations. Additionally, "apparatus claims are not necessarily indefinite for using functional language . . . [f]unctional language may also be employed to limit the claims without using the means-plus-function format." See *National Presto Industries, Inc*. v. *The West Bend Co.,* 76 F. 3d 1185 (Fed. Cir. 1996), *R.A.C.C. Indus*. v. *Stun-Tech, Inc.,* 178 F.3d 1309 (Fed. Cir. 1998) (unpublished), *Microprocessor Enhancement Corp*. v. *Texas Instruments Inc*, & *Williamson* v. *Citrix Online, LLC,* 792 F.3d 1339 (2015).

We claim:

1. A method of requirement, active compliance, active detection and resource management algorithm of cyber security utilizes or ties with a learning computer system, wherein the method of requirement, active compliance, active detection and resource management algorithm is a set of rules given to the learning computer system, wherein the learning computer system comprises: a premise computer system, or a mobile computer system, or a cloud computer system, wherein the learning computer system further comprises: one or more hardware processors, or system on chips based on neural networks, in communication with a non-transitory computer readable medium, wherein the non-transitory computer readable medium stores one or more software modules, including step-by-step instructions for the method of requirement, active compliance, active detection and resource management algorithm of cyber security, one or more learning algorithms, and/or quantum computing learning algorithms that are executable by the one or more hardware processors, or system on chips based on neural networks, wherein the one or more learning algorithms, and/or quantum computing learning algorithms are coupled with learning and/or adoption and/or data analysis in any cyber security risk in real-time or near real-time, wherein the method of requirement, active compliance, active detection and resource management algorithm of cyber security comprises: steps (a), (b), (c), (d), (e), (f), (g) and (h), at least in an ordered manner or an ordered sequence, (a) a requirement input collection algorithm or a set of step-by-step instructions for collecting a requirement of cyber security, or a requirement input data of cyber security from a data source, or an inputting device;

(b) a compliance requirement input collection algorithm or a set of step-by-step instructions for collecting compliance of cyber security, or a compliance input data of cyber security from a data source, or an inputting device;

(c) a requirement analysis algorithm or a set of step-by-step instructions for analyzing the requirement of cyber security, the requirement input data of cyber security, the compliance input data of cyber security, or the compliance of cyber security;

(d) a specification generation algorithm or a set of step-by-step instructions for generating a specification of the requirement based on an analysis of the requirement of cyber security, the requirement input data of cyber security, the compliance input data of cyber security, or the compliance of cyber security;

(e) a verification algorithm or a set of step-by-step instructions for verifying, the requirement of cyber security, the requirement input data of cyber security, the compliance input data of cyber security, or the compliance of cyber security;

(f) a fuzzy logic algorithm or a set of step-by-step instructions for accounting for inexactness of the requirement input data of cyber security, or inexactness of interpretation of the requirement input data of cyber security;

(g) an algorithm or a set of step-by-step instructions for monitoring a user behavior, or an entity behavior; and (h) a traceability generation algorithm or a set of step-by-step instructions for tracing the requirement input data of cyber security, or a requirement output data of cyber security, wherein the method of requirement, active compliance, active detection and resource management algorithm of cyber security is interfacing with an algorithm or a set of step-by-step instructions for analysis of a large set of data, or a set of encrypted data blocks in real-time or near real-time, wherein the method of requirement, active compliance, active detection and resource management algorithm of cyber security is coupled with a semantic web to reduce any risk of cyber security.

2. The method of requirement, active compliance, active detection and resource management algorithm of cyber security in claim 1, is further coupled with a remote browser to reduce any risk of cyber security.

3. The method of requirement, active compliance, active detection and resource management algorithm of cyber security in claim 2, is further coupled with a physical un-clonable function device (PUFD) to reduce any risk of cyber security, wherein the physical un-clonable function device (PUFD) comprises one or more memristors.

4. The method of requirement, active compliance, active detection and resource management algorithm of cyber security in claim 1, is further coupled with a blockchain to reduce any risk of cyber security.

5. The method of requirement, active compliance, active detection and resource management algorithm of cyber security in claim 1, is further coupled with hardware authentication to reduce any risk of cyber security.

6. The method of requirement, active compliance, active detection and resource management algorithm of cyber security in claim 1, is further coupled with a quantum computing resistant cryptosystem.

7. The method of requirement, active compliance, active detection and resource management algorithm of cyber security in claim 1, further comprising: a neuro-fuzzy logic algorithm or a set of step-by-step instructions to account for inexactness of data analysis.

8. The method of requirement, active compliance, active detection and resource management algorithm of cyber security in claim 1, is further coupled with a set of step-by-step instructions for monitoring continuous risk, or trust assessment of cyber security.

9. The method of requirement, active compliance, active detection and resource management algorithm of cyber security in claim 1, is further coupled with a set of step-by-step instructions for identifying a risk, when the requirement of cyber security changes.

10. The method of requirement, active compliance, active detection and resource management algorithm of cyber security in claim 1, is further coupled with one or more software agents, wherein the one or more software agents are coupled with the learning computer system.

11. A method of requirement, active compliance, active detection and resource management algorithm of cyber security utilizes or ties with a learning computer system, wherein the method of requirement, active compliance, active detection and resource management algorithm is a set of rules given to the learning computer system, wherein the learning computer system comprises: a premise computer system, or a mobile computer system, or a cloud computer system, wherein the learning computer system further comprises: one or more hardware processors, or system on chips based on neural networks, in communication with a non-transitory computer readable medium, wherein the non-transitory computer readable medium stores one or more software modules, including step-by-step instructions for the method of requirement, active compliance, active detection and resource management algorithm of cyber security, one or more learning algorithms, and/or quantum computing learning algorithms, and/or one or more software agents, that are executable by the one or more hardware processors, or system on chips based on neural networks, wherein the one or more learning algorithms, and/or quantum computing learning algorithms are coupled with learning and/or adoption and/or data analysis in any cyber security risk in real-time or near real-time, wherein the one or more software agents are coupled with the learning computer, wherein the one or more software agents are coupled to search an Internet for cyber security risk in real-time or near real-time, wherein the method of requirement, active compliance, active detection and resource management algorithm of cyber security comprises: steps (a), (b), (c), (d), (e), (f), (g) and (h), at least in an ordered manner or an ordered sequence, (a) a requirement input collection algorithm or a set of step-by-step instructions for collecting a requirement of cyber security, or a requirement input data of cyber security from a data source, or an inputting device;

(b) a compliance requirement input collection algorithm or a set of step-by-step instructions for collecting compliance of cyber security, or a compliance input data of cyber security from a data source, or an inputting device;

(c) a requirement analysis algorithm or a set of step-by-step instructions for analyzing the requirement of cyber security, the requirement input data of cyber security, the compliance input data of cyber security, or the compliance of cyber security;

(d) a specification generation algorithm or a set of step-by-step instructions for generating a specification of the requirement based on an analysis of the requirement of cyber security, the requirement input data of cyber security, the compliance input data of cyber security, or the compliance of cyber security;

(e) a verification algorithm or a set of step-by-step instructions for verifying, the requirement of cyber security, the requirement input data of cyber security, the compliance input data of cyber security, or the compliance of cyber security;

(f) a fuzzy logic algorithm or a set of step-by-step instructions for accounting for inexactness of the requirement input data of cyber security, or inexactness of interpretation of the requirement input data of cyber security;

(g) an algorithm or a set of step-by-step instructions for monitoring a user behavior, or an entity behavior; and (h) a traceability generation algorithm or a set of step-by-step instructions for tracing the requirement input data of cyber security, or a requirement output data of cyber security, wherein the method of requirement, active compliance, active detection and resource management algorithm of cyber security is interfacing with a semantic web, and/or an algorithm or a set of step-by-step instructions for analysis of a large set of data, wherein the method of requirement, active compliance, active detection and resource management algorithm of cyber security is coupled with a quantum computing resistant cryptosystem.

12. The method of requirement, active compliance, active detection and resource management algorithm of cyber security in claim 11, is further coupled with a remote browser to reduce any risk of cyber security.

13. The method of requirement, active compliance, active detection and resource management algorithm of cyber security in claim 12, is further coupled with a physical un-clonable function device (PUFD) to reduce any risk of cyber security, wherein the physical un-clonable function device (PUFD) comprises one or more memristors.

14. The method of requirement, active compliance, active detection and resource management algorithm of cyber security in claim 11, is further coupled with a blockchain to reduce any risk of cyber security.

15. The method of requirement, active compliance, active detection and resource management algorithm of cyber security in claim 11, is further coupled with hardware authentication to reduce any risk of cyber security.

16. The method of requirement, active compliance, active detection and resource management algorithm of cyber security in claim 11, further comprising: a neuro-fuzzy logic algorithm or a set of step-by-step instructions to account for inexactness of data analysis.

17. The method of requirement, active compliance, active detection and resource management algorithm of cyber security in claim 11, is further coupled with a set of step-by-step instructions for monitoring a continuous risk, or trust assessment of cyber security.

18. The method of requirement, active compliance, active detection and resource management algorithm of cyber security in claim 11, is further coupled with a set of step-by-step instructions for identifying a risk, when the requirement of cyber security changes.

19. A method of requirement, active compliance, active detection and resource management algorithm of cyber security utilizes or ties with a learning computer system, wherein the method of requirement, active compliance, active detection and resource management algorithm is a set of rules given to the learning computer system, wherein the learning computer system comprises: a premise computer system, or a mobile computer system, or a cloud computer system, wherein the learning computer system further comprises: one or more hardware processors, or system on chips based on neural networks, in communication with a non-transitory computer readable medium, wherein the non-transitory computer readable medium stores one or more software modules, including step-by-step instructions for the method of requirement, active compliance, active detection and resource management algorithm of cyber security, one or more learning algorithms, and/or quantum computing learning algorithms that are executable by the one or more hardware processors, or system on chips based on neural networks, wherein the one or more learning algorithms, and/or quantum computing learning algorithms are coupled with learning and/or adoption and/or data analysis in any cyber security risk in real-time or near real-time, wherein the method of requirement, active compliance, active detection and resource management algorithm of cyber security comprises: steps (a), (b), (c), (d), (e) and (f), at least in an ordered manner or an ordered sequence, (a) a compliance requirement input collection algorithm or a set of step-by-step instructions for collecting compliance of cyber security, or a compliance input data of cyber security from a data source, or an inputting device;

(b) a verification algorithm or a set of step-by-step instructions for verifying the compliance input data of cyber security, or the compliance of cyber security;

(c) a neuro-fuzzy logic algorithm or a set of step-by-step instructions for accounting for inexactness of the compliance input data of cyber security, or the compliance of cyber security;

(d) an algorithm or a set of step-by-step instructions for monitoring a user behavior, or an entity behavior;

(e) an algorithm or a set of step-by-step instructions for assigning a deceptive network credential in real-time or near real-time; and (f) a traceability generation algorithm or a set of step-by-step instructions for tracing the compliance input data of cyber security, or the compliance of cyber security, wherein the method of requirement, active compliance, active detection and resource management algorithm of cyber security is interfacing with an algorithm or a set of step-by-step instructions for analysis of a large set of data, and a set of encrypted data blocks, wherein the method of requirement, active compliance, active detection and resource management algorithm of cyber security is coupled with hardware authentication to reduce any risk of cyber security.

20. The method of requirement, active compliance, active detection and resource management algorithm of cyber security in claim 19, is further coupled with a remote browser to reduce any risk of cyber security.

21. The method of requirement, active compliance, active detection and resource management algorithm of cyber security in claim 20, is further coupled with a physical un-clonable function device (PUFD) to reduce any risk of cyber security, wherein the physical un-clonable function device (PUFD) comprises one or more memristors.

22. The method of requirement, active compliance, active detection and resource management algorithm of cyber security in claim 19, is further coupled with a semantic web to reduce any risk of cyber security.

23. The method of requirement, active compliance, active detection and resource management algorithm of cyber security in claim 19, is further coupled with a blockchain to reduce any risk of cyber security.

24. The method of requirement, active compliance, active detection and resource management algorithm of cyber security in claim 19, is further coupled with a quantum computing resistant cryptosystem.

25. The method of requirement, active compliance, active detection and resource management algorithm of cyber security in claim 19, further comprising: a neuro-fuzzy logic algorithm or a set of step-by-step instructions to account for inexactness of data analysis.

26. The method of requirement, active compliance, active detection and resource management algorithm of cyber security in claim 19, is further coupled with a set of step-by-step instructions for monitoring a continuous risk, or trust assessment of cyber security.

27. The method of requirement, active compliance, active detection and resource management algorithm of cyber security in claim 19, is further coupled with a set of step-by-step instructions for identifying a risk, when a requirement of cyber security changes.

28. The method of requirement, active compliance, active detection and resource management algorithm of cyber security in claim 19, is further coupled with one or more software agents to search an Internet for cyber security risk in real-time or near real-time, wherein the one or more software agents are coupled with the learning computer system.

29. A method of requirement, active compliance, active detection and resource management algorithm cyber security utilizes or ties with a learning computer system, wherein the method of requirement, active compliance, active detection and resource management algorithm is a set of rules given to the learning computer system, wherein the learning computer system comprises: a premise computer system, or a mobile computer system, or a cloud computer system, wherein the learning computer system further comprises: one or more hardware processors, or system on chips based on neural networks, in communication with a non-transitory computer readable medium, wherein the non-transitory computer readable medium stores one or more software modules, including step-by-step instructions for the method of requirement, active compliance, active detection and resource management algorithm of cyber security, one or more learning algorithms, and/or quantum computing learning algorithms that are executable by the one or more hardware processors, or system on chips based on neural networks, wherein the one or more learning algorithms, and/or quantum computing learning algorithms are coupled with learning and/or adoption and/or data analysis in any cyber security risk in real-time or near real-time, wherein the method of requirement, active compliance, active detection and resource management algorithm of cyber security comprises: steps (a), (b) and (c), at least in an ordered manner or an ordered sequence, (a) an algorithm or a set of step-by-step instructions for monitoring a user behavior, or an entity behavior;

(b) an algorithm or a set of step-by-step instructions for accessing a deceptive network credential in real-time or near real-time; and (c) an algorithm or a set of step-by-step instructions for monitoring a continuous risk, or trust assessment of cyber security in real-time or near real-time;

wherein the method of requirement, active compliance, active detection and resource management algorithm of cyber security is coupled with hardware authentication to reduce any risk of cyber security, wherein the method of requirement, active compliance, active detection and resource management algorithm for of cyber security is further coupled with a semantic web, and an algorithm or a set of step-by-step instructions for analysis of a large set of data.

30. The method of requirement, active compliance, active detection and resource management algorithm of cyber security in claim 29, is further interfacing with an algorithm or a set of step-by-step instructions for analysis of a large set of data in real-time or near real-time.

31. The method of requirement, active compliance, active detection and resource management algorithm of cyber security in claim 29, is further interfacing with a set of encrypted data blocks in real-time or near real-time.

32. The method of requirement, active compliance, active detection and resource management algorithm of cyber security in claim 29, is further coupled with one or more software agents to search an Internet for cyber security risk in real-time or near real-time, wherein the one or more software agents are coupled with the learning computer system.

33. The method of requirement, active compliance, active detection and resource management algorithm of cyber security in claim 29, is further coupled with a remote browser to reduce any risk of cyber security.

34. The method of requirement, active compliance, active detection and resource management algorithm of cyber security in claim 33, is further coupled with a physical un-clonable function device (PUFD) to reduce any risk of cyber security, wherein the physical un-clonable function device (PUFD) comprises one or more memristors.

35. The method of requirement, active compliance, active detection and resource management algorithm of cyber security in claim 29, is further coupled with a blockchain to reduce any risk of cyber security.

36. The method of requirement, active compliance, active detection and resource management algorithm of cyber security in claim 29, is further coupled with a quantum computing resistant cryptosystem.

37. The method of requirement, active compliance, active detection and resource management algorithm of cyber security in claim 29, further comprising: a neuro-fuzzy logic algorithm or a set of step-by-step instructions to account for inexactness of data analysis.

* * * * *